(12) United States Patent
Raleigh et al.

(10) Patent No.: US 9,571,559 B2
(45) Date of Patent: Feb. 14, 2017

(54) ENHANCED CURFEW AND PROTECTION ASSOCIATED WITH A DEVICE GROUP

(71) Applicant: Headwater Partners I LLC, Redwood Shores, CA (US)

(72) Inventors: Gregory G. Raleigh, Woodside, CA (US); Jose Tellado, Mountain View, CA (US); Jeffrey Green, Sunnyvale, CA (US); James Lavine, Corte Madera, CA (US); Russell Bertrand Carter, III, San Jose, CA (US)

(73) Assignee: Headwater Partners I LLC, Tyler, TX (US)

( * ) Notice: Subject to any disclaimer, the term of this patent is extended or adjusted under 35 U.S.C. 154(b) by 215 days.

(21) Appl. No.: 14/181,910

(22) Filed: Feb. 17, 2014

(65) Prior Publication Data

US 2014/0162595 A1 Jun. 12, 2014

Related U.S. Application Data

(63) Continuation-in-part of application No. 13/748,152, filed on Jan. 23, 2013, which is a continuation-in-part
(Continued)

(51) Int. Cl.
*H04M 11/00* (2006.01)
*H04L 29/08* (2006.01)
(Continued)

(52) U.S. Cl.
CPC .............. *H04L 67/04* (2013.01); *H04L 12/14* (2013.01); *H04L 67/22* (2013.01); *H04M 15/00* (2013.01);
(Continued)

(58) Field of Classification Search
CPC .................................................. H04M 2215/32
(Continued)

(56) References Cited

U.S. PATENT DOCUMENTS 5,131,020 A 7/1992 Liebesny et al.
5,283,904 A 2/1994 Carson et al.
(Continued)

FOREIGN PATENT DOCUMENTS

CA 2688553 A1 12/2008
CN 1310401 A 8/2001
(Continued)

OTHER PUBLICATIONS

3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
(Continued)

*Primary Examiner* — Andrew Joseph Rudy
(74) *Attorney, Agent, or Firm* — James E. Harris

(57) ABSTRACT

A method comprising obtaining, from a master user, a device usage allocation applicable to two or more devices, the two or more devices being associated with another user, the another user being different from the master user, obtaining an aggregate measure of device usage associated with the two or more devices, if the aggregate measure of device usage associated with the two or more devices satisfies a condition relative to the device usage allocation, managing an activity of the two or more devices, and sending a notification to at least one of the two or more devices, the notification for presentation to the another user through a user interface of the at least one of the two or more devices.

25 Claims, 85 Drawing Sheets

Related U.S. Application Data of application No. 13/441,821, filed on Apr. 6, 2012, and a continuation-in-part of application No. 12/380,780, filed on Mar. 2, 2009, now Pat. No. 8,839,388, and a continuation-in-part of application No. 12/695,020, filed on Jan. 27, 2010, now Pat. No. 8,406,748, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/239,321, filed on Sep. 21, 2011, now Pat. No. 8,898,293, and a continuation-in-part of application No. 13/309,556, filed on Dec. 1, 2011, now Pat. No. 8,893,009, and a continuation-in-part of application No. 13/374,959, filed on Jan. 24, 2012, now Pat. No. 8,606,911, said application No. 13/441,821 is a continuation-in-part of application No. 12/380,759, filed on Mar. 2, 2009, now Pat. No. 8,270,310, and a continuation-in-part of application No. 12/380,779, filed on Mar. 2, 2009, now abandoned, and a continuation-in-part of application No. 12/380,758, filed on Mar. 2, 2009, and a continuation-in-part of application No. 12/380,778, filed on Mar. 2, 2009, now Pat. No. 8,321,526, and a continuation-in-part of application No. 12/380,768, filed on Mar. 2, 2009, now Pat. No. 9,137,739, and a continuation-in-part of application No. 12/380,767, filed on Mar. 2, 2009, now Pat. No. 8,355,337, and a continuation-in-part of application No. 12/380,780, filed on Mar. 2, 2009, now Pat. No. 8,839,388, and a continuation-in-part of application No. 12/380,755, filed on Mar. 2, 2009, now Pat. No. 8,331,901, and a continuation-in-part of application No. 12/380,756, filed on Mar. 2, 2009, now Pat. No. 8,250,207, and a continuation-in-part of application No. 12/380,772, filed on Mar. 2, 2009, now Pat. No. 8,839,387, and a continuation-in-part of application No. 12/380,782, filed on Mar. 2, 2009, now Pat. No. 8,270,952, and a continuation-in-part of application No. 12/380,783, filed on Mar. 2, 2009, now abandoned, and a continuation-in-part of application No. 12/380,757, filed on Mar. 2, 2009, now Pat. No. 8,326,958, and a continuation-in-part of application No. 12/380,781, filed on Mar. 2, 2009, now Pat. No. 8,229,812, and a continuation-in-part of application No. 12/380,774, filed on Mar. 2, 2009, now Pat. No. 8,630,192, and a continuation-in-part of application No. 12/380,773, filed on Mar. 2, 2009, now Pat. No. 8,799,451, and a continuation-in-part of application No. 12/380,769, filed on Mar. 2, 2009, now Pat. No. 8,675,507, and a continuation-in-part of application No. 12/380,777, filed on Mar. 2, 2009, now Pat. No. 8,583,781, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, now Pat. No. 8,548,428, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, and a continuation-in-part of application No. 13/134,005, filed on May 25, 2011, now Pat. No. 8,635,335, and a continuation-in-part of application No. 13/134,028, filed on May 25, 2011, now Pat. No. 8,589,541, and a continuation-in-part of application No. 13/229,580, filed on Sep. 9, 2011, now Pat. No. 8,626,115, and a continuation-in-part of application No. 13/237,827, filed on Sep. 20, 2011, now Pat. No. 8,832,777, and a continuation-in-part of application No. 13/239,321, filed on Sep. 21, 2011, now Pat. No. 8,898,293, and a continuation-in-part of application No. 13/247,998, filed on Sep. 28, 2011, now Pat. No. 8,725,123, and a continuation-in-part of application No. 13/248,028, filed on Sep. 28, 2011, now Pat. No. 8,924,469, and a continuation-in-part of application No. 13/248,025, filed on Sep. 28, 2011, now Pat. No. 8,924,543, and a continuation-in-part of application No. 13/253,013, filed on Oct. 4, 2011, now Pat. No. 8,745,191, and a continuation-in-part of application No. 13/309,556, filed on Dec. 1, 2011, now Pat. No. 8,893,009, and a continuation-in-part of application No. 13/309,463, filed on Dec. 1, 2011, now Pat. No. 8,793,758.

(60) Provisional application No. 61/765,978, filed on Feb. 18, 2013, provisional application No. 61/785,988, filed on Mar. 14, 2013, provisional application No. 61/794,116, filed on Mar. 15, 2013, provisional application No. 61/792,765, filed on Mar. 15, 2013, provisional application No. 61/793,894, filed on Mar. 15, 2013, provisional application No. 61/799,710, filed on Mar. 15, 2013, provisional application No. 61/801,074, filed on Mar. 15, 2013, provisional application No. 61/589,830, filed on Jan. 23, 2012, provisional application No. 61/610,876, filed on Mar. 14, 2012, provisional application No. 61/658,339, filed on Jun. 11, 2012, provisional application No. 61/667,927, filed on Jul. 3, 2012, provisional application No. 61/674,331, filed on Jul. 21, 2012, provisional application No. 61/724,267, filed on Nov. 8, 2012, provisional application No. 61/724,837, filed on Nov. 9, 2012, provisional application No. 61/724,974, filed on Nov. 10, 2012, provisional application No. 61/732,249, filed on Nov. 30, 2012, provisional application No. 61/734,288, filed on Dec. 6, 2012, provisional application No. 61/745,548, filed on Dec. 22, 2012, provisional application No. 61/472,606, filed on Apr. 6, 2011, provisional application No. 61/550,906, filed on Oct. 24, 2011, provisional application No. 61/589,830, filed on Jan. 23, 2012, provisional application No. 61/610,910, filed on Mar. 14, 2012, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/275,208, filed on Aug. 25, 2009, provisional application No. 61/237,753, filed on Aug. 28, 2009, provisional application No. 61/348,022, filed on May 25, 2010, provisional application No. 61/381,159, filed on Sep. 9, 2010, provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/381,162, filed on Sep. 9, 2010, provisional application No. 61/385,020, filed on Sep. 21, 2010, provisional application No. 61/389,549, filed on Oct. 4, 2010, provisional application No. 61/252,151, filed on Oct. 15, 2009, provisional application No. 61/270,353, filed on Jul. 6, 2009, provisional application No. 61/252,153, filed on Oct. 15, 2009.

(51) Int. Cl.
*H04L 12/14* (2006.01)
*H04M 15/00* (2006.01)
*H04W 4/24* (2009.01)
*H04W 4/26* (2009.01)
*H04W 8/18* (2009.01)
*H04W 24/02* (2009.01)

(52) U.S. Cl.
CPC ............ *H04M 15/58* (2013.01); *H04M 15/61* (2013.01); *H04W 4/24* (2013.01); *H04W 4/26* (2013.01); *H04W 8/18* (2013.01); *H04L 67/34* (2013.01); *H04M 2215/0188* (2013.01); *H04W 24/02* (2013.01)

(58) Field of Classification Search
USPC ......... 455/405, 406, 418, 419, 414.1, 432.1; 709/223, 224
See application file for complete search history.

(56) References Cited

U.S. PATENT DOCUMENTS

| | | | |
|---|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A * | 5/2000 | Tamura ............ H04M 1/72502 455/419 |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A * | 12/2000 | Voit ........................ H04L 12/14 370/353 |
| 6,185,576 B1 | 2/2001 | Mcintosh |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,532,235 B1 | 3/2003 | Benson et al. |
| 6,532,579 B2 | 3/2003 | Sato et al. |
| 6,535,855 B1 | 3/2003 | Cahill et al. |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,598,034 B1 | 7/2003 | Kloth |
| 6,601,040 B1 | 7/2003 | Kolls |
| 6,603,969 B1 | 8/2003 | Vuoristo et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |

(56) References Cited

U.S. PATENT DOCUMENTS

| | | |
|---|---|---|
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Hermann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,982,733 B1 | 1/2006 | McNally et al. |
| 6,983,370 B2 | 1/2006 | Eaton et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 * | 9/2006 | Campen ............ H04M 3/42144 455/414.1 |
| 7,113,780 B2 | 9/2006 | McKenna et al. |
| 7,113,997 B2 | 9/2006 | Jayapalan et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,203,169 B1 | 4/2007 | Okholm et al. |
| 7,203,752 B2 | 4/2007 | Rice et al. |
| 7,212,491 B2 | 5/2007 | Koga |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,428,750 B1 | 9/2008 | Dunn et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |

(56) References Cited

U.S. PATENT DOCUMENTS

| | | |
|---|---|---|
| 7,499,537 B2 | 3/2009 | Elsey et al. |
| 7,502,672 B1 | 3/2009 | Kolls |
| 7,508,799 B2 | 3/2009 | Sumner et al. |
| 7,512,128 B2 | 3/2009 | DiMambro et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,599,288 B2 | 10/2009 | Cole et al. |
| 7,599,714 B2 | 10/2009 | Kuzminskiy |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,617,516 B1 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,676,673 B2 | 3/2010 | Weller et al. |
| 7,680,086 B2 | 3/2010 | Eglin |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,770,785 B2 | 8/2010 | Jha et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,606 B2 | 9/2010 | Birger et al. |
| 7,809,351 B1 | 10/2010 | Panda et al. |
| 7,817,615 B1 | 10/2010 | Breau et al. |
| 7,817,983 B2 | 10/2010 | Cassett et al. |
| 7,822,837 B1 | 10/2010 | Urban et al. |
| 7,826,427 B2 | 11/2010 | Sood et al. |
| 7,826,607 B1 | 11/2010 | de Carvalho Resende et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,477 B2 | 12/2010 | Cristofalo et al. |
| 7,853,255 B2 | 12/2010 | Karaoguz et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |

(56) References Cited

U.S. PATENT DOCUMENTS

| | | |
|---|---|---|
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman et al. |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |

(56) References Cited

U.S. PATENT DOCUMENTS

| | | |
|---|---|---|
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,307,067 B2 | 11/2012 | Ryan |
| 8,307,095 B2 | 11/2012 | Clark et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour |
| 8,386,386 B1 | 2/2013 | Zhu |
| 8,391,262 B2 | 3/2013 | Maki et al. |
| 8,391,834 B2 | 3/2013 | Raleigh |
| 8,396,458 B2 | 3/2013 | Raleigh |
| 8,396,929 B2 | 3/2013 | Helfman et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B2 | 4/2013 | Wang |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,429,409 B1 | 4/2013 | Wall et al. |
| 8,437,734 B2 | 5/2013 | Ray et al. |
| 8,441,955 B2 | 5/2013 | Wilkinson et al. |

(56) References Cited

U.S. PATENT DOCUMENTS

| | | | |
|---|---|---|---|
| 8,442,015 B2 | 5/2013 | Behzad et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 | 7/2013 | Shahbazi |
| RE44,412 E | 8/2013 | Naqvi et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 * | 9/2013 | Pekrul ............... F01C 1/3445 418/259 |
| 8,526,329 B2 | 9/2013 | Mahany et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,532,610 B2 | 9/2013 | Manning Cassett et al. |
| 8,533,775 B2 | 9/2013 | Alcorn et al. |
| 8,538,394 B2 | 9/2013 | Zimmerman et al. |
| 8,538,402 B2 * | 9/2013 | Vidal .................. H04W 4/00 455/418 |
| 8,538,421 B2 | 9/2013 | Brisebois et al. |
| 8,538,458 B2 | 9/2013 | Haney |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,554,876 B2 | 10/2013 | Winsor |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,589,541 B2 | 11/2013 | Raleigh et al. |
| 8,589,955 B2 | 11/2013 | Roundtree et al. |
| 8,600,895 B2 | 12/2013 | Felsher |
| 8,601,125 B2 | 12/2013 | Huang et al. |
| 8,605,691 B2 | 12/2013 | Soomro et al. |
| 8,621,056 B2 | 12/2013 | Coussemaeker et al. |
| 8,626,115 B2 | 1/2014 | Raleigh et al. |
| 8,630,314 B2 | 1/2014 | York |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,925 B1 | 3/2014 | Liu et al. |
| 8,693,323 B1 | 4/2014 | McDysan |
| 8,694,772 B2 | 4/2014 | Kao et al. |
| 8,701,015 B2 | 4/2014 | Bonnat |
| 8,705,361 B2 | 4/2014 | Venkataraman et al. |
| 8,706,863 B2 | 4/2014 | Fadell |
| 8,712,631 B2 | 4/2014 | Tietjen et al. |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,739,287 B1 | 5/2014 | Polyakov et al. |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,793,304 B2 | 7/2014 | Lu et al. |
| 8,799,227 B2 | 8/2014 | Ferguson et al. |
| 8,804,517 B2 | 8/2014 | Oerton |
| 8,811,338 B2 | 8/2014 | Jin et al. |
| 8,811,991 B2 | 8/2014 | Jain et al. |
| 8,812,525 B1 | 8/2014 | Taylor, III |
| 8,819,253 B2 | 8/2014 | Simeloff et al. |
| 8,825,109 B2 | 9/2014 | Montemurro et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,875,042 B2 * | 10/2014 | Lejeune ............... G06F 1/1616 715/764 |
| 8,880,047 B2 | 11/2014 | Konicek et al. |
| 8,898,748 B2 | 11/2014 | Burks et al. |
| 8,908,516 B2 | 12/2014 | Tzamaloukas et al. |
| 8,930,238 B2 | 1/2015 | Coffman et al. |
| 8,943,551 B2 | 1/2015 | Ganapathy et al. |
| 8,948,726 B2 | 2/2015 | Smith et al. |
| 8,949,597 B1 | 2/2015 | Reeves et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,977,856 B2 | 3/2015 | Malek et al. |
| 8,983,860 B1 | 3/2015 | Beda, III et al. |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,021,069 B2 | 4/2015 | Ducrou et al. |
| 9,030,934 B2 | 5/2015 | Shah et al. |
| 9,032,427 B2 | 5/2015 | Gallant et al. |

(56) References Cited

U.S. PATENT DOCUMENTS

| | | | |
|---|---|---|---|
| 9,043,462 B2* | 5/2015 | Badiee | H04L 43/08 709/224 |
| 9,047,651 B2* | 6/2015 | Roumeliotis | G06Q 50/32 |
| 9,049,010 B2 | 6/2015 | Jueneman et al. | |
| 9,135,037 B1 | 9/2015 | Petrescu-Prahova et al. | |
| 9,137,389 B2* | 9/2015 | Neal | G06Q 10/103 |
| 9,172,553 B2 | 10/2015 | Dawes et al. | |
| 9,173,090 B2 | 10/2015 | Tuchman et al. | |
| 9,176,913 B2 | 11/2015 | Millet et al. | |
| 9,177,455 B2* | 11/2015 | Remer | G08B 25/016 |
| 9,191,394 B2 | 11/2015 | Novak et al. | |
| 9,282,460 B2 | 3/2016 | Souissi | |
| 9,298,723 B1 | 3/2016 | Vincent | |
| 9,325,737 B2 | 4/2016 | Gutowski et al. | |
| 9,344,557 B2 | 5/2016 | Gruchala et al. | |
| 9,361,451 B2 | 6/2016 | Oberheide et al. | |
| 9,367,680 B2 | 6/2016 | Mahaffey et al. | |
| 9,369,959 B2 | 6/2016 | Ruutu et al. | |
| 9,386,045 B2 | 7/2016 | Kgil et al. | |
| 9,413,546 B2 | 8/2016 | Meier et al. | |
| 2002/0120370 A1 | 8/2002 | Parupudi et al. | |
| 2002/0138599 A1 | 9/2002 | Dilman et al. | |
| 2002/0154751 A1 | 10/2002 | Thompson et al. | |
| 2002/0188732 A1 | 12/2002 | Buckman et al. | |
| 2002/0191573 A1 | 12/2002 | Whitehill et al. | |
| 2003/0028623 A1 | 2/2003 | Hennessey et al. | |
| 2003/0084321 A1 | 5/2003 | Tarquini et al. | |
| 2003/0134650 A1 | 7/2003 | Sundar et al. | |
| 2003/0159030 A1 | 8/2003 | Evans | |
| 2003/0184793 A1 | 10/2003 | Pineau | |
| 2003/0188006 A1 | 10/2003 | Bard | |
| 2004/0039792 A1 | 2/2004 | Nakanishi | |
| 2004/0054779 A1 | 3/2004 | Takeshima et al. | |
| 2004/0127208 A1 | 7/2004 | Nair et al. | |
| 2004/0133668 A1 | 7/2004 | Nicholas, III | |
| 2004/0137890 A1 | 7/2004 | Kalke | |
| 2004/0170191 A1 | 9/2004 | Guo et al. | |
| 2004/0176104 A1 | 9/2004 | Arcens | |
| 2004/0203833 A1 | 10/2004 | Rathunde et al. | |
| 2004/0225561 A1 | 11/2004 | Hertzberg et al. | |
| 2004/0243680 A1 | 12/2004 | Mayer | |
| 2004/0243992 A1 | 12/2004 | Gustafson et al. | |
| 2004/0259534 A1 | 12/2004 | Chaudhari et al. | |
| 2004/0260766 A1 | 12/2004 | Barros et al. | |
| 2004/0267872 A1 | 12/2004 | Serdy et al. | |
| 2005/0041617 A1 | 2/2005 | Huotari et al. | |
| 2005/0060525 A1 | 3/2005 | Schwartz et al. | |
| 2005/0075115 A1 | 4/2005 | Corneille et al. | |
| 2005/0091505 A1 | 4/2005 | Riley et al. | |
| 2005/0096024 A1 | 5/2005 | Bicker et al. | |
| 2005/0108075 A1 | 5/2005 | Douglis et al. | |
| 2005/0135264 A1 | 6/2005 | Popoff et al. | |
| 2005/0163320 A1 | 7/2005 | Brown et al. | |
| 2005/0186948 A1 | 8/2005 | Gallagher et al. | |
| 2005/0239447 A1 | 10/2005 | Holzman et al. | |
| 2005/0245241 A1 | 11/2005 | Durand et al. | |
| 2005/0250536 A1 | 11/2005 | Deng et al. | |
| 2006/0030306 A1 | 2/2006 | Kuhn | |
| 2006/0035631 A1 | 2/2006 | White et al. | |
| 2006/0072451 A1 | 4/2006 | Ross | |
| 2006/0075506 A1 | 4/2006 | Sanda et al. | |
| 2006/0095517 A1 | 5/2006 | O'Connor et al. | |
| 2006/0098627 A1 | 5/2006 | Karaoguz et al. | |
| 2006/0099970 A1 | 5/2006 | Morgan et al. | |
| 2006/0114821 A1 | 6/2006 | Willey et al. | |
| 2006/0126562 A1 | 6/2006 | Liu | |
| 2006/0136882 A1 | 6/2006 | Noonan et al. | |
| 2006/0143066 A1 | 6/2006 | Calabria | |
| 2006/0160536 A1 | 7/2006 | Chou | |
| 2006/0168128 A1 | 7/2006 | Sistla et al. | |
| 2006/0182137 A1 | 8/2006 | Zhou et al. | |
| 2006/0200663 A1 | 9/2006 | Thornton | |
| 2006/0206709 A1 | 9/2006 | Labrou et al. | |
| 2006/0277590 A1 | 12/2006 | Limont et al. | |
| 2006/0291419 A1 | 12/2006 | McConnell et al. | |
| 2007/0005795 A1 | 1/2007 | Gonzalez | |
| 2007/0060200 A1 | 3/2007 | Boris et al. | |
| 2007/0061800 A1 | 3/2007 | Cheng et al. | |
| 2007/0073899 A1 | 3/2007 | Judge et al. | |
| 2007/0130283 A1 | 6/2007 | Klein et al. | |
| 2007/0143824 A1 | 6/2007 | Shahbazi | |
| 2007/0147317 A1 | 6/2007 | Smith et al. | |
| 2007/0165630 A1 | 7/2007 | Rasanen et al. | |
| 2007/0174490 A1 | 7/2007 | Choi et al. | |
| 2007/0192460 A1 | 8/2007 | Choi et al. | |
| 2007/0201502 A1 | 8/2007 | Abramson | |
| 2007/0213054 A1 | 9/2007 | Han | |
| 2007/0226775 A1 | 9/2007 | Andreasen et al. | |
| 2007/0234402 A1 | 10/2007 | Khosravi et al. | |
| 2007/0255769 A1 | 11/2007 | Agrawal et al. | |
| 2007/0255797 A1 | 11/2007 | Dunn et al. | |
| 2007/0257767 A1 | 11/2007 | Beeson | |
| 2007/0259656 A1 | 11/2007 | Jeong | |
| 2007/0266422 A1 | 11/2007 | Germano et al. | |
| 2007/0293191 A1 | 12/2007 | Mir et al. | |
| 2007/0294410 A1 | 12/2007 | Pandya et al. | |
| 2007/0297378 A1 | 12/2007 | Poyhonen et al. | |
| 2007/0299965 A1 | 12/2007 | Nieh et al. | |
| 2008/0010379 A1 | 1/2008 | Zhao | |
| 2008/0018494 A1 | 1/2008 | Waite et al. | |
| 2008/0025230 A1 | 1/2008 | Patel et al. | |
| 2008/0032715 A1 | 2/2008 | Jia et al. | |
| 2008/0034063 A1 | 2/2008 | Yee | |
| 2008/0034419 A1 | 2/2008 | Mullick et al. | |
| 2008/0050715 A1 | 2/2008 | Golczewski et al. | |
| 2008/0056273 A1 | 3/2008 | Pelletier et al. | |
| 2008/0066181 A1 | 3/2008 | Haveson et al. | |
| 2008/0080457 A1 | 4/2008 | Cole | |
| 2008/0089303 A1 | 4/2008 | Wirtanen et al. | |
| 2008/0096559 A1 | 4/2008 | Phillips et al. | |
| 2008/0125079 A1 | 5/2008 | O'Neil et al. | |
| 2008/0126287 A1 | 5/2008 | Cox et al. | |
| 2008/0139210 A1 | 6/2008 | Gisby et al. | |
| 2008/0166993 A1 | 7/2008 | Gautier et al. | |
| 2008/0178300 A1 | 7/2008 | Brown et al. | |
| 2008/0212751 A1 | 9/2008 | Chung | |
| 2008/0263348 A1 | 10/2008 | Zaltsman et al. | |
| 2008/0270212 A1 | 10/2008 | Blight et al. | |
| 2008/0279216 A1 | 11/2008 | Sharif-Ahmadi et al. | |
| 2008/0282319 A1 | 11/2008 | Fontijn et al. | |
| 2008/0293395 A1 | 11/2008 | Mathews et al. | |
| 2008/0313315 A1 | 12/2008 | Karaoguz et al. | |
| 2008/0320497 A1 | 12/2008 | Tarkoma et al. | |
| 2009/0006229 A1 | 1/2009 | Sweeney et al. | |
| 2009/0016310 A1 | 1/2009 | Rasal | |
| 2009/0036111 A1 | 2/2009 | Danford et al. | |
| 2009/0042536 A1 | 2/2009 | Bernard et al. | |
| 2009/0044185 A1 | 2/2009 | Krivopaltsev | |
| 2009/0046707 A1 | 2/2009 | Smires et al. | |
| 2009/0047989 A1 | 2/2009 | Harmon et al. | |
| 2009/0048913 A1 | 2/2009 | Shenfield et al. | |
| 2009/0049518 A1 | 2/2009 | Roman et al. | |
| 2009/0070379 A1 | 3/2009 | Rappaport | |
| 2009/0132860 A1 | 5/2009 | Liu et al. | |
| 2009/0163173 A1 | 6/2009 | Williams | |
| 2009/0181662 A1 | 7/2009 | Fleischman et al. | |
| 2009/0197612 A1 | 8/2009 | Kiiskinen | |
| 2009/0203352 A1 | 8/2009 | Fordon et al. | |
| 2009/0217364 A1 | 8/2009 | Salmela et al. | |
| 2009/0254857 A1 | 10/2009 | Romine et al. | |
| 2009/0282127 A1 | 11/2009 | LeBlanc et al. | |
| 2009/0307696 A1 | 12/2009 | Vals et al. | |
| 2010/0030890 A1 | 2/2010 | Dutta et al. | |
| 2010/0041365 A1 | 2/2010 | Lott et al. | |
| 2010/0075666 A1 | 3/2010 | Garner | |
| 2010/0121744 A1 | 5/2010 | Belz et al. | |
| 2010/0151866 A1 | 6/2010 | Karpov et al. | |
| 2010/0167696 A1 | 7/2010 | Smith et al. | |
| 2010/0190469 A1 | 7/2010 | Vanderveen et al. | |
| 2010/0235329 A1 | 9/2010 | Koren et al. | |
| 2010/0248719 A1 | 9/2010 | Scholaert | |
| 2010/0287599 A1 | 11/2010 | He et al. | |
| 2010/0311402 A1 | 12/2010 | Srinivasan et al. | |
| 2010/0318652 A1 | 12/2010 | Samba | |

(56) References Cited

U.S. PATENT DOCUMENTS

| | | |
|---|---|---|
| 2011/0110309 A1 | 5/2011 | Bennett |
| 2011/0145920 A1 | 6/2011 | Mahaffey et al. |
| 2011/0238545 A1 | 9/2011 | Fanaian et al. |
| 2011/0277019 A1 | 11/2011 | Pritchard, Jr. |
| 2012/0101952 A1 | 4/2012 | Raleigh et al. |
| 2012/0108225 A1 | 5/2012 | Luna et al. |
| 2012/0144025 A1 | 6/2012 | Melander et al. |
| 2012/0166364 A1 | 6/2012 | Ahmad et al. |
| 2012/0166604 A1 | 6/2012 | Fortier et al. |
| 2013/0072177 A1 | 3/2013 | Ross et al. |
| 2013/0275583 A1 | 10/2013 | Roach et al. |
| 2013/0326356 A9 | 12/2013 | Zheng et al. |
| 2014/0066101 A1 | 3/2014 | Lyman et al. |
| 2014/0073291 A1 | 3/2014 | Hildner et al. |
| 2014/0080458 A1 | 3/2014 | Bonner et al. |
| 2014/0241342 A1 | 8/2014 | Constantinof |
| 2015/0149358 A1 | 5/2015 | Robbin et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 A | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1978772 | 10/2008 |
| EP | 2007065 A1 | 12/2008 |
| EP | 2466831 A1 | 6/2012 |
| JP | 3148713 B2 | 3/2001 |
| JP | 2005339247 A | 12/2005 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| WO | 9858505 | 12/1998 |
| WO | 9927723 A1 | 6/1999 |
| WO | 9965185 | 12/1999 |
| WO | 0245315 A2 | 6/2002 |
| WO | 02067616 A1 | 8/2002 |
| WO | 02093877 A1 | 11/2002 |
| WO | 03014891 | 2/2003 |
| WO | 03017063 A2 | 2/2003 |
| WO | 03017065 A2 | 2/2003 |
| WO | 03058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 A1 | 6/2007 |
| WO | 2007069245 | 6/2007 |
| WO | 2007097786 | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2011002450 A1 | 11/2011 |
| WO | 2011149532 A1 | 12/2011 |
| WO | 2012047275 A | 4/2012 |

OTHER PUBLICATIONS

3rd Generation Partnership Project, "Technical Specification Group Services and System Aspects; Policy and Charging Control Architecture," Release 8, Document No. 3GPP TS 23.203, V8.4.0, Dec. 2008.

Alonistioti et al., "Intelligent Architectures Enabling Flexible Service Provision and Adaptability," 2002.

Amazon Technologies, Inc., "Kindle™ User's Guide," 3rd Edition, Copyright 2004-2009.

Chandrasekhar et al., "Femtocell Networks: A Survey," Jun. 28, 2008.

Chaouchi et al., "Policy Based Networking in the Integration Effort of 4G Networks and Services," 2004 IEEE.

Cisco Systems, Inc., "Cisco Mobile Exchange (CMX) Solution Guide: Chapter 2—Overview of GSM, GPRS, and UMTS," Nov. 4, 2008.

Dikaiakos et al., "A Distributed Middleware Infrastructure for Personalized Services," Nov. 24, 2003.

European Commission, "Data Roaming Tariffs—Transparency Measures," [online] retrieved from http://web.archive.org/web/20081220232754/http://ec.europa.eu/information_society/activities/roaming/data/measures/index_en.htm, Dec. 20, 2008 [retrieved May 16, 2012].

Farooq et al., "An IEEE 802.16 WiMax Module for the NS-3 Simulator," Mar. 2-6, 2009.

Han et al., "Information Collection Services for Qos-Aware Mobile Applications," 2005.

Hartmann et al., "Agent-Based Banking Transactions & Information Retrieval—What About Performance Issues?" 1999.

Hewlett-Packard Development Company, LP, "IP Multimedia Services Charging," white paper, Jan. 2006.

Hossain et al., "Gain-Based Selection of Ambient Media Services in Pervasive Environments," Mobile Networks and Applications. Oct. 3, 2008.

Knight et al., "Layer 2 and 3 Virtual Private Networks: Taxonomy, Technology, and Standardization Efforts," IEEE Communications Magazine, Jun. 2004.

(56) References Cited

OTHER PUBLICATIONS

Koutsopoulou et al., "Middleware Platform for the Support of Charging Reconfiguration Actions," 2005.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Nilsson et al., "A Novel MAC Scheme for Solving the QoS Parameter Adjustment Problem in IEEE802.11e EDCA," Feb. 2006.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Steglich, Stephan, "I-Centric User Interaction," Nov. 21, 2003.
Van Eijk, et al., "GigaMobile, Agent Technology for Designing Personalized Mobile Service Brokerage," Jul. 1, 2002.
Zhu et al., "A Survey of Quality of Service in IEEE 802.11 Networks," IEEE Wireless Communications, Aug. 2004.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Ruckus Wireless—White Paper; "Smarter Wi-Fi for Mobile Operator Infrastructures" 2010.
Accuris Networks, "The Business Value of Mobile Data Offload—a White Paper", 2010.
Wireless Broadband Alliance, "WISPr 2.0, Apr. 8, 2010"; Doc. Ref. No. WBA/RM/WISPr, Version 01.00.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wi-Fi Alliance Technical Committee Hotspot 2.0 Technical Task Group, "Hotspot 2.0 (Release 1) Technical Specification—Version 1.0.0"; 2012.
Wi-Fi Alliance Hotspot 2.0 Technical Task Group, "Wi-Fi Certified Passpoint™ (Release 1) Deployment Guidelines—Version 1.0—Oct. 2012".
"ASA/PIX: Allow Split Tunneling for VPN Clients on the ASA Configuration Example," Document ID 70917, Jan. 10, 2008.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Dixon et al., Triple Play Digital Services: Comcast and Verizon (Digital Phone, Television, and Internet), Aug. 2007.
Kassar et al., "An overview of vertical handover decision strategies in heterogeneous wireless networks," ScienceDirect, University Pierre & Marie Curie, Paris, France, Jun. 5, 2007.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Search Report and Written Opinion mailed Jun. 13, 2014 from International Serial No. PCT/US2014/016704 filed Feb. 17, 2014.
"Ads and movies on the run," the Gold Coast Bulletin, Southport, Qld, Jan. 29, 2008.
"Jentro Technologies launches Zenlet platform to accelerate location-based content delivery to mobile devices," The Mobile Internet, Boston, MA, Feb. 2008.
Jing et al., "Client-Server Computing in Mobile Environments," GTE Labs. Inc., Purdue University, ACM Computing Surveys, vol. 31, No. 2, Jun. 1999.
Kim, "Free wireless a high-wire act; MetroFi needs to draw enough ads to make service add profits," San Francisco Chronicle, Aug. 21, 2006.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Loopt User Guide, metroPCS, Jul. 17, 2008.
Nuzman et al., "A compund model for TCP connection arrivals for LAN and WAN applications," Oct. 22, 2002.
Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Sabat, "The evolving mobile wireless value chain and market structure," Nov. 2002.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
"The Construction of Intelligent Residential District in Use of Cable Television Network," Shandong Science, vol. 13, No. 2, Jun. 2000.
"Communication Concepts for Mobile Agent Systems," by Joachim Baumann et al.; Inst. of Parallel and Distributed High-Performance Systems, Univ. of Stuttgart, Germany, pp. 123-135, 1997.
"Prevent iCloud Documents & Data from using your data plan," Oct. 26, 2011; CNET webarchive, by Jason Cipriani.
"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Ahmed et al., "Multi Access Data Network Connectivity and IP Flow Mobility in Evolved Packet System (EPS)," 2010 IEEE.
Blackberry Mobile Data System, version 4.1, Technical Overview, 2006.
Client Guide for Symantec Endpoint Protection and Symantec Network Access Control, 2007.
Ehnert, "Small application to monitor IP trafic on a Blackberry—1.01.03", Mar. 27, 2008; http://www.ehnert.net/MiniMoni/.
Fujitsu, "Server Push Technology Survey and Bidirectional Communication in HTTP Browser," Jan. 9, 2008 (JP).
Kasper et al., "Subscriber Authentication in mobile cellular Networks with virtual software SIM Credentials using Trusted Computing," Fraunhofer—Institute for Secure Information Technology SIT, Darmstadt, Germany; ICACT 2008.
Kuntze et al., "Trustworthy content push," Fraunhofer—Institute for Secure Information Technology SIT; Germany; WCNC 2007 proceedings, IEEE.
Muntermann et al., "Potentials und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Open Mobile Alliance (OMA), Push Architecture, Candidate Version 2.2; Oct. 2, 2007; OMA-AD-Push-V2_2-20071002-C.
Quintana, David, "Mobile Multitasking," Apr. 14, 2010.
Roy et al., "Energy Management in Mobile Devices with the Cinder Operating System", Stanford University, MIT CSAIL, Jun. 3, 2010.
Windows7 Power Management, published Apr. 2009.

* cited by examiner

Account Setup

We didn't find an existing account for your device.

Would you like to Create a New ItsOn Mobile Account, or Join this device to an Existing Account?

⦿ New Account  This is my first ItsOn Mobile device

◯ Existing Account  I already have an ItsOn Mobile Account. Add this device to my account

[Create]

FIG. 2

Create a new account

⦿ Prepay    ◯ Postpay itsoncb@gmail.com   [Select]

itsoncb

Fkhg

16504403025

[Previous]  [Create]

FIG. 3

FIG. 8
FIG. 7

FIG. 9

Top up — 2809

Account balance: $100

Enter initial credit amount
- ● $10  ○ $20  ○ $50  ○ $100
- VISA-1111  [Change]

[Cancel]  [Refresh Balance]  [Top up]

FIG. 10

Setup top up — 2810

Payment frequency
- ○ Balance is less than  ☐
- ○ Every month on the  ☐
- ● No auto top up Reload by this amount
- ○ $10  ○ $20  ○ $50  ○ $100
- VISA-1111  [Change]

[Cancel]  [Update]

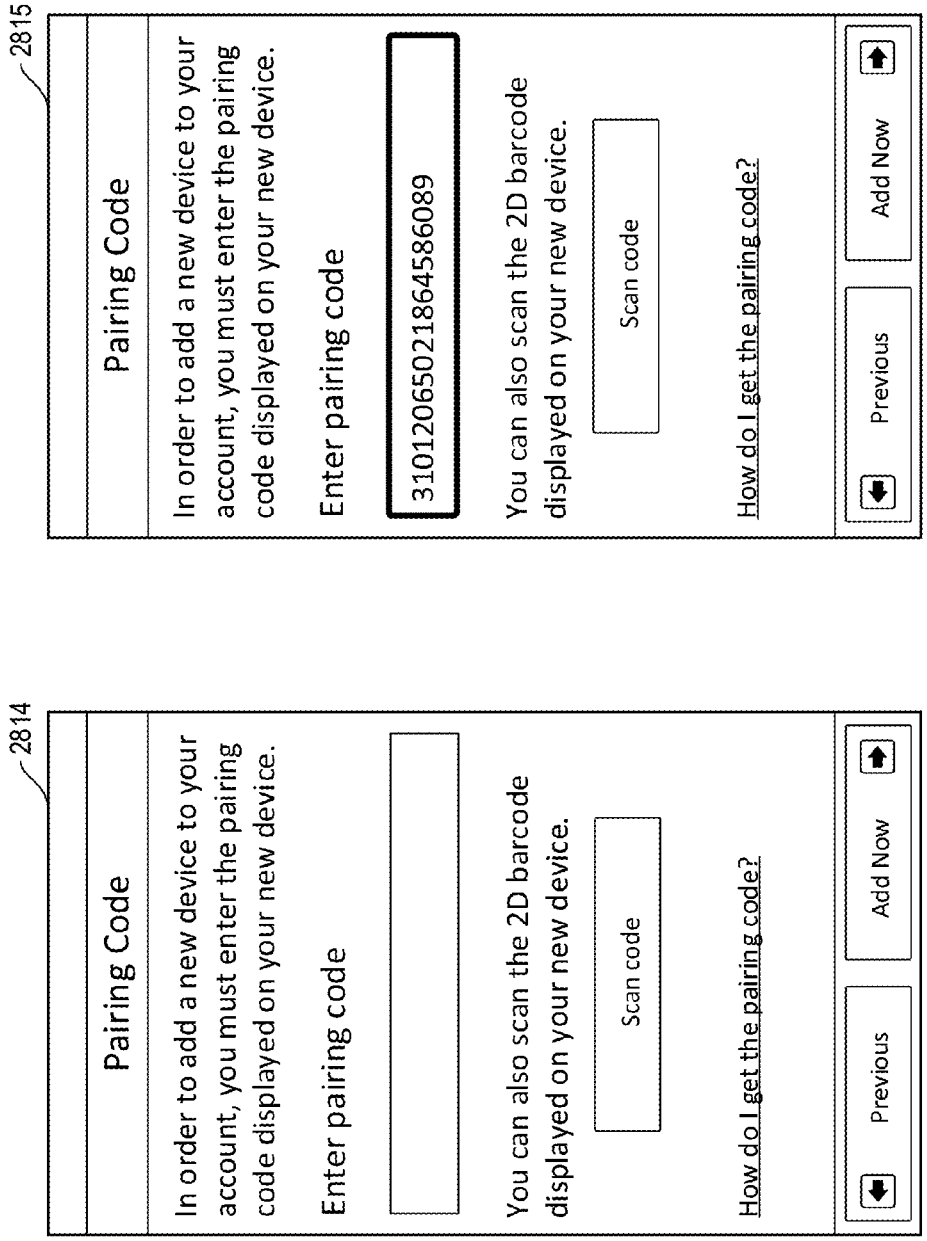

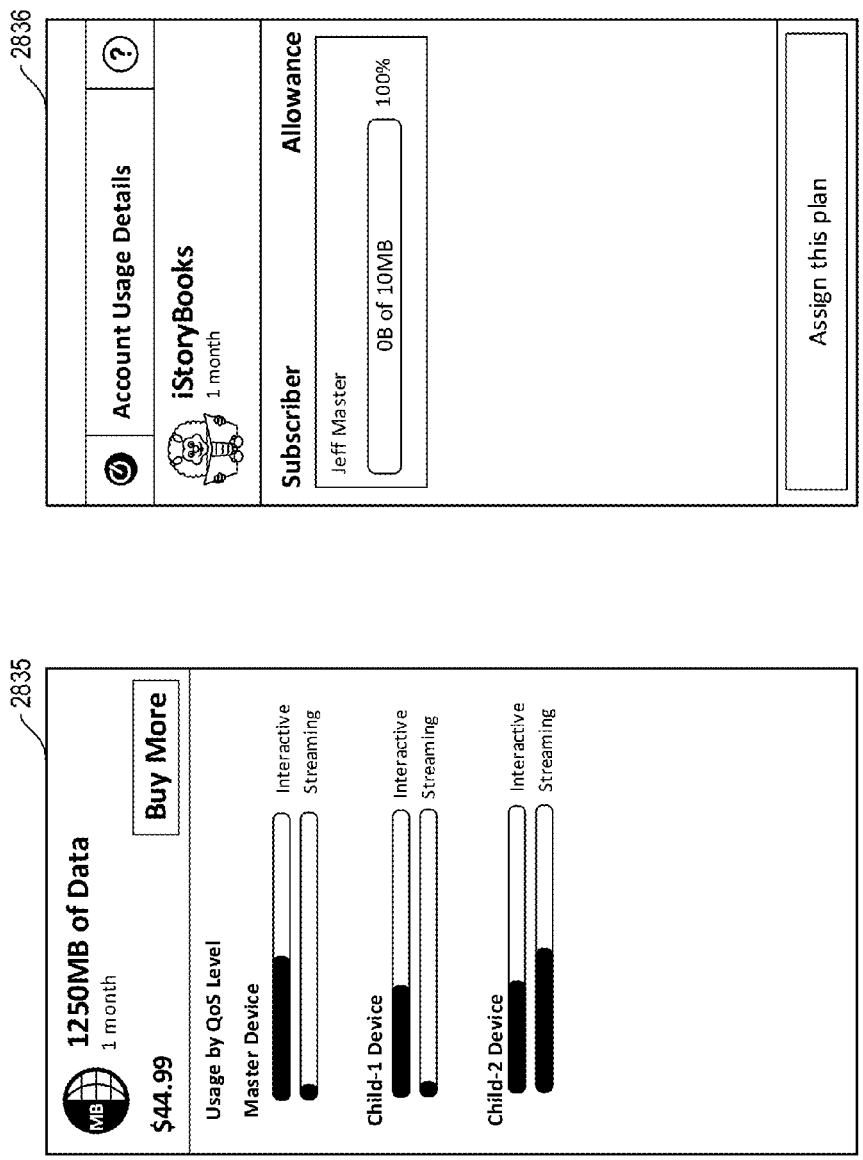

FIG. 43

Usage — June 2012

20 Hours of Applications
20 Hours of Applications

Jeff Child — 48 secs of 20 hrs
Jeff Master — 44 secs of 20 hrs

100 Text Messages
100 Text Messages

250 Minutes of Talk
250 Minutes of Talk iStoryBooks
Access to iStoryBooks

FIG. 44

Transactions and...

June 2012
Total: $93.56

User initiated Top Up — $100.00
Purchase plan: Starter Plan — ($4.99)
Purchase plan: iStoryBooks — ($1.45)

FIG. 58

Master user Curfew settings — 9038

- Child A — [ - ] »
- Child B — [ - ] »
- Parent C — [ Dinner ] »
- Me — [ Dinner ] »
- Select Group — [ Sleep ] »

[ OK ] [ Cancel ]

FIG. 59

Master user Curfew settings — 9040

Child Device A — Dinner »
 Start Time — Now »
 End Time — In 30 min »

Child Device B — Sleeping »
 Start Time — In 5 min »
 End Time — In 8 hr »

Child Device C — None »

[ OK ] [ Cancel ]

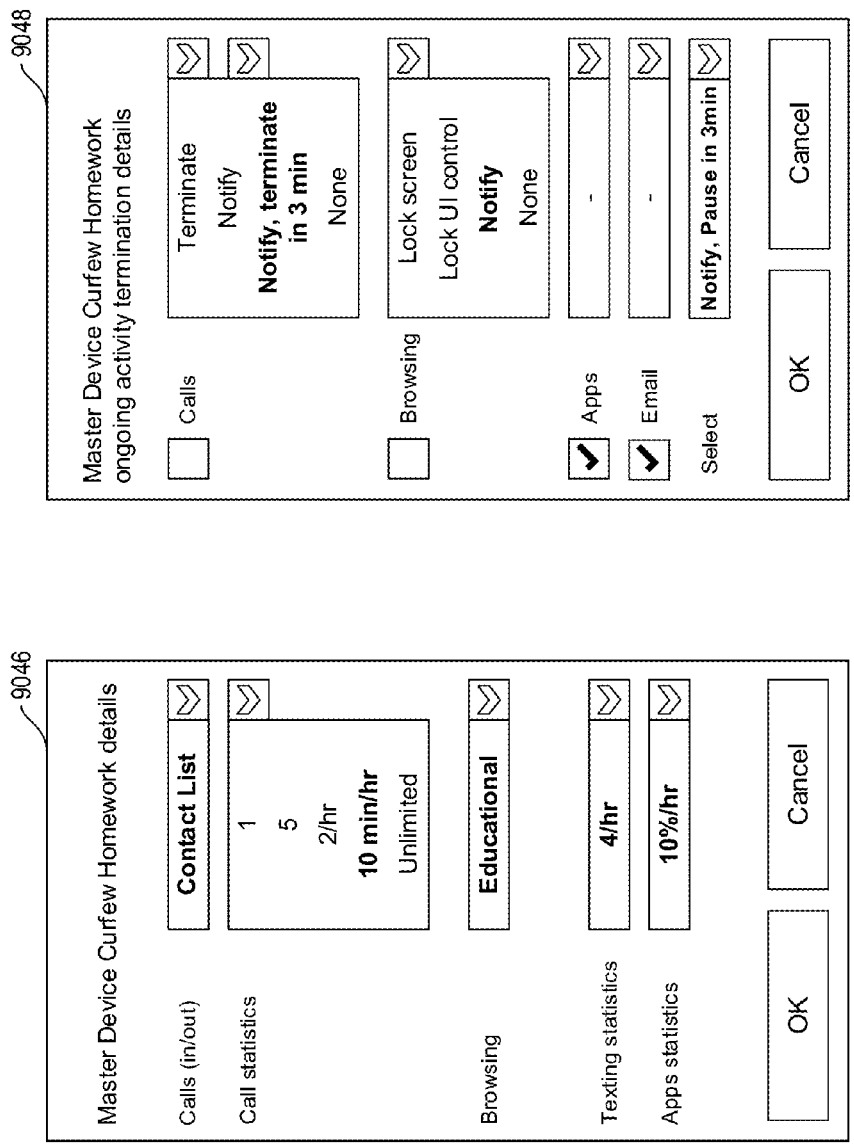

FIG. 65

Master Device Curfew Custom Advance setup — 9052

- Custom Name: Driving
- Location Excluded: Home
- Speed Excluded: <3mi/hr
- Device State Included: Hands Free, Bluetooth, Typing, Voice Activated
- Network State Included: Wi-Fi, Home Cellular, Roaming Cellular
- Device Connect Included: Airplane mode, Wi-Fi only

[ OK ]   [ Cancel ]

FIG. 64

Master Device Curfew Custom details — 9050

- Custom Name: Driving
- Calls (in/out): Emergency, Family, Contact list, All
- Browsing: None
- Texting: None
- Apps: None

[ OK ]   [ Cancel ]

9062

Master Device Protection settings

Child Device A — None / PG7 / PG12 »

Child Device B — None / PG7 / PG12 »

Child A — PG7 »

Child B — PG12 »

Master Device C — None »

Select All — - »

OK    Cancel

Email & Password

Please enter your email address and set a password for your account.

Account Email Address

Enter Password

Re-enter Password

Previous | Continue

Welcome to ItsOn Mobile

Would you like to:

Join an Account
Joining this device to an existing account will allow it to share a monthly plan already in place.

Join Existing

Create an Account
Creating a new account for this device means signing up for a new monthly plan and owning the account.

Create New

Later

FIG. 73

FIG. 76
FIG. 75

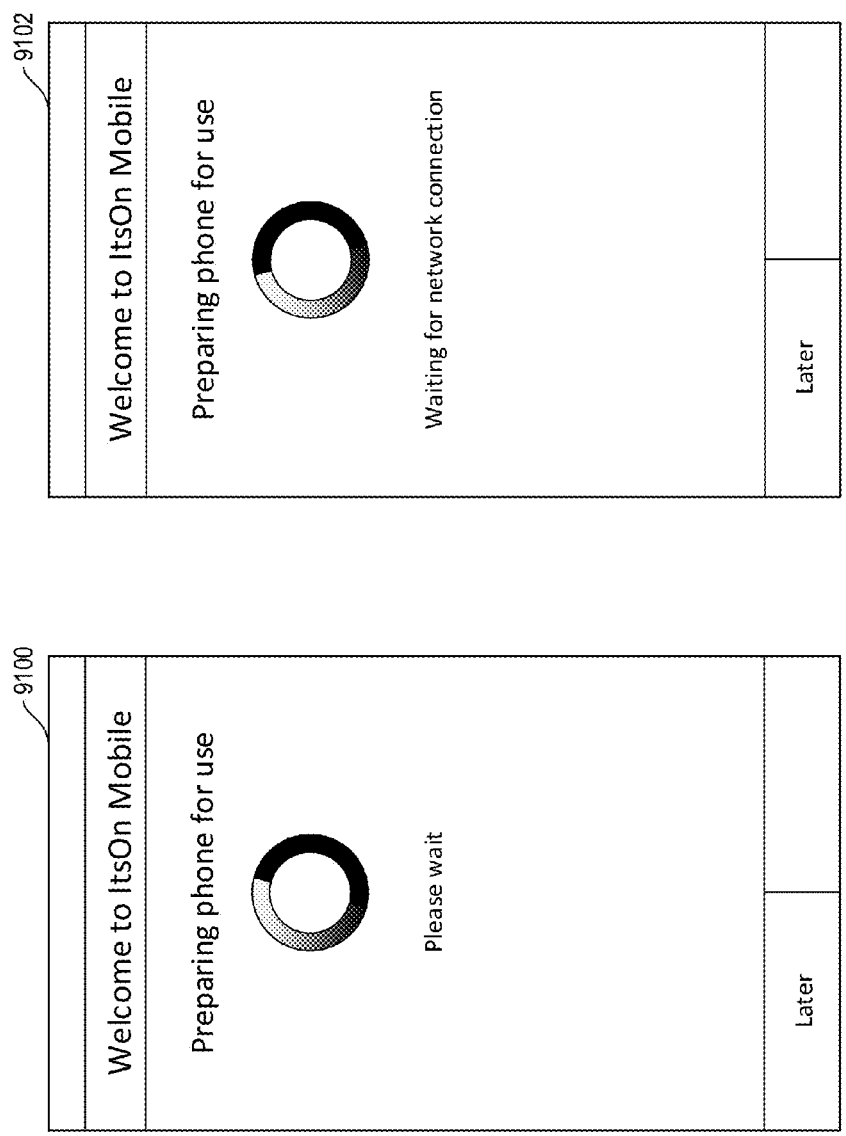

Monthly Plan — Customize — 9132

| | |
|---|---|
| New Plan Cost | $7.87 |
| Previous Plan Cost | $7.87 |
| Monthly Difference | $0.00 |

Customized  $7.87

150 mins  100 texts  100 MB

- 🞪 30 min $0.86 / 150 mins $3.74 / ⌃ 400 min $8.93
- ❌ 0 tex $0.00 / 100 texts $0.38 / ⌃ 450 tex $1.47
- ❌ 0 MB $0.00 / 100 MB $3.75 / ⌃ 300 M $9.78

Prices don't include taxes and fees

Back | Select

FIG. 106

Monthly Plan — Confirm your changes — 9134

| | |
|---|---|
| New Plan Cost | $7.87 |
| Previous Plan Cost | $7.87 |
| Monthly Difference | $0.00 |

Plan Changes

| Old | New |
|---|---|
| 150 mins $3.74 | 150 mins $3.74 |
| | No change |
| 100 texts $0.38 | 100 texts $0.38 |
| | No change |
| 100 MB $3.75 | 100 MB $3.75 |
| | No change |

Prices don't include taxes and fees

Back | Confirm

Edit Restriction

Restriction Details
650-XXX-XXXX

Restriction Name: My restriction

ON

Restricted Services
- Restrict Talk/Text — Manage
- Restrict App/Internet access — Manage When to restrict: School Days ▶

Days: Su M T W Th F Sa

Times: From 08:00 AM To 03:00 PM

Cancel | Delete | Save

Edit Restriction

Allowed exceptions: People
650-XXX-XXXX

● No exceptions
○ Anyone in the contacts list
○ Specific people:

Cancel | Save

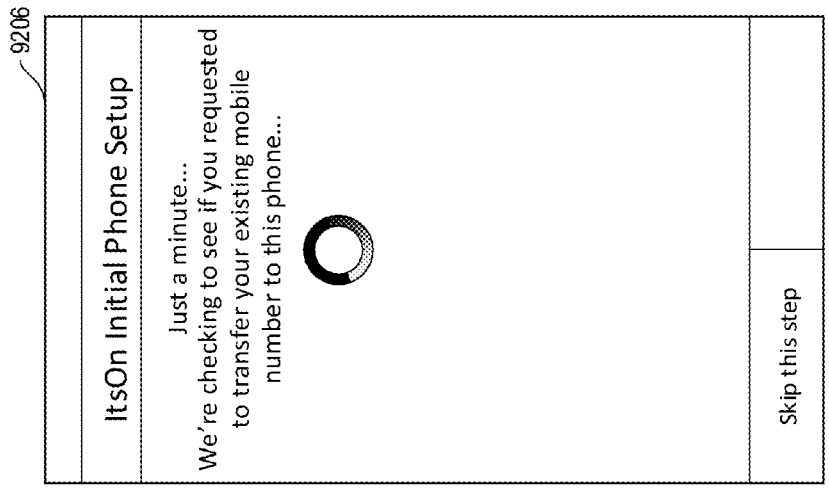

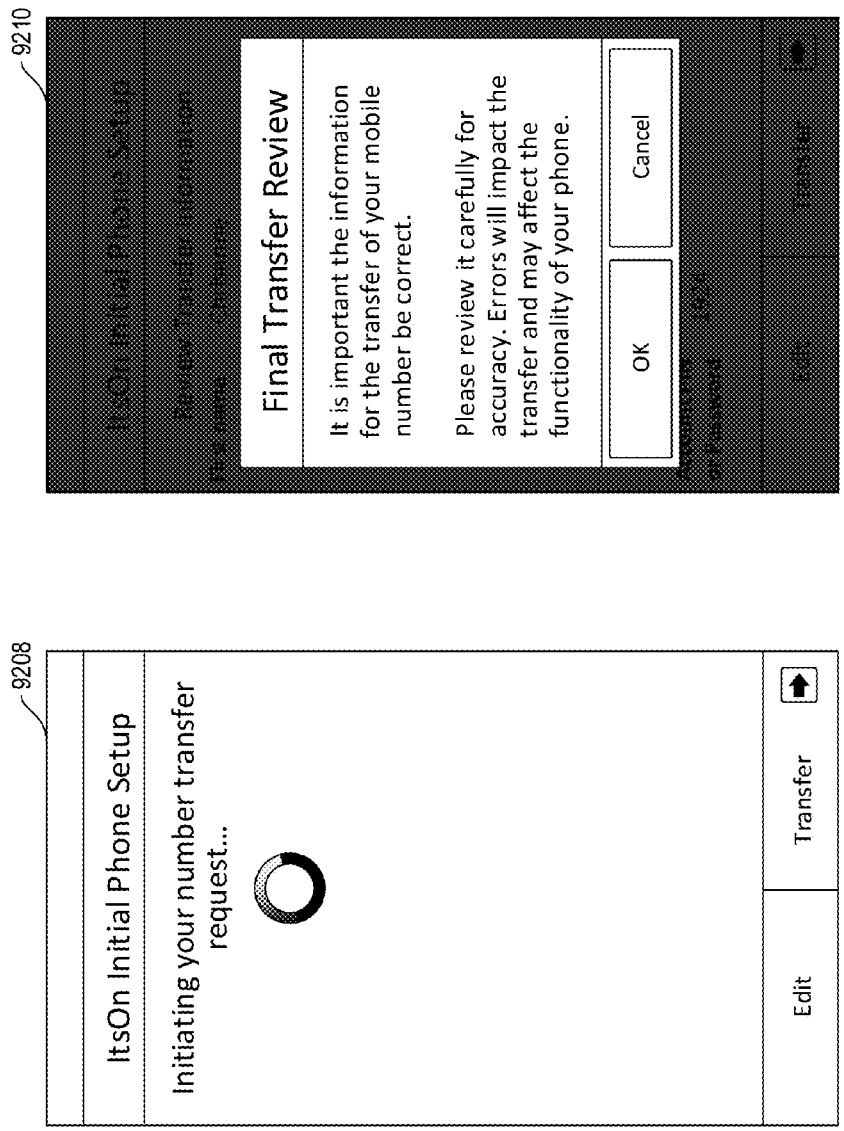

ENHANCED CURFEW AND PROTECTION ASSOCIATED WITH A DEVICE GROUP

CROSS REFERENCE TO OTHER APPLICATIONS

This application is a continuation-in-part of co-pending U.S. nonprovisional application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT (UI), which is a continuation-in-part of the following U.S. nonprovisional application Ser. No. 13/441,821, filed Apr. 6, 2012, entitled MANAGING SERVICE USER DISCOVERY AND SERVICE LAUNCH OBJECT PLACEMENT ON A DEVICE; Ser. No. 12/380,780, filed Mar. 2, 2009, entitled AUTOMATED DEVICE PROVISIONING AND ACTIVATION; Ser. No. 12/695,020, filed Jan. 27, 2010, entitled ADAPTIVE AMBIENT SERVICES, now U.S. Pat. No. 8,406,748 (issued Mar. 26, 2013); Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); Ser. No. 13/229,580, filed Sep. 9, 2011, entitled WIRELESS NETWORK SERVICE INTERFACES, now U.S. Pat. No. 8,626,115 (issued Jan. 7, 2014); Ser. No. 13/239,321, filed Sep. 21, 2011, entitled SERVICE OFFER SET PUBLISHING TO DEVICE AGENT WITH ON-DEVICE SERVICE SELECTION; Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK; and Ser. No. 13/374,959, filed Jan. 24, 2012, entitled FLOW TAGGING FOR SERVICE POLICY IMPLEMENTATION, now U.S. Pat. No. 8,606,911 (issued Dec. 10, 2013).

This application claims the benefit of the following U.S. provisional applications: 61/765,978, filed Feb. 18, 2013, entitled ENHANCED CURFEW AND PROTECTION ASSOCIATED WITH A DEVICE GROUP; 61/785,988, filed Mar. 14, 2013, entitled AUTOMATED CREDENTIAL PORTING FOR MOBILE DEVICES; 61/794,116, filed Mar. 15, 2013, entitled ENHANCED INTERMEDIATE NETWORKING DEVICE; 61/792,765, filed Mar. 15, 2013, entitled DEVICE GROUP AND SERVICE PLAN MANAGEMENT; 61/793,894, filed Mar. 15, 2013, entitled SIMPLIFIED POLICY DESIGN, MANAGEMENT, AND IMPLEMENTATION; 61/799,710, filed Mar. 15, 2013, entitled AMBIENT OR SPONSORED SERVICES; and 61/801,074, filed Mar. 15, 2013, entitled DEVICE GROUP AND SERVICE PLAN MANAGEMENT.

All of the above-referenced patents, nonprovisional applications, and provisional applications are hereby incorporated by reference for all purposes.

This application also incorporates by reference for all purposes the following United States nonprovisional applications: U.S. application Ser. No. 12/695,019, filed Jan. 27, 2010, entitled DEVICE ASSISTED CDR CREATION, AGGREGATION, MEDIATION AND BILLING, now U.S. Pat. No. 8,275,830 (issued Sep. 25, 2012); U.S. application Ser. No. 12/694,445, filed Jan. 27, 2010, entitled SECURITY TECHNIQUES FOR DEVICE ASSISTED SERVICES, now U.S. Pat. No. 8,391,834 (issued Mar. 5, 2013); U.S. application Ser. No. 12/694,451, filed Jan. 27, 2010, entitled DEVICE GROUP PARTITIONS AND SETTLEMENT PLATFORM, now U.S. Pat. No. 8,548,428 (issued Oct. 1, 2013); U.S. application Ser. No. 12/694,455, filed Jan. 27, 2010, entitled DEVICE ASSISTED SERVICES INSTALL, now U.S. Pat. No. 8,402,111 (issued Mar. 19, 2013); U.S. application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); U.S. application Ser. No. 12/695,980, filed Jan. 28, 2010, entitled ENHANCED ROAMING SERVICES AND CONVERGED CARRIER NETWORKS WITH DEVICE ASSISTED SERVICES AND A PROXY, now U.S. Pat. No. 8,340,634 (issued Dec. 25, 2012); U.S. application Ser. No. 13/237,827, filed Sep. 20, 2011, entitled ADAPTING NETWORK POLICIES BASED ON DEVICE SERVICE PROCESSOR CONFIGURATION; U.S. application Ser. No. 13/253,013, filed Oct. 4, 2011, entitled SYSTEM AND METHOD FOR PROVIDING USER NOTIFICATIONS; U.S. application Ser. No. 13/248,028, filed Sep. 28, 2011, entitled ENTERPRISE ACCESS CONTROL AND ACCOUNTING ALLOCATION FOR ACCESS NETWORKS; U.S. application Ser. No. 13/247,998, filed Sep. 28, 2011, entitled SECURE DEVICE DATA RECORDS; U.S. application Ser. No. 13/309,463, filed Dec. 1, 2011, entitled SECURITY, FRAUD DETECTION, AND FRAUD MITIGATION IN DEVICE-ASSISTED SERVICES SYSTEMS; U.S. application Ser. No. 13/248,025, filed Sep. 28, 2011, entitled SERVICE DESIGN CENTER FOR DEVICE ASSISTED SERVICES; U.S. application Ser. No. 13/134,005, filed May 25, 2011, entitled SYSTEM AND METHOD FOR WIRELESS NETWORK OFFLOADING; U.S. application Ser. No. 13/802,483, filed Mar. 13, 2013, entitled MOBILE DEVICE ACTIVATION VIA DYNAMICALLY SELECTED ACCESS NETWORK; and U.S. application Ser. No. 13/842,172, filed Mar. 15, 2013, entitled NETWORK SERVICE PLAN DESIGN.

This document also incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4, 2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; and U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; and U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; U.S. Provisional Application No. 61/252,153, filed Oct. 15, 2009, entitled DEVICE GROUP PARTITIONS AND SETTLEMENT PLATFORM; U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY; U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed September 28, entitled SECURED DEVICE DATA RECORDS, 2010; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PROVIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; U.S. Provisional Application No. 61/472,606, filed Apr. 6, 2011, entitled MANAGING SERVICE USER DISCOVERY AND SERVICE LAUNCH OBJECT PLACEMENT ON A DEVICE; U.S. Provisional Application No. 61/550,906, filed Oct. 24, 2011, entitled SECURITY FOR DEVICE-ASSISTED SERVICES; U.S. Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; U.S. Provisional Application No. 61/610,876, filed Mar. 14, 2012, entitled METHODS AND APPARATUS FOR APPLICATION PROMOTION AND SPONSORSHIP; U.S. Provisional Application No. 61/610,910, filed Mar. 14, 2012, entitled WIFI ACTIVATION BACKUP PROCESS; U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; U.S. Provisional Application No. 61/674,331, filed Jul. 21, 2012, entitled SERVICE CONTROLLER FOR MANAGING CLOUD-BASED POLICY; U.S. Provisional Application No. 61/724,267, filed Nov. 8, 2012, entitled FLEXIBLE SERVICE PLAN DESIGN, USER INTERFACE AND DEVICE MANAGEMENT; U.S. Provisional Application No. 61/724,837, filed Nov. 9, 2012, entitled SERVICE PLAN DISCOVERY, CUSTOMIZATION, AND MANAGEMENT; U.S. Provisional Application No. 61/724,974, filed Nov. 10, 2012, entitled SERVICE PLAN DISCOVERY, CUSTOMIZATION, AND MANAGEMENT; U.S. Provisional Application No. 61/732,249, filed Nov. 30, 2012, entitled APPLICATION PROGRAMMING INTERFACES FOR SMART SERVICES; U.S. Provisional Application No. 61/734,288, filed Dec. 6, 2012, entitled INTERMEDIATE NETWORKING DEVICE SERVICES; and U.S. Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; U.S. Provisional Application No. 61/756,332, filed Jan. 24, 2013, entitled MOBILE HOTSPOT; and U.S. Provisional Application No. 61/758,964, filed Jan. 30, 2013, entitled MOBILE HOTSPOT.

BRIEF DESCRIPTION OF THE DRAWINGS

Various embodiments of the invention are disclosed in the following detailed description and the accompanying drawings.

FIG. 2 illustrates a representative screen for a mobile wireless communication device that is not yet associated with a master service account in accordance with some embodiments.

FIG. 3 illustrates a representative screen providing a choice between a prepay account and a post-pay account in accordance with some embodiments.

FIG. 7 illustrates a representative screen for entering payment information associated with an account in accordance with some embodiments.

FIG. 8 illustrates a representative screen summarizing payment information associated with an account in accordance with some embodiments.

FIG. 9 illustrates a representative screen providing options for replenishing an account balance in accordance with some embodiments.

FIG. 10 illustrates a representative screen providing options for replenishing an account balance in accordance with some embodiments.

FIGS. 14 and 15 illustrate a representative screen providing for entering information to associate a child device with an account in accordance with some embodiments.

FIG. 18 illustrates a representative screen displaying devices associated with a master service account in accordance with some embodiments.

FIG. 19 illustrates a representative screen for selecting device permissions in accordance with some embodiments.

FIG. 22 illustrates a representative screen providing account usage details for a specific voice service plan of the mobile wireless communication device in accordance with some embodiments.

FIG. 23 illustrates a representative screen presenting an example of plan sharing options available to the user of the mobile wireless communication device in accordance with some embodiments.

FIG. 24 illustrates a representative screen displaying full sharing of a voice service plan by two mobile wireless communication devices in accordance with some embodiments.

FIG. 25 illustrates a representative screen displaying a voice service plan allocated entirely to one of two mobile wireless communication devices in accordance with some embodiments.

FIG. 28 illustrates a representative screen displaying service plan sharing for a set of data service plans for two mobile wireless communication devices in accordance with some embodiments.

FIG. 35 illustrates a representative screen displaying service usage details arranged by a quality of service (QoS) level for a shared service plan in accordance with some embodiments.

FIG. 36 illustrates a representative screen displaying an option to assign a service plan to a mobile wireless communication device in accordance with some embodiments.

FIG. 43 illustrates a representative screen displaying service usage for multiple service plans and multiple mobile wireless communication devices during a particular time period in accordance with some embodiments.

FIG. 44 illustrates a representative screen displaying service plan transactions and balances in accordance with some embodiments.

FIG. 58 illustrates a representative screen that is presented on a device to a master user when the master user attempts to manage a curfew of one or more users associated with one or more devices from a device group in accordance with some embodiments.

FIG. 59 illustrates a representative screen that is presented on a device to a master user when the master user attempts to manage a curfew with time events of a first set of one or more devices from a device group and one or more users associated with a second set of one or more devices from the device group in accordance with some embodiments.

FIG. 62 illustrates a representative screen that is presented on a master device when a subscriber attempts to manage a "Homework" curfew selection in accordance with some embodiments.

FIG. 63 illustrates a representative screen that is presented on a master device when a subscriber attempts to manage a "Homework ongoing activity termination details" curfew selection in accordance with some embodiments.

FIG. 64 illustrates a representative screen that is presented on a master device when a subscriber attempts to define a custom curfew mode in accordance with some embodiments.

FIG. 65 illustrates a representative screen that is presented on a master device when a subscriber attempts to manage advanced custom settings in accordance with some embodiments.

FIG. 70 illustrates a representative screen that is presented on a master device when a subscriber attempts to manage a protection setting of one or more devices and one or more users in accordance with some embodiments.

FIG. 71 illustrates a representative screen that is presented on a master device when a subscriber attempts to manage a "PG 7" protection selection in accordance with some embodiments.

FIG. 72 illustrates a representative screen that is presented on a master device when a subscriber attempts to manage the protection of a "Browsing" activity within a "PG 7" protection selection in accordance with some embodiments.

FIG. 73 illustrates a representative initial opening "start up" screen that provides for associating a device with a service account in accordance with some embodiments.

FIG. 74 illustrates a representative screen to enter information for an email account and an account password in accordance with some embodiments.

FIG. 75 illustrates a representative screen to enter information for an email account and an account password after a user has input information in accordance with some embodiments.

FIG. 76 illustrates another representative screen to enter information for a new service account in accordance with some embodiments.

FIG. 77 illustrates a representative screen to enter information for one or more security questions associated with the service account, the user of the device, and/or the service account owner in accordance with some embodiments.

FIG. 78 illustrates a representative screen for selecting a recurring service plan for the device in accordance with some embodiments.

FIG. 85 illustrates a representative screen to enter information to join a device to an existing service account in accordance with some embodiments.

FIG. 86 illustrates another representative screen to enter information to join a device to an existing service account, including an overlay keyboard through which to enter the requested information in accordance with some embodiments.

FIGS. 89 through 93 illustrate representative screens to indicate progress of a process to prepare a device for use with a wireless network in accordance with some embodiments.

FIG. 95 illustrates a representative screen that provides information to a user of a device to assist in learning how to use the device user interface in accordance with some embodiments.

FIG. 96 illustrates a representative screen through which a user of a device reviews profile information for a user (and/or an administrator) of the device in accordance with some embodiments.

FIG. 99 illustrates a representative screen including detailed information for a selected invoice in accordance with some embodiments.

FIG. 100 illustrates a representative screen to add an account associated with an "outside" vendor to the device in accordance with some embodiments.

FIGS. 101 and 102 illustrate representative screens for updating and/or modifying information for payment forms associated with a service account and service account profile information in accordance with some embodiments.

FIG. 105 illustrates a representative screen through which a user of a device customizes a service plan in accordance with some embodiments.

FIGS. 106 and 107 illustrate representative screens to confirm changes for a customized service plan in accordance with some embodiments.

FIG. 108 illustrates a representative screen that summarizes information for a service plan in accordance with some embodiments.

FIG. 109 illustrates a representative screen that provides additional detailed information for a service plan element of a service plan in accordance with some embodiments.

FIGS. 110 and 111 illustrate representative screens that provide summarized information for a service plan and/or element of a service plan in accordance with some embodiments.

FIG. 115 illustrates a representative screen that presents a set of "featured" service plans for review, selection, and/or purchase by a user of a device in accordance with some embodiments.

FIG. 116 illustrates a representative screen that presents summary information for a particular service plan selected from a set of featured service plans in accordance with some embodiments.

FIG. 123 illustrates a representative screen that provides information on service activity controls for a selected device in accordance with some embodiments.

FIG. 124 illustrates a representative screen for modifying a particular service activity control for a device or a set of devices in accordance with some embodiments.

FIGS. 125 through 127 illustrate representative screens for defining or modifying a service activity control for a device or a set of devices in accordance with some embodiments.

FIG. 128 illustrates a representative screen for defining exceptions that override a service activity control or a set of service activity controls in accordance with some embodiments.

FIG. 129 illustrates a representative screen for defining a set of specific people to allow as an exception for communication that overrides one or more service activity controls in accordance with some embodiments.

FIG. 130 illustrates a representative screen for selecting an individual from a contact list to include in a restriction exception list that overrides a service activity control in accordance with some embodiments.

FIG. 133 illustrates a representative screen for defining allowed exceptions that include specific individuals in accordance with some embodiments.

FIG. 134 illustrates a representative screen for defining an "allowed exception" list for a service activity control in accordance with some embodiments.

FIG. 135 illustrates a representative screen for selecting a pre-defined time period for a service activity control in accordance with some embodiments.

FIG. 136 illustrates a representative screen for selecting an initial time period value or an ending time period value for a service activity control in accordance with some embodiments.

FIGS. 137 and 138 illustrate representative screens for setting or modifying a service activity control for a device or a set of devices in accordance with some embodiments.

FIG. 139 illustrates a representative overlay screen that summarizes a service activity control defined by the administrator in accordance with some embodiments.

FIG. 140 illustrates a representative screen that displays a list of service activity controls for a device in accordance with some embodiments.

FIG. 141 illustrates a representative screen for defining an exception to a service activity control in accordance with some embodiments.

FIGS. 142 through 148 illustrate representative screens for transferring a device number from another device to the particular device in accordance with some embodiments.

FIGS. 149 through 156 illustrate representative screens for presenting tutorial information to a user of the device in accordance with some embodiments.

DETAILED DESCRIPTION

Figure 1:
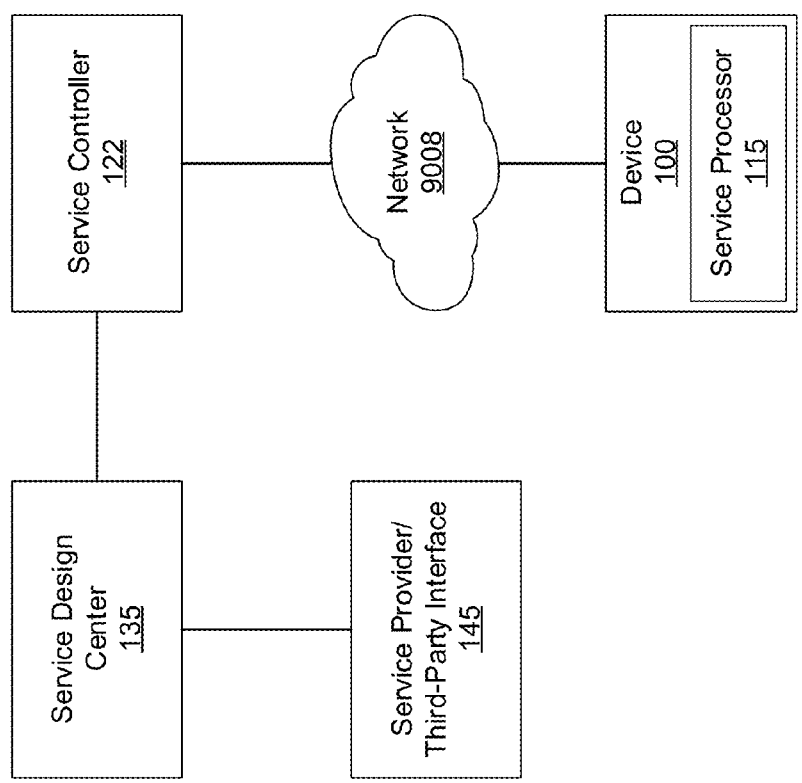
FIG. 1 illustrates a representative system of interconnected network elements communicatively coupled to a mobile wireless communication device in accordance with some embodiments.

In recent years, mobile wireless communication devices have become popular, and many individuals, families, and organizations use or own multiple mobile wireless communication devices. As would be appreciated by a person having ordinary skill in the art, there are many kinds of mobile wireless communication devices, including, for example, smart phones, tablets, laptops, mobile phones, personal digital assistants, and many others. These mobile wireless communication devices are capable of sending and receiving wireless radio frequency signals over one or more wireless communication networks, such as cellular (e.g., 2G, 2.5G, 3G, 4G, LTE, LTE advanced, etc.) networks, local-area (e.g., Wi-Fi) networks, or other wireless communication networks.

A mobile wireless communication device (hereinafter generally referred to simply as a device) may need to be associated with a service account in order to allow a user or owner of the device (herein referred to as a subscriber or user) to use the device to communicate over a particular wireless communication network in a manner that is meaningful to the subscriber (e.g., to access content or a service offered by a service provider). Moreover, the device may need to be associated with one or more service plans that allow it to access services offered by a service provider. A service plan may, in general, allow for a quantity of communication or a time period of communication (e.g., 100 MB of data per month, 24 hours of network access, 100 minutes of phone calls, etc.). Some examples of services that may be offered by a service provider include the non-mutually-exclusive categories of voice services (e.g., phone calls, etc.), messaging services (e.g., text messages, multimedia messages, etc.), data services (e.g., Internet access, etc.), and hybrid services (e.g., voice over IP (VOIP), video chat, etc.). A service provider may be an operator of a wireless communication network, or may be another entity, such as a mobile virtual network operator (MVNO), a retail partner, a mobile wireless communication device original equipment manufacturer (OEM), a mobile wireless communication device operating system (OS) provider or a third-party service partner. There are many other examples of services, service plans, and service providers, and the examples provided herein are not intended to be limiting.

It may also be desirable to associate more than one device with a particular service account. There are many potential benefits of associating multiple devices with a particular service account, including, for example, simplifying billing for the service provider and for the subscriber, and potentially reducing service costs for subscribers, e.g., by sharing the particular service account among multiple devices. For example, a husband and wife may want to establish a single service account for both of their smart phones. As another example, a parent may want to establish a single service account for the several mobile phones used by family members. As another example, an employer may want to establish a single service account for multiple smart phones used by one or more of its employees. As another example, a person may want to establish a single service plan for multiple devices that the person uses, such as, for example, one or more of a smart phone, a tablet, a laptop, and an intermediate networking device that forwards traffic between a local area network and a wireless cellular network. There are many other examples of situations in which it might be desirable to associate multiple devices with a single service account (hereinafter referred to as a master service account).

In addition to associating multiple devices with a master service account, it may be desirable to share a service plan that is associated with the master service account among the multiple devices associated with the master service account. For example, a parent might want to purchase a single service plan that is shared among all members of the family, or an employer might want to purchase a single service plan that is shared among multiple employees.

Today, subscribers who wish to share a service plan among multiple devices can only do so with several limitations. For example, creating a master service account and sharing a service plan among multiple devices can require direct involvement of a service provider, e.g. a service provider customer representative. The service provider associates each of the devices with a master service account and with a service plan, and the associated devices then share the service plan. Often, subscribers cannot add or delete devices from the master service account without assistance from the service provider. In order to make changes to the master account, subscribers may need to call the service provider or may be required to log in to a web portal (e.g., by logging into a website), e.g., through a separate computing system. Another drawback is that although all of the devices associated with a master service account share a service plan, there are no controls to prevent a particular device from "hogging" allocations provided by the service plan. Another drawback is that although some service providers today allow sharing of voice minutes or text message allocations, they may not allow sharing of a data plan, or they may limit sharing of a data plan. Yet another drawback is that today's shared service plans may not allow subscribers to associate different kinds of devices (e.g., a tablet and a smart phone) with a master service account. As a result of these drawbacks, the utility of shared service plans available today is limited.

Disclosed herein are methods, systems, and apparatuses to enable subscribers of devices to view, research, select and customize service plans for one or more devices. Also disclosed herein are methods, systems, and apparatuses that allow subscribers to create and manage a group of two or more devices (herein referred to as a device group) without service provider involvement. After a subscriber has established a master service account, the subscriber can create a device group by associating additional devices with the established master service account that is already associated with a master device or with a master user (e.g., an administrator at an enterprise or another party who is not necessarily associated with a master device, but who is associated with the master service account). Also disclosed are methods, systems, and apparatuses to enable subscribers to share service plans among multiple devices in the device group. Also disclosed are methods, systems, and apparatuses to enable subscribers to fully or partially assign a service plan from one device to another device in the device group. Also disclosed are methods, systems, and apparatuses to allow subscribers to monitor or manage the devices in a device group from one or more master devices in the device group. Managing includes adding, deleting, or modifying devices or properties of devices, service plans, service accounts, etc. For example, managing includes dictating or changing a usage limit on one or more services available to devices in the device group.

As used herein, service activity is used to refer to any service usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, short messaging service (SMS), IP multimedia system (IMS), or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of verifiable service control policies. As will be apparent to one of ordinary skill in the art in view of the embodiments described herein, some embodiments identify various service activities for the purpose of decomposing overall service usage into finer subcategories of activities that can be verifiably monitored, categorized, cataloged, reported, controlled, monetized and used for end user notification in a manner that results in superior optimization of the service capabilities for various levels of service cost or for various types of devices or groups. In some embodiments, it will be apparent to one of ordinary skill in the art that the terms "service activity" and "service usage" are associated with categorizing and possibly monitoring or controlling data traffic, application usage, communication with certain network end points, or transactions, and it will also be apparent that in some embodiments, the term service activity is intended to include one or more of the broader aspects listed above. The term service usage can be used interchangeably with the term service activity, and neither term is intended in general to exclude any aspect of the other. In some cases, where the term service usage and/or service activity is used, more specific descriptors such as traffic usage, application usage, website usage, and other service usage examples are also used to provide more specific examples or focus in on a particular element of the more encompassing term.

FIG. 1 is a high-level block diagram in accordance with some embodiments. As shown in FIG. 1, in some embodiments, a device agent (e.g., software such as one or more components of service processor 115) is installed on a device 100 and is configured to communicate a request to add device 100 to a master service account, a device group, or a multi-device (i.e., shareable) service plan or service plan bundle. In some embodiments, at least an aspect of the request is received from a network element, such as service controller 122 of FIG. 1. In some embodiments, the communications between the device agent and the network element take place over a secure communications link. In some embodiments, the secure communications link is encrypted by transport layer security (TLS), a secure socket layer (SSL), or by another suitable encryption mechanism or protocol.

In some embodiments, service controller 122 illustrated in FIG. 1 is the same as Sign-Up Request Processor 9002 shown in FIGS. 45, 48, 50, 52, and 53. In some embodiments, Sign-Up Request Processor 9002 is a function within service controller 122. In some embodiments, Sign-Up Request Processor 9002 is co-located with the service controller 122. In some embodiments, the request to add device 100 to the master service account, device group, or multi-device service plan is communicated to a network element, such as service controller 122 shown in FIG. 1 or Sign-Up Request Processor 9002 shown in FIGS. 45, 48, 50, 52, and 53.

In some embodiments, a request to add device 100B to the master service account, device group, or multi-device service plan is communicated to another device, device 100A. In some embodiments, device 100A is a master device. In some embodiments, device 100A is any device associated with the primary service account holder (e.g., the subscriber who pays for the service). In some embodiments, device 100A is any device associated with the shared account that also has permissions to add additional devices or subscribers to the master service account, device group, or multi-device service plan. In some embodiments, the request to add device 100B to the master service account, device group, or multi-device service plan is communicated over a wireless network. In some embodiments, the request to add device 100B to the master service account, device group, or multi-device service plan is communicated over a wired network. In some embodiments, the request to add device 100B to the master service account, device group, or multi-device service plan is communicated using a code or a unique display object presented through a user interface of device 100B. In some embodiments, the request to add device 100B to the master service account, device group, or multi-device service plan is communicated using an audio signal.

In some embodiments, the request to add device 100B to the master service account, device group, or multi-device service plan includes a credential that provides for unique identification of device 100B, such as a subscriber identity module, a device identifier, a phone number, an International Mobile Subscriber Identity (IMSI), a mobile equipment identifier (MEID), or any other credential. In some embodiments, the request to add device 100B to the master service account, device group, or multi-device service plan includes information that provides for identification of a user of device 100B (e.g., a subscriber). In some embodiments, the credential comprises a secure information aspect associated with device 100B. In some embodiments, the credential comprises a secure information aspect associated with device 100A (which may be a master device). As would be appreciated by a person having ordinary skill in the art, a credential allows a user to access network services using a device. A credential uniquely identifies an entity, such as a particular device 100, a particular subscriber or account-holder, a particular service account, etc. Examples of credentials include, but are not limited to, a phone number, an international mobile subscriber identifier (IMSI), a mobile station identifier (MSID), a subscriber identity module (SIM) identifier, an electronic serial number (ESN), a mobile equipment identifier (MEID), an international mobile equipment identity (IMEI), a device identifier, a subscriber identifier, a service account identifier, a media access control (MAC) address, an Internet protocol (IP) address, a token, a one-time token, any other identifying information that uniquely identifies an entity, and combinations of these. Some credentials (e.g., a SIM, a phone number, etc.) may be moved from one device 100 to another device 100 (e.g., from device 100A to device 100B), whereas other credentials are permanently associated with a device 100 (e.g., an ESN, a device identifier, etc.). This document often refers to a credential as uniquely identifying the device 100 because even a credential that can be moved from one device 100 to another device 100 can uniquely identify a particular device 100 when the credential is installed in the particular device 100 (e.g., while a SIM card is in device 100, the SIM card uniquely identifies the particular device 100 because the SIM card can only be installed in one device 100 at a time).

In some embodiments, the request to add device 100B to the master service account, device group, or multi-device service plan or service plan bundle includes information that identifies a user of device 100B. In some embodiments, the request to add device 100B to the master service account, device group, or multi-device service plan includes information that identifies a user of device 100B or information that identifies a user of device 100A. In some embodiments, the request to add device 100B to the master service account, device group, or multi-device service plan includes a credential that provides for unique identification of the master service account, device group, or multi-device service plan. In some embodiments, the credential also includes a secure service plan information aspect (e.g., a password, a personal identification number, etc.) known only to a subscriber of the master service account, device group, or multi-device service plan. In some embodiments, the credential comprises information associated with an aspect of an account that is associated with the master service account, device group, or multi-device service plan (e.g., an account number, etc.).

In some embodiments, device 100B includes a user interface, and the first device agent (e.g., Device Agent 9006B) initiates the request to add device 100B to the master service account, device group, or multi-device service plan based at least in part on a user input obtained through the user interface. In some embodiments, the user input includes: a credential that provides for unique identification of device 100B; information that provides for identification of a user of device 100B; information that provides for identification of a unique master service account, device group, or multi-device service plan; information that provides for identification of a user of a second device (e.g., a master device) associated with the master service account, device group, or multi-device service plan, such as Master Device 100A; information that provides for identification of an account associated with the master service account, device group, or multi-device service plan; or a combination of these.

In some embodiments, a device agent installed on a device 100 is configured to communicate a request to add another device to a master service account, device group, or multi-device service plan. In some embodiments, at least an aspect of the request is received from a network element, such as service controller 122 shown in FIG. 1 or Sign-Up Request Processor 9002 shown in FIGS. 45, 48, 50, 52, and 53. In some embodiments, the request to add the device to the master service account, device group, or multi-device service plan is communicated to a network element. In some embodiments, the request to add the another device, herein denoted as device 100B, to the master service account, device group, or multi-device service plan is communicated to device 100A. In some embodiments, device 100B is a master device, and device 100A is a child (or secondary) device. In some embodiments, device 100B is a child (or secondary) device, and device 100A is a master device. In some embodiments, both device 100A and device 100B are master devices. In some embodiments, the request to add device 100B to the master service account, device group, or multi-device service plan is communicated over a wireless network. In some embodiments, the request to add device 100B to the master service account, device group, or multi-device service plan is communicated over a wired network. In some embodiments, the request to add device 100B to the master service account, device group, or multi-device service plan is communicated using a code or a unique display object presented through a user interface of device 100A. In some embodiments, the request to add device 100B to the master service account, device group, or multi-device service plan is communicated using an audio signal.

In some embodiments, the request to add device 100B to the master service account, device group, or multi-device service plan includes a credential that provides for unique identification of device 100A, such as a subscriber identity module, a device identifier, a phone number, an IMSI, an MEID, or any other credential. In some embodiments, the request to add device 100B to the master service account, device group, or multi-device service plan includes information that provides for identification of a user of device 100A (e.g., a subscriber). In some embodiments, the request to add device 100B to the master service account, device group, or multi-device service plan includes a credential that provides for unique identification of device 100A, such as a subscriber identity module, a device identifier, a phone number, an IMSI, an MEID, or any other credential. In some embodiments, the request to add device 100B to the master service account, device group, or multi-device service plan includes information that provides for identification of a user of device 100B. In some embodiments, the request to add device 100B to the master service account, device group, or multi-device service plan includes a credential that provides for unique identification of device 100B. In some embodiments, the credential comprises a secure information aspect associated with device 100A. In some embodiments, the credential comprises a secure information aspect associated with device 100B. In some embodiments, the request to add device 100B to the master service account, device group, or multi-device service plan includes information that identifies a user of device 100A. In some embodiments, the request to add device 100B to the master service account, device group, or multi-device service plan includes information that identifies a user of device 100B.

In some embodiments, the request to add device 100B to the master service account, device group, or multi-device service plan includes a credential that provides for unique identification of the master service account, device group, or multi-device service plan. In some embodiments, the credential also includes a secure service plan information aspect known only to a subscriber of the master service account, device group, or multi-device service plan (e.g., a password, a personal identification number, etc.). In some embodiments, the credential comprises information associated with an aspect of an account that is associated with the master service account, device group, or multi-device service plan (e.g., an account number, etc.).

In some embodiments, device 100A includes a user interface, and a first device agent (e.g., Device Agent 9006A) initiates the request to add device 100B to the master service account, device group, or multi-device service plan based at least in part on a user input obtained through the user interface. In some embodiments, the user input includes information associated with at least one of: a credential that provides for unique identification of device 100A; a credential that provides for unique identification of device 100B; information that provides for identification of a user of device 100A; information that provides for identification of a user of device 100B; information that provides for identification of a unique master service account, device group, or multi-device service plan; and information that provides for identification of an account associated with the master service account, device group, or multi-device service plan.

In some embodiments, a first device agent (e.g., Device Agent 9006A) installed on device 100A is configured to communicate an acknowledgment to add device 100B to a master service account, device group, or multi-device service plan. In some embodiments, the acknowledgment comprises a permission or a request acceptance. In some embodiments, the acknowledgment is based on a user response to a message presented through a user interface of device 100A. In some embodiments, the device agent is configured to present the message. In some embodiments, the message includes information obtained from a network element. In some embodiments, the network element is a website, a web page, a wireless application protocol (WAP) site, a portal server, a message server, or an access network policy interface.

In some embodiments, the first device agent receives, from a network element, information associated with device 100B's request to share a service plan. In some embodiments, the first device agent presents a message based on the information associated with device 100B's request to share a service plan through a user interface of device 100A, obtains a user response, and generates the acknowledgment based on the user response. In some embodiments, the network element is a website, a web page, a wireless application protocol (WAP) site, a portal server, a message server, or an access network policy interface.

In some embodiments, the first device agent receives, from device 100B, information associated with another device's request to share a service plan. In some embodiments, the first device agent presents a message based on the information associated with the another device's request to share a service plan through a user interface of device 100A, obtains a user response, and generates the acknowledgment based on the user response.

In some embodiments, a first device agent (e.g., Device Agent 9006A) installed on device 100A is configured to communicate an acknowledgment to add device 100B to a master service account, device group, or multi-device service plan. In some embodiments, the acknowledgment comprises a permission or a request acceptance. In some embodiments, the first device agent assists in presenting a message through a user interface of device 100A, the message being configured to seek the acknowledgment. In some embodiments, the acknowledgment is configured to assist in enrolling device 100B in a master service account, device group, or multi-device service plan. In some embodiments, the message includes information obtained from a network element. In some embodiments, the network element is a website, a web page, a wireless application protocol (WAP) site, a portal server, a message server, or an access network policy interface.

In some embodiments, the first device agent receives, from a network element, information associated with device 100B's request to share a service plan. In some embodiments, the first device agent presents a message based on the information associated with the second device's request to share the service plan through a user interface of device 100A, obtains a user response, and generates the acknowledgment based on the user response. In some embodiments, the network element is a website, a web page, a wireless application protocol (WAP) site, a portal server, a message server, or an access network policy interface.

In some embodiments, the first device agent receives, from device 100B, information associated with another device's request to share a service plan. In some embodiments, the first device agent presents a message based on the information associated with the another device's request to share the service plan through a user interface of device 100A, obtains a user response, and generates the acknowledgment based on the user response.

In some embodiments, device 100B is not associated with a master service account, device group, or multi-device service plan. In some embodiments, a network element (e.g., service controller 122 shown in FIG. 1 or Sign-Up Request Processor 9002 shown in FIGS. 45, 48, 50, 52, and 53) is configured to accept, from a device agent (e.g., Device Agent 9006B) on device 100B, a request to add device 100B to a master service account, device group, or multi-device service plan. In some embodiments, the network element confirms a secure information aspect associated with the request, and, after confirming that the secure information aspect is consistent with a device that is to be added to the master service account, device group, or multi-device service plan, configures one or more network service policies to add device 100B to the master service account, device group, or multi-device service plan. In some embodiments, the secure information aspect comprises: a credential that provides for unique identification of device 100B; information that provides for identification of a user of device 100B; information that provides for identification of a unique master service account, device group, or multi-device service plan; information that provides for identification of a user of a second device (e.g., device 100A) that is associated with the master service account, device group, or multi-device service plan; information that provides for identification of an account associated with the master service account, device group, or multi-device service plan; or a combination of these. In some embodiments, an aspect of the request is communicated to a device agent (e.g., Device Agent 9006A) installed on device 100A, and an aspect of the secure information aspect associated with the request is associated with a user input obtained by the network element from the device agent on device 100A (e.g., communicated by the device agent).

In some embodiments, the network element configures the one or more network service policies to add device 100B to the master service account, device group, or multi-device service plan by provisioning a device service usage accounting system to identify service usage associated with device 100B and account the identified first device service usage to the master service account, device group, or multi-device service plan. In some embodiments, the network element configures the one or more network service policies to add device 100B to the master service account, device group, or multi-device service plan by provisioning a device access service policy system to identify attempted or successful network service activity associated with device 100B and to apply a set of one or more access control policies associated with the master service account, device group, or multi-device service plan to the identified attempted or successful network service activity associated with device 100B.

In some embodiments, the network element configures the one or more network service policies to add device 100B to the master service account, device group, or multi-device service plan by provisioning a device access service notification system to identify attempted or actual network service activity associated with device 100B and to apply a set of one or more access service notification policies associated with device 100B and to apply a set of one or more access service notification policies associated with the multi-device service plan to cause a multi-device service plan notification to be presented through device 100B's user interface.

In some embodiments, the aspect of the request that is communicated to a device agent (e.g., Device Agent 9006A) installed on device 100A comprises an indication that a user of device 100B desires to add device 100B to the master service account, device group, or multi-device service plan, and the aspect of the secure information associated with the request that is communicated from device 100A to the network element comprises an indication that a user of device 100A approves enrollment of device 100B in the master service account, device group, or multi-device service plan.

In some embodiments, device 100A includes a user interface, and a device agent (e.g., Device Agent 9006A) on device 100A presents a breakdown of usage of a shared or assigned service plan through the user interface. In some embodiments, the breakdown of service usage includes a first subset of a shared service plan and a second subset of the shared service plan. In some embodiments, the first subset is associated with device 100A, and the second subset is associated with a second device (e.g., device 100B). In some embodiments, neither of the first subset and the second subset is associated with device 100A. In some embodiments, the breakdown of service usage includes a characterization of the service activities that are generating service usage for the second subset. In some embodiments, the device agent is configured to accept user inputs to specify alert conditions for assisting in creating user interface alert messages when the service usage for the second subset of the shared device plan usage associated with the second device satisfies a condition. In some embodiments, the condition is based on an input from a user of device 100A. In some embodiments, the second subset includes a characterization of at least a portion of the device activities responsible for at least a portion of the service usage of device 100B. In some embodiments, the device agent on device 100A is configured to specify a policy limit on the service activities that are generating service usage for the second subset. In some embodiments, the policy limit specifies a limit on voice service usage. In some embodiments, the policy limit specifies a limit on data service usage. In some embodiments, the policy limit includes a limit on a subset of service activities less than all service activities available to device 100B. In some embodiments, the policy limit includes a limit on service usage while device 100B is roaming. In some embodiments, the policy limit includes a limit on cellular wireless services. In some embodiments, the policy limit includes a limit on Wi-Fi access.

In some embodiments, device 100A includes a user interface, and a device agent on device 100A (e.g., Device Agent 9006A) is configured to present, through the user interface, a message configured to present a service policy management option associated with device 100B's use of a shared or assigned service plan. In some embodiments, the message includes at least an aspect that is obtained from a network element. In some embodiments, the message includes at least an aspect that is stored locally on device 100A. In some embodiments, the network element is a website, a web page, a wireless application protocol (WAP) site, a portal server, a message server, or an access network policy interface. In some embodiments, the message is pushed to device 100A by a network element.

In some embodiments, the service policy management option is a service permission. In some embodiments, the service policy management option is a service allowance. In some embodiments, the device agent on device 100A assists in obtaining, through the user interface, a user input indicating that a user of device 100A desires to implement the presented service policy management option. In some embodiments, the device agent on device 100A assists in causing the service policy management option to be implemented to govern, at least in part, one or more service policies of device 100B. In some embodiments, the device agent on device 100A assists in causing the service policy management option to be implemented by providing information to a network element configured to implement the service policy management option. In some embodiments, the device agent on device 100A assists in causing the service policy management option to be implemented by providing information to a device agent (e.g., Device Agent 9006B) installed on device 100B, the device agent on device 100B being configured to implement the service policy management option. In some embodiments, the device agent on device 100A assists in causing the service policy management option to be implemented by communicating information that causes a device agent (e.g., Device Agent 9006A) on device 100B to implement the service policy management option.

In some embodiments, the service policy management option comprises an indication or acknowledgment that device 100B is authorized to use wireless access services in accordance with access service policies associated with the master service account, device group, or multi-device service plan.

In some embodiments, the service policy management option comprises an indication or acknowledgment that device 100B is authorized to use less than all of a total service allowance provided for under the service policies associated with a multi-device (e.g., shared, shareable, assignable, or assigned) service plan. In some embodiments, the less than all of the total service allowance is less than the entire allowance provided for under the service policies associated with the multi-device service plan. In some embodiments, the less than all of the total service allowance specifies a service usage limit. In some embodiments, the limit is expressed as a percentage. In some embodiments, the limit is expressed as an amount of a resource. In some embodiments, the less than all of the total service allowance specifies an allowance for a set of one or more service activities, the set of one or more device service activities being less than all service activities available to device 100B. In some embodiments, the less than all of the total service allowance specifies a time period during which device 100B is authorized for one or more services. In some embodiments, the less than all of the total service allowance specifies a time period during which device 100B is authorized for a set of one or more service activities less than all service activities available to device 100B. In some embodiments, the set of one or more service activities includes one or more emergency services (e.g., the ability to place an outgoing call to an emergency number, the ability to send an outgoing text to a specified emergency number, etc., where the emergency number is not necessarily a public services emergency number but could instead be a number associated with a parent or another trusted entity). In some embodiments, the set of one or more service activities includes communication with a subset of devices, the subset of devices less than all devices that device 100B is capable of communicating with. In some embodiments, the less than all of the total service allowance is network-dependent (e.g., there is one allowance when device 100B is communicating over a cellular network and another, potentially different, allowance when device 100B is communicating over a Wi-Fi network, or there is one allowance when device 100B is communicating over a roaming network and another, potentially different, allowance when device 100B is communicating over a home network, etc.). In some embodiments, the less than all of the total service allowance is associated with service policies that apply to more than one wireless network (e.g., the service policies apply whether device 100B is connected to a roaming network or a home network, or the service policies apply whether device 100B is connected to a cellular network or a Wi-Fi network, etc.).

In some embodiments, the less than all of the total service allowance specifies a time period during which device 100B is to be de-authorized for service. In some embodiments, one or more service policies governing service usage in the de-authorized state provide for access to one or more emergency services (e.g., the ability to place an outgoing call to an emergency number, the ability to send an outgoing text to a specified emergency number, etc., where the emergency number is not necessarily a public services emergency number but could instead be a number associated with a parent or another trusted entity) while device 100B is in the de-authorized state. In some embodiments, one or more service policies governing service usage in the de-authorized state provide for communication with a subset of devices while device 100B is in the de-authorized state, the subset of devices being less than all devices device 100B is capable of communicating with (e.g., device 100B may communicate with a first parent's device but not with a sibling's device). In some embodiments, the one or more service policies governing service usage in the de-authorized state are network-dependent (e.g., the service policies in effect when device 100B is connected to a roaming network are different from the service policies in effect when device 100B is connected to a home network, or the service policies in effect when device 100B is connected to a cellular network are different from the service policies in effect when device 100B is connected to a Wi-Fi network, etc.). In some embodiments, the one or more service policies governing service usage in the de-authorized state apply to more than one wireless network (e.g., the service policies apply whether device 100B is connected to a roaming network or a home network, or the service policies apply whether device 100B is connected to a cellular network or a Wi-Fi network, etc.).

In some embodiments, the less than all of the total service allowance specifies a time period during which device 100B is to be de-authorized for a set of one or more service activities, the set of one or more service activities less than all service activities available to device 100B (e.g., in the de-authorized state, device 100B may make phone calls to one or more numbers (e.g., an emergency number), but device 100B may not stream video or use one or more applications or access one or more network destinations).

In some embodiments, the less than all of the total service allowance includes a first service allowance and a second service allowance, the first service allowance providing information to govern an aspect of a service policy for a first set of one or more service activities, the first set of service activities less than all service activities available to device 100B, and the second service allowance providing information to govern an aspect of a service policy for a second set of one or more service activities. In some embodiments, the first service allowance allows one or more services associated with the first set of one or more service activities, and the second service allowance blocks one or more services associated with the second set of one or more service activities.

In some embodiments, the policy management option comprises a policy setting. In some embodiments, the policy setting is applicable to more than one wireless network that device 100B is capable of connecting to (e.g., the policy setting applies whether device 100B is connected to a cellular network or a Wi-Fi network). In some embodiments, the policy setting has at least an aspect that changes depending on the type of network device 100B is connected to (e.g., the policy setting has a first aspect when device 100B is connected to a cellular network and a second aspect when device 100B is connected to a Wi-Fi network, or the policy setting has a first aspect when device 100B is connected to a roaming network and a second aspect when device 100B is connected to a home network, etc.).

In some embodiments, the device agent on device 100A (e.g., Device Agent 9006A) is configured to receive a message indicating a service condition exists for device 100V. In some embodiments, the service condition is an "out of allowance" condition (e.g., device 100B has exhausted a usage allowance, etc.). In some embodiments, the service condition is an indication that a particular amount or percentage of service usage has occurred. In some embodiments, the service condition is an indication that a particular service activity that is not allowed under the current service policy settings for device 100B has been attempted by device 100B. In some embodiments, the service condition is an indication that a user of device 100B desires a particular service activity that is not allowed under the current service policy settings for device 100B. In some embodiments, device 100A includes a user interface, and the device agent on device 100A is configured to present, through the user interface, a service-condition notification including information about the service condition. In some embodiments, device 100A includes a user interface, and the device agent is configured to present, through the user interface, an option to modify a service policy associated with device 100B in response to the service-condition notification.

In some embodiments, the multi-device (e.g., shared or assigned) service plan comprises a set of one or more service policies that govern at least an aspect of wireless network access permissions for one or more wireless access networks, and wherein the set of one or more service policies is capable of supporting wireless access services for a plurality of wireless devices.

In some embodiments, a network system is configured to provide a user interface to a service account owner or a manager of a master service account, device group, or multi-device service plan, wherein the user interface presents a user option to include a device in the master service account, device group, or multi-device service plan, the device not having been included in the master service account, device group, or multi-device service plan when the device was initially purchased or activated. In some embodiments, the network system accepts a user input comprising an instruction to add the device to the master service account, device group, or multi-device service plan. In some embodiments, the network system determines whether the device is already associated with a pre-existing service plan provided by a particular mobile operator. In some embodiments, if the device is associated with a pre-existing service plan provided by the particular mobile operator, the network system provisions the device to be de-activated from the pre-existing service plan and added to the master service account, device group, or multi-device service plan. In some embodiments, if the device is not associated with a pre-existing service plan provided by the particular mobile operator, the network system determines if the device requires a number port (e.g., the transfer of a phone number). In some embodiments, if the device is not associated with a pre-existing service plan provided by the particular mobile operator, and the device requires a number port, the network system communicates the number porting requirement to a number porting system queue in the network. In some embodiments, if the device is not associated with a pre-existing service plan provided by the particular mobile operator, and the device does not require a number port, the network system provisions the device to be added to the master service account, device group, or multi-device service plan.

In some embodiments, the network system user interface is provided by a network element. In some embodiments, the network element is a website, a web page, a wireless application protocol (WAP) site, a portal server, a message server, or an access network policy interface. In some embodiments, the user interface is provided by communicating a user interface message to a device agent located on a device (e.g., a master device). In some embodiments, the device agent is on a device belonging to an account owner or account master for the master service account, device group, or multi-device service plan. In some embodiments, the device accepts a user input. In some embodiments, accepting the user input comprises accepting a user secure credential to authenticate the account owner or account master identity. In some embodiments, the device belongs to a user who wishes to add the device to a master service account, device group, or multi-device service plan, and accepting a user input comprises accepting a user secure credential to authenticate that the device user has the permission of the multi-device service account owner or master to add the device to the master service account, device group, or multi-device service plan. In some embodiments, accepting a user input includes accepting a user secure credential to authenticate the account owner or account master identity.

Next, this document describes several embodiments that allow a subscriber to establish a master service account and to manage the service plans and devices associated with the master service account.

Establishing a Master Service Account

In some embodiments, a subscriber can acquire a device and establish a master service account through the device user interface (e.g., a touch screen) or through, for example, a website. FIG. 1 illustrates device 100 equipped with service processor 115 in accordance with some embodiments. Service processor 115 is communicatively coupled to service controller 122 through wireless network 9008. Service controller 122 is communicatively coupled to network elements that facilitate the provisioning of services to devices, such as billing systems (not shown). The functions and capabilities of service processor 115 and service controller 122 have been described in many other patent applications and patents, including, for example, U.S. Pat. No. 8,023,425. One of the functions of service processor 115 is to present information to a user of device 100 through a user interface of device 100 (e.g., a touch screen display, etc.; not shown). In some embodiments, service processor 115 also collects information from a user through the user interface. In some embodiments, service processor 115 sends some or all of the collected information, or a representation of some or all of the collected information, over a control channel to service controller 122. In some embodiments, the control channel is secured by an encryption protocol.

In some embodiments, service controller 122 is also communicatively coupled to service design center 135. In some embodiments, service design center 135 allows a service provider or a service provider partner entity, through service provider/third-party interface 145, to configure service plan and service plan bundle offerings for distribution to devices such as device 100. In some embodiments, service design center 135 allows a service provider or a service provider partner entity to configure the messages, information, and screens as illustrated by multiple figures provided herein.

FIG. 2 illustrates an exemplary message in a representative screen 2802, in accordance with some embodiments, that is presented through the user interface of device 100 when device 100 is not yet associated with a master service account. The message informs the subscriber that device 100 is not associated with an existing service account and asks if the subscriber would like to create a new master service account or join device 100 to an existing master service account. In some embodiments, the message informs the subscriber of an option to transfer a service account from a different device to device 100. In some embodiments, the subscriber may select "New Account" and select "Create."

FIG. 3 illustrates an exemplary message in a representative screen 2803, in accordance with some embodiments, that is presented as a result of selecting "Create" in FIG. 2. In this particular example, the subscriber may choose between a prepay account and a post-pay account. As would be appreciated by a person having ordinary skill in the art, a prepay account is established by depositing some amount of money (or money equivalent) in the account and debiting that amount of money as the subscriber uses for-fee services. With a post-pay account, on the other hand, the subscriber uses services on credit and is then billed for service usage after some period of time (e.g., after one month has passed). In the example shown in FIG. 3, the subscriber chooses a prepay account and enters information to establish the master service account. The subscriber then selects "Create." In some embodiments, the subscriber is presented multiple screens in which to enter account information. In some embodiments, subscriber is presented an option to transfer all or part of account information from another account. In some embodiments, the subscriber is presented an option to transfer account information from a third-party service partner system (e.g., from an Apple ID account, an iTunes account, an iCloud account, a Google account, an Amazon account, or other account that can have requisite identification and/or credit information for the subscriber.)

Figure 4:
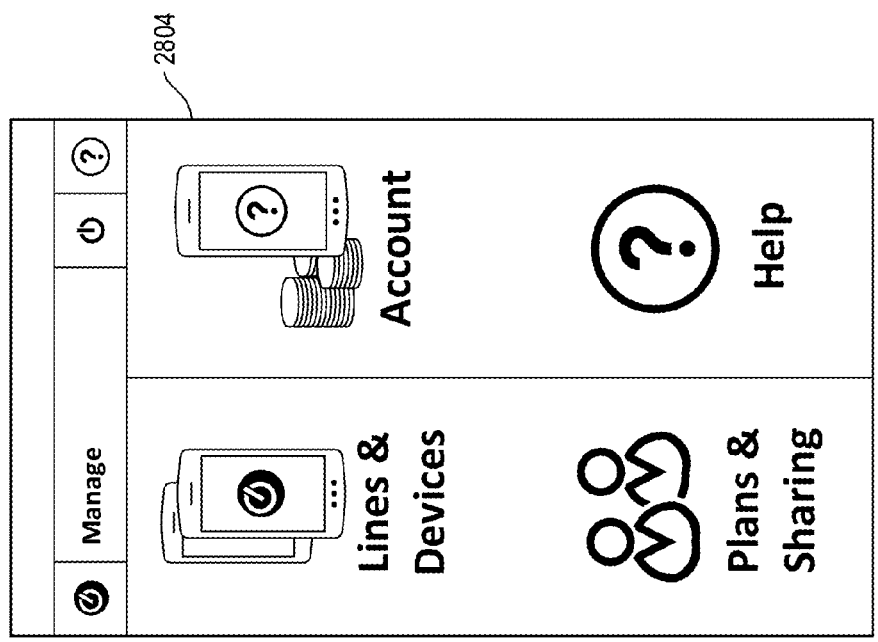
FIG. 4 illustrates a representative "Home" screen on the mobile wireless communication device in accordance with some embodiments.

FIG. 4 shows a representative screen 2804 illustrating information that may be presented, in some embodiments, through the user interface of device 100 after the subscriber has established a master service account for device 100 (e.g., by following the procedure described above). In representative screen 2804, there are four icons: "Lines & Devices," "Account," "Plans & Sharing," and "Help." In some embodiments, selecting "Lines & Devices" allows the subscriber to access information about those devices 100 that are associated with the master service account. In some embodiments, selecting "Account" allows the subscriber to access information about the master service account. In some embodiments, selecting "Plans & Sharing" allows the subscriber to access information about available service plans and, if additional devices 100 are associated with the master service account, whether and how those service plans are shared among devices 100 in a device group.

Figure 5:
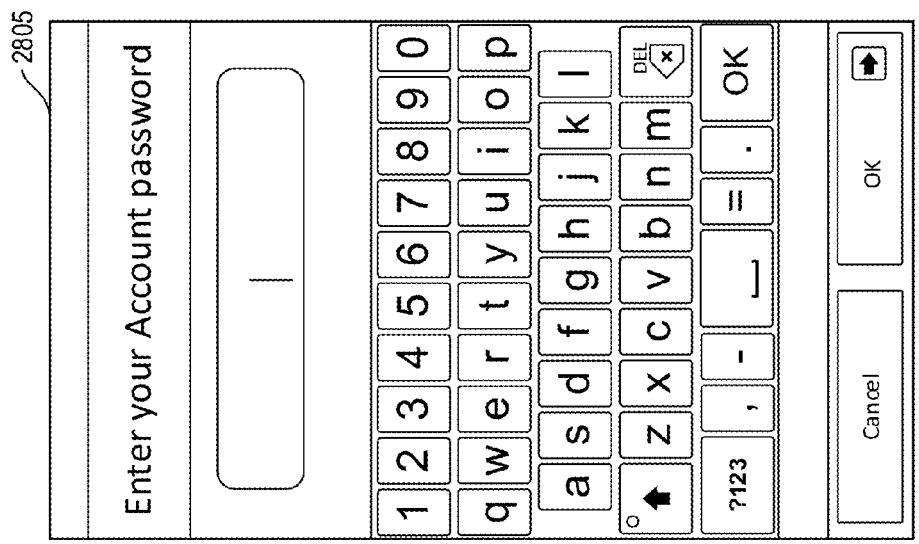
FIG. 5 illustrates a representative screen prompting for a password associated with a master service account in accordance with some embodiments.

When a subscriber selects the "Account" partition 2801 in FIG. 4, FIG. 5 illustrates a representative screen 2805 that may be displayed as a result according to some embodiments. The display prompts the subscriber for the password associated with the master service account so that the user can view information about the account. After the subscriber enters the password, the subscriber selects "OK." In some embodiments, a password or other credential is required in order to establish a new account. In some embodiments, a password or other credential is required to be entered in order to associate with an existing account. In some embodiments, a password or credential is associated with a set of permission levels that determine what account information the subscriber/user can enter and/or modify for a new or existing account. In some embodiments, a set of screens presented to the subscriber/user are dependent on the type of credential and/or password entered by the subscriber/user during the account setup process. In some embodiments, additional information is obtained from the subscriber/user to be used for supplemental authentication. In some embodiments, a set of security questions is presented to the user/subscriber through one or more screens on device 100. In some embodiments, answers to at least one of the set of security questions is used for supplemental authorization, e.g., when accessing a service management system or a customer support system.

Figure 6:
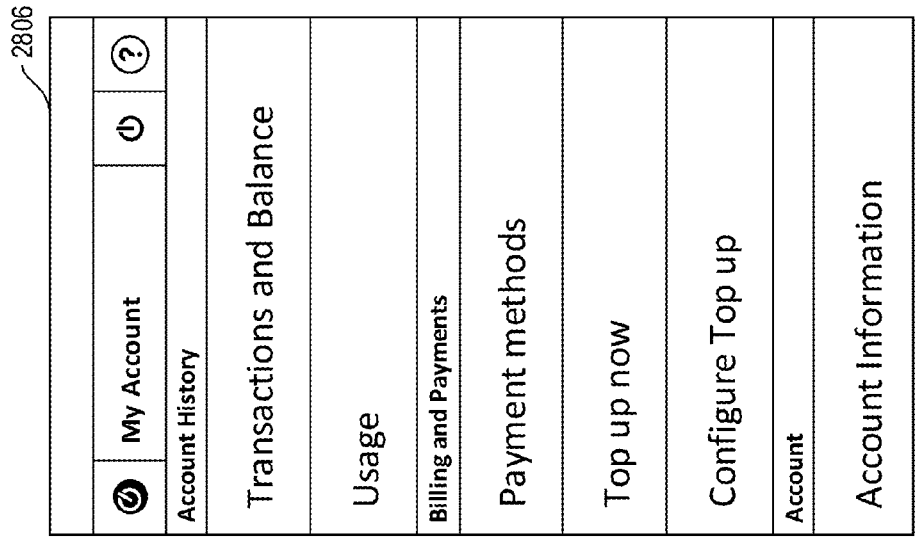
FIG. 6 illustrates a representative screen providing access to account information in accordance with some embodiments.

FIG. 6 illustrates a representative screen 2806 of information that may be presented to the subscriber who provides the correct account password. The subscriber can access information about the account history by selecting either "Transactions and Balance" or "Usage." The subscriber can access information about billing and payments by selecting "Payment methods," "Top up now," or "Configure Top up." The subscriber can access other information about the account by selecting "Account Information."

FIG. 7 illustrates an example of a display 2807 that may be presented when the subscriber selects "Payment Methods." Although FIG. 7 illustrates the situation in which a subscriber pays by credit card, as would be appreciated by a person having ordinary skill in the art, many other payment schemes are possible, including, for example, debit cards, automated clearing house (ACH) transactions, direct debit from an account at a financial institution, PayPal, Scratcher, e-Money, or another form of virtual money. It is also possible that the payment method comprises other consideration, such as credits a subscriber earned in some manner (e.g., by viewing advertisements, for accepting an offer, etc.).

In the example of FIG. 7, the payment method is a credit card, and the subscriber selects a credit card type and enters information in various fields. The subscriber enters his or her name in the "Name" field; the credit card number in the "Card Number" field; the credit card's expiration date in the "Expiration" fields; the credit card's security code in the "Security Code" field; the subscriber's address in the "Address" field; and a nickname for the credit card in the "Payment Nickname" field. In this example, the subscriber can also choose to remove the credit card or use the credit card as the default payment method. The subscriber completes entry of the payment information by selecting "Update."

FIG. 8 illustrates a representative screen 2808 displaying that, in some embodiments, when the subscriber selects "Payment methods" in FIG. 6, the credit card entered through the display shown in FIG. 7 is listed (in this example as the default payment method). This screen also invites the subscriber to enter an additional payment method by selecting "Add a new payment method."

FIG. 9 is an example of a screen 2809 that may be presented, in accordance with some embodiments, when the subscriber selects "Top up now" from the display 2806 shown in FIG. 6. As shown in FIG. 9, the subscriber's master service account balance is $100. The subscriber has the option to add funds to the subscriber's prepay account. As shown in FIG. 9, the subscriber may choose to add $10, $20, $50, or $100 to the account balance. The subscriber's default payment method ("VISA-1111") is presented as the payment source. By selecting "Top up" with the selections shown in FIG. 9, the subscriber will add $10 to the account balance of $100, thus resulting in a total balance of $110. After selecting "Top up," the subscriber would be able to select "Refresh Balance" to confirm that the account balance is $110.

FIG. 10 illustrates an example of a screen 2810 that may be presented when a subscriber selects "Configure Top up" shown in FIG. 6. As shown in the example of FIG. 10, the subscriber may choose to "top up" (e.g., add funds to) the account when the balance is less than a particular value ("Balance is less than _"), on a particular day each month ("Every month on the _"), or manually ("No auto top up"). The subscriber selects an amount for the top up and a payment source and selects "Update" to complete the configuration. Although FIG. 10 illustrates an example in which the user tops up the account using a credit card, other sources to top up are possible, including, for example, debit cards, automated clearing house (ACH) transactions, direct debit from an account at a financial institution, PayPal, Scratcher, e-Money, or another form of virtual money. It is also possible that the payment method comprises other consideration, such as credits a subscriber earned in some manner (e.g., by viewing advertisements, for accepting an offer, etc.).

Although FIGS. 7 through 10 illustrated the configuration and management of a prepay account, it should be noted that, in some embodiments, the subscriber may alternatively configure the master service account to be a post-pay account. In some embodiments, the subscriber configures the master service account to be a post-pay account and is billed later for services. In some embodiments, the subscriber does not have to enter payment information to set up a post-pay account. In some embodiments, the service provider bills the subscriber with a post-pay account at a regular interval (e.g., monthly). In some embodiments, the service provider bills the subscriber after the subscriber has accumulated a particular amount of charges (e.g., after the subscriber has accumulated $5 of charges).

Figure 11:
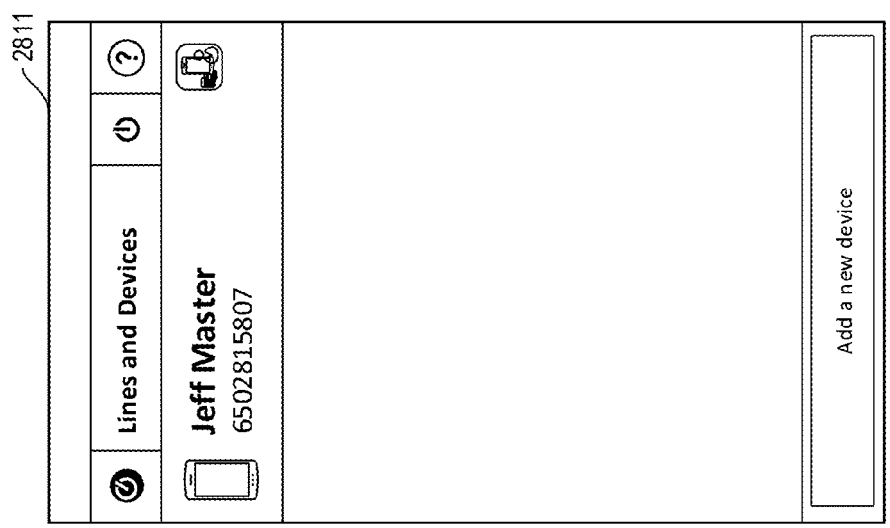
FIG. 11 illustrates a representative screen summarizing information for mobile wireless communication devices in accordance with some embodiments.

FIG. 11 illustrates a representative screen 2811 of information that may be presented, in accordance with some embodiments, when the subscriber who has established a master service account selects "Lines & Devices" from the screen 2804 shown in FIG. 4. As indicated by FIG. 11, there is only one device 100 associated with the master service account ("Jeff Master").

Adding Devices to Master Service Account

Having used one device, hereinafter referred to as the "master device" ("Jeff Master" in FIG. 11), to establish a master service account and configure payment options, including a payment source and, if desired, an automated top up of master service account funds, in some embodiments, the subscriber is able to add other devices 100, hereinafter referred to as "child devices" or "secondary devices," to the master service account and create a device group. It should be noted that the designation of the device used to set up the master service account as a "master device" is for illustrative purposes. As will be appreciated by a person having ordinary skill in the art in light of this disclosure, once a master service account has been established, the capabilities of and permissions granted to the devices associated with that master account can be modified. Thus, a device that was originally a "master" device can be made a child device, and a device that was originally a child device can be promoted to a master device. The use of the terms "master" and "child" herein is merely to improve readability. As would be appreciated by a person having ordinary skill in the art, whether a device is a "master" or a "child" is dependent on the capabilities of and permissions granted by a subscriber to that device.

Figure 12:
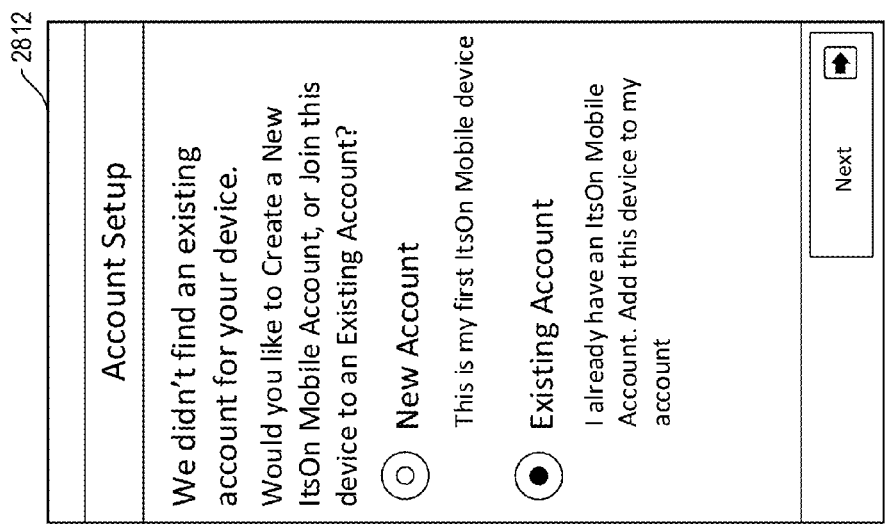
FIG. 12 illustrates a representative screen displayed for a child device that is not associated with an account in accordance with some embodiments.

FIG. 12 illustrates a representative display 2812 that may be presented, in some embodiments, when the subscriber attempts to use a child device that is not yet associated with the master device, any other devices, a device group, or the master service account. In this particular example, the information presented through the child device user interface is the same as the information presented through the master device in the example of FIG. 2. As would be appreciated by a person having ordinary skill in the art, the information presented may differ, and the child device may display more or less information than the master device. Because the subscriber has already established a master service account, as described above, the subscriber selects "Existing Account" to indicate that the subscriber wishes to add the child device to the master service account. The subscriber selects "Next" to proceed.

Figure 13:
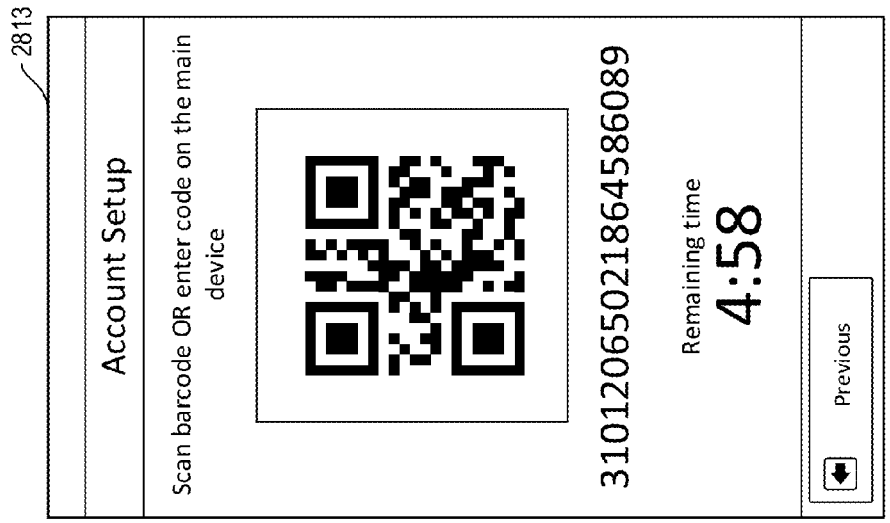
FIG. 13 illustrates a representative screen for associating a child device with an account in accordance with some embodiments.

In accordance with some embodiments, FIG. 13 illustrates a representative display 2813 that may be presented when the subscriber selects "Next" in FIG. 12. The child device presents information that enables the subscriber to "link" (i.e., pair, associate, etc.) the child device with the master device and to add the child device to the master service account. In some embodiments, such as the example shown in FIG. 13, the information is displayed on the child device's user interface. In some embodiments, the information is included in a text message or an e-mail message received by the child device, by the master device, or by the subscriber. In some embodiments, for security purposes, the provided information expires after a particular time period, and the display provides a countdown timer to indicate much time remains for the subscriber to complete the linking procedure. In some embodiments, there is no countdown timer. In some embodiments, the information that allows the subscriber to link the child device to the master service account is a bar code, a quick response (QR) code, or a sequence of alphanumeric characters (e.g., a password). In some embodiments, the information is an instruction for the subscriber to perform some type of action, such as holding the child device in proximity to the master device to allow the information transfer from the child device to the master device. There are many ways the information can be transferred, including, for example, infrared beaming, Bluetooth exchange, and text message exchange. As would be appreciated by a person having ordinary skill in the art, there are many types and forms of information that can enable the linking of the child device to the master device (and to the master service account), and the examples provided herein are not intended to be limiting.

FIG. 14 illustrates a representative screen 2814 of information that may be presented on the master device, in accordance with some embodiments, when a subscriber attempts to link a child device to the master device (and to the master service account). In the example of FIG. 14, the subscriber is instructed to enter, through the master device user interface, the information that enables the subscriber to link the child device to the master device. In some embodiments, the subscriber enters the information by using the master device to scan the information presented through the child device (e.g., by using the master device to scan a barcode, QR code, or alphanumeric string displayed on the child device). In some embodiments, the subscriber manually enters (e.g., by typing) the information into the master device. In some embodiments, the subscriber holds the master device in proximity to the child device to allow a near-field communication transfer, a beam transfer, or some other wireless information transfer to occur. As would be appreciated by a person having ordinary skill in the art, the information transfer could also be accomplished through a wired transfer, e.g., through a personal computer or another device connected by a USB connection, an Ethernet connection, or another wired connection. As would also be appreciated by a person having ordinary skill in the art, there are many ways to enter the information to allow the child device to join the master account, and the examples provided herein are not intended to be limiting.

FIG. 15 illustrates a representative screen 2815 that may be presented by the master device after the subscriber has entered the information that allows the child device to be linked to the master device and its associated master service account. In this example, the pairing code shown in FIG. 13 has been transferred to the master device, whether by manual entry, by scanning, or by some other method. The subscriber completes the joining process by selecting "Add now."

Figures 16, 17:
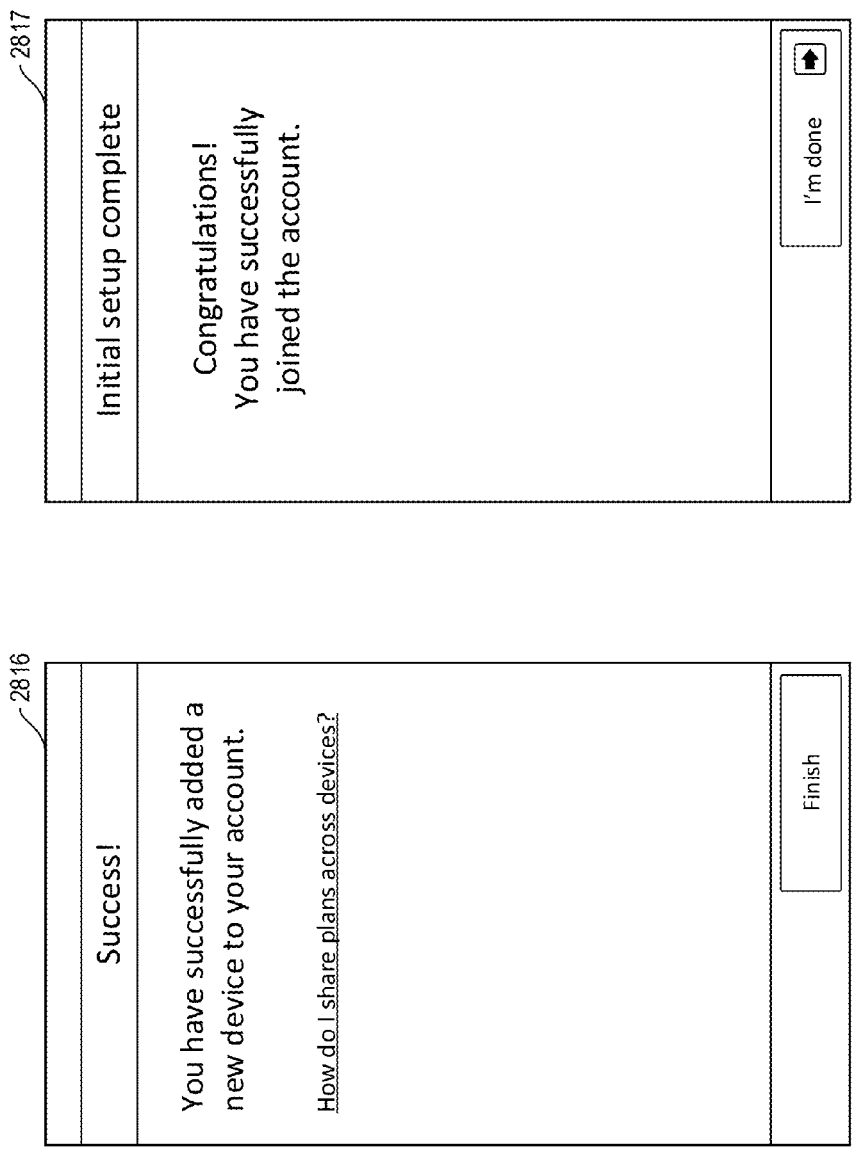
FIGS. 16 and 17 illustrate representative screens displaying information following successful association of a child device with an account in accordance with some embodiments.

FIG. 16 illustrates a representative screen 2816 displaying an example message that may be presented through the master device's user interface after the subscriber has selected "Add now" in FIG. 15. The master device message indicates that the subscriber has successfully added a new device to the master service account. The message also invites the subscriber to learn how to share service plans among devices associated with the master service account.

FIG. 17 illustrates a representative screen 2817 displaying an example message that may be presented through the child device's user interface after the subscriber has selected "Add now" from FIG. 15. The child device message indicates that the child device has been added to the master service account.

Figures 18, 19:
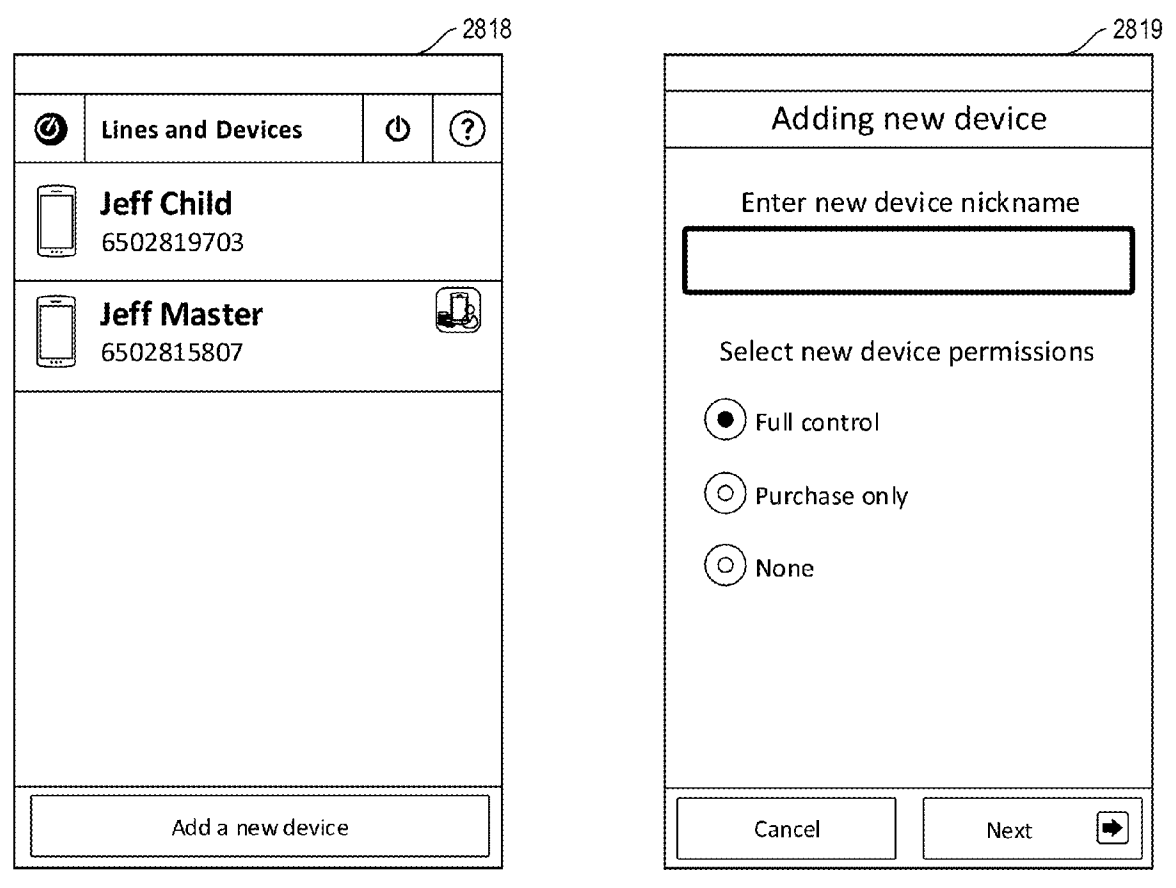

FIG. 18 illustrates a representative screen 2818 displaying that, in accordance with some embodiments, the subscriber can view all devices associated with the master service account by selecting "Lines & Devices" from the display of FIG. 4. As illustrated by FIG. 18, there are two devices associated with the master service account: "Jeff Child" and "Jeff Master." Although FIG. 18 presents an example in which there is only one master device in the device group, there can be more than one master device in a device group, and each master device can be configured so that it can, but need not necessarily, manage child devices in the device group.

In addition to establishing multiple master devices and permissions associated with each master device, the subscriber can establish permission privileges for added (e.g., child) devices. FIG. 19 illustrates a representative screen 2819 displaying an example of permission privileges the subscriber can grant to a child device in accordance with some embodiments. In some embodiments, a subscriber grants full control to an added device. In some embodiments, a device with full control can manage the master service account, add or remove devices from the master service account, and purchase service plans. In some embodiments, a device with full control has the capabilities of a master device. In some embodiments, a subscriber grants an added device the ability to purchase service plans, but not the ability to configure or manage the master service account or the devices in the device group. In some embodiments, a subscriber grants no privileges to an added device. In some embodiments, a user of a device with no privileges cannot purchase service plans or view or manage the master service account.

Sharing Service Plans

Having added another device to the master service account, the subscriber can manage all devices in the device group and can share one or more service plans among devices in the device group. The subscriber can also assign a service plan from a master device to a child device. In some embodiments, service plans are designed to be shareable, assignable (see below), or not shareable. In some embodiments, service plans are designed using a service design center, e.g., service design center 135 illustrated in FIG. 1, and the sharing properties are entered through the service design center. In some embodiments, a service plan has an attribute that determines whether it is shareable. In some embodiments, service plans that are shareable are automatically shared when devices are added to the master service account. In some embodiments, service plans that are shareable are not automatically shared when devices are added to the master service account.

Figure 20:
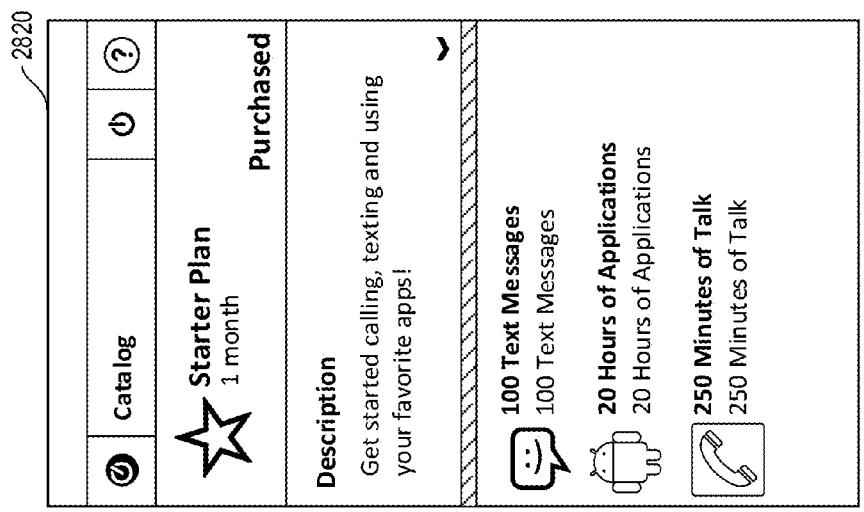
FIG. 20 illustrates a representative screen presenting an example of a service plan subscribed to by the user of the mobile wireless communication device in accordance with some embodiments.

FIG. 20 illustrates a representative screen 2820 presenting an example of a service plan bundle, called "Starter Plan," that has been purchased using the master device. The illustrated service plan bundle includes service plans for 100 text messages, 20 hours of application use, and 250 minutes of phone calls.

Figure 21:
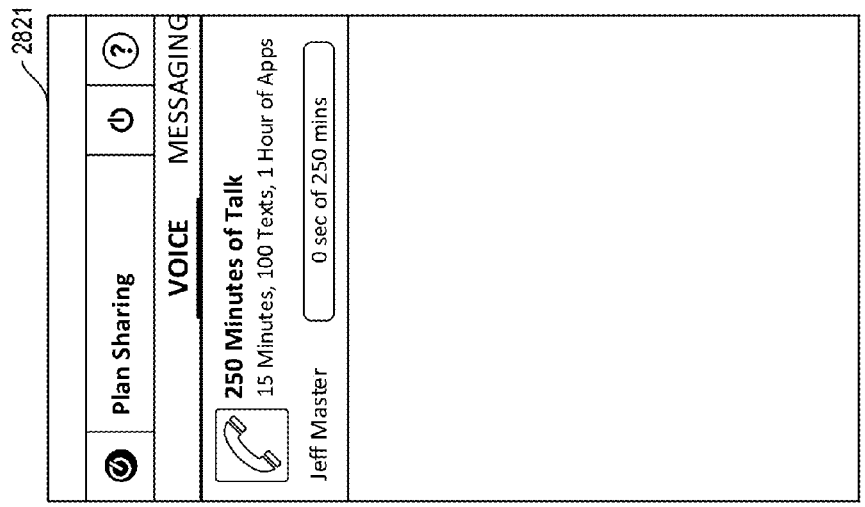
FIG. 21 illustrates a representative screen for sharing voice service plans of the mobile wireless communication device in accordance with some embodiments.
Figures 22, 23:
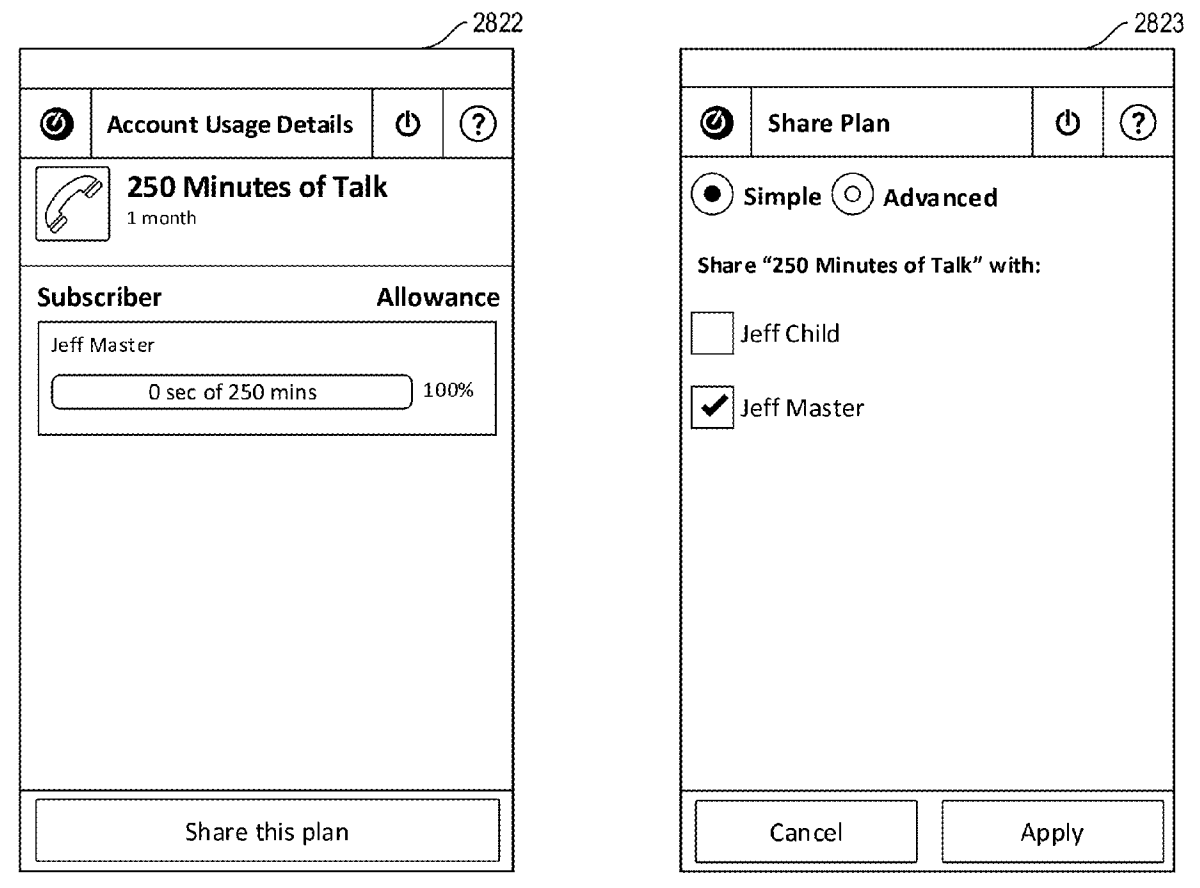

In some embodiments, the subscriber can view information about shared service plans and can share service plans by selecting "Plans & Sharing" from the screen shown in FIG. 4. FIGS. 21 and 22 illustrate that before sharing the "Starter Plan," all of the "250 Minutes of Talk" service plan is allocated to the master device ("Jeff Master"), and that none of the "250 Minutes of Talk" service plan is allocated to the child device that is now also associated with the master service account. In some embodiments, selecting the "250 Minutes of Talk" service plan in screen 2821 shown in FIG. 21, launches screen 2822 shown in FIG. 22. By selecting "Share this plan" from screen 2822 illustrated in FIG. 22, the subscriber can share the "250 Minutes of Talk" service plan with another device.

Figures 24, 25:
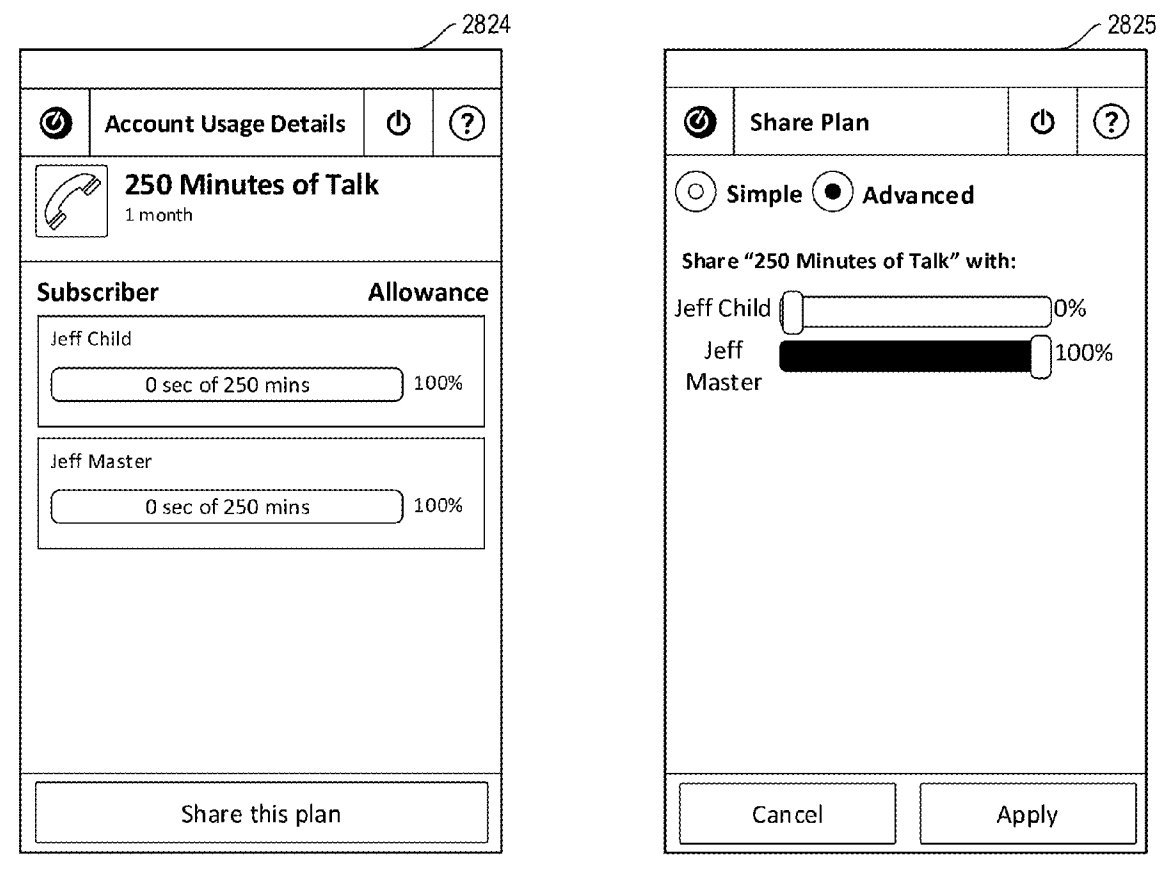

FIG. 23 illustrates a representative screen 2823 presenting an example of plan sharing options that may be available to the subscriber in some embodiments. In the example shown in FIG. 23, the subscriber can choose "Simple" or "Advanced" sharing, and the subscriber can choose which device(s) in a device group will be able to share the selected service plan. In some embodiments, "Simple" sharing allows all selected devices to share the service plan with no limits on their individual usage. Thus, all selected devices share in the usage of an aggregate amount of a resource (e.g., a total number of bytes or a total period of time). FIG. 24 illustrates a representative screen 2824 displaying that, after a simple share of "250 Minutes of Talk," both the master device ("Jeff Master") and the child device ("Jeff Child") are authorized to use up to 250 minutes of the service plan.

Rather than simply sharing a service plan among multiple devices, which may not prevent "hogging" of the allocation provided by the service plan by individual devices, it may be desirable to allocate discrete portions of a service plan to different devices within the device group. For example, a parent who has purchased a service plan that includes 500 voice minutes and 100 text messages per month might want to allocate 100 of the voice minutes and 40 text messages to each of her two children's mobile phones. FIG. 25 illustrates a representative screen 2825 for "Advanced" service plan sharing in accordance with some embodiments. As shown in FIG. 25, the subscriber can make less than all of the shared service plan available to devices in the device group. In FIG. 25, the master device is allowed to use the entire service plan allocation, whereas the child device is not allowed to use any of the service plan allocation. In the representative screen 2826 illustrated in FIG. 26, however, the subscriber has enabled the child device to use up to fifty percent of the "250 Minutes of Talk" service plan allocation. The master device is still allowed to use up to all of the "250 Minutes of Talk" service plan allocation, however. Thus, the master device may still "hog" the service plan's allocation, but the subscriber has ensured that the child device cannot use more than half of the service plan's allocation.

Figure 27:
FIG. 27 illustrates a representative screen displaying account usage details for a voice service plan shared by two mobile wireless communication devices in accordance with some embodiments.
Figure 26:
FIG. 26 illustrates a representative screen displaying a voice service allocated differently to each of two mobile wireless communication devices in accordance with some embodiments.

FIG. 27 illustrates a representative screen 2827 displaying that, following the "Advanced" share illustrated in FIG. 26, the master device may use up to all of the "250 Minutes of Talk" service plan allocation, whereas the child device may only use up to 125 minutes or half of the "250 Minutes of Talk."

As would be appreciated by a person having ordinary skill in the art, there are many ways a service plan could be shared among devices. For example, the subscriber could allocate a certain percentage or amount (e.g., number of minutes, number of texts, number of bytes, etc.) of a service plan to each device associated with the master service account such that the sum of all individual allocations is equal to the total allowed by the service plan. As would also be appreciated by a person having ordinary skill in the art, the subscriber may choose to share different service plans differently among devices in the device group. Similarly, when the subscriber has purchased a service plan bundle, such as "Starter Plan," the subscriber may choose to share constituent service plans of the service plan bundle differently (e.g., a parent may choose to share 80% of the text messages but only 50% of the voice minutes with a child), or she may choose to share all service plans included in a service plan bundle in the same way (e.g., a parent may allow a child to use up to 50% of each service plan included in the service plan bundle.)

In some embodiments, the subscriber chooses to place limits on a service usage amount (e.g., impose a cap or specify an allocation) that can be consumed by a particular device in the device group, e.g., by entering a specific service usage limit using the master device or by using another device and providing a credential that indicates that the subscriber has permission to set service usage limits. By providing a limit for a service usage amount, the subscriber can prevent the particular device from "hogging" the service plan. In some embodiments, the particular device that is limited is the master device. In some embodiments, the particular device that is limited is a child device in a device group shared with the master device (i.e., of which the master device is also a member). In some embodiments, the particular device is another device in a device group shared with the master device. In some embodiments, the particular device is a device managed by a system administrator.

In some embodiments, the subscriber specifies a "microlease" allocation, wherein a device (master or child) is provided an allocation of service usage, and the device subsequently requests an additional allocation after the initial allocation is exhausted.

In some embodiments, the master device monitors usage by devices in the device group and changes one or more plan-sharing parameters based on the monitored usage. In some embodiments, the master device revokes an allocation when the master device determines that the allocation is not being used, or when the master device determines that another device has a greater need for the allocation. In some embodiments, the master device changes an allocation (i.e., increases or decreases an allocation) based on a metric. In some embodiments, the metric is an amount of usage (or a failure to use a service plan) during a time period. In some embodiments, the metric is an expected usage during a time period. In some embodiments, the metric is based on service plan usage by one or more other devices in the device group. In some embodiments, the master device reapportions a service plan or an allocation of a service plan to one or more devices based on a determination that the reapportionment will reduce waste of the service plan.

In some embodiments, the subscriber specifies one or more parameters to assist the master device in managing plan sharing. In some embodiments, the master device manages plan sharing without subscriber involvement.

In some embodiments, the subscriber allocates a maximum amount of a service plan for a period of time and establishes a "metering" of the total during a sequence of time periods (e.g., a total of 100 text messages during a month and no more than 25 text messages per week). In some embodiments, the subscriber allocates an initial allocation to a child device and then allocates an additional allocation (e.g., a smaller allocation) when the child device exhausts the initial allocation.

In the examples provided herein, none of the "Starter Plan" service plan bundle had been consumed when the subscriber shared the service plan bundle with another device. In some embodiments, had a portion of the service plan bundle been consumed prior to sharing, the subscriber would only be able to share what service usage allocation remained of the service plan bundle. In some embodiments, each service plan within a service plan bundle can be shared individually.

Assigning Service Plans

In some embodiments, a subscriber may want to allocate the entirety of a service plan to a child device, leaving none of the service plan available to the master device. For example, a parent might purchase a service plan that is of great interest to her child but of no interest to the parent. In some embodiments, therefore, a subscriber may assign a service plan from one device in the device group to another device in the device group. In some embodiments, a service plan must be assignable to be assigned. In some embodiments, whether a service plan is assignable is configured using a service design center. In some embodiments, a service plan has an attribute that determines whether it is assignable. In some embodiments, a service plan is assignable but not shareable. In some embodiments, a service plan is shareable but not assignable. In some embodiments, a service plan is both shareable and assignable. In some embodiments, a service plan is neither shareable nor assignable. In some embodiments, one or more permission policies that can apply to a shared service plan can also apply to an assigned service plan.

Figure 28:
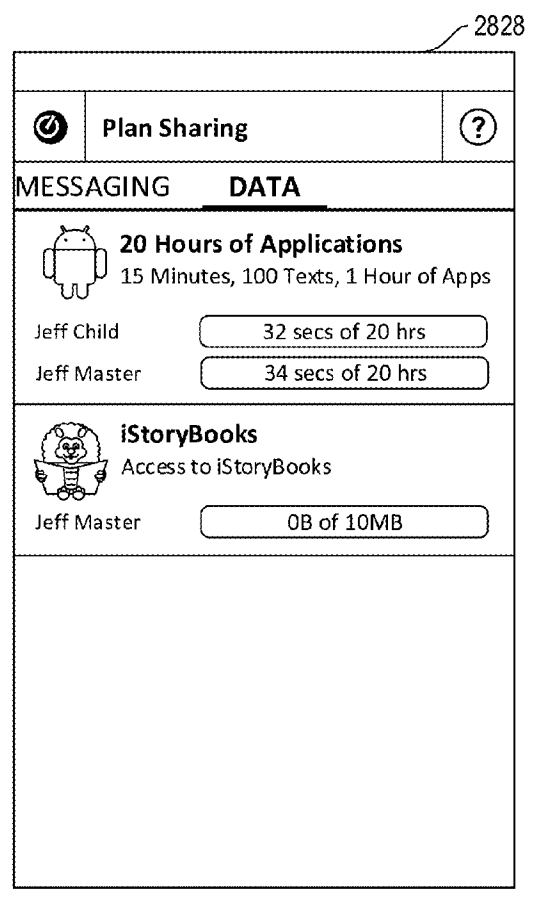

FIG. 28 illustrates a representative screen 2828 for a master device with a service plan called "iStoryBooks" that is available to the master device ("Jeff Master") but not to the child device ("Jeff Child"). FIG. 28 is representative of a situation in which a parent purchased the service plan using the master device.

Figure 29:
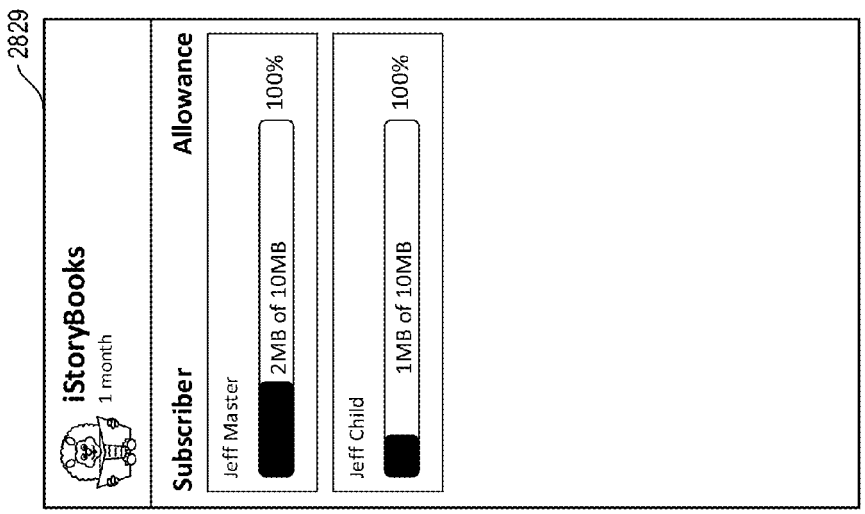

FIG. 29 illustrates a representative screen 2829 for a master device that has a service plan ("iStoryBooks") that is available to both the master device and the child device. FIG. 29 is representative of a situation where the service usages of the shared service plan by the master device and the child device are presented on the master device (e.g., through the master device's user interface). In the embodiment shown in FIG. 29, the service usage of the master device is presented separately from the service usage of the child device. In some embodiments, the service usage can be consolidated into a single progress bar. In some embodiments, where the service usage is consolidated into a single progress bar, the service usage amounts from the master and the child device are represented with different colors, dividers, labels, or some other visual cue to delineate the service usage associated with the different devices.

Figure 30:
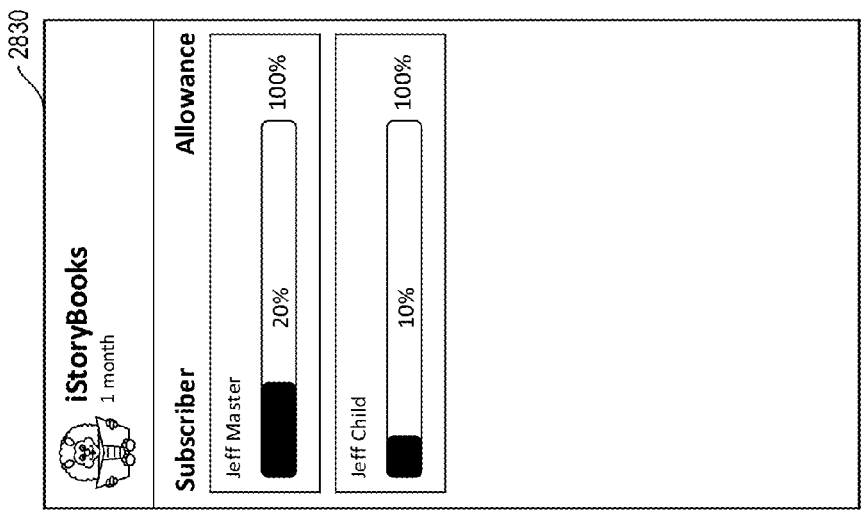
FIGS. 29 and 30 illustrate representative screens displaying sharing of a specific service plan among two mobile wireless communication devices in accordance with some embodiments.

FIG. 30 illustrates a representative screen 2830 for a master device that has a service plan ("iStoryBooks") that is available to both the master device and the child device. FIG. 30 is representative of a situation where the service usages of the shared service plan by the master device and the child device are displayed on the master device and the service usage is displayed as a percentage of a service usage allocation relative to a service plan allocation limit. In the embodiment illustrated in FIG. 30, the service usage of the master device is separated from the service usage of the child device. In some embodiments, the service usage can be consolidated to display on a single progress bar. In some embodiments, where the service usage is consolidated on a single progress bar, the service usage amounts from the master device and the child device are represented with different colors, dividers, labels, or some other visual cue to delineate the service usage of the different devices.

Figures 31, 32:
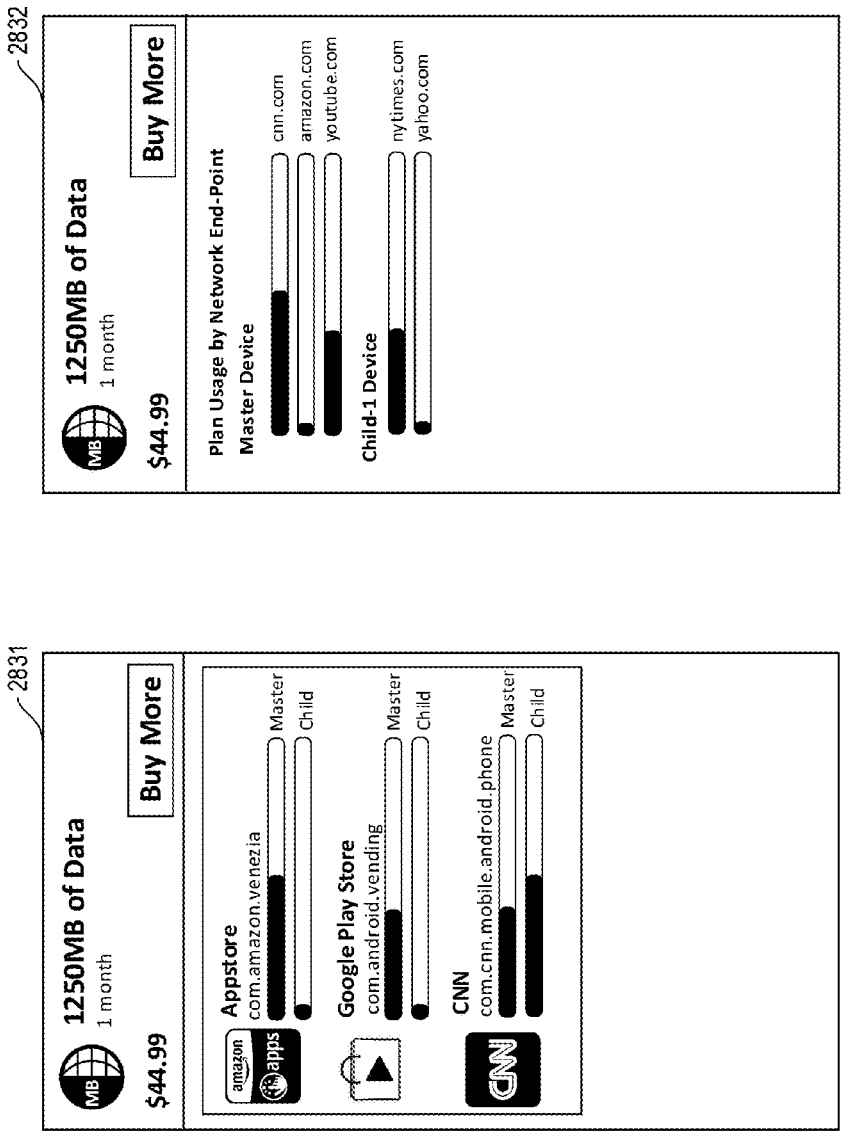
FIG. 31 illustrates a representative screen displaying service usage details arranged by application for a shared service plan in accordance with some embodiments.
FIG. 32 illustrates a representative screen displaying service usage details arranged by network end-point for a shared service plan in accordance with some embodiments.

FIG. 31 illustrates a representative screen 2831 for a master device with a service plan that is available to both the master device and the child device. FIG. 31 is representative of a situation where the service usage is displayed by application, and application service usage is shown for each device that is associated with the shared service plan. In some embodiments, the service usage can be consolidated on a single progress bar. In some embodiments, where the usage is consolidated on a single progress bar, the service usage amounts from the master device and the child device are represented with different colors, dividers, labels, or some other visual cue to delineate the service usage of the different devices.

FIG. 32 illustrates a representative screen 2832 for a master device with a service plan that is available to both the master device and the child device. FIG. 32 is representative of a situation where the service usages of the shared service plan per network end-point (e.g., domain, IP address, URL, etc.) by the master and the child devices are presented on the master device, and the service usage display is displayed as service usage per network end-point. In the embodiment of FIG. 32, the service usage of the master device is separated from the service usage of the child device. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

Figure 33:
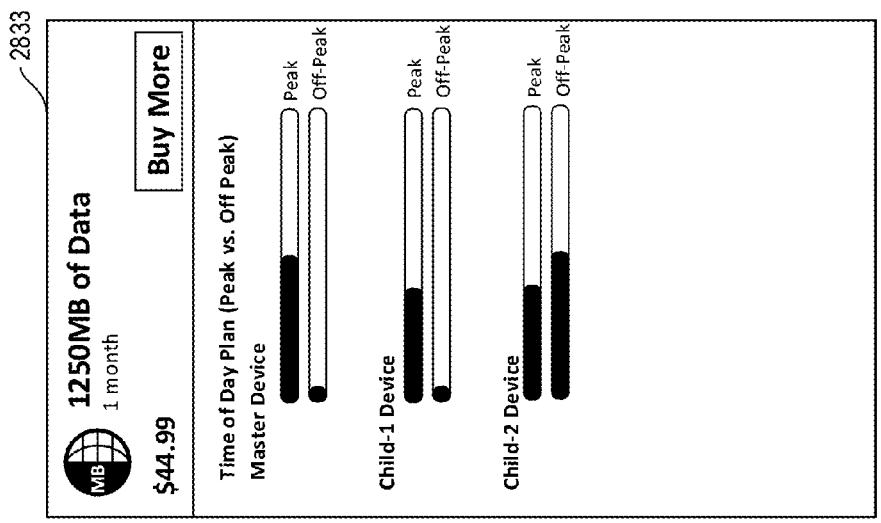
FIG. 33 illustrates a representative screen displaying service usage details arranged by time of day categories for a shared service plan in accordance with some embodiments.

FIG. 33 illustrates a representative screen 2833 for a master device with a service plan that is available to the master device and two child devices. FIG. 33 is representative of a situation where the service plan has time of day usage measurements, and the usage is displayed by time-of-day categories (e.g., peak and off-peak), and usage by time-of-day category is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

Figure 34:
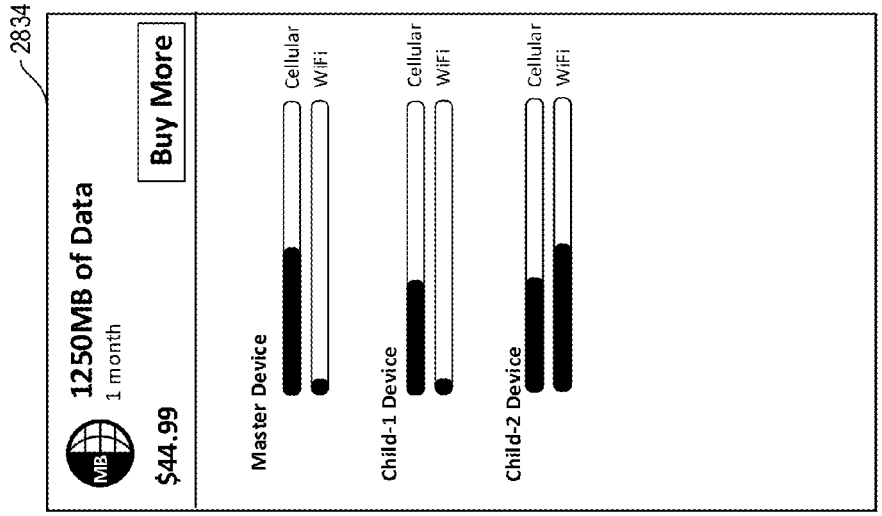
FIG. 34 illustrates a representative screen displaying service usage details arranged by network type for a shared service plan in accordance with some embodiments.

FIG. 34 illustrates a representative screen 2834 for a master device with a service plan that is available to the master device and two child devices. FIG. 34 is representative of a situation where the service usage is displayed by network type, and service usage by network type is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

FIG. 35 illustrates a representative screen 2835 for a master device with a service plan that is available to the master device and two child devices. FIG. 35 is representative of a situation where the service plan includes QoS Level service usage measurements, the service usage is displayed by QoS Level (e.g., streaming and interactive), and service usage by QoS Level is shown for each device that is associated with the shared service plan. In some embodiments, the service usage can be consolidated on a single progress bar. In some embodiments, where the service usage is consolidated on a single progress bar, the service usage amounts from the master device and the child device are represented with different colors, dividers, labels, or some other visual cue to delineate the service usage of the different devices.

As would be appreciated by a person having ordinary skill in the art, there are many different examples, combinations, and permutations of shared service usage displays, and the examples presented herein are meant to be illustrative and not intended to be limiting.

FIG. 36 illustrates a representative screen 2836 displaying that the "iStoryBooks" service plan is currently available only to the master device ("Jeff Master"). By selecting "Assign this plan," the subscriber can assign the "iStoryBooks" service plan to another device in the device group.

Figure 37:
FIG. 37 illustrates a representative screen displaying selection options for assigning a service plan to one of two mobile wireless communication devices in accordance with some embodiments.

FIG. 37 illustrates a representative screen 2837 that may be presented as a result of selecting "Assign this plan" in accordance with some embodiments. By selecting "Jeff Child" and selecting "Apply," the subscriber assigns the "iStoryBooks" service plan to the child device.

Figure 38:
FIG. 38 illustrates a representative screen displaying plan sharing properties of multiple service plans across multiple mobile wireless communication devices in accordance with some embodiments.

FIG. 38 illustrates a representative screen 2838 displaying that after the subscriber selects "Apply" from the display shown in FIG. 37, the "iStoryBooks" service plan has been assigned to the child device and is no longer available to the master device.

Figure 39:
FIG. 39 illustrates a representative screen displaying an option to assign an already assigned service plan in accordance with some embodiments.

FIG. 39 illustrates a representative screen 2839 displaying that although the "iStoryBooks" service plan has been assigned to the child device, the subscriber can reassign the service plan by selecting "Assign this plan." For example, a parent could temporarily remove the "iStoryBooks" service plan from her child's device if she needed to.

Although FIG. 37 indicates that in some embodiments, the entirety of a service plan is assigned to a single device (i.e., either "Jeff Master" or "Jeff Child"), in some embodiments, a subscriber can assign a single service plan to more than one device. For example, a subscriber who has two children, each of whom has a device 100, can assign "iStoryBooks" to both children's devices. The children would then share the service plan. In some embodiments, when a subscriber assigns a service plan to multiple devices, the subscriber specifies how the service plan will be shared by the multiple devices (e.g., using the terminology of FIG. 23, in a "Simple" or "Advanced" manner).

As will be appreciated by a person having ordinary skill in the art in light of the disclosures herein, a difference between a subscriber assigning a service plan to one or more devices and the subscriber sharing the service plan is that, in some embodiments, a shared service plan remains visible on the master device as a service plan that is available to the master device, whereas an assigned service plan does not remain visible on the master device as a service plan that is available to the master device.

It should now be apparent to a person having ordinary skill in the art that there are many unique and interesting ways that a subscriber can share and assign service plans, and the examples herein are not intended to be limiting.

Monitoring Usage and Transactions

Figure 40:
FIG. 40 illustrates a representative screen displaying tracking of service usage of a child device in accordance with some embodiments.

In addition to adding devices to the master service account, sharing service plans, and assigning service plans, subscribers may track usage and access usage history by selecting "Usage" from the display 2806 shown in FIG. 6. For example, FIG. 40 illustrates a representative screen 2840 showing that a subscriber may access child device usage (in this case, usage by "Jeff Child") through the child device. FIG. 40 shows that the child device has used only one minute of the 20 hours of application use, and none of the "iStoryBooks" service plan.

Figure 42:
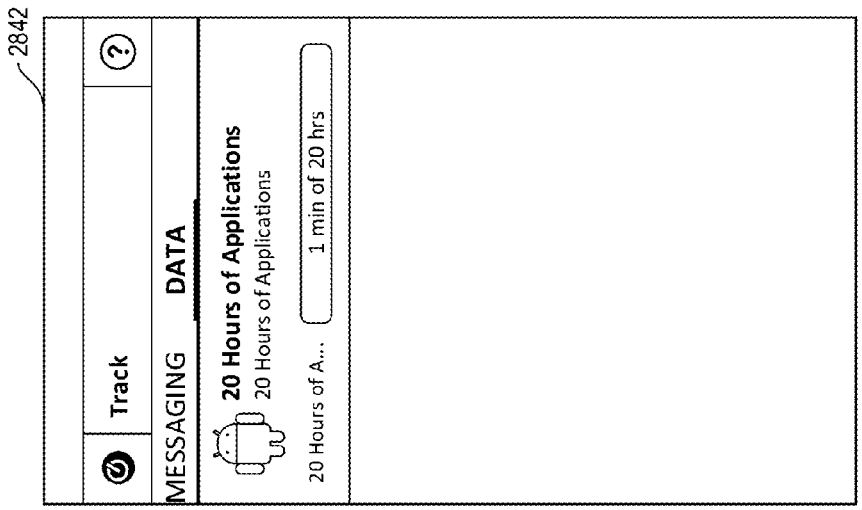
FIG. 42 illustrates another representative screen displaying service usage for different service plan categories in accordance with some embodiments.
Figure 41:
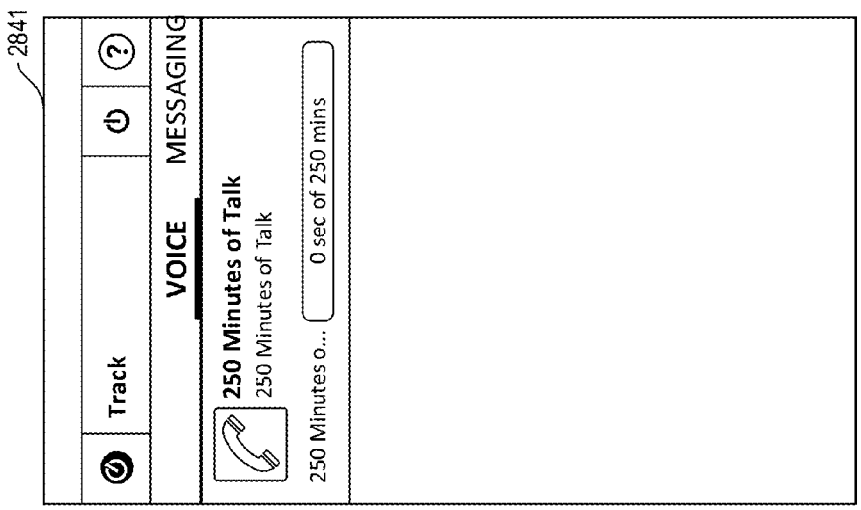
FIG. 41 illustrates a representative screen displaying service usage for different service plan categories in accordance with some embodiments.

The subscriber may track usage for all devices or for just the master device from the master device by selecting "Usage" from the screen 850 illustrated in FIG. 6. For example, FIGS. 41 and 42 illustrate representative screens 2841 and 2842 showing usage for the categories of voice and data, respectively. According to FIG. 41, all "250 Minutes of Talk" remain available.

FIG. 43 illustrates a representative screen 2843 showing the master device's presentation of usage of the "20 Hours of Applications" plan by each device in the device group during a particular time period (in this example, the month of June 2012).

In addition to viewing information about service usage, in some embodiments, the subscriber can access information about transactions. FIG. 44 illustrates a representative screen 2844 of information available to a subscriber who selects "Transactions and Balance" from the screen 2806 illustrated in FIG. 6. In FIG. 44, the transactions from the month of June 2012 are presented. They included a user initiated top-up and two service plan purchases ("Starter Plan" and "iStoryBooks"). As shown in FIG. 44, following these transactions, the subscriber's master account has a balance of $93.56.

In some embodiments, a child device sends a message to a master device when a usage allocation is exhausted (e.g., when the child device has exhausted its share of a service plan) or when a particular milestone is met (e.g., when the child device has only two minutes of talk time left). In some embodiments, the child device sends a message to a master device, and the master device presents a notification to the subscriber to provide information about the service usage event on the child device. In some embodiments, the master device suggests a solution to the service usage event, such as by presenting an offer to the subscriber, such as an offer to purchase an additional service plan or an offer to assist the subscriber in modifying the parameters of a shared service plan.

In some embodiments, a child device sends a message to a master device when a user of the child device has attempted an unauthorized service usage. For example, in some embodiments, if a user of a child device attempts to send a text message, but the child device does not have an allocation of text messages, the child device sends a message to the master device to report that the child device attempted to send a text message. In some embodiments, the child device sends a message about an attempted unauthorized service usage to the master device without interaction with or input from a user of the child device. In some embodiments, the master device presents an offer to the subscriber, such as an offer to purchase an additional service plan or an offer to assist the subscriber in modifying the parameters of a shared service plan.

In some embodiments, the child device presents a notification through its user interface when a user of the child device attempts an unauthorized service usage. In some embodiments, a user of a child device subject to an allocation (e.g., a maximum number of text messages) who exhausts the allocation can send a message to one or more master devices to request an additional allocation. In some embodiments, the child device assists a user of the child device in requesting a service plan or additional resources from the subscriber.

In some embodiments, a subscriber can access the master service account from a device that is not a master device, but is associated with the master service account, by logging into the master service account (e.g., through a screen such as the representative screen 2805 illustrated in FIG. 5). This functionality may be useful for when a master device is not immediately accessible, but the subscriber wishes to share a service plan, modify service plan sharing for one or more service plans, or assign a service plan.

In some embodiments, a subscriber can give, as a gift, a service plan or a portion of a service plan to a device 100 that is not within the device group but that is capable of receiving the gift. For example, in some embodiments, a subscriber can give a service plan or a portion of a service plan to a device outside a first device group but within a second device group.

In some embodiments, a user of child device with no purchase capability can, from the child device, request that the master device grant the child device access to a service. For example, in some embodiments, when a user of a child device attempts to use or access a service that is not authorized, the child device will present a notification that indicates the child device is not authorized for the service. In some embodiments, the notification facilitates the child device requesting access from the master device (e.g., the notification includes a button called "Request Access From Master"). In some embodiments, the master device receives the request and presents a notification through the master device's user interface, thus allowing the subscriber to grant or deny access to the requested service. In some embodiments, the master device sends a message to the child device indicating whether the request was granted or denied. In some embodiments, after receiving the message from the master device, the child device presents a notification through a user interface to indicate whether the request was granted or denied.

On-Device Multi-Device Service Sign-Up

Figure 45:
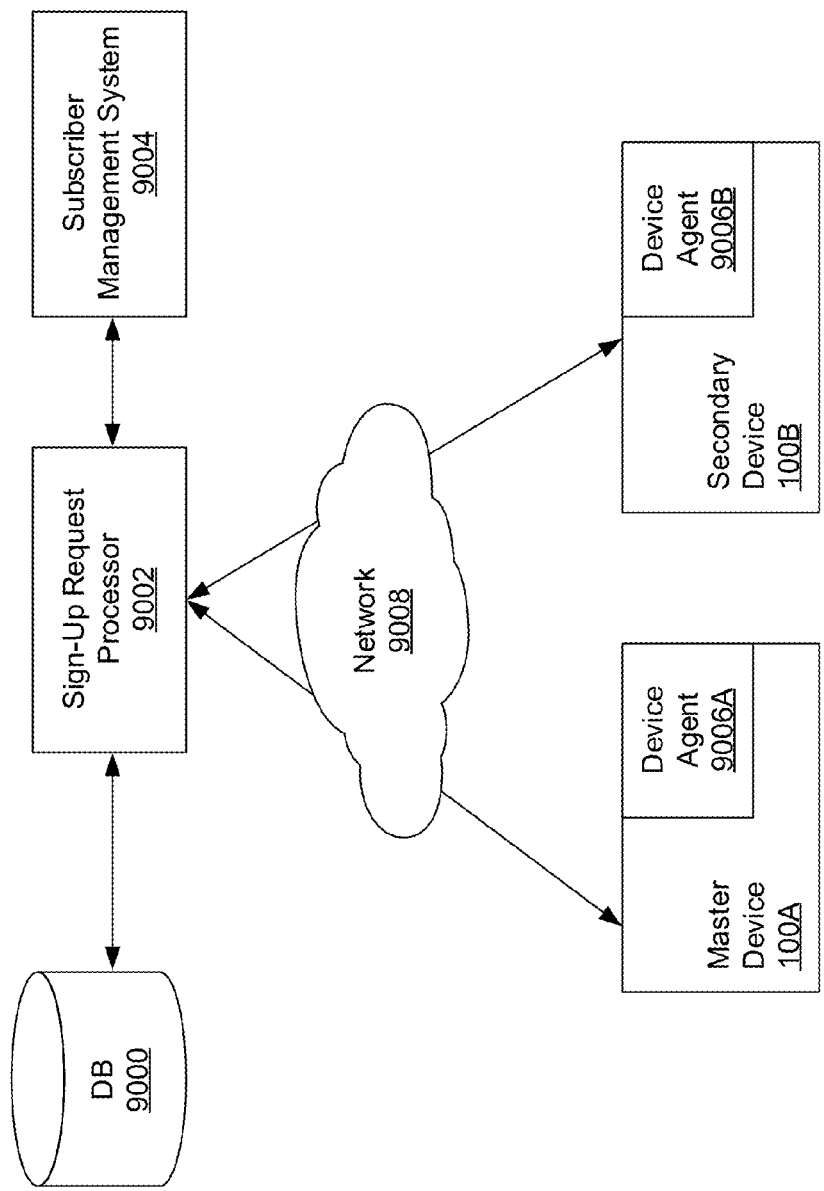
FIG. 45 illustrates a representative system configuration providing for a master-subscriber-initiated or a secondary-subscriber-initiated on-device multi-device service sign-up procedure in accordance with some embodiments.

FIG. 45 illustrates a system configuration that enables a master-subscriber-initiated on-device multi-device service sign-up procedure in accordance with some embodiments. Sign-Up Request Processor 9002 is communicatively coupled to database 9000 (labeled "DB"), and to Subscriber Management System 9004. Sign-Up Request Processor 9002 is also communicatively coupled, through network 9008, to Master Device 100A and Secondary Device 100B. Master Device 100A includes Device Agent 9006A, and Secondary Device 100B includes Device Agent 9006B.

Figure 46:
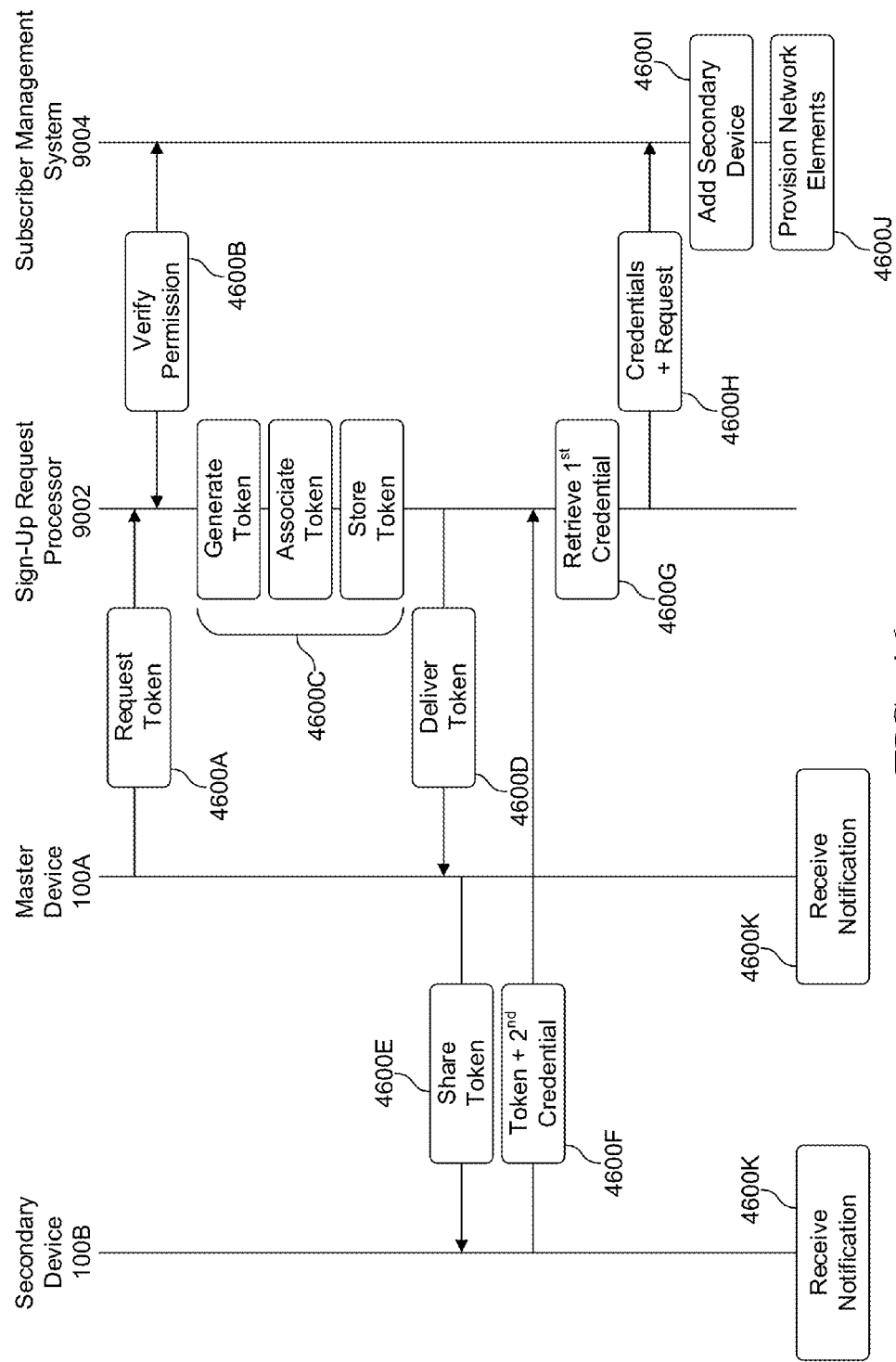
FIG. 46 illustrates a representative flow chart illustrating exchange and processing of messages to add a secondary device to a master service account, device group, or multi-device service plan initiated by a master device subscriber in accordance with some embodiments.

FIG. 46 illustrates an exchange of messages and processing of messages by Master Device 100A, Secondary Device 100B (referred to as the child device in the context of FIGS. 2 through 44), Sign-Up Request Processor 9002, and Subscriber Management System 9004 illustrated in the system configuration of FIG. 45. FIG. 46 illustrates a representative embodiment for the subscriber of Master Device 100A to add Secondary Device 100B to the master service account, device group, or multi-device service plan. Additional embodiments are also discussed further herein.

In some embodiments, the master device subscriber initiates the linking process. In some embodiments, the master device subscriber (e.g., via a Device Agent 9006A) requests a one-time token from Sign-Up Request Processor 9002 (labeled 4600A in FIG. 46). At 4600B, Sign-Up Request Processor 9002 verifies with Subscriber Management System 9004 that the subscriber associated with Master Device 100A has permission to add additional devices to the master service account, device group, or multi-device service plan (e.g., by verifying a username and/or password, credential, etc.). At 4600C, Sign-Up Request Processor 9002 generates a one-time token, associates it with the master subscriber (e.g., device credential, user credential, account credential, etc.), stores the token and the credential in database 9000 (labeled DB) and then, at 4600D, delivers the token to the master subscriber (via Device Agent 9006A). At 4600E, the master device subscriber shares the one-time token with the intended secondary device subscriber (e.g., via email, SMS, MMS, an image that can be scanned (e.g., bar code, QR Code, etc.), sound file, NFC, "bump," Bluetooth message, etc.). The secondary device subscriber enters the one-time token (via the Device Agent) on Secondary Device 100B. There are many ways the secondary device subscriber can enter the one-time token, e.g., by scanning an image, sending or receiving or opening an email attachment, sending or receiving or opening an SMS, sending or receiving or opening an MMS attachment, sending or receiving or opening a sound file, through a near field communication (NFC), through a "bump" with another device (e.g., Master Device 100A), using a Bluetooth message, etc. In some embodiments, the master device subscriber shares the token with Secondary Device 100B by displaying an image that can be scanned on its screen, and Secondary Device 100B's Device Agent 9006B scans the image (e.g., with a built-in camera and scanning software). In some embodiments, Master Device 100A's Device Agent 9006A displays a PIN code on Master Device 100A and the secondary device subscriber enters that PIN code into Secondary Device 100B via Device Agent 9006B. In other embodiments, Master Device 100A shares the token with Secondary Device 100B via a Bluetooth link, a near-field communication (NFC), a "bump," or any other type of communication that allows devices in relatively close proximity to communicate with each other.

At 4600F, Device Agent 9006B sends the entered token information plus its (e.g., device, user, etc.) credential (e.g., 2nd credential shown in FIG. 46) from Secondary Device 100B to Sign-Up Request Processor 9002. At 4600G, Sign-Up Request Processor 9002 looks up the token in database 9000 and obtains the master device credential (e.g., 1st credential shown in FIG. 46). At 4600H, Sign-Up Request Processor 9002 sends the master device credential, the secondary device credential and a request to join Secondary Device 100B to the master service account, device group, or multi-device service plan to Subscriber Management System 9004. Subscriber Management System 9004 de-provisions (if necessary) Secondary Device 100B from its current plan and, at 4600I, adds Secondary Device 100B as a subscriber onto the master service account, device group, or multi-device service plan (e.g., for voice, text and data). (De-provisioning Secondary Device 100B from its current plan is not shown explicitly in FIG. 46, but de-provisioning can occur, in some embodiments, before adding Secondary Device 100B to the intended master service account, device group or multi-device service plan.) At 4600J, Subscriber Management System 9004 provisions the network elements to recognize that Secondary Device 100B is now associated with the master service account, device group, or multi-device service plan. At 4600K, the Master device subscriber and secondary device subscribers both receive a notification that Secondary Device 100B is associated with the master service account, device group, or multi-device service plan. Optionally, in some embodiments, the network system (or the master device subscriber) can assign usage quotas to Secondary Device 100B.

In some embodiments, Sign-Up Request Processor 9002 does not send the token back to Master Device 100A, but instead sends it directly to Secondary Device 100B to enable the secondary device subscriber to accept the "invitation" to be added to the shared plan. In this embodiment, when the secondary device subscriber accepts the invitation, the token is sent back to Sign-Up Request Processor 9002 as described above, and the provisioning process occurs.

In some embodiments, the master device subscriber initiates the share request from a website. In this embodiment, the process is similar to the process where the share request is initiated from Master Device 100A. In this embodiment, the master device subscriber logs into a secure website or portal and enters the necessary information to initiate the sharing request (e.g., his account number, user credential, device credential, etc.) and the request is then processed in the same manner as if the request originated from Master Device 100A.

In some embodiments, the token is a PIN and the PIN is delivered out-of-band to the secondary device subscriber (e.g., via SMS, email message, etc.). In some embodiments, the secondary device subscriber calls an Interactive Voice Recognition (IVR) system and enters the PIN. The IVR obtains the PIN (e.g., through DTMF tones or through voice-to-text processing) and delivers it to Sign-Up Request Processor 9002. From there, the process continues as if the request were handled by Device Agent 9006B on Secondary Device 100B.

In some embodiments, the token is a PIN and the PIN is delivered out-of-band to the secondary device subscriber (e.g., via SMS, email message, etc.). In some embodiments, an IVR system automatically calls the secondary device subscriber (at a phone number specified by the Master device subscriber in the share request or on the secondary device itself, etc.). The secondary device subscriber then enters the PIN (e.g., using DTM voice-to-text processing) on the IVR and the IVR delivers the PIN to Sign-Up Request Processor 9002. From there, the process continues as if the request were handled by Device Agent 9006B on Secondary Device 100B.

In some embodiments, Master Device 100A is a first device that has a master device credential provisioned into a network access service permission system by Subscriber Management System 9004 to provide for Master Device 100A to access network services in accordance with a multi-device service plan, and Secondary Device 100B is a second device that has a secondary device credential provisioned into the network access service permission system by Subscriber Management System 9004 to provide for secondary device access network services in accordance with a multi-device service plan.

In some embodiments, the master device credential is provisioned into the network access service permission system before the secondary device credential is provisioned into the network access service permission system. In some embodiments, the secondary device credential is provisioned into the network access service permission system before the master device credential is provisioned into the network access service permission system. In some embodiments, the secondary device credential and the master device credential are provisioned at the same time into the network access service permission system.

In some embodiments, Sign-Up Request Processor 9002 is located in the carrier network. In some embodiments, Sign-Up Request Processor 9002 is located in a third-party provider network (e.g., device OEM, VSP, MVNO, device OS provider, Voice over IP (VoIP) provider, etc.).

Figure 47:
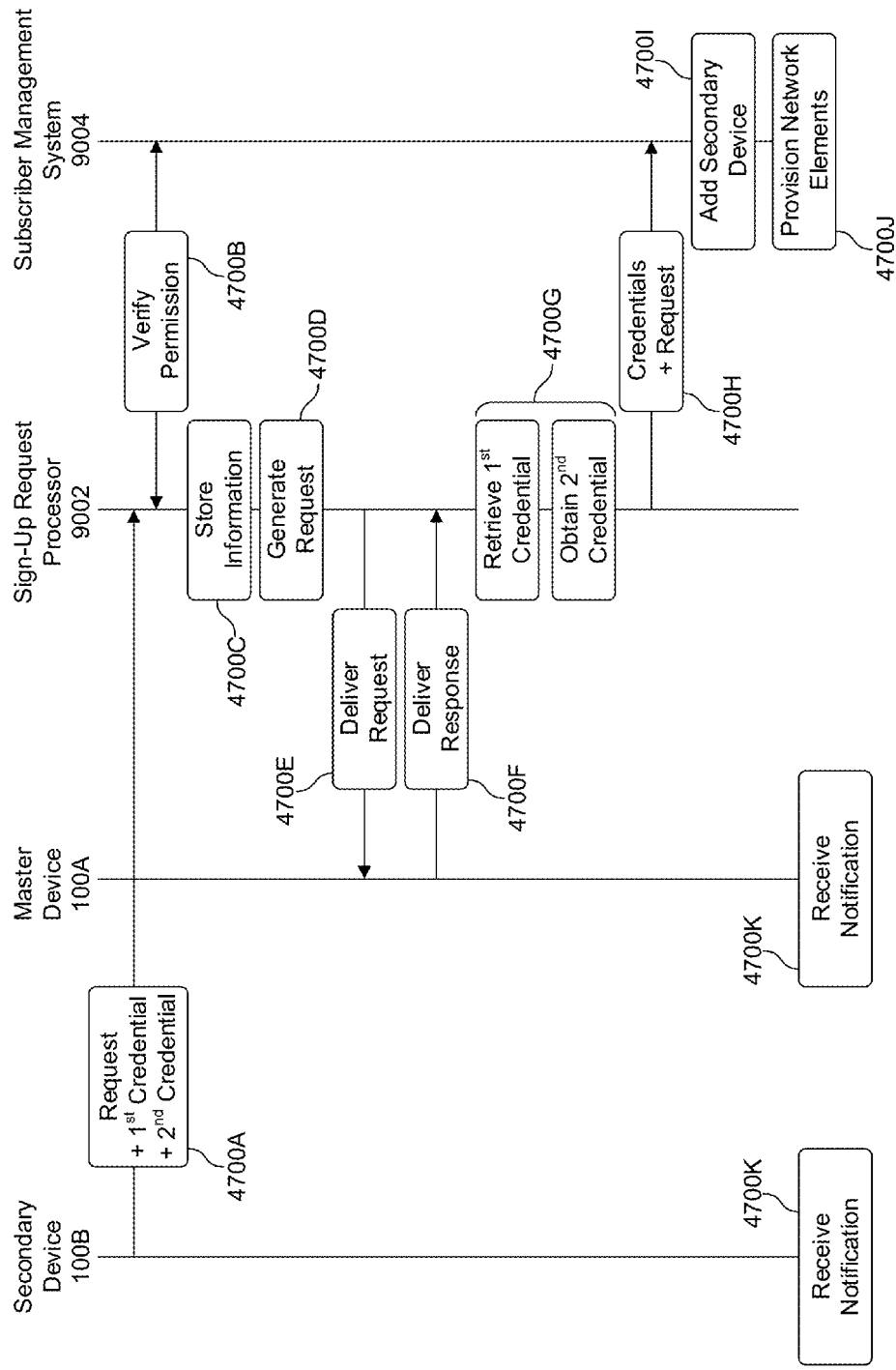
FIG. 47 illustrates a representative flow chart illustrating exchange and processing of messages to add a secondary device to a master service account, device group, or multi-device service plan initiated by a secondary device subscriber in accordance with some embodiments.

The system illustrated in FIG. 45 also enables a secondary-subscriber-initiated on-device multi-device service sign-up procedure in accordance with some embodiments. FIG. 47 illustrates an exchange of messages and processing of messages by Master Device 100A, Secondary Device 100B, Sign-Up Request Processor 9002, and Subscriber Management System 9004 illustrated in the system configuration of FIG. 45. FIG. 47 illustrates a representative embodiment for a subscriber of Secondary Device 100B to request that the subscriber of Master Device 100A add Secondary Device 100B to the master service account, device group, or multi-device service plan. Additional embodiments are also discussed further herein.

In some embodiments, at 4700A, the secondary device subscriber (via Device Agent 9006B) sends a request to Sign-Up Request Processor 9002 requesting to add Secondary Device 100B a device to the Master Device's master service account, device group, or multi-device service plan. The request includes Secondary Device 100B's credential and/or the user's credential (e.g., MEID, IMEI, IMSI, MSID, phone number, account number, etc.) and a credential for Master Device 100A's account (e.g., MEID, IMEI, phone number, IMSI, MSID, account number, etc.). (The secondary device and/or user's credential is labeled as "2nd credential" in FIG. 47. The credential for the master device's account is labeled as "1st credential" in FIG. 47.) At 4700B, Sign-Up Request Processor 9002 verifies with Subscriber Management System 9004 that the subscriber of Master Device 100A has permission to add additional devices to the master service account, device group, or multi-device service plan (e.g., by verifying a credential, etc.). In some embodiments, at 4700C, Sign-Up Request Processor 9002 saves Master Device 100A and Secondary Device 100B and/or user information in database 9000. At 4700D, Sign-Up Request Processor 9002 generates a request. At 4700E, Sign-Up Request Processor 9002 delivers the request to the Master device subscriber (e.g., via SMS, email, PIN code, message to Device Agent 9006A on Master Device 100A, etc.). The Master device subscriber receives the request and responds to the request via Device Agent 9006 (e.g., enters his credentials, enters the PIN code, etc.). At 4700F, Device Agent 9006 delivers the response to Sign-Up Request Processor 9002. At 4700G, Sign-Up Request Processor 9002 looks up the Master Device credential (labeled as "1st credential" in FIG. 47) in database 9000 and obtains the secondary device credential. At 4700H, Sign-Up Request Processor 9002 sends the master device credential, the secondary device credential, and a request to add the secondary device to the master service account, device group, or multi-device service plan to Subscriber Management System 9004. In some embodiments, Subscriber Management System 9004 de-provisions (if necessary) Secondary Device 100B from Secondary Device 100B's current plan and, at 4700I, adds Secondary Device 100B as a subscriber onto the master service account, device group, or multi-device service plan (e.g., for voice, text and data). (De-provisioning of Secondary Device 100B from Secondary Device 100B's current plan, if needed, is not shown explicitly in FIG. 47.) At 4700J, Subscriber Management System 9004 provisions the network elements to recognize that Secondary Device 100B is now associated with the master service account, device group, or multi-device service plan. At 4700K, the master device subscriber and secondary device subscriber each receive a notification that that Secondary Device 100B is now associated with the master service account, device group, or multi-device service plan. Optionally, in some embodiments, the network (or the master device subscriber) can assign usage quotas to Secondary Device 100B.

Figure 48:
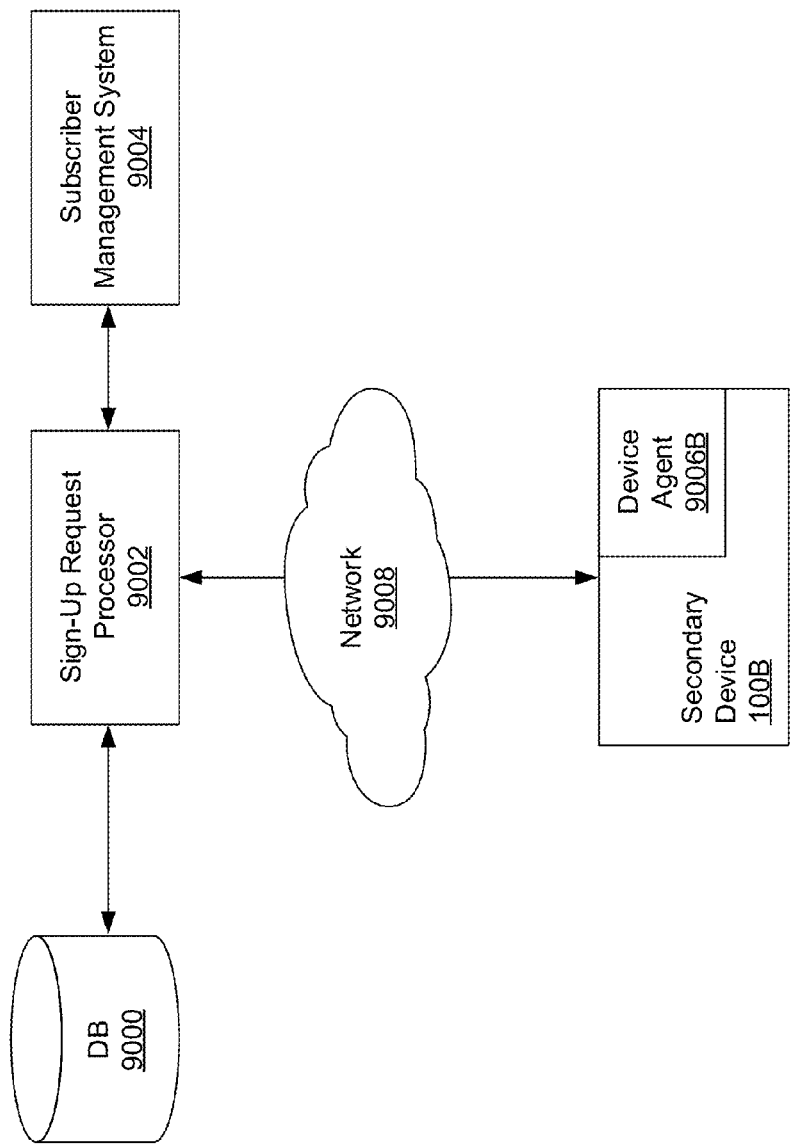
FIG. 48 illustrates a representative system configuration providing for adding a secondary device to a master service account, device group, or multi-device service plan without the use or involvement of a master device in accordance with some embodiments.
Figure 49:
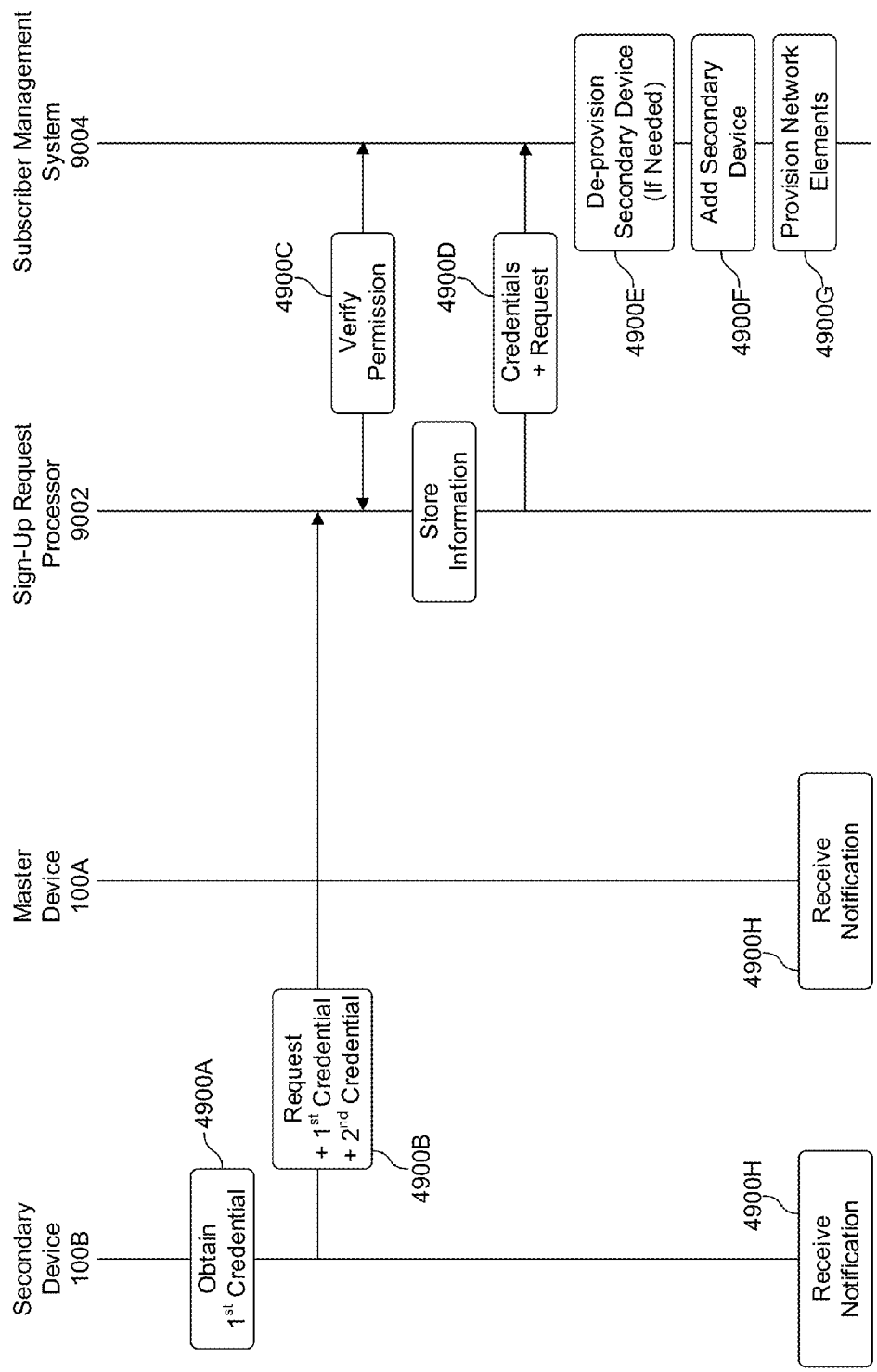
FIG. 49 illustrates a representative flow chart illustrating exchange and processing of messages to add a secondary device to a master service account, device group, or multi-device service plan initiated by a secondary device subscriber in accordance with some embodiments.

FIG. 48 illustrates a system configuration enabling Secondary Device 100B to be added to a master service account, device group, or multi-device service plan without the use or involvement of Master Device 100A in accordance with some embodiments. FIG. 49 illustrates an exchange of messages and processing of messages by Master Device 100A, Secondary Device 100B, Sign-Up Request Processor 9002, and Subscriber Management System 9004 illustrated in the system configuration of FIG. 48. Additional embodiments are also discussed further herein.

At 4900A, the master device subscriber enters his credentials on Secondary Device 100B (via Device Agent 9006B). (The master device subscriber credentials are labeled "1st credential" in FIG. 49.) At 4900B, Device Agent 9006B sends a request including the master device subscriber credential (e.g., username, password, account number, phone number, etc.) and a secondary device credential (e.g., MEID, IMEI, MSID, IMSI, phone number, secondary device subscriber account number, etc.) to Sign-Up Request Processor 9002 requesting that Secondary Device 100B be added as a device to the master service account, device group, or multi-device service plan. (The secondary device credential is labeled "2nd credential" in FIG. 49.) In some embodiments, the request includes Secondary Device 100B's credential and/or the user's credential (e.g., MEID, IMEI, IMSI, MSID, phone number, account number, etc.) and a credential for the Master Device's account (e.g., MEID, IMEI, phone number, IMSI, MSID, account number, etc.). At 4900C, Sign-Up Request Processor 9002 verifies with Subscriber Management System 9004 that the subscriber of Master Device 100A has permissions to add additional devices to the master service account, device group, or multi-device service plan (e.g., by verifying a credential, etc.). At 4900D, Sign-Up Request Processor 9002 sends the master device credential, the secondary device credential and a request to join Secondary Device 100B to the master service account to Subscriber Management System 9004. At 4900E, Subscriber Management System 9004 de-provisions (if necessary) Secondary Device 100B from Secondary Device 100B's current plan and, at 4900F, adds Secondary Device 100B to the master service account, device group, or multi-device service plan (e.g., for voice, text and data). At 4900G, Subscriber Management System 9004 provisions the network elements to recognize that Secondary Device 100B is now associated with the master service account, device group, or multi-device service plan. At 4900H, the master device subscriber and secondary device subscriber each receive a notification that that Secondary Device 100B is now associated with the master service account, device group, or multi-device service plan. Optionally, the network (or the master device subscriber) can assign usage quotas to Secondary Device 100B.

In some embodiments, Sign-Up Request Processor 9002 is located in the carrier network. In other embodiments, Sign-Up Request Processor 9002 is located in a third-party provider network (e.g., device OEM, VSP, MVNO, device OS provider, VoIP provider, etc.).

Figure 50:
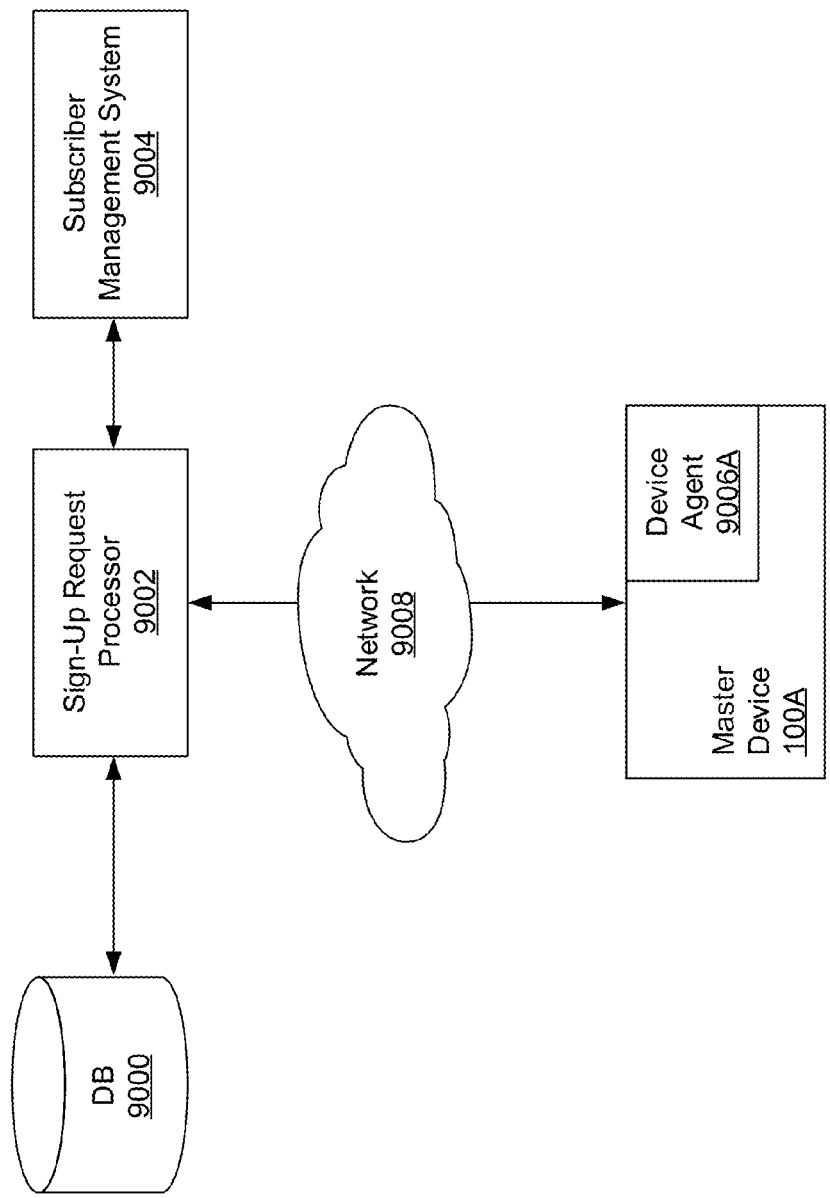
FIG. 50 illustrates a representative system configuration providing for adding a secondary device to a master service account, device group, or multi-device service plan entirely from a master device in accordance with some embodiments.
Figure 51:
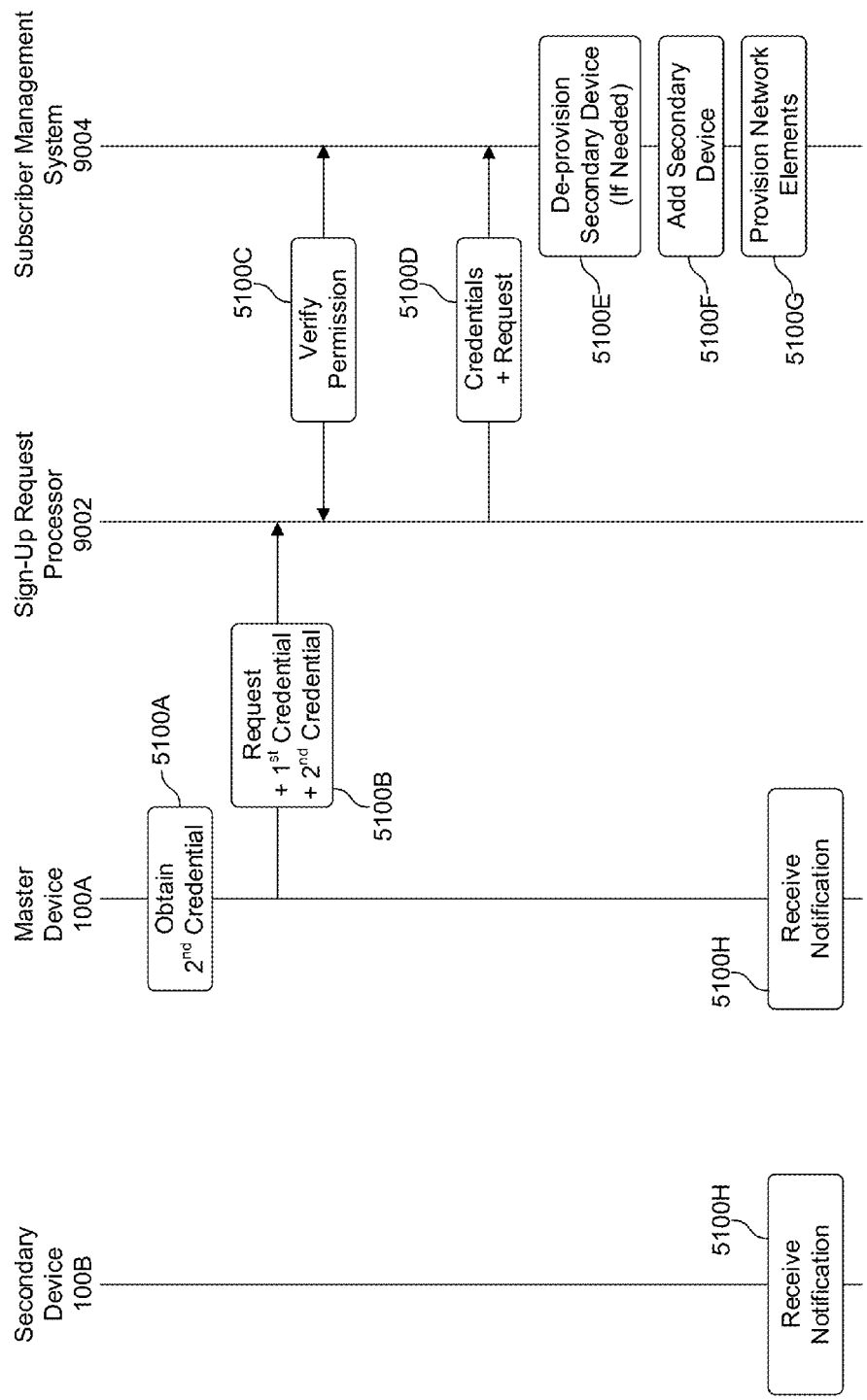
FIG. 51 illustrates a representative flow chart illustrating exchange and processing of messages to add a secondary device to a master service account, device group, or multi-device service plan initiated by the master device in accordance with some embodiments.

FIG. 50 illustrates a system configuration that enables the enrollment of Secondary Device 100B entirely from Master Device 100A in accordance with some embodiments. FIG. 51 illustrates an exchange of messages and processing of messages by Master Device 100A, Secondary Device 100B, Sign-Up Request Processor 9002, and Subscriber Management System 9004 illustrated in the system configuration of FIG. 50. Additional embodiments are also discussed further herein.

At 5100A, the master device subscriber enters a secondary device credential (e.g., IMSI, MSID, IMEI, MEID, phone number, etc.) (via Device Agent 9006A). (The secondary device credential is labeled "2nd credential" in FIG. 51.) At 5100B, Device Agent 9006A sends a request including the master device subscriber credential (e.g., username, password, account number, phone number, IMSI, MSID, IMEI, MEID, etc.) and the secondary device credential (e.g., MEID, IMEI, MSID, IMSI, phone number, etc.) to Sign-Up Request Processor 9002 requesting that Secondary Device 100B be added to the master service account, device group, or multi-device service plan. (The master device subscriber credential is labeled "1st credential" in FIG. 51.) At 5100C, Sign-Up Request Processor 9002 verifies with Subscriber Management System 9004 that the subscriber of Master Device 100A has permission to add additional devices to the master service account, device group, or multi-device service plan (e.g., by verifying a credential, etc.). At 5100D, Sign-Up Request Processor 9002 sends the master device credential, the secondary device credential and a request to add Secondary Device 100B to the master service account, device group, or multi-device service plan to Subscriber Management System 9004. At 5100E, Subscriber Management System 9004 de-provisions (if necessary) Secondary Device 100B from its current plan and, at 5100F, adds Secondary Device 100B to the master service account, device group, or multi-device service plan (e.g., for voice, text and data). At 5100G, Subscriber Management System 9004 provisions the network elements to recognize that Secondary Device 100B is now associated with the master service account, device group, or multi-device service plan. At 5100H, the master device subscriber and secondary device subscriber each receive a notification that that Secondary Device 100B is now associated with the master service account, device group, or multi-device service plan. Optionally, in some embodiments, a network element (e.g., Provisioning or Policy Management) or the master device subscriber can assign usage quotas to Secondary Device 100B.

In some embodiments, prior to sending the "add" request to Subscriber Management System 9004 at 5100D, Sign-Up Request Processor 9002 may send a validation request to Secondary Device 100B (via Device Agent 9006B) or the secondary device subscriber to confirm the change and wait for the response before performing the "add" action. In some embodiments, the request is an SMS, a call from an IVR system, an email, a notification on Secondary Device 100B (via Device Agent 9006B), etc.

In some embodiments, the master device subscriber adds Secondary Device 100B to the master device subscriber's shared plan prior to Secondary Device 100B being activated. In some embodiments, the master device subscriber adds Secondary Device 100B to the master device subscriber's shared plan at the time that Secondary Device 100B is being provisioned or activated.

In some embodiments, where Secondary Device 100B is added to the master service account, device group, or multi-device service plan prior or during the activation process, Sign-Up Request Processor 9002 delivers a notification to the secondary device subscriber indicating that the device has been associated with the master service account, device group, or multi-device service plan. In some embodiments, the notification is delivered to Device Agent 9006B for presentation through a user interface of Secondary Device 100B. In some embodiments, the notification is delivered as an SMS, MMS, voice message (either live or IVR), or email. In some embodiments, the notification requires the secondary device subscriber to acknowledge the notification prior to associating Secondary Device 100B with the master service account, device group, or multi-device service plan. In some embodiments, the secondary device subscriber is automatically associated with the master service account, device group, or multi-device service plan without the secondary device subscriber having to confirm the notification.

In some embodiments, Sign-Up Request Processor 9002 is located in the carrier network. In other embodiments, it is located in a third-party provider network (e.g., device OEM, VSP, MVNO, device OS provider, VoIP provider, etc.).

Service Plan Sharing with Allowance Limits

In some embodiments in which a service plan is shared, the master device subscriber may wish to only share a portion of the total service plan with a secondary device subscriber. In some embodiments, the sharing process includes a step where the master device subscriber defines what portion or portions of the service plan (voice service plan, messaging service plan, data access service plan, etc.) are to be shared with the secondary device subscriber. In some embodiments, the portions represent a set of services less than all of the services offered by the service plan to be shared. In some embodiments, the portions are represented by imitations expressed in voice minutes, long distance minutes, international calling destinations, international calling minutes, number of text messages, number of MMS messages, access to specific data services (e.g., website, domain, content type (e.g., streaming audio, streaming video, VoIP, etc.), quality-of-service (QoS) rated services, protocol type, general data access in time or usage (e.g., megabytes, kilobytes, etc.), application usage, content downloads, content uploads, 3G access, 4G access, Wi-Fi access, etc.), time periods (e.g., days of the week, specific hours in a day, or total hours in a day, total hours in a week, total days in a month, etc.), or other units that are applicable to the shared portion of the service plan. In some embodiments, the portions can be expressed as percentage of the service plans' service usage allowance for a category of service (e.g., 5% of the voice minute allowance, 20% of the data allowance, etc.) or absolute values (e.g., 20 minutes of voice, 100 messages, 5 MB of data, 5 hours of data use, 1 hour of VoIP calling, 30 minutes of media streaming, etc.). In some embodiments, the sharing limits are set up with the initial offer to share. In some embodiments, the sharing limits are set up after the plan has been shared with Secondary Device 100B. In some embodiments, in which sharing limits are set up with the initial offer to share, the sharing attributes may be stored in database 9000 and associated with the sharing token. When the secondary device subscriber is provisioned onto the sharing plan, the sharing attributes are also communicated to Subscriber Management System 9004 along with the "add" request.

In some embodiments, the master device subscriber may purchase an add-on service plan for the secondary device subscriber and allocate (e.g., assign) the entire add-on service plan to the secondary device subscriber (e.g., the secondary device subscriber gets an add-on service plan that provides additional service usage quota for a service that the secondary device subscriber uses more frequently than other users (e.g., an application-specific (e.g., Facebook, email, etc.) service plan, an additional allocation of voice minutes or text messages, etc.). In some embodiments, the master device subscriber adds certain capabilities (that might be offered at a discount) to certain users so that those users do not consume the quotas of the shared service plan while using these activities. For example, a master device subscriber might share a non-streaming data plan with a secondary device subscriber, but the secondary device subscriber desires to stream data (e.g., by watching a video, listening to streaming audio, video conferencing, etc.). The master device subscriber may purchase an audio/video streaming-capable service plan and assign that service plan to Secondary Device 100B, but not to other devices. This allows the secondary device subscriber to stream data without the master device subscriber having to purchase a larger streaming capable plan.

Sharing with Curfews

In some embodiments in which a service plan is shared, the master device subscriber may wish to set curfews (e.g., no messaging between 10:00 PM and 6:00 AM, email data access only during school hours, no voice calls except certain numbers during the school day (e.g., numbers on a "whitelist"), no international long distance calls, etc.) associated with Secondary Device 100B (which may be a child device) as part of the sharing process. In some embodiments, these curfews provide limits on usage of certain aspects of the shared portion of the service plan and thus provide for further control of service plan sharing. In some embodiments, the service plan sharing process includes a step where the master device subscriber defines the curfews on the portion or portions of a service plan (voice service plan, messaging service plan, data access service plan, etc.) that are to be shared with Secondary Device 100B. The curfews can be expressed as limits on certain aspects of the service plan during certain time periods (e.g., no text messaging from 10:00 PM until 6:00 AM Monday-Friday, only allow voice calls to a certain set of numbers during school hours, no Hulu videos after 8:00 PM, etc.), maximum usage of an aspect of a service plan during a time period (e.g., maximum of 30 minutes of voice calling per day on weekdays, maximum of 20 MB of Facebook during school hours, no text messaging on Mondays, etc.). In some embodiments, the curfews restrict certain types of access during a specified interval. In some embodiments, the curfews limit certain types of access during a specified interval. In some embodiments, the curfews are set up with the initial offer to share. In some embodiments, the curfews are set up after the secondary device subscriber has been joined to a shared service plan. In some embodiments in which the curfews are set up with the initial offer to share, the curfew attributes are stored in database 9000 and associated with the sharing token. When the secondary device subscriber is provisioned onto a shared service plan, the curfew attributes are communicated to Subscriber Management System 9004 along with the "add" request. In some embodiments, curfews are combined with sharing limits (e.g., 100 MB of data usage during the service plan cycle and no data usage allowed during school hours, etc.).

User Establishing Quotas/Curfews/Limitations on Service Usage

In some embodiments, a user may want to set quotas, curfews or limitations on his own service usage. One motivation for doing this may be cost-related (e.g., a user wants to ensure a service plan allowance is not exhausted before the end of the service plan cycle, a user wants to prevent overages, a user's company subsidizes only a certain percentage of service plan usage and the user does not want to exhaust his portion of the allowance, etc.), but there may be other reasons. In some embodiments, the notification enables the secondary subscriber to request additional service from the master subscriber when the notification is triggered. In some embodiments, the notification enables an automatic purchase (or re-purchase) of a specified service plan. In some embodiments, the automatic purchase of a service plan also delivers a notification to the master subscriber. In some embodiments, the notification that is delivered to the master subscriber is delivered via email, SMS, MMS, a message on Master Device 100A (e.g., through Device Agent 9006A), a message on a portal, or a message on a website. In some embodiments, the user interacts with Device Agent 9006A on his device to set the desired service controls. Device Agent 9006A communicates the service limits to Subscriber Management System 9004 (either directly or via an intermediate element), and Subscriber Management System 9004 provisions the controls to the appropriate enforcement elements. In some embodiments, the control elements are network elements (e.g., policy controller, policy charging and rules function (PCRF), policy charging enforcement function (PCEF), etc.). In some embodiments, the control elements are device-based agents/elements. In some embodiments, the control agents/elements exist both in the network and on the device.

Notifications

In some embodiments, the master device subscriber may desire to set up notifications for secondary users to alert them when they are reaching plan allowances, their individual quota allowances, plan time elapsed or remaining, usage velocity (e.g., rate of service usage), etc. In these types of embodiments, the master device subscriber can, from his device or from an alternative device (e.g., a Secondary Device 100B, another device associated with the master service account, device group, or multi-device service plan, a website visited from a computer or tablet, etc.), set up these notifications. In some embodiments, the notifications can also include actions or offers to modify an aspect of service usage (e.g., turn off or block certain services because an allocated quota is running out, or because a service is expensive while roaming, etc.). In other embodiments, the notifications can include an action to also inform the master device subscriber of a secondary device subscriber's activity within the service. In some embodiments, this alert to the master device subscriber can also include a request from the secondary device subscriber to increase the secondary device subscriber's quota allocation, to purchase additional service and assign an additional allocation to the secondary device subscriber, to re-allocate other users' quotas on the service to this particular secondary subscriber, etc. In some embodiments, these notifications can be initiated because a particular secondary user is not using much of his allocated quota, and the notification is sent to the master device subscriber to inform the master device subscriber of the condition and allow the master device subscriber to reallocate the quota as the master device subscriber deems appropriate (e.g., the subscriber may give more service allocation to a different user (including himself) since the particular secondary device subscriber is not going to use his allocation based on current usage velocity (e.g., the average rate of data consumption over a period of time (e.g., one hour, one day, one week, etc.)) trends).

In some embodiments, the master device subscriber uses an application (e.g., application locally on Master Device 100A, a website from a computer, an application on Secondary Device 100B, etc.) to configure the notifications. In some embodiments, the master device subscriber enters a login credential, an account number, a phone number, etc., to identify him as someone who is authorized to make changes to the account. Once logged in, the master device subscriber interacts with the application to set up the desired notifications for the specific secondary device subscriber (or users). In some embodiments, the notifications are configured to be the same for all secondary device subscribers. In some embodiments, the notifications are specific to each secondary device subscriber. In some embodiments, the notifications are specific to a subset of secondary device subscribers. For example, in an enterprise scenario, there may be groups of users based on their position or function within the enterprise (e.g., sales, executive, field service, etc.). Each group of users may have different sets on notifications configured by the master device subscriber because each group of users may have different aspects of a service plan shared with them. For example, a sales group and a field service group may have a larger allocation of service usage for maps and navigation services, and there could be notifications for service usage within that particular allocation for those groups, so they know if they are running out of that type of service. In a family share scenario, the children might have limited access to a social networking application during school hours (e.g., 10 MB, 30 minutes, etc.), and the master device subscriber sets a notification to notify the child when she is reaching her daily limit. In some embodiments, the notification that is configured is delivered to the specific user of the service (e.g., the child, etc.). In some embodiments, the notification is delivered to the master device subscriber. In some embodiments, the notification is delivered to both the master device subscriber and the specific user of the service. Once the notifications are configured, they are sent to Subscriber Management System 9004. Subscriber Management System 9004 provisions the notification type, parameters, text, actions, etc. to the various elements that are responsible for implementing the notification policy. In some embodiments, the elements are network-based elements (e.g., OCS, PCRF, PCEF, notification element, etc.). In some embodiments, the elements are device-based agents (e.g., agents for local usage counting, local classification and policy management, local notification agent, etc.). In some embodiments, the elements are located in both the network and the device (e.g., accounting and policy control in the network, notification agent on the device, etc.). Once the elements are provisioned, the notification policy is associated with the appropriate subscribers (e.g., the one or more secondary device subscribers) and enabled when the subscriber is actively using the services.

As discussed previously, in some embodiments, the notification is actionable by either the secondary device subscriber or the master device subscriber. For example, in an enterprise scenario, when the user is reaching the limit of an enterprise-paid service, the notification can include an option for the secondary device subscriber to purchase additional service just for him (e.g., not shared with other users). In some embodiments, the notification action is to alert the master device subscriber so he can take action (e.g., purchase additional shared service, purchase service just for that user, reallocate usage quotas, etc.). In some embodiments, the notification to the master device subscriber includes an option to purchase additional service. In some embodiments, the additional service includes shared service (e.g., additional usage for all subscribers on the shared account). In some embodiments, the additional service is specifically for the subscriber whose usage profile generated the notification. In some embodiments, the additional service is for a specific subset of subscribers on the shared service plan. In some embodiments, the master device subscriber has the option to decline the additional service offer. In some embodiments, the action taken by the master device subscriber (e.g., additional service purchased, no additional service purchased, etc.) is communicated to the secondary Device subscriber. In some embodiments, the communication is via email, SMS, MMS, a message delivered to Device Agent 9006B on Secondary Device 100B, a message displayed on a portal, or a message displayed on a website.

In some embodiments, the system is configured to detect when Device Agent 9006B on Secondary Device 100B has been tampered with. In some embodiments, tampering includes removal of Device Agent 9006B, modification of Device Agent 9006B, or modification of the configuration data used by Device Agent 9006B. In some embodiments, this is achieved by detecting that Device Agent 9006B on Secondary Device 100B has not sent a heartbeat message (e.g., a message configured to inform a network element that the device agent is present and operating properly, where such messages are possibly sent periodically or upon request by the network element) to Sign-Up Request Processor 9002 (or other monitoring network element) or to Device Agent 9006A on Master Device 100A in the configured time interval. In some embodiments, the detection is achieved by inspecting traffic to or from Secondary Device 100B and determining if the inspected traffic conforms to the controls that are expected to be enforced (e.g., whether there is data usage when data curfews are in place, whether there is a voice call to a non-whitelisted number when a voice curfew is in place, etc.). In some embodiments, detecting tampering is achieved by verifying a credential of Device Agent 9006B, a software signing key, a software hash, a software configuration integrity, a software configuration hash, an operating system (OS) credential, an OS software hash, or an OS signing key. In some embodiments, the detection occurs on Secondary Device 100B. In some embodiments, the detection occurs on Master Device 100A. In some embodiments, the detection occurs in the network. In some embodiments, the detection is performed by two or more elements (e.g., missing heartbeat message between Secondary Device 100B and a network element). In some embodiments, when it has been detected that tampering has occurred on Secondary Device 100B, a notification is sent to the master device user. In some embodiments, the notification is delivered directly to Master Device 100A via, for example, SMS, Device Agent 9006B notification, email or IVR phone call. In some embodiments, the notification also includes an alert sound to bring immediate attention to the notification. In some embodiments, the notification is displayed on top of all other UI elements on the master device. In some embodiments, the notification is delivered to other account entities in addition to the master device subscriber or Master Device 100A. In some embodiments, the notification is delivered to multiple account entities.

In some embodiments, the master device credential is provisioned into the network access service permission system to provide a master device user with a higher level of control over multi-device service plan configuration, and the secondary device credential is provisioned into the network access service permission system to provide a secondary device user with a lesser degree of control over multi-device service plan configuration. In some embodiments, the secondary device credential is provisioned into the network access service permission system to provide a secondary device user with a higher level of control over multi-device service plan configuration, and the master device credential is provisioned into the network access service permission system to provide a master device user with a lesser degree of control over multi-device service plan configuration. In some embodiments, the master device credential and the secondary device credential are provisioned into the network access service permission system to provide the same degree of control over multi-device service plan configuration to a user of Master Device 100A and a user of Secondary Device 100B.

In some embodiments, the control over multi-device service plan configuration comprises the ability to approve or initiate purchasing, upgrading, downgrading or discontinuing a service plan or a multi-device service plan. In some embodiments, the control over multi-device service plan configuration comprises the ability to approve or initiate adding or deleting one or more devices associated with the master service account, device group, or multi-device service plan. In some embodiments, the control over multi-device service plan configuration comprises the assignment of or approval of a service usage allowance for one or more devices capable of receiving services in accordance with the multi-device service plan. In some embodiments, the service usage allowance comprises a voice, text or data usage allowance for one or more wireless access networks. In some embodiments, the allowance comprises an allowance on one or more applications or one or more application types that may be used on one or more wireless access networks. In some embodiments, the allowance comprises a time of day or time period allowance during which one or more access network services may be used. In some embodiments, the allowance comprises an allowance for communication with one or more network end points or websites or one or more network endpoint types or website types over one or more wireless access networks. In some embodiments, the allowance comprises an allowance for one or more content types or traffic types on one or more wireless access networks. In some embodiments, the allowance comprises an allowance for one or more QoS levels on one or more wireless access networks. In some embodiments, the allowance comprises one or more roaming permission levels for one or more wireless roaming networks. In some embodiments, an allowance is implemented by provisioning an allowance policy instruction or allowance policy setting into one or more device agents on the device associated with the allowance. In some embodiments, the allowance is implemented by provisioning an allowance policy instruction or allowance policy setting into a device service processor on the device associated with the allowance.

In some embodiments, information defining at least an aspect of the allowance is obtained from one or more device agents on master device 100A (e.g., Device Agent 9006A). In some embodiments, information defining at least an aspect of the allowance is obtained from one or more device agents on Secondary Device 100B (e.g., Device Agent 9006B). In some embodiments, information defining at least an aspect of the allowance is obtained from a master device user or secondary device user input to a website or portal. In some embodiments, information defining at least an aspect of the allowance is obtained from an account owner input to a website or portal.

In some embodiments, the control over multi-device service plan configuration comprises the assignment of or approval of a service usage limit for one or more devices capable of receiving services in accordance with the multi-device service plan. In some embodiments, the service usage limit comprises a voice, text, or data usage limit for one or more wireless access networks. In some embodiments, the limit comprises a limit on one or more applications or one or more application types that may be used on one or more wireless access networks. In some embodiments, the limit comprises a time of day or time period limit during which one or more access network services may be used. In some embodiments, the limit comprises a limit on communication with one or more network end points or websites or one or more network endpoint types or website types over one or more wireless access networks. In some embodiments, the limit comprises a limit for one or more content types or traffic types on one or more wireless access networks. In some embodiments, the limit comprises a limit for one or more QoS levels on one or more wireless access networks. In some embodiments, the limit comprises one or more roaming limitations for one or more wireless roaming networks. In some embodiments, a limit is implemented by provisioning a limit policy instruction or limit policy setting into one or more network elements responsible for providing wireless access network permission for one or more wireless access networks to the device associated with the limit. In some embodiments, a limit is implemented by provisioning a limit policy instruction or limit policy setting into one or more network elements responsible for providing wireless access network permission for one or more wireless access networks to the device associated with the limit.

Notifications During a Voice Call

In some embodiments, one or more device applications, one or more device agents (e.g., Device Agent 9006), or one or more service processor agents (the "service purchase application") are configured to allow a user to purchase a voice service allowance increase, upgrade, service plan increase, "top up," or other service increase during the time a device user is conducting a phone call.

In some embodiments, coincident in time with a voice call being conducted over a cellular wireless network, the service purchase application is configured to establish a data connection over the same cellular network to a network server, service controller, activation server, or billing server (the "service purchase server") that is configured to modify, increase, or effect a purchase of a voice service allowance, and the service purchase application is further configured to communicate a user selection to purchase a voice service allowance increase, upgrade, service plan increase, "top up," or other service increase during the time a device user is conducting a phone call.

In some embodiments, coincident in time with a voice call being conducted over a cellular wireless network, the service purchase application is configured to establish a secure data connection over the same cellular network to the service purchase server, and the service purchase application is further configured to provide one or more device credentials to identify the device to the service purchase server and communicate a user selection to purchase a voice service allowance increase, upgrade, service plan increase, "top up," or other service increase during the time a device user is conducting a phone call. In some embodiments, the voice application is further configured to display a user interface notification that provides the user with one or more actionable options to purchase additional voice service during a voice call. In some embodiments, the service purchase application is configured to track real time voice service usage coincident in time with a voice call taking place.

In some embodiments, the service purchase application is configured to track real time voice service usage coincident in time with a voice call taking place and communicate, or display on the device UI, an indication of the real time voice service usage during the call. In some embodiments, the service purchase agent is further configured to communicate an indication of the real time voice service usage through an earpiece or speaker of the device. In some embodiments, the service purchase agent is further configured to communicate an indication of the real time voice service usage through an earpiece or speaker of the device during the time a voice call is being conducted. In some embodiments the service purchase agent is further configured to communicate an indication of the real time voice service usage through an earpiece or speaker of the device during the time a voice call is being conducted in a manner that does not result in a call participant on the other side of the call from the device hearing the communication of an indication of the real time voice service usage.

In some embodiments, the service purchase application is configured to track real time voice service usage coincident in time with a voice call taking place and communicate, or display on the device UI, an indication of the real time voice service usage during the call, the indication of real time voice service usage comprising text on the UI, numeric indication on the UI, an amount of use compared to a service limit on the UI, an amount of use as a percentage of a service limit on the UI, an indication that there is a certain amount of time consumed on the service plan, an indication that there is only a certain amount of time left on a service plan, or any combination of these. In some embodiments, the display on the device UI of an indication of the real time voice service usage during the call comprises a graphical object. In some embodiments, the graphical object comprises a graph, a horizontal bar, a vertical bar, a dial or gauge, a pie, or a slider.

In some embodiments, the service purchase application is configured to track real time voice service usage coincident in time with a voice call taking place and communicate through an earpiece speaker connected to the device an indication of the real time voice service usage during the call, the indication of real time voice service usage comprising a voice message. In some embodiments, the voice message comprises a numeric indication, an amount of use compared to a service limit, an amount of use as a percentage of a service limit, an indication that there is a certain amount of time consumed on the service plan, an indication that there is only a certain amount of time left on a service plan, or any combination of these.

In some embodiments, the service purchase application is configured to track real time voice service usage during a voice call, and compare the voice service usage against one or more pre-configured limits on service, and when one of the one or more service limits is reached, communicate, or display on the device UI, a notification message as described above. In some embodiments, the message includes a device pop-up UI that enables a user of the device to select a voice upgrade, top up, service plan increase, or other voice service purchase. In some embodiments the service purchase application is further configured to communicate the user selection to a service purchase server coincident in time with the voice call. In some embodiments, the service purchase agent is configured to complete the purchase prior to the voice call ending so that the call can continue beyond an original limit on voice service use. In some embodiments, the service purchase agent is further configured to provide an acknowledgement to the device UI that the service purchase has been completed. In some embodiments, the service purchase agent is further configured to provide an acknowledgement to the device UI that the service purchase has been completed prior to the voice call ending.

In some embodiments, a cellular network system is configured to simultaneously establish a data communication connection between a device service purchase application and a service purchase server coincident in time with a voice call being conducted by the same cellular network, and the service purchase server is configured to accept a service purchase agent voice service purchase indication and cause a voice service plan to be upgraded, to increase a voice service limit, reconfigure a voice or bundle service plan, or purchase a new voice or bundle service plan. In some embodiments, the voice service purchase server is configured to increase voice service before the end of a voice call so that the voice call can continue beyond an original service limit.

In some embodiments, the voice service purchase server is further configured to cause the voice service plan to be upgraded, to increase a voice service limit, reconfigure a voice or bundle service plan, or purchase a new voice or bundle service plan by communicating with a billing system to assist in changing a service plan status associated with the device credential.

In some embodiments, the voice service purchase server is further configured to cause the voice service plan to be upgraded, to increase a voice service limit, reconfigure a voice or bundle service plan, or purchase a new voice or bundle service plan by communicating with a OCS system to assist in changing a service plan status associated with the device credential.

In some embodiments, the voice service purchase server is further configured to cause the voice service plan to be upgraded, to increase a voice service limit, reconfigure a voice or bundle service plan, or purchase a new voice or bundle service plan by communicating with a service controller or activation server system to assist in changing a service plan status associated with the device credential.

In some embodiments, the voice service purchase server is further configured to cause the voice service plan to be upgraded, to increase a voice service limit, reconfigure a voice or bundle service plan, or purchase a new voice or bundle service plan by communicating with a service controller system to assist in changing a service plan status associated with the device credential, and the service controller system is configured to provide a new voice service allowance policy to one or more service processor agents on the device.

In some embodiments, during a voice call a service processor is configured to track real time voice service usage, communicate an indication of real time voice service usage to an earpiece, speaker or UI connected to the device, and provide the user with a voice service upgrade or purchase offer before the voice call expires. In some embodiments, the indication is provided when a pre-configured limit is reached. In some embodiments, the pre-configured limit is set by a user of the device on the device UI. In some embodiments, the pre-configured limit (and possibly other aspects of the notification) is provided by a network element or configured in the software of the device. In some embodiments, when the user responds to the upgrade offer indicating a user desire to purchase the upgrade, the service processor increases a voice allowance implemented by one or more device service processor agent (such as a policy control agent, a policy decision agent, a policy implementation agent, or policy enforcement agent, or a combination of these). In some embodiments, the service processor also communicates the service plan purchase to a network element such as a service purchase server, a service controller, an activation server or a billing server.

Figure 52:
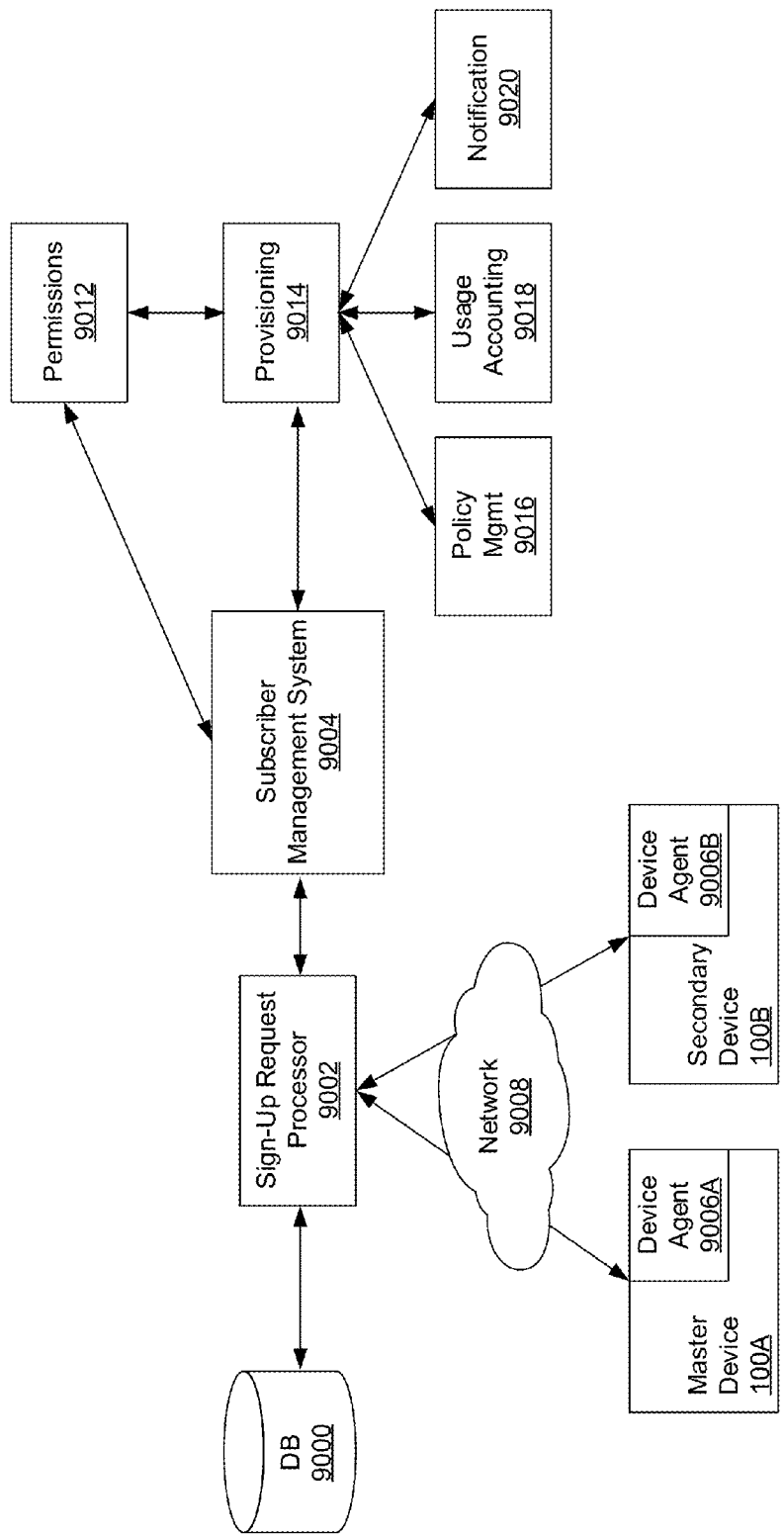
FIG. 52 illustrates a representative system configuration for service plan management for multiple mobile wireless communication devices in accordance with some embodiments.

FIG. 52 illustrates a system configuration 1570 in accordance with some embodiments. In some embodiments, Master Device 100A and Secondary Device 100B interact with Sign-Up Request Processor 9002 (via Device Agents 9006A and 9006B) to manage plan sharing. In some embodiments, Sign-Up Request Processor 9002 interacts with Subscriber Management System 9004 to complete a requested function. In some embodiments, Subscriber Management System 9004 acts as the single interface point for Sign-Up Request Processor 9002, and Sign-Up Request Processor 9002 directs all of its queries and requests through Subscriber Management System 9004. In some embodiments, Sign-Up Request Processor 9002 makes "high level" requests to Subscriber Management System 9004 (e.g., add a secondary device subscriber to a master service account, device group, or multi-device service plan, etc.) and Subscriber Management System 9004 converts the "high level" request into a series of "low level" requests and workflows to the various elements needed to complete the requested action. In this manner, a service operator can make necessary changes to the "low level" processing while keeping the interface at the "high level" consistent. It also enables the service operator to support a multi-vendor configuration without having to expose the low-level requests and workflow details to Sign-Up Request Processor 9002. In some embodiments, Sign-Up Request Processor 9002 is a component of Subscriber Management System 9004.

In some embodiments, such as the embodiment illustrated in FIG. 52, Permissions element 9012 verifies that the requestor (e.g., master device subscriber) has the appropriate account permissions to initiate an action (e.g., request a subscriber be added to a master service account, device group, or multi-device service plan, remove a subscriber from a master service account, device group, or multi-device service plan, set quota and sharing limits for secondary device subscribers, etc.). Additionally, in some embodiments, Provisioning element 9014 is responsible for provisioning the required elements based on actions requested by Sign-Up Request Processor 9002 (e.g., add a secondary device subscriber, remove a secondary device subscriber, set a quota for a Master or secondary device subscriber, set a notification policy for a Master or secondary device subscriber, adjust a curfew, etc.). In some embodiments, when a request is made to Provisioning 9014 by Sign-Up Request Processor 9002, Provisioning 9014 validates a credential to ensure that the requestor has the authority to perform the action (e.g., master device subscriber can add a user, secondary device subscriber can configure notifications, etc.). Additionally, in some embodiments, Provisioning 9014 provisions Permissions 9012 with updated account or subscriber level permissions (e.g., add or remove a subscriber from a shared account, grant or revoke certain account-level permissions to a secondary device subscriber, grant or revoke certain subscriber-level permissions to a secondary device subscriber, etc.). In some embodiments, Provisioning 9014 also provisions Policy Management (Policy Mgmt) element 9016 to set appropriate quotas, restrictions, events to monitor (e.g., attempting to perform an action that is not allowed either at the plan level or based on limits/restrictions set by the master device subscriber that would then trigger a notification alert, etc.), etc. In some embodiments, Provisioning 9014 provisions Usage Accounting element 9018 with service plans associated with the account (shared and non-shared plans) and the subscriber IDs that are sharing the plans. In some embodiments, Usage Accounting 9018 is provisioned via a third party (e.g., device OEM, OS provider, retail partner, VSP, MVNO, etc.) server. In some embodiments, Usage Accounting 9018 is provisioned from a device agent (e.g., Device Agent 9006A or 9006B). In some embodiments, Usage Accounting 9018 is provisioned with rules regarding which services are free to the subscriber and which are not (e.g., sponsored services, carrier administration traffic, special phone numbers (e.g., 611, 911, operator customer support, retail partner, sponsored service partner, etc.)). In some embodiments, Usage Accounting 9018 is configured to report usage to a device agent on the subscriber devices (e.g., Device Agent 9006A on Master Device 100A or Device Agent 9006B on Secondary Device 100B). In some embodiments, the usage data information delivered to the device agent includes detailed usage information for each device associated with the master service account, device group, or multi-device service plan. In some embodiments, the usage information delivered to or displayed on the device is different for the master subscriber and the child (i.e., secondary) subscriber. For example, in some embodiments, the master subscriber can view total plan usage, his own usage and usage by subscriber associated with the shared plan, while the child subscriber can only view his own usage.

In some embodiments, Usage Accounting 9018 and Policy Management 9016 interwork to meet a service policy objective (e.g., when usage within a service plan for a specific secondary device subscriber hits a certain usage level, block further access to that service plan for that secondary device). In some embodiments, Provisioning 9014 also provisions Notification element 9020 with the details about notifications that need to be delivered to subscribers based on certain events. In some embodiments, these details include trigger identification, notification text, and actions. In some embodiments, these details include other instructions that instruct Notification 9020 (and, in some embodiments, a device agent such as Device Agent 9006A or 9006B) on further workflow associated with a notification (e.g., a notification trigger identification that indicates that a service plan limit has been reached, the text to be shown to the subscriber when the condition occurs, the buttons to display on the notification (e.g., dismiss, purchase additional service, view product catalog, "snooze," "don't remind me again," etc.), and the action to take when specific buttons are selected (e.g., when the user selects "don't remind me again," show these choices for when to remind him again (e.g., never, 1 hour, 2 hours, 4 hours, etc.)).

In some embodiments, the elements illustrated in FIG. 52 are located in the network. In some embodiments, the elements in FIG. 52 are located on the subscriber device (e.g., Master Device 100A or Secondary Device 100B). In some embodiments, some of the elements in FIG. 52 are located in the subscriber device, and some of the elements are located in the network.

In some embodiments, the elements in FIG. 52 work in a coordinated manner. For example, in some embodiments, notifications are triggered when certain policy events (managed by Policy Management 9016) or certain usage thresholds (managed by Usage Accounting 9018) occur. As would be appreciated by a person having ordinary skill in the art, there are many combinations of interworking between network elements that will achieve the desired coordinated events. Additionally, although FIG. 52 illustrates the elements as separate entities, the elements can be combined or further divided as appropriate for the particular implementation.

In some embodiments, a network system is configured to provision a multi-device service plan access network permission configuration into one or more access network permission control elements, the permission configuration allowing access network service permission in accordance with a multi-device service plan for at least Master Device 100A and Secondary Device 100B. In some embodiments, the provisioning of the secondary device service permissions is accomplished by providing a secondary device credential and service permission information to a subscriber management system that configures a set of one or more wireless access network permissions on one or more wireless access network access control elements, the one or more wireless access network permissions comprising access control permissions for attempted or actual access traffic associated with the secondary device credential. In some embodiments, the one or more access network permission control elements comprise one or more device agents (e.g., Device Agent 9006B) located on Secondary Device 100B. In some embodiments, the one or more device agents comprise a service processor (e.g., service processor 115). In some embodiments, the one or more access network permission control elements comprise a subscriber management system (e.g., Subscriber Management System 9004). In some embodiments, the one or more access network permission control elements comprise a service controller (e.g., service controller 122). In some embodiments, the one or more access network permission control elements comprise a network AAA system. In some embodiments, the one or more access network permission control elements comprise one or more of a network gateway, router, policy control enforcement function, gateway GPRS support node (GGSN), serving GPRS support node (SGSN), packet data serving node (PDSN), home location register (HLR), home subscriber server (HSS), packet data network gateway (PGW), serving gateway (SGW), traffic monitoring function, deep packet inspection (DPI) function, or home agent.

In some embodiments, Sign-Up Request Processor 9002 is located in the carrier network. In other embodiments, it is located in a third party provider network (e.g., device OEM, VSP, MVNO, device OS provider, VoIP provider, etc.).

It is sometimes desirable that a common application programming interface (API) be implemented to simplify or eliminate the details of what has to happen in one or more carrier networks, and to establish a finite set of pre-specified API commands to support a common multi-device service plan assignment system that works with a plurality of third-party on-device multi-device service plan sharing and assignment solutions. In some embodiments, the pre-specified API commands include such actions as activate a device 100 onto a shared plan, add a device 100 to a master service account, device group, or multi-device service plan, remove a device 100 from a master service account, device group, or multi-device service plan, manage quotas for devices 100 on a shared plan, manage notifications for devices 100 on a shared plan, or assign specific plans to certain devices 100 on a shared plan. As would be appreciated by a person having ordinary skill in the art, there are many types actions that can be defined, and the examples provided herein are not intended to be limiting.

Figure 53:
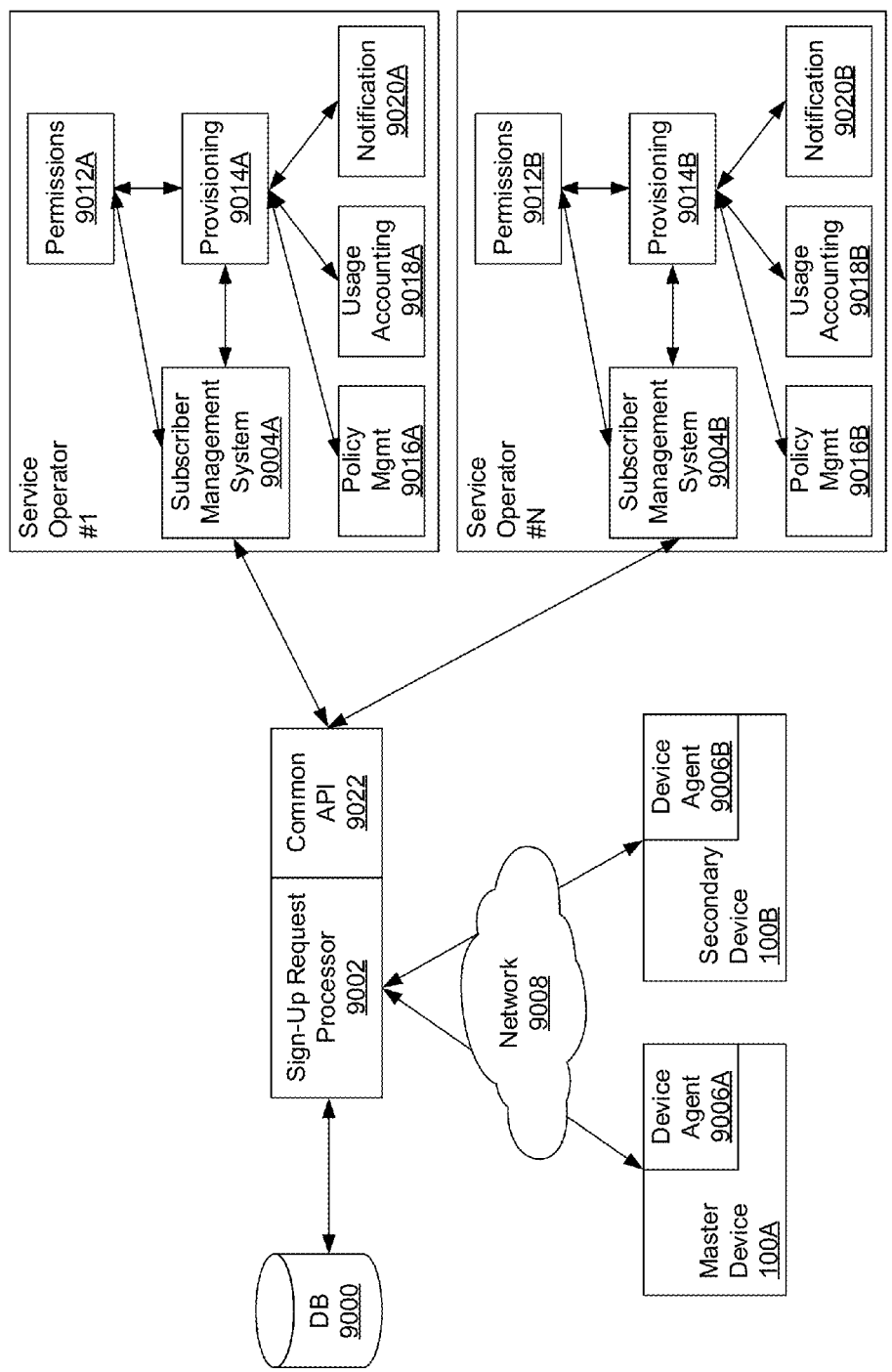
FIG. 53 illustrates a representative system configuration for service plan management for multiple mobile wireless communication devices and multiple service operators through a common application programming interface (API) in accordance with some embodiments.

In some embodiments, such as the embodiment illustrated in FIG. 53, there is one Sign-Up Request Processor 9002 that interconnects with multiple service operators via Common API 9022. Specifying a common API enables Sign-Up Request Processor 9002 to add new service operators (e.g., Service Operator #1, Service Operator #N) without having to implement new interfaces to support the new service operators. In some embodiments, the subscriber has a common sign-up experience regardless of his service operator. This allows a third party (e.g., device OEM, VSP, MVNO, device OS provider, VoIP provider, etc.) to define a user interface (UI) and process and implement that UI once in Sign-Up Request Processor 9002 and/or Device Agent 9006 to enable the third party to offer a common experience across all of the service operators that it interworks with.

For example, a device manufacturer may want to have a common service sign-up and sharing management UI and process for all of its products and desires that the common service sign-up and sharing management UI and process are implemented consistently across all of the service operators that are selling the manufacturer's products. Thus, in some embodiments, the device manufacturer provides Sign-Up Request Processor 9002 and Common API 9022 and works with the service operators to have them implement the required functionality to support the on-device service sign-up and multi-device sharing functions. In some embodiments, the manufacturer implements, on Sign-Up Request Processor 9002, common APIs (e.g., Common API 9022) for functions like add new service, delete service, add a device 100 to a master service account, device group, or multi-device service plan, delete a device 100 from a master service account, device group, or multi-device service plan, manage quotas on a shared plan, etc., and then provide a well-defined API, interface, and protocol (e.g., JSON, WSDL, etc.) to the interface with the individual service operators. In some embodiments, the interface protocol between Sign-Up Request Processor 9002 and the service operator Subscriber Management System 9004 is a "high level" functional interface as described above, and Subscriber Management System 9004 implements a series of "low level" instructions to each of the affected operator elements (as described in the discussion of FIG. 53). In some embodiments, the subscribers sharing a service plan must be subscribed to the same service operator. In some embodiments where a centralized accounting function is implemented, the subscribers may be, but need not be, subscribed to different service operators, and the centralized accounting function tracks, manages and aggregates the service usage of all of the devices sharing the shared plan across all of the service operators. By leveraging a single sign-up request processor, Sign-Up Request Processor 9002 brokers the multi-device plan sharing, management and assignment requests across the different service operators.

FIG. 53 illustrates a system configuration including a network that devices 100 can use to communicate with Sign-Up Request Processor 9002 in accordance with some embodiments. In some embodiments, the network is a common network regardless of the service operator that the subscriber is subscribed to. In other embodiments, each service operator uses its own network to enable the device to connect to Sign-Up Request Processor 9002. In some embodiments, network 9008 is a cellular network. In some embodiments, network 9008 is a Wi-Fi network. In some embodiments, network 9008 is a Wi-Fi network for one device and a cellular network for the other device.

In some embodiments, Sign-Up Request Processor 9002 is located in the carrier network. In other embodiments, Sign-Up Request Processor 9002 is located in a third-party provider network (e.g., device OEM, VSP, MVNO, device OS provider, VoIP provider, etc.). In some embodiments, there is a plurality of Sign-Up Request Processors 9002. In some embodiments, each of the plurality of Sign-Up Request Processors 9002 conforms to the common API command set. In some embodiments, each of the plurality of Sign-Up Request Processors 9002 is associated with a subset of the entities requiring access to manage multi-device plan sharing and assignment. In some embodiments, these entities include device OEM, OS provider, VSP, MVNO, MNO, retail distribution partners, or sponsored service providers. In some embodiments, each of the entities requiring access to manage multi-device plan sharing and assignment implements its own UI, device agent, and on-device workflows to enable the entity to customize the process to suit its needs without impacting the service operator interfaces.

Although FIG. 53 illustrates Common API 9022 coupled with Sign-Up Request Processor 9002, in some embodiments, Common API 9022 is defined by each service operator (e.g., MNO, MVNO, VSP, etc.) and is coupled with each service operator's Subscriber Management System 9004. In some embodiments, Sign-Up Request Processor 9002 conforms to each service operator's API specification. In some embodiments, the service operator API exposes the "high level" requests (e.g., add subscriber to a master service account, device group, or multi-device service plan, remove subscriber from a master service account, device group, or multi-device service plan, allocate quotas, add curfew, remove curfew, add notification, delete notification, etc.) to Sign-Up Request Processor 9002 and then converts the "high level" commands into the appropriate "low level" commands and workflow specific to that service operator.

In some embodiments, a party specifies a global API that defines a superset of required "high level" commands that entities use to manage multi-device plan sharing capabilities and then provide an internal framework to allow the individual service operators to convert the "high level" commands received from Sign-Up Request Processor 9002 into the service operator-specific "low level" commands and workflows that apply to that service operator. In some embodiments, the party is an operator, a VSP, an MVNO, an OEM, an OS provider, a retail distribution partner, or any type of partner that would benefit from a consistent multi-device service management experience across multiple service providers.

Device Credentials

In some embodiments, device 100 comprises one or more wireless modems that enable the device to connect to at least a first wireless network and one or more device agents (e.g., Device Agent 9006) that: obtain a first device credential from a device credential storage element, the first device credential uniquely identifying device 100; present a multi-device service plan sign-up message through a user interface of device 100, the multi-device service plan sign-up message offering the user an option to associate device 100 with a master service account, device group, or multi-device service plan, the master service account, device group, or multi-device service plan comprising access service permissions to enable communication over the first wireless network by one or more devices; obtain a user input indicating that the user desires to associate device 100 with the master service account, device group, or multi-device service plan; and communicate the first device credential and the user input to a network element responsible for associating device 100 with the master service account, device group, or multi-device service plan.

In some embodiments, device 100 receives an acknowledgment that device 100 was successfully associated with the master service account, device group, or multi-device service plan. In some embodiments, device 100 receives the acknowledgment from a network element and presents the acknowledgment through a device user interface.

In some embodiments, device 100 receives an instruction that assists in associating device 100 with the master service account, device group, or multi-device service plan. In some embodiments, device 100 receives that instruction from a network element and executes the instruction to assist in associating device 100 with the master service account, device group, or multi-device service plan. In some embodiments, the instruction modifies an aspect of a device connection to the first wireless network. In some embodiments, the instruction modifies an aspect of a device access permission associated with communicating over the first wireless network. In some embodiments, the instruction modifies an aspect of a first device credential or a second device credential.

In some embodiments, the first device credential comprises one or more of a phone number, an IMSI, an MSID, a SIM identifier, an ESN, an MEID, an IMEI, a device identifier, a subscriber identifier, a service account identifier, a token, and a one-time token.

In some embodiments, at least a portion of the service plan sign-up message is obtained from a device system memory. In some embodiments, the at least a portion of the service plan sign-up message is pre-stored in the device system memory before the service plan sign-up message display sequence is initiated. In some embodiments, at least a portion of the service plan sign-up message is obtained from a network destination. In some embodiments, the at least a portion of the service plan sign-up message is obtained from a network element before the service plan sign-up message display sequence is initiated. In some embodiments, the at least a portion of the service plan sign-up message is obtained from a network element immediately prior to the service plan sign-up message display sequence being initiated. In some embodiments, the network element comprises a website, a portal, or a message server.

In some embodiments, device 100 obtains at least a portion of the service plan sign-up message from a push message sent by a network server. In some embodiments, the network server is a push server. In some embodiments, device 100 receives the push message over a secure push message control link. In some embodiments, device 100 assists in securing the push message control link by sharing the first device credential with a push message server and establishing an encrypted link in cooperation with the push message server.

In some embodiments, a network system receives a secondary device multi-device service plan sign-up request from a device agent (e.g., Device Agent 9006B) on Secondary Device 100B. In some embodiments, the multi-device service plan sign-up request comprises a master user credential and a secondary device credential. In some embodiments, the network system compares the master user credential to an account owner credential associated with a master service account, device group, or multi-device service plan. In some embodiments, if the comparison indicates that the master user credential and the account owner credential are consistent, the network system provides a provisioning instruction to a wireless access network control system to associate Secondary Device 100B with access control permissions associated with the master service account, device group, or multi-device service plan.

In some embodiments, a network system receives a secondary device multi-device service plan sign-up request from a device agent (e.g., Device Agent 9006B) on Secondary Device 100B. In some embodiments, the multi-device service plan sign-up request comprises a master user credential and a secondary device credential. In some embodiments, the network system compares the master user credential to an account owner credential associated with a master service account, device group, or multi-device service plan. In some embodiments, if the comparison indicates that the master user credential and the account owner credential are consistent, the network system provides a provisioning instruction to a wireless access network accounting system to account service usage associated with Secondary Device 100B to the master service account.

Sign-Up Requests

In some embodiments, a master device (e.g., Master Device 100A) comprises one or more device agents (e.g., Device Agent 9006A) that receive a multi-device sign-up option message or request message from a network element to add Secondary Device 100B to a master service account, device group, or multi-device service plan. In some embodiments, the one or more agents present the multi-device sign-up option message or request message to a user through a user interface of the master device. In some embodiments, the one or more agents obtain a user response through the user interface and send the user response to the network element. In some embodiments, the user response comprises a master account-holder credential and an acknowledgment of the request to add Secondary Device 100B to the master service account, device group, or multi-device service plan. In some embodiments, the master device also sends a master device credential to the network element, the master device credential uniquely identifying the master device. In some embodiments, the master device communicates with the network element over a secure link. In some embodiments, the master device receives the multi-device sign-up option message or request message request from the network element over the secure link. In some embodiments, the secure link comprises a secure push message link, and the master device receives the message over the secure link by receiving a push message from a network push message server. In some embodiments, the master device assists in securing the secure push message link by executing a link establishment process during which the master device shares a master credential with the network push message server and, in cooperation with the network push message server, establishes an encrypted link.

In some embodiments, a network system receives a secondary device multi-device service plan sign-up option response message or request message from a device agent (e.g., Device Agent 9006B) on Secondary Device 100B. In some embodiments, the network system communicates information about the secondary device multi-device service plan sign-up option response message or request message to a master device agent on a master device (e.g., Device Agent 9006A on Master Device 100A). In some embodiments, the network system obtains a response to the information about the secondary device multi-device service plan sign-up option response message or request message from the master device agent. In some embodiments, if the response indicates that the secondary device service plan sign-up option response or request is granted or acknowledged, the network system provides a provisioning instruction to a wireless access network control system to associate Secondary Device 100B with access control permissions associated with the master service account, device group, or multi-device service plan. In some embodiments, the network system also receives a device credential from the master device in association with the response. In some embodiments, the network system includes a secure message link server that communicates the information about the secondary device multi-device service plan sign-up option response message or request message to the master device agent. In some embodiments, the network system includes a network push message server and the secure link comprises a secure push message link, and the network system communicates the information about the secondary device multi-device service plan sign-up option response message or request message to the master device agent by sending a push message from a network push message server. In some embodiments, the network system secures the network push message server by executing a push message link establishment process in which the network push message server obtains a device credential and, in cooperation with the master device, establishes an encrypted link.

In some embodiments, a network system receives a secondary device multi-device service plan sign-up option response message or request message from a device agent (e.g., Device Agent 9006B) on Secondary Device 100B. In some embodiments, the network system communicates information about the secondary device multi-device service plan sign-up option response message or request message to a master device agent on a master device (e.g., Device Agent 9006A on Master Device 100A). In some embodiments, the network system obtains a response to the information about the secondary device multi-device service plan sign-up option response message or request message from the master device agent. In some embodiments, if the response indicates that the secondary device service plan sign-up option response or request is granted or acknowledged, the network system provides a provisioning instruction to a wireless access network accounting system to account service usage associated with Secondary Device 100B to the master service account. In some embodiments, the network system also receives a device credential from the master device in association with the response. In some embodiments, the network system includes a secure message link server that communicates the information about the secondary device multi-device service plan sign-up option response message or request message to the master device agent. In some embodiments, the network system includes a network push message server and the secure link comprises a secure push message link, and the network system communicates the information about the secondary device multi-device service plan sign-up option response message or request message to the master device agent by sending a push message from a network push message server. In some embodiments, the network system secures the network push message server by executing a push message link establishment process in which the network push message server obtains a device credential and, in cooperation with the master device, establishes an encrypted link.

In some embodiments, Secondary Device 100B comprises one or more device agents (e.g., Device Agent 9006B) that receive a request from a network element to add Secondary Device 100B to a master service account, device group, or multi-device service plan. In some embodiments, the one or more agents present the multi-device sign-up option message or request message to a user through a user interface of Secondary Device 100B. In some embodiments, the one or more agents obtain a user response through the user interface and send the user response to the network element. In some embodiments, the user response comprises a master account-holder credential and an acknowledgment of the request to add Secondary Device 100B to the master service account, device group, or multi-device service plan. In some embodiments, the response comprises a credential associated with a user of Secondary Device 100B and an acknowledgment of the request to add Secondary Device 100B to the master service account, device group, or multi-device service plan. In some embodiments, Secondary Device 100B sends a secondary device credential to the network element in association with the response. In some embodiments, Secondary Device 100B communicates with the network element over a secure link. In some embodiments, the master device (e.g., Master Device 100A) receives the request from the network element over the secure link. In some embodiments, the secure link comprises a secure push message link, and the master device receives the request over the secure link by receiving a push message from a network push message server. In some embodiments, the master device assists in securing the secure push message link by executing a link establishment process during which the master device shares a master credential with the network push message server and, in cooperation with the network push message server, establishes an encrypted link.

In some embodiments, a network system receives a secondary device multi-device service plan sign-up request from a master device agent (e.g., Device Agent 9006A) on a master device (e.g., Master Device 100A). In some embodiments, the network system communicates information about the secondary device multi-device service plan sign-up request to a device agent (e.g., Device Agent 9006B) on Secondary Device 100B. In some embodiments, the network system obtains a response to the information about the secondary device multi-device service plan sign-up option request from device agent on the secondary device (e.g., Device Agent 9006B). In some embodiments, if the response indicates that the secondary device service plan sign-up option request is granted or acknowledged, the network system provides a provisioning instruction to a wireless access network control system to associate Secondary Device 100B with access control permissions associated with the master service account, device group, or multi-device service plan. In some embodiments, the network system is further configured to obtain a device credential associated with the master device in association with the request. In some embodiments, the network system is further configured to obtain a device credential associated with Secondary Device 100B in association with the response. In some embodiments, the network system includes a secure message link server that communicates the information about the secondary device multi-device service plan sign-up request to the device agent on Secondary Device 100B (e.g., Device Agent 9006B). In some embodiments, the network system includes a network push message server and the secure link comprises a secure push message link, and the network system communicates the information about the secondary device multi-device service plan sign-up request to the device agent on Secondary Device 100B by sending a push message from a network push message server. In some embodiments, the network system secures the network push message server by executing a push message link establishment process in which the network push message server obtains a device credential and, in cooperation with Secondary Device 100B, establishes an encrypted link.

In some embodiments, a network system receives a secondary device multi-device service plan sign-up request from a master device agent on a master device (e.g., Device Agent 9006A on Master Device 100A). In some embodiments, the network system communicates information about the secondary device multi-device service plan sign-up request to a device agent (e.g., Device Agent 9006B) on Secondary Device 100B. In some embodiments, the network system obtains a response to the information about the secondary device multi-device service plan sign-up request from the device agent on Secondary Device 100B. In some embodiments, if the response indicates that the secondary device service plan sign-up request is granted or acknowledged, the network system provides a provisioning instruction to a wireless access network accounting system to account service usage associated with Secondary Device 100B to the master service account. In some embodiments, the network system obtains a device credential associated with the master device in association with the response. In some embodiments, the network system obtains a device credential associated with Secondary Device 100B in association with the response. In some embodiments, the network system includes a secure message link server that communicates the information about the secondary device multi-device service plan sign-up option response message or request message to the master device agent (e.g., Device Agent 9006A). In some embodiments, the network system includes a network push message server and the secure link comprises a secure push message link, and the network system communicates the information about the secondary device multi-device service plan sign-up option response message or request message to the master device agent by sending a push message from a network push message server. In some embodiments, the network system secures the network push message server by executing a push message link establishment process in which the network push message server obtains a device credential and, in cooperation with Master Device 100A, establishes an encrypted link.

In some embodiments, Master Device 100A comprises one or more device agents (e.g., Device Agent 9006A) that present a user interface message offering to associate Secondary Device 100B with a master service account, device group, or multi-device service plan. In some embodiments, the one or more device agents obtain an affirmative user response to the user interface message. In some embodiments, the one or more device agents obtain a secondary device credential and send an indication of the affirmative user response and the secondary device credential to a network element. In some embodiments, the one or more device agents obtain the secondary device credential from a user input obtained through the master device user interface. In some embodiments, the one or more device agents obtain secondary device credential by communicating with Secondary Device 100B through, for example, the first wireless network, Bluetooth, near-field communication, an object presented on the secondary device user interface and captured by Master Device 100A (for example, by a camera), an encoded sound signal, etc. In some embodiments, the one or more device agents obtain a user credential and send the user credential to the network element. In some embodiments, the one or more device agents obtain a master device credential and send the master device credential to the network element. In some embodiments, the one or more device agents obtain an indication of a user-established limit on service usage for Secondary Device 100B. In some embodiments, the one or more device agents send information about the user-established limit on service usage to the network element. In some embodiments, the one or more device agents obtain a user-established permission level associated with Secondary Device 100B. In some embodiments, the one or more device agents send information about the user-established permission level to the network element. In some embodiments, the one or more device agents obtain at least a portion of the user interface message offering to associate Secondary Device 100B with a master service account, device group, or multi-device service plan from memory on the master device. In some embodiments, the one or more device agents obtain at least a portion of the user interface message offering to associate Secondary Device 100B with a master service account, device group, or multi-device service plan from a network element. In some embodiments, the network element is a website or a portal.

In some embodiments, a device (e.g., Master Device 100A or Secondary Device 100B) comprises one or more agents (e.g., Device Agent 9006A, 9006B) that present a user interface message offering an option to provide monetary credit (e.g., money or an equivalent) to Secondary Device 100B. In some embodiments, the one or more agents accept a user response to the offer and provide the user response to a network element (e.g., by sending the user response to the network element).

In some embodiments, a network system communicates over a secure link with a master device agent on a master device (e.g., Device Agent 9006A on Master Device 100A). In some embodiments, the network system obtains a request to provide monetary credit to Secondary Device 100B. In some embodiments, the request includes a master user credential and a secondary credential identifying the secondary device. In some embodiments, the network system determines if the master user credential is associated with the secondary credential, and, if it is, the network system provisions a monetary accounting system to provide monetary credit to Secondary Device 100B.

In some embodiments, a device (e.g., Master Device 100A or Secondary Device 100B) comprises one or more agents (e.g., Device Agent 9006A, 9006B) configured to present a user interface (UI) message offering an option to provide access usage credit to Secondary Device 100B, accept a user input in response to the offer, and communicate the user input to a network element.

In some embodiments, a network system communicates over a secure link with a master device agent on a master device (e.g., Device Agent 9006A on Master Device 100A). In some embodiments, the network system obtains a request to provide service usage credit to Secondary Device 100B. In some embodiments, the network system obtains the request from the master device agent over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service usage accounting system to provide service usage credit to Secondary Device 100B.

In some embodiments, a device 100 comprises one or more agents configured to present a user interface (UI) message offering an option to provide control of at least an aspect of a secondary device service permission level, obtain a user response to the offer, and communicate the user response to a network element.

In some embodiments, a network system communicates over a secure link with a master device agent on a master device (e.g., Device Agent 9006A on Master Device 100A). In some embodiments, the network system obtains a request to control at least an aspect of a secondary device service permission level. In some embodiments, the network system obtains the request from the master device agent over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service permission control system to control the at least an aspect of the secondary device service permission level.

In some embodiments, a device system comprises one or more agents configured to present a user interface (UI) message offering an option to deny at least an aspect of a secondary device service permission level, obtain a user response to the offer, and communicate the user response to a network element.

In some embodiments, a network system communicates over a secure link with a master device agent on a master device (e.g., Device Agent 9006A on Master Device 100A). In some embodiments, the network system obtains a request to deny at least an aspect of a secondary device service permission level. In some embodiments, the network system obtains the request from the master device agent over the secure link. In some embodiments, the network system obtains a master user credential and a secondary device credential associated with the request and determines if the master user credential is associated with the secondary device credential. In some embodiments, if the master user credential is associated with the secondary device credential, the network system provisions a service permission control system to deny the at least an aspect of the secondary device service permission level.

In some embodiments, a network system configures a notification regarding a secondary device usage level, wherein the notification is to be delivered to Master Device 100A. In some embodiments, the network system configures a usage level setting based on information from Master Device 100A. In some embodiments, the network system configures the usage level setting based on information from a website or portal. In some embodiments, the network system configures the usage level setting as part of a service plan provisioning interface.

In some embodiments, the usage level is associated with voice usage. In some embodiments, the voice usage is expressed in units of minutes. In some embodiments, the voice usage is expressed as a percentage of plan limit. In some embodiments, voice usage is expressed as a percentage of an allowance.

In some embodiments, the usage level is associated with text or SMS usage. In some embodiments, the text or SMS usage is expressed as a number of texts or SMS messages. In some embodiments, text or SMS usage is expressed as an object count. In some embodiments, text or SMS usage is expressed as a number of megabytes (MB). In some embodiments, text or SMS usage is expressed as a percentage of a plan limit. In some embodiments, a text or SMS usage is expressed as a percentage of an allowance (e.g., an allowance under a shared plan).

In some embodiments, the usage level is associated with data usage. In some embodiments, the data usage is expressed as an amount of data (e.g., measured in megabytes, kilobytes, etc.). In some embodiments, the data usage is expressed as an amount of time. In some embodiments, the data is expressed as a percentage of a plan limit. In some embodiments, the data is expressed as a percentage of an allowance (e.g., an allowance under a shared plan).

In some embodiments, the usage level is for classification of data (e.g., a category of service activities less than all service activities available to device 100). In some embodiments, the data classification usage expressed in MB. In some embodiments, the data classification is expressed as a usage during a period of time. In some embodiments, the data classification is expressed as a percentage of a plan limit. In some embodiments, the data classification is expressed as a percentage of an allowance (e.g., an allowance under a shared plan). In some embodiments, the classification of data is for one or more applications. In some embodiments, the classification is for one or more network end points. In some embodiments, the classification is for one or more voice services. In some embodiments, the classification is for one or more text messages or messaging services. In some embodiments, the classification is for one or more content types. In some embodiments, the classification is for roaming services (e.g., service usage while roaming, such as number of voice minutes used while roaming, amount of data used while roaming, etc.). In some embodiments, the classification is for home cellular network services (e.g., service usage while on a home cellular network, such as number of voice minutes used while roaming, amount of data used while roaming, etc.). In some embodiments, the classification is for Wi-Fi services (e.g., service usage while on one or more Wi-Fi networks, such as number of voice minutes used while on Wi-Fi networks, amount of data used while on Wi-Fi networks, etc.). In some embodiments, the classification is for one or more quality-of-service (QoS) levels or one or more QoS types. In some embodiments, the classification is for one or more traffic or content types (e.g., service usage for streaming video, service usage for streaming audio, service usage for a particular protocol, etc.). In some embodiments, the classification is for one or more time periods (e.g., service usage during the past day, week, month, etc.). In some embodiments, the classification is for one or more geographic areas or physical locations (e.g., service usage in Santa Clara County, service usage at the office, service usage at home, etc.). In some embodiments, classification is for one or more application types (e.g., service usage associated with user applications, service usage associated with social networking applications, service usage associated with video applications, etc.). In some embodiments, the classification is for one or more websites. In some embodiments, the classification is for one or more website types. In some embodiments, the classification is for one or more of categories of service usage, such as, for example, voice, text, data, gaming, video, browsing, chat, shopping, maps, audio, etc.

In some embodiments, a master device (e.g., Master Device 100A) comprises one or more agents (e.g., Device Agent 100A) configured to receive a child usage level message and present information about the child usage levels through a master device user interface (UI).

In some embodiments, a network system compares a pre-determined secondary device service usage limit with a measured secondary device service usage level associated with a secondary device (e.g. Secondary Device 100B) associated with a secondary device credential. In some embodiments, the network system determines if the measured secondary device service usage level exceeds the pre-determined secondary device service usage limit. In some embodiments, if the limit is exceeded, the network system obtains (e.g., configures, retrieves, etc.) a secondary device service usage message associated with the secondary device service usage limit. In some embodiments, the network system determines a master device credential of a master device (e.g., Master Device 100A) that is associated with the secondary device and sends the secondary device service usage message to a master device agent (e.g., Device Agent 9006A) on the master device identified by the master device credential.

In some embodiments, a master device (e.g., Master Device 100A) comprises one or more agents (e.g., Device Agent 9006A) configured to receive a child usage level message and present information from or determined based on the child usage level message through a master-device user interface. In some embodiments, the child usage level message indicates that the secondary device (e.g., Secondary Device 100B) is out of usage allocation. In some embodiments, the child usage level message indicates that the secondary device is nearing a condition where it will be out of usage allocation. In some embodiments, the one or more agents also present an option to modify (e.g., increase or decrease) secondary device usage permissions or limits. In some embodiments, the one or more agents accept a user response to the option to modify the secondary usage permissions or limits. In some embodiments, the one or more agents send the user response to a network element.

In some embodiments, a network system determines a usage level for a secondary device (e.g., Secondary Device 100B). In some embodiments, the network system determines if secondary device usage level satisfies a pre-determined condition. In some embodiments, if the secondary device usage level satisfies the pre-determined condition, the network system determines a master device (e.g., Master Device 100A) that is associated with the secondary device. In some embodiments, the network system determines (e.g., configures, obtains, etc.) a secondary device usage level message associated with the pre-determined condition and sends the secondary device usage level message to the master device. In some embodiments, the usage level message includes an option to increase a usage allowance for a secondary device. In some embodiments, the network system also obtains a master user response to increase the secondary device usage allowance. In some embodiments, the network system receives the master user response from the master device. In some embodiments, the network system provisions one or more network elements to as needed to increase the secondary device usage allowance.

In some embodiments, the network system receives a secure request from a master account holder to add a device (device 100) to a master service account, device group, or multi-device service plan. In some embodiments, the secure request comprises a master account holder credential and a first device credential. In some embodiments, the network system confirms the master account credential and, after confirming the master account credential, provisions a network access system to provide the service usage or attempted service usage over a first wireless access network that is associated with a first device credential to support the access permissions associated with the master service account, device group, or multi-device service plan. In some embodiments, the request to add device 100 to the master service account, device group, or multi-device service plan is obtained from a device agent (e.g., Device Agent 9006) on device 100. In some embodiments, the request to add device 100 to the master service account, device group, or multi-device service plan is obtained from a device agent on another device. In some embodiments, the request to add device 100 to the master service account, device group, or multi-device service plan is obtained from a website or portal. In some embodiments, provisioning includes associating device 100 credential to the master service account, device group, or multi-device service plan. In some embodiments, provisioning includes de-assigning device 100 credential from a pre-existing service plan. In some embodiments, access permissions include one or more permissions for categories of service usage established by the master account holder.

In some embodiments, a network system receives a secure request from a master account holder to add a first device (device 100) to a master service account, device group, or multi-device service plan, the secure request comprising a master account holder credential and a first device credential. In some embodiments, the network system confirms the master account credential and provisions a network service usage accounting system to account service usage over a first wireless access network that is associated with device 100 credential to the master account. In some embodiments, the request to add device 100 to the master service account, device group, or multi-device service plan is obtained from a device agent located on device 100. In some embodiments, the request to add device 100 to the master service account, device group, or multi-device service plan is obtained from a device agent (e.g., Device Agent 9006) located on another device. In some embodiments, the request to add device 100 to the master service account, device group, or multi-device service plan is obtained from a website or portal. In some embodiments, provisioning includes associating device 100 credential to the master service account, device group, or multi-device service plan. In some embodiments, provisioning includes de-assigning device 100 credential from a pre-existing service plan. In some embodiments, the request to add device 100 to the master service account, device group, or multi-device service plan is obtained from a device agent on device 100. In some embodiments, the request to add device 100 to the master service account, device group, or multi-device service plan is obtained from a device agent on another device (e.g., Device Agent 9006). In some embodiments, the request to add device 100 to the master service account, device group, or multi-device service plan is obtained from a website or portal. In some embodiments, provisioning includes associating a first device credential to the master service account, device group, or multi-device service plan. In some embodiments, provisioning includes de-assigning the first device credential from a pre-existing service plan. In some embodiments, access permissions include one or more permissions for a category of service usage established by the master account holder.

In some embodiments, a network system obtains a secondary device access credit indication for a classification of service (e.g., a category of service usage) from a master device agent on a master device (e.g., Device Agent 9006A on Master Device 100A) and provisions an access control system to provide access credit for the classification of service for a secondary device (e.g., Secondary Device 100B) from the master device, the classification of service less than all services available to the secondary device. In some embodiments, the classification is for one or more applications. In some embodiments, the classification is for one or more network end points. In some embodiments, the classification is for one or more voice services. In some embodiments, the classification is for one or more text messages. In some embodiments, the classification is for one or more content types. In some embodiments, the classification is for roaming services. In some embodiments, the classification is for home cellular services. In some embodiments, the classification is for Wi-Fi services. In some embodiments, the classification is for one or more QoS levels or one or more QoS types. In some embodiments, the classification is for one or more traffic types. In some embodiments, the classification is for one or more time periods. In some embodiments, the classification is for one or more geographic areas or physical locations. In some embodiments, the classification is for one or more application types. In some embodiments, the classification is for one or more websites. In some embodiments, the classification is for one or more website types. In some embodiments, the classification is for one or more of voice, text, data, gaming, video, browsing, chat, shopping, maps, audio, etc.

In some embodiments, a network system obtains a secondary device access credit indication for a classification of service from a master account holder user interface (UI), the classification of service less than all services available to device 100. In some embodiments, the master account holder UI is located on a master device (e.g., Master Device 100A). In some embodiments, the master account holder UI comprises a website.

Enhanced Curfews

In some embodiments, a master user (alternatively or in addition denoted herein as a subscriber, a manager user, user group master, an owner, or an account holder) manages (wherein "manages" comprises one or more of: sets, defines, controls, monitors, notifies, acknowledges) a curfew on at least a portion of a service plan (comprising one or more service activities, such as browsing, texting, email, video streaming, etc., or other activities associated with one or more devices 100 and/or one or more users (or subscribers) associated with the one or more devices 100, such as application or game usage) for one or more other devices 100 associated with a device group (wherein the device group may be defined by a service plan, a service account, a shared allocation group, a device agent grouping, device pairing, etc.), a user group, or both a device group and a user group. In some embodiments, a master user manages a curfew from a master device (e.g., Master Device 100A). In some embodiments, a master user manages a curfew from a child or secondary device (e.g., Secondary Device 100B) after sharing a master user credential. In some embodiments, the master user manages a curfew from a master device after sharing a master user credential. In some embodiments, the master user manages a curfew for a device associated with the master user, for example a master device. In some embodiments, the device group has more than one master user (e.g., both parents of a family plan). In some embodiments, the curfew is based on the union of the more than one master user management. In some embodiments, the curfew is based on the latest master user management. In some embodiments, the master users are organized by a hierarchy or by tiers, and the master user management is based on the hierarchy (e.g., one parent of a family plan may set a curfew and the other parent of the family plan may or may not be allowed to override it).

Figures 54, 55:
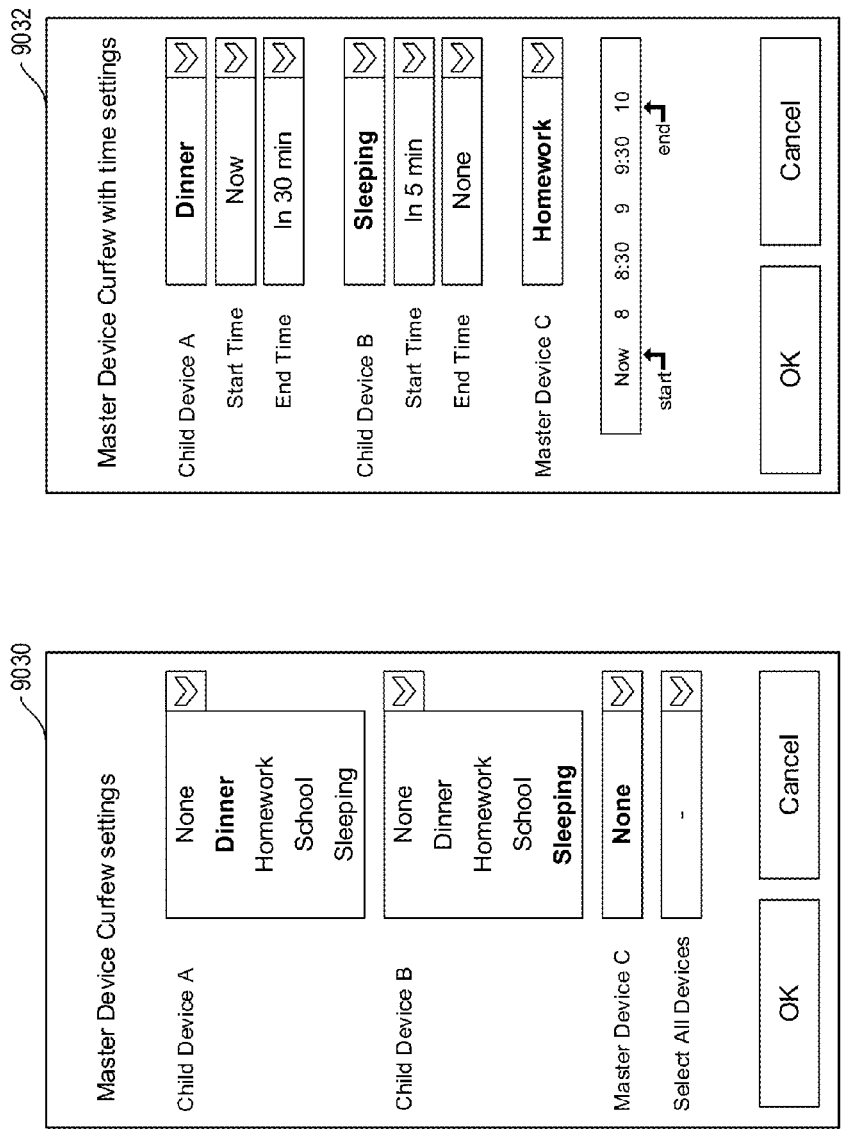
FIG. 54 illustrates a representative screen that is presented on a master device when a subscriber attempts to manage a curfew of one or more devices in accordance with some embodiments.
FIG. 55 illustrates a representative screen that is presented on a master device when a subscriber attempts to manage a curfew with time events of one or more devices in accordance with some embodiments.

FIG. 54 illustrates representative screen 9030, which illustrates exemplary information that may be presented on the master device (e.g., Master Device 100A), in accordance with some embodiments, when a subscriber attempts to manage a curfew of one or more devices. For example, the "Master Device Curfew settings" may be managed from a master device (e.g., Master Device 100A). In some embodiments, a user may arrive at the "Master Device Curfew settings" from a device agent user interface (UI). In some embodiments, a user may arrive at the "Master Device Curfew settings" from the master device settings or an application on the master device. In some embodiments, the "Master Device Curfew settings" may be a website, portal, etc. In some embodiments, the "Master Device Curfew settings" settings may be presented to the master device from a network element. In the embodiment illustrated in FIG. 54, the master user may manage settings for three devices: "Child Device A," "Child Device B," and "Master Device C." In the embodiment illustrated in FIG. 54, each device may be managed independently (e.g., by selecting a curfew setting from a dropdown menu). In the embodiment illustrated in FIG. 54, the master user may select one of the following options: "None" (which may be associated with no curfew), "Dinner," "Homework," "School," or "Sleeping." In the embodiment illustrated in FIG. 54, the current selection for "Child Device A" is "Dinner," the current selection for "Child Device B" is "Sleeping," and the current selection for "Master Device C" is "None."

In some embodiments, it may be more convenient for the curfew manager to select a common selection for all the devices by setting "Select All Devices" (e.g., if the whole family is having or about to have dinner, a master user may select "Dinner" in the "Select All Devices" drop down menu). In some embodiments, a master user selection may take place real time (or alternatively in near-real time or quasi real-time). In some embodiments, real time includes the actions associated with the master user management taking effect within a few minutes of being set by the master user. In some embodiments, real time includes the actions associated with the master user management taking effect in less than a minute after being set by the master user. In some embodiments, real time includes the actions associated with the master user management taking effect in less than a few seconds after being set by the master user. In some embodiments, the master user selection takes place in real time after the master user selects the "OK" button (e.g., through a touch screen or a voice command). In some embodiments, the "Master Device Curfew settings" menu (or alternatively: presentation, display, screen, window, or portal, etc.) may be used by a master user to check the curfew status of one or more devices. In some embodiments the "Master Device Curfew settings" presentation (or alternatively: display, screen, window, or portal, etc.) may be used by a master user to change a previously selected curfew status of one or more devices (or one or more users). In some embodiments, the "Master Device Curfew settings" presentation (or alternatively: display, screen, window, or portal, etc.) may be used by a master user to end the curfew status of one or more devices (e.g., by changing the selected setting for "Child Device A" from "Dinner" to "None" and selecting "OK," or alternatively one or more of: "Accept," "Yes," "Start," "Curfew Now," "Curfew Start," "Time-out," or "Time-out Now").

In some embodiments, the master user desires to manage time events for a curfew. FIG. 55 illustrates a representative screen 9032, which illustrates exemplary information that may be presented on the master device (e.g., Master Device 100A), in accordance with some embodiments, when a subscriber attempts to manage a curfew with time events of one or more devices. In the illustration of FIG. 55, the "Master Device Curfew with time settings" menu allows the master user to select a "Start Time" and/or an "End Time." In some embodiments, the "Start Time" is as soon as possible, current time, or real-time, as denoted by "Child Device A"-"Start Time" selection "Now." In some embodiments, the "Start time" is delay/offset relative to current-time, as denoted by "Child Device B"-"Start Time" selection "In 5 min." In some embodiments, a delay relative to current-time could give the manager (or the child) some time to prepare prior to the curfew enforcement. In some embodiments, one or more of the managed device (e.g., one of both of the Child Device A or Child Device B) received a notification of the curfew selection. In some embodiments, one or more of the managed devices (e.g., one or both of the Child Device A or Child Device B) received a notification of the curfew selection and the time event information. In the illustration of FIG. 55, the "End Time" selection could be selected from a drop down menu including set times (e.g., "In 30 min," "None," etc.). In some embodiments, the "End Time" selection could receive a master input from a UI (e.g., text, voice, etc.). In the illustration of FIG. 55, the Time events may be specified with a drag and place pointer (e.g., the "start" and "end" arrows managing the "Master Device C" time events managing the curfew setting of "Homework"). In some embodiments, there are additional master devices or additional child devices.

Figures 56, 57:
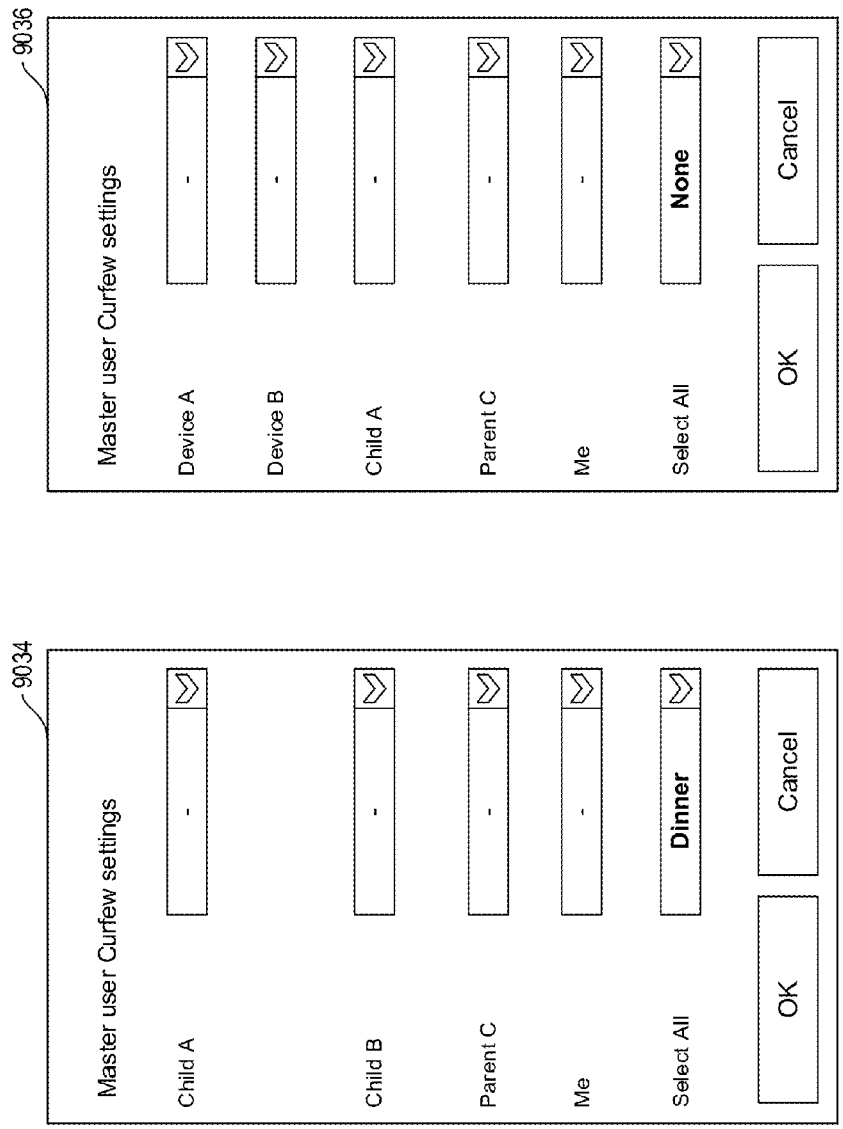
FIG. 56 illustrates a representative screen that is presented on a device to a master user when a master user attempts to manage a curfew of one or more users associated with one or more devices from a device group in accordance with some embodiments.
FIG. 57 illustrates a representative screen that is presented on a device to a master user when the master user attempts to manage a curfew of a first set of one or more devices from a device group and one or more users associated with a second set of one or more devices from a device group in accordance with some embodiments.

FIG. 56 illustrates representative screen 9034, which illustrates exemplary information that may be presented on a device to a master user, in accordance with some embodiments, when a master user attempts to manage a curfew of one or more users associated with one or more devices from a device group. In some embodiments, the master user is managing the curfew settings from a master device (e.g., Master Device 100A). In some embodiments, the master user is managing the curfew settings from a particular device from the device group after providing master user credentials. In some embodiments, the master user is managing the curfew settings from any device from the device group after providing master user credentials. In the embodiment illustrated in FIG. 56, the master user may manage each of four users associated with the device group: "Child A," "Child B," "Parent C," and "Me." In the embodiment illustrated in FIG. 56, the master user is able to manage the users' curfew activity. In this manner, if a device associated with the device group may be used by more than one user (e.g., a tablet shared by Child A and B, a shared IPTV, etc.) the curfew management could be targeted to the appropriate user. In the "Master user curfew setting" menu illustrated in FIG. 56, all the users have been placed in curfew "Dinner" mode by selecting the "Dinner" option in the "Select All." For this example, this enables the master user to place all devices associated to the four users in the "Dinner" mode quickly and in real-time. In some embodiments, a time event may be associated with the user-based curfew setting (e.g., "Dinner" in 5 min or "Sleeping in 10 min"). This may be more convenient when a user (e.g., Child A) has more than one device (e.g., smartphone, tablet, game console, or TV). In some embodiments, the user associated with a device may be static or dynamic. In some embodiments, the user associated with the device may be based on a credential obtained from the user (e.g., password, PIN, etc.). In some embodiments, the user associated with the device may be recognized based on a sensor signal obtained from the user (e.g., camera, voice recognition, facial recognition, biometric data, etc.).

FIG. 57 illustrates representative screen 9036, illustrating exemplary information that may be presented on a device to a master user, in accordance with some embodiments, when a master user attempts to manage a curfew of a first set of one or more devices from a device group and one or more users associated with a second set of one or more devices from a device group. In some embodiments, the first set of one or more devices and the second set of one or more devices may comprise one or more common devices. In the illustration of FIG. 57, the master user may individually control any entity (device or user) within the set of two devices ("Device A", "Device B") and three users ("Child A", "Parent C", "Me"). In some embodiments, a master user may not know the current association between one or more users and one or more devices in the device group (e.g., the master user is in a different room in the house than one or more other users, or the door to the room of one of the users is closed, or the master user is not at home and one of the children to be "curfewed" is). In some embodiments, a combination of device and user curfew management is more convenient or effective. In some embodiments a user may be using more than one device simultaneously (e.g., texting on a smartphone while watching TV), or a device may have more than one user (e.g., two users watching TV together). In the illustration of FIG. 57, the master user has selected the curfew option "Select All" to setting "None", which could disable all curfew settings to all five entities above. For example, the selection illustrated in FIG. 57 could be used to undo the selection illustrated in FIG. 56 after dinner (or alternatively breakfast or lunch, etc.) activity has been completed.

FIG. 58 illustrates representative screen 9038, illustrating exemplary information that may be presented on a device to a master user, in accordance with some embodiments, when a master user attempts to manage a curfew of one or more users associated with one or more devices from a device group. In the illustration of FIG. 58, a master user may manage a subgroup of entities (for this example there are four entities named "Child A," "Child B," "Parent C," and "Me," which happen to be names of users, but could have been devices or a combination of users and devices). In the illustration of FIG. 58, a select box is placed next to or adjacent to each entity (for other examples a touch of the name, or a color, sorting the entities into two lists, separate drag and drop boxes, etc., could be used to select/separate/sort/classify one or more entity from the group of entities) to identify which entities are associated with the "Select group" curfew selection "Sleep." In this example, "Child A" and "Child B" have been selected (with the checkmark in the adjacent box) for the curfew setting "Sleep," and "Parent C"

and "Me" (e.g., both parents) have been selected to be in "Dinner" curfew mode (e.g., to prevent a subset of service plan activities during dinner time).

FIG. 59 illustrates representative screen 9040, which illustrates exemplary information that may be presented on a device to a master user, in accordance with some embodiments, when a master user attempts to manage a curfew with time events of a first set of one or more devices from a device group (e.g., "Child Device C") and one or more users (e.g., "Child A" and "Child B") associated with a second set of one or more devices from a device group. In the embodiment illustrated in FIG. 59, the master user manages a curfew for a combination of user and device entities and includes curfew selections and time events, which were discussed in detail in explaining previous figures.

Figures 60, 61:
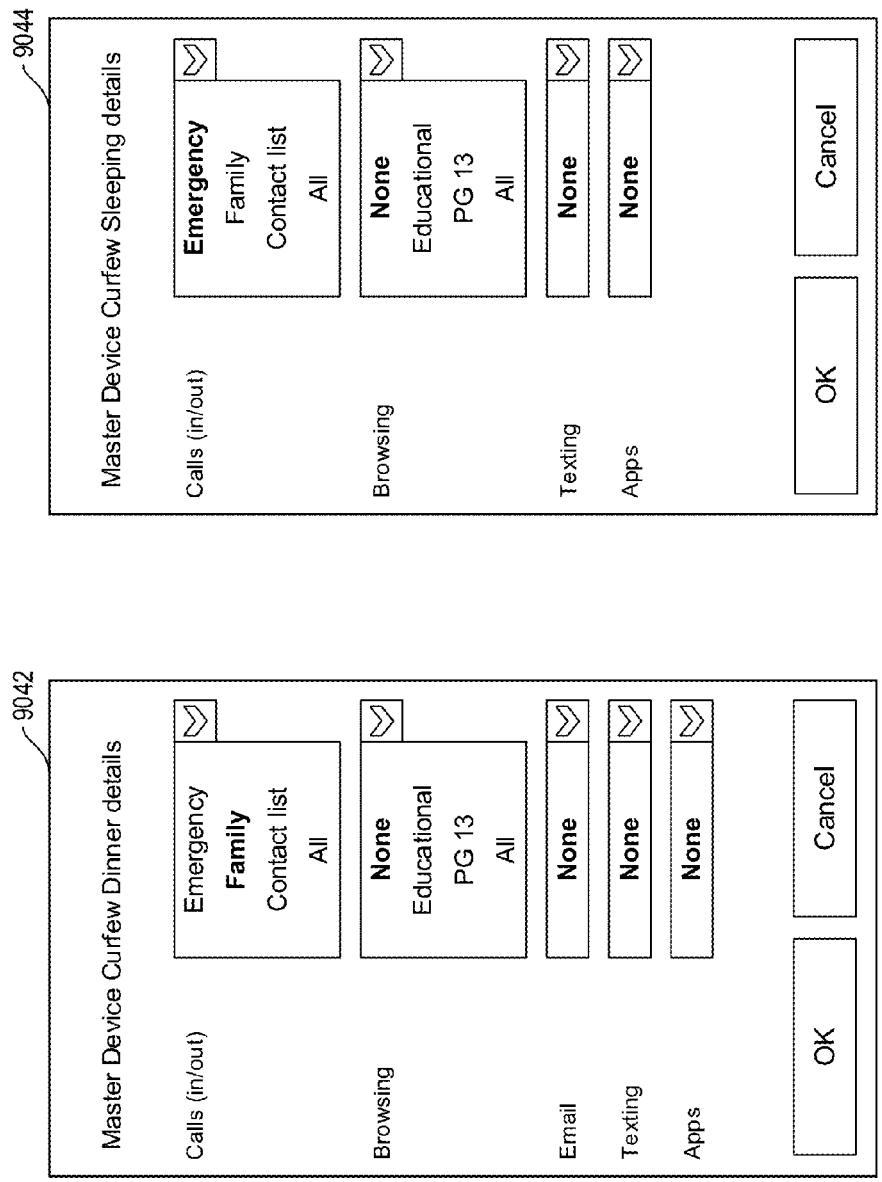
FIG. 60 illustrates a representative screen that is presented on a master device when a subscriber attempts to manage a "Dinner" curfew selection in accordance with some embodiments.
FIG. 61 illustrates a representative screen that is presented on a master device when a subscriber attempts to manage a "Sleeping" curfew selection in accordance with some embodiments.

FIG. 60 illustrates representative screen 9042, which illustrates exemplary information that may be presented on the master device, in accordance with some embodiments, when a subscriber attempts to manage the curfew "Dinner" selection. In some embodiments, the curfew "Dinner" selection is pre-configured. In some embodiments, the curfew "Dinner" selection is pre-configured by a device agent (e.g., an OS function, service processor, app, mobile operator app, third-party app, etc.). In some embodiments, the curfew "Dinner" selection is pre-configured by a network element. In some embodiments, the curfew "Dinner" selection is pre-configured by a third-party provider of the curfew service. In some embodiments, the curfew "Dinner" selection may be modified or customized by a master user. In some embodiments, the curfew "Dinner" selection may be modified or customized by a master user on a master device. In some embodiments, the curfew "Dinner" selection may be modified or customized by a master user on a second device (e.g., a child device (such as device 100B)—for example, after presenting master credentials).

In the illustration of FIG. 60, the service activities restrictions associated with the curfew "Dinner" selection allow "Family" calls ("Calls (in/out)" set to "Family"), no browsing, no email, no texting, no apps (e.g., by "Browsing" set to "None," "Email" set to "None," "Texting" set to "None," and "Apps" set to "None"). In some embodiments, additional activities may be listed or some activities may not be listed. In some embodiments, the master user can modify or customize only a subset of the activities (e.g., a master user may not be allowed to prevent an emergency communication—for example, a 911 call) associated with a curfew selection (e.g., a master user may not be allowed to set calls to "None"). In some embodiments, the pre-configured selections or master user modifications may be different for in-bound or out-bound communications (e.g., allow the device to send texts, but not to receive texts). In some embodiments, the modifications to a pre-set curfew take effect after the "OK" input is selected. In some embodiments, the modifications to pre-set curfew take effect in real-time after the "OK" input is selected. In some embodiments, the "OK" selection could be alternatively or in addition represented by an equivalent term, such as one or more of: "Accept," "Yes," "Start," "Curfew Now," "Curfew Start," "Time-out," "Time-out Now," etc. In some embodiments, the pre-set modifications could remain unchanged by selecting the "Cancel" input (or some other equivalent message, such as "NO," "OFF," "Stop," or "Reject"). In some embodiments, the device could be modified back to its original settings with a "Reset" selection.

FIG. 61 illustrates representative screen 9044, which illustrates exemplary information that may be presented on the master device, in accordance with some embodiments, when a subscriber attempts to manage the curfew "Sleeping" selection. In some embodiments, the curfew "Sleeping" selection is pre-configured. In some embodiments, the curfew "Sleeping" selection may be modified or customized by a master user. In the illustration of FIG. 61, the service activities restrictions associated with the curfew "Dinner" selection allow "Emergency" calls ("Calls (in/out)" set to "Emergency"), no browsing, no email, no texting, no apps (e.g., by "Browsing" set to "None," "Email" set to "None," "Texting" set to "None," and "Apps" set to "None").

FIG. 62 illustrates representative screen 9046, illustrating exemplary information that may be presented on the master device, in accordance with some embodiments, when a subscriber attempts to manage the curfew "Homework" selection. In some embodiments, the curfew selection (e.g., "Homework") is pre-configured. In some embodiments, the curfew selection comprises additional settings (or alternatively referenced herein as selections or options). In some embodiments, the additional settings comprise service activity statistics. In some embodiments, the additional settings comprise one or more of: a number, a maximum number, a number per unit of time, amount, maximum amount, amount per unit of time, accounting, accounting per unit of time, etc., of service activity. In the illustration of FIG. 62, the "Call statistics" drop-down menu presents a selection comprising: number of calls ("1," "5"), number of calls per unit of time (two calls per hour or "2/hr"), or unlimited calls. In some embodiments, a user (e.g., a master user) may input a statistic (e.g., by text or voice input—for example, a unit, a unit and a time, a unit per unit of time, etc.) instead of or in addition to a list of pre-set choices of statistics. In some embodiments, a user may select a percentage of service usage (e.g., the device "Apps" may not be used more than 10% of the time) or a percentage per unit of time. For example, in the embodiment illustrated by FIG. 62, "Apps statistics" of "10%/hr" could restrict apps usage to no more than 6 min of each hour, which could be a moving/sliding window or synchronized to the 24 hour clock hour or half-hours, etc.

In some embodiments, a curfew selection may manage new (or alternatively un-initiated, future, or un-started) service activities. For example, a curfew selection may manage calls, texts, or browsing that may be attempted or desired at a future time after the curfew has been set (e.g., a real-time curfew selection). In some embodiments, a curfew selection may manage ongoing (or alternatively in progress or initiated, or started) service activities. For example, a curfew selection may manage calls, texts, browsing, app or usage that may be ongoing prior to when the curfew has been set (e.g., a real-time curfew selection after a child device has initiated a phone call or is in the middle of using an app or playing a game). In some embodiments, it may be desirable to select (e.g., from a list of preset or custom settings) management actions to be taken on ongoing activities. In some embodiments, managing an ongoing activity may include one or more of: locking the device, pausing the device, powering down the device, disabling a UI of the device, terminating a service activity, or providing a notification to be presented to a user regarding the ongoing service activity. In some embodiments, managing an ongoing activity may include a plurality of activities, such as presenting a notification to a user of a child device followed by pausing/terminating the service activity. In some embodiments, the pausing/terminating is delayed relative to the notification.

FIG. 63 illustrates representative screen 9048, which illustrates exemplary information that may be presented on the master device, in accordance with some embodiments, when a subscriber attempts to manage the curfew "Homework ongoing activity termination details" selection. In the embodiment illustrated in FIG. 63, the service activity "Calls" includes a menu pull-down with the selections "Terminate" (e.g., real-time termination without Notification), "Notify" (e.g., notify the user of the device to be curfewed that the service activity "Calls" is not included in the curfew mode "Homework," "Notify, terminate in 3 min" (e.g., send/present a notification to the device under curfew in real-time and terminate the call three minutes later), or "None" (e.g., ongoing calls are not managed). In the illustration of FIG. 63, the service activity "Browsing" includes a menu pull-down with the selections "Lock screen" (e.g., real-time device screen lock without Notification), "Notify" (e.g., notify the user of the device to be curfewed that the browsing is not included in the curfew mode "Homework," or "None" (e.g., ongoing browsing is not managed).

In some embodiments, a user (e.g., a master user) may select common management actions for several activities (e.g., for faster enforcement, to save setting time or simplify selections). In the illustration of FIG. 63, the activities "Apps" and "Email" have both been selected (as shown by checked adjacent boxes) and a common management action (e.g., "Notify, pause in 3 min") has been selected for both apps and email ongoing activities. In some embodiments, more, less or all activities could be selected to share a management action for ongoing activity termination.

In some embodiments, a user (e.g., a master user) may define a custom (or alternatively, or in addition, a new) curfew management mode, for example to complement one or more preset curfew management modes. FIG. 64 illustrates a representative screen 9050, which illustrates exemplary information that may be presented on the master device, in accordance with some embodiments, when a subscriber attempts to define a custom curfew mode. In the illustration of FIG. 64, a user interacting with the master device (e.g., a master user) may specify a custom name. In the illustration of FIG. 64, the custom curfew mode is called "Driving" (e.g., input by text, voice, touch keypad, etc.). In the illustration of FIG. 64, the master device selections have been set as following (as indicated by the bold text, but could be alternatively represented with italics, larger font, different font, different shading, etc.): "Call" option selected is "Emergency," which could indicate that only emergency calls are allowed while in "Driving" curfew mode; "Browsing," "Texting," and "Apps" option selected is "None," which could indicate that no browsing, texting, or app usage is allowed while driving.

In some embodiments a user of one or more devices of the device group (e.g., a master user of the master device) may provide additional (or alternatively referred to within as advanced or enhanced) curfew settings. In some embodiments, the additional curfew setting comprise one or more of: locations included or excluded (or alternatively called allowed or disallowed; or whitelisted or blacklisted), location changes (or alternatively or in addition: location variation, change of location, speed, velocity, location positioning, etc.) included or excluded, device state included or excluded, network state (e.g., networks available, quality of network connection, cost of network usage, state of service plan, etc.) included or excluded, device connectivity state (e.g., which of the one or more modems are enabled or disabled).

FIG. 65 illustrates representative screen 9052, which illustrates exemplary information that may be presented on the master device, in accordance with some embodiments, when a subscriber attempts to manage advanced custom settings. In the illustration of FIG. 65, an example list of included and excluded states (or alternatively or in addition parameters, characteristics) that may be relevant to the one or more devices to be managed by a curfew are included. For example, "Location Excluded" may allow the master user to specify which locations are excluded from the "Driving" curfew mode, like being at "Home." Alternatively being at a park or a school could be excluded.

In the embodiment illustrated in FIG. 65, the selection "Speed Excluded" may allow the master user to specify which speeds are excluded from the "Driving" curfew mode, like being at "<3 ml/hr" which may indicate the device is stationary or moving slowly, such as being walked with or jogged with. In the illustration of FIG. 65, the selection "Device State Included" may allow the master user to specify which device state or states (e.g., child device state or any device associated with a particular child) are excluded from the "Driving" curfew mode, like being in "Hands Free" or "Bluetooth" or "Voice Activated" state (e.g., these device states may be considered safe for making phone calls or reading/writing messages while in "Driving" mode). Alternatively, being at a park or a school could be excluded. In some embodiments (e.g., "Device State Included" from FIG. 65), more than one item may be selected (e.g., for joint management) for a given setting/state/selection. In the illustration of FIG. 65, the selection "Network State Included" may allow the master user to specify which access networks are included from the "Driving" curfew mode, like being at "Wi-Fi" which may indicate the device is stationary or moving slowly (e.g., if the Wi-Fi access points don't allow for handoff), such as being walked with or jogged with. In the illustration of FIG. 65, for example "Device Connect Included" may allow the master user to specify which modems are active/included from the "Driving" curfew mode, like being at "Wi-Fi" or "Airplane mode" (which could disable/power down all or most wireless modems and could prevent service activities—such as push notification or email sound notification—which could be distracting in the "Driving" curfew mode).

In some embodiments, it may be advantageous to provide messages (also referred to within as notifications) to a device (e.g., a child device) based on curfew management activities, events, etc., for presentation to a user interacting with the device under curfew. In some embodiments, it may be advantageous for a user interacting with the device associated with a curfew to accept (also referred to within as acknowledge) a least a portion of the notifications received. In some embodiments, notifications may be customized (or selected from a list of preset messages) by a master user (e.g., at a master device) prior to communication to the device under curfew.

In some embodiments, the curfew is associated with a child user (or some other user of the device group or user group) and a curfew notification (or some other curfew management) could be communicated to one or more devices associated with the child user (e.g., the child may be using more than one device, or may switch from a first device to a second device during the curfew). In some embodiments, a notification is presented at a curfew-managed device in real-time. In some embodiments, a notification is presented at a curfew-managed device at a later time based on an event (e.g., a child device may not be in use at the time curfew is initiated, but is attempted to be used at a later time during the curfew enforcement and the notification is presented at that time).

In some embodiments, the curfew is associated with a child user (or some other user associated with the device group or user group) and the curfew management (e.g., control) could be associated to one or more devices associated with the child user (e.g., the child may be using more than one device during the curfew, or may switch from a first device to a second device during the curfew). In some embodiments, a user (e.g., a child user) interacts with different devices during the time the curfew is in effect, and the curfew management is adapted based on the user interactions with one or more of the different devices over time.

In some embodiments, the curfew device group (or user group) is based on a service account (e.g., a wireless access account, a family share account, a shared usage allocation account, a SMB account, an enterprise account, etc.). In some embodiments, the curfew device group is based on a service plan (e.g., a wireless operator, service provider, mobile wireless operator, MVNO, etc.). In some embodiments, the curfew device group is based on an access network (e.g., the devices associated with a home WLAN). In some embodiments, a curfew device group is based on two or more of: a service account, service plan, access network. In some embodiments, a curfew device group is based on a device agent (e.g., an OS function, service processor, app, mobile operator app, third-party app, etc.) on the device group. For example, the device agent could be an application that is installed on each device in the device group (e.g., with a special credential assigned to the device group) and optionally at least one of the devices has an additional capability based on the application that allows it to be the curfew manager. In some embodiments, a first device of the curfew device group is part of a first service account (or a first service plan, or a first mobile operator, or a first service provider) and a second device of the curfew device group is part of a second service account (or a second service plan, a second mobile operator, or a second service provider). In some embodiments, a first device of the curfew device group is part of a first service account (or a first service plan, or a first mobile operator, or a first service provider) and a second device of the curfew device group is part of a second service account (or a second service plan, a second mobile operator, or a second service provider) and device 100A and device 100B are associated to a device group based on a device agent (e.g., an application) or a website, portal or a third-party device group provider (not associated with the mobile operator, wireless service provider). In some embodiments, the curfew device group (or user group) is based on a common operating system (e.g., two or more devices in the device group are based on Android, iOS, etc.), for example assisted by an OS function, service processor or application and optionally a device group credential. In some embodiments, the master device is not part of the device group and the master device manages the devices (or users associated to devices) based on a website, portal or a third-party device group provider (e.g., not associated with the mobile operator, wireless service provider). For example, the device group may only include child devices or devices associated to child users. In some embodiments, the device group is based on one or more credentials that enable a master user (e.g., on a device with network access or device-to-device communication) to configure a device agent on the device under curfew.

In some embodiments, the curfew user group is based on a service account (e.g., a wireless access account, family share account, a shared usage allocation account, a SMB account, an enterprise account, etc.). In some embodiments, the curfew user group is based on a service plan (e.g., a wireless operator, service provider, mobile wireless operator, MVNO, etc.). In some embodiments, the curfew user group is based on an access network (e.g., the users interacting with devices communicating with a home WLAN). In some embodiments, a curfew user group is based on two or more of: a service account, service plan, access network. In some embodiments, a curfew user group is based on a device agent on the device group. For example, the device agent could be an application installed on the device configured to obtain a user credential associated with the device group (e.g., with a special credential assigned to the user group) and optionally at least one of the users has additional capabilities based on the user credential that allows him/her to be the curfew manager.

In some embodiments, a curfew group comprises a combination of one or more devices and one or more users (e.g., a curfew group may comprise a master device, two child devices, a master user, and a child user).

In some embodiments, curfew management and/or enforcement (e.g., a curfew control policy) is implemented (or is assisted by) at least in part by one or more network elements or a network system (e.g., a service controller or a DPI server inspecting data communications associated with a device under curfew). In some embodiments, curfew management (e.g., a curfew control policy) is implemented (or is assisted by) at least in part by a device under curfew (e.g., one or more device agents such as an OS function, service processor, app, mobile operator app, third-party app, etc.). In some embodiments, curfew management (e.g., a curfew control policy) is implemented (or is assisted by) at least in part by one or more network elements and at least in part by a device under curfew. In some embodiments, a master user (e.g., from a master device) provides management information to a network element (e.g., via a website, portal, or entering information into a third-party server) for assistance in enforcing (e.g., control, monitoring, notification) the curfew. In some embodiments, a master user (e.g., from a master device) provides management information to a network element (e.g., via a website, portal, or entering information into a third-party server) which communicates with a device agent on the device under curfew for assistance in enforcing (e.g., controlling, monitoring, notifying) the curfew.

Figures 66, 67:
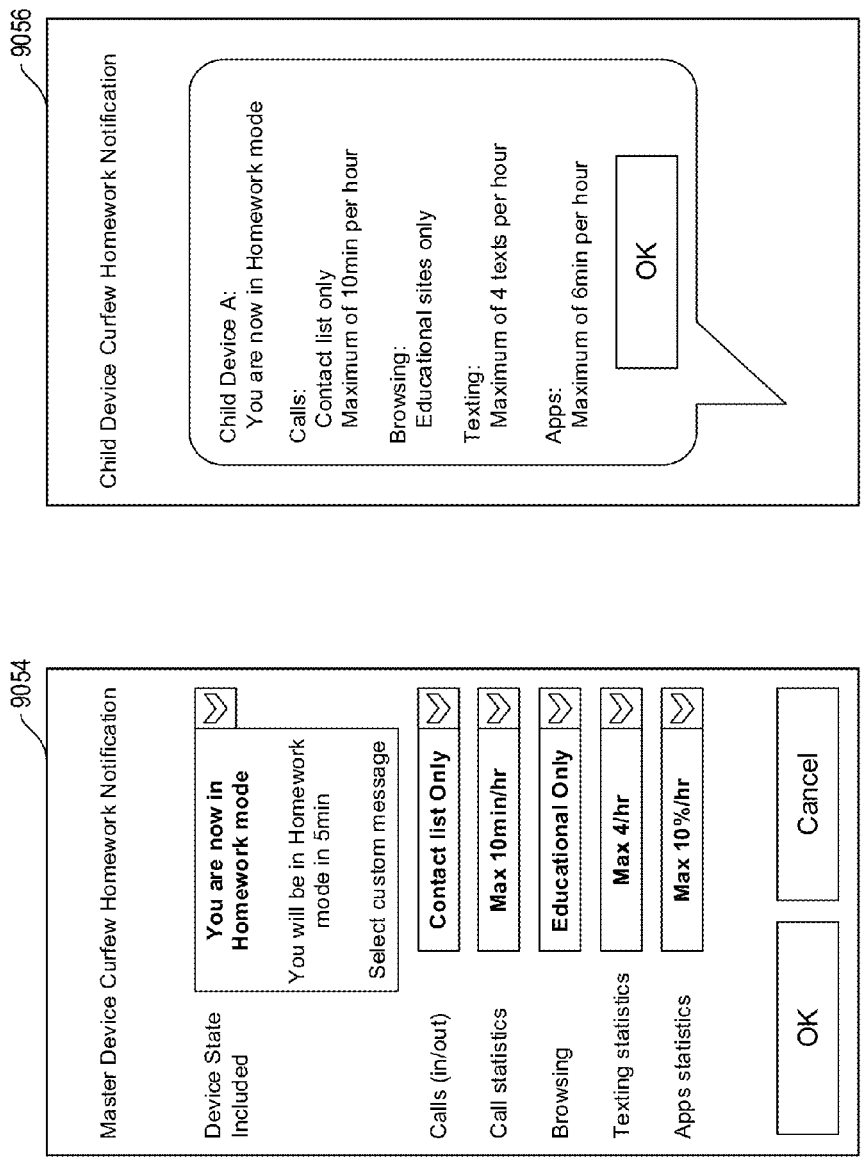
FIG. 66 illustrates a representative screen that is presented on a master device when a subscriber attempts to manage notification settings in accordance with some embodiments.
FIG. 67 illustrates a representative screen with notification information that is presented on a child device in accordance with some embodiments.

FIG. 66 illustrates representative screen 9054, which illustrates exemplary information that may be presented on the master device, in accordance with some embodiments, when a subscriber attempts to manage notification settings. FIG. 67 illustrates representative screen 9056, which illustrates exemplary notification information that may be presented on the child device, in accordance with some embodiments, after a master user has initiated a curfew (e.g., a real-time curfew) mode to manage notification settings. In the illustration of FIG. 66, the "Master Device Curfew Homework Notification" menu includes notification management for six items. For example the "Header" item could provide overall curfew information, such as curfew mode name "Homework" and/or when the curfew will be enforced, such as immediately (also referred to herein or equivalently as real-time, quasi-real time, almost real-time, now, as soon as possible) "You are now in Homework mode" or with some delay relative to the current time (e.g., "You will be in Homework mode in 5 min," for example to provide some time to the child user to manage the termination of ongoing activities or to prevent the child user from initiating new activities) or alternatively providing an absolute time (e.g., "Homework mode at 8pm"—not shown). In the illustration of FIG. 66, the master user may provide a custom message by selecting "Select custom message" and inputting a notification such as, "Joey, please start working on your project" for the "Homework" curfew mode (not shown). In the illustrations of FIG. 66 and FIG. 67, a master user has selected the "You are now in Homework mode" notification, and the associated notification on the child device is "Child Device A: You are now in Homework mode." In some embodiments, the message could have the child's name (e.g., for a more personal message and/or to save the master user the effort to determine which device(s) a child is interacting with).

In the illustrations of FIG. 66 and FIG. 67, the "Calls (in/out)" may include "Contact list only" and the associated message presented at the child device is "Calls: Contact list only."

In some embodiments, a user may provide input to manage a statistic associated with the device activities (e.g., a time or usage limit, a time or usage maximum, a usage, a percentage of usage, or any prior parameter normalized per unit of time). In some embodiments, a user may provide input to manage a statistic associated with the device activities and information associated with the statistic is shared with a device under curfew by a curfew notification.

In the illustrations of FIG. 66 and FIG. 67, a master user has selected the "Call statistics" item to be a "Max 10 min/hr" notification (which is an example of time limit usage over a unit of time) and the associated notification on the child device is "Calls: Maximum of 10 min per hour." In the illustrations of FIG. 66 and FIG. 67, a master user has selected the "Texting statistics" item to be a "Max 4/hr" notification and the associated notification on the child device is "Texting: Maximum of 4 texts per hour" (which is an example of a usage amount over a unit of time). In the illustration of FIG. 66 and FIG. 67, a master user has selected the "Apps statistics" item to be a "Max 10%/hr" notification, and the associated notification on the child device is "Apps: Maximum of 6 min per hour" (which is an example of a usage percentage over a unit of time at the master device, which is converted into time usage amount per unit of time for presentation at the child device).

In some embodiments, additional (or alternatively or in addition enhanced or optional) curfew notification messages may be generated by a master user/device and received by a child user/device. In some embodiments, curfew notification messages are associated with termination of activities that were ongoing prior to a change of curfew management (e.g., a real-time curfew management to enter "Dinner" mode when a child device has an active app session).

Figures 68, 69:
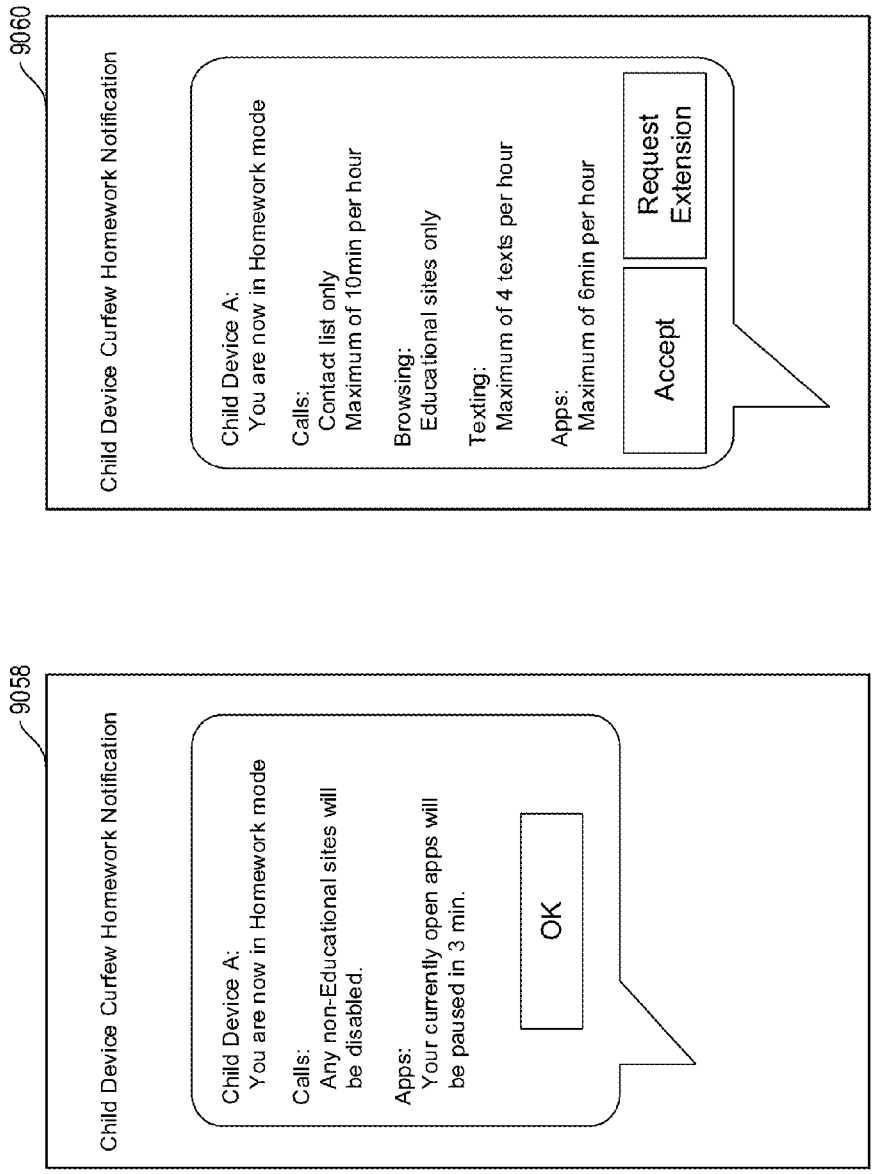
FIG. 68 illustrates a representative screen with notification information that is presented on a child device after a master user as initiated or changed a curfew mode to manage notification settings for ongoing activities in accordance with some embodiments.
FIG. 69 illustrates a representative screen with notification information that is presented on a child device after a master user has initiated or changed a curfew mode to provide a user a notification option to accept or request an extension of a real-time curfew in accordance with some embodiments.

FIG. 68 illustrates representative screen 9058, which illustrates exemplary notification information that may be presented on the child device, in accordance with some embodiments, after a master user has initiated (or changed) a curfew (e.g., a real-time curfew) mode to manage notification settings for ongoing activities. In the illustration of FIG. 68, "Child Device A: You are now in Homework mode" could represent an overview/summary notification message. In the illustration of FIG. 68, "Browsing: Any non-Educational sites will be disabled" could notify a user associated with the child device A that any ongoing browsing will be disabled (e.g., by redirecting to a particular page, such as a home page, disabling links from a current page, pausing video streaming embedded in the page, etc.). In the illustration of FIG. 68, "Your currently open apps will be paused in 3 min," could notify a user associated with the child device A that any ongoing app activity (e.g., playing a game or streaming a video) will be paused (e.g., other termination choices could be exiting, quitting, freezing the app activity).

In some embodiments, a user or device (e.g., a child or significant other, or a child device) under curfew or to be curfewed or to be offered a curfew could be given an option to accept (alternatively referred to herein as an OK, ACK, acknowledge, Yes, etc.) the notification (and alternatively or in addition accept management associated with the curfew notification) or request a change in the curfew management. In some embodiments, the request for a change in the curfew management may include requesting an extension prior to the curfew taking effect (e.g., relative to a current time or real-time enforcement). FIG. 69 illustrates representative screen 9060, which illustrates exemplary notification information that may be presented on the child device, in accordance with some embodiments, after a master user has initiated (or changed) a curfew (e.g., a real-time curfew) mode to provide a user a notification option to accept or request an extension of a real-time curfew. In some embodiments, the request for a change in the curfew management may include one or more of: declining the curfew (e.g., a significant other that will not accept a "Dinner" curfew mode to attend a work emergency); shortening or lengthening the curfew (e.g., a child that has completed homework and would like to shorten or exit a "Homework" curfew mode); or changing one or more settings of the curfew (e.g., a child that requires access to an educational app required for a homework activity if the "Homework" curfew mode restricts app usage). In some embodiments, the request for a change of a curfew could be requested (e.g., assisted by one or more of a device agent, curfew app, service provider app, settings menu) prior to the curfew taking effect. In some embodiments, the request for a change of a curfew could be requested while the curfew is active. In some embodiments, the request for a change of a curfew requested by a child device or child user is communicated to a master user or master device assisted with a notification message.

In some embodiments, a curfew service activity usage management characteristic (e.g., a limit, a maximum amount, a maximum amount per unit of time, or a percentage) comprises aggregating the usage over a plurality of devices. In some embodiments, a user under curfew interacts with more than one device (e.g., a child table and a child smartphone) and a user (e.g., a child user) is managed based on the aggregated usage (e.g., a child having a five minute limit of app usage during a "Homework curfew" will not be allowed to play five minutes on a smartphone followed by another five minutes on a tablet). In some embodiments, the aggregation of usage over more than one device may account for simultaneous usage during a curfew management. For example, if a child is allowed to have five minutes of audio streaming and five minutes of surfing during a "Homework" curfew, if the child's audio streaming partially overlaps with the child's five minutes of surfing, at least a portion of the first or second five minute allocations may be reduced or not accounted for. In some embodiments, activities are grouped (or alternatively or in addition classified, tiered, ranked, etc.) for assisting in managing a curfew. In some embodiments, a plurality of activities are grouped and a service usage management characteristic is managed for the group of activities. For example, the three service activities: apps/games, browsing and video streaming may be grouped into the category "get a break" and a limit of usage may be applied on the group (e.g., a maximum of 10 min/hr of activities from the "get a break" group during a "Homework" curfew mode, and the aggregate of apps/ games, browsing and video streaming should be limited to ten minutes of each hour—which may or may not include discounts for overlapping activities).

In some embodiments, a master curfew management communication (e.g., from a master device or based on information provided by a master user onto any device from the group) to a particular device or a device associated with a particular user (e.g., a child device or a device a child user is engaging with) originates or terminates at a device agent (e.g., an app, OS function, service processor at the master device or child device). In some embodiments, a master curfew management communication comprises at least: control information, notification information, and acknowledgement information. In some embodiments, a master curfew management assists in providing a device agent (e.g., an app) to particular device (e.g., a child device). In some embodiments, a master curfew management communication from a device to a particular device or a device associated with a particular user is communicated over a device-to-device link, such as near field communication (NFC), ad hoc Wi-Fi, Bluetooth, Zigbee, etc. In some embodiments, a master curfew management communication from a device to a particular device or a device associated with a particular user is communicated over a local area network (LAN), such as a wireless local area network (WLAN), Wi-Fi, etc. In some embodiments, a master curfew management communication from a device to a particular device or a device associated with a particular user is communicated over a wide area network (WAN), such as WWAN, cellular, etc. In some embodiments, a master curfew management communication from a device to a particular device or a device associated with a particular user is communicated over a combination of access networks (e.g., a master device communicating over Wi-Fi to a intermediate networking device communicating over a cellular network to a child wireless device). In some embodiments, a master curfew management communication from a device to a particular device or a device associated with a particular user is communicated over a limited access network (e.g., the curfew control is only allowed in a home Wi-Fi network).

Enhanced Protection

In some embodiments, a master user (alternatively or in addition denoted herein as a subscriber, a manager user, user group master, an owner or an account holder) manages (wherein manages comprises one or more of sets, defines, controls, monitors, notifies, acknowledges) a protection on at least a portion of a service plan (e.g., comprising one or more service activities, such as browsing, texting, email, video streaming, etc. or other activities associated with one or more devices and/or one or more users (or subscribers) associated with the one or more devices, such as app/games usage) for one or more other devices associated with a device group (wherein the device group may be defined by a service plan, a service account, a shared allocation group a device agent grouping, device pairing, etc.) or a user group or both a device group and user group. In some embodiments a master user manages a protection from a master device. In some embodiments, a master user manages a protection from a second device after sharing a master user credential. In some embodiments the master user manages a protection from a master device after sharing a master user credential. In some embodiments, the master user manages a protection for a device associated with the master user, for example a master device. In some embodiments, the device group has more than one master user (e.g., both parents of a family plan). In some embodiments, the protection is based on the union of the more than one master user management.

In some embodiments, the protection is based on the latest master user management. In some embodiments, the plurality of master users is grouped by a hierarchy or tiers, and the master user management is based on the hierarchy (e.g., one parent may set a protection and another parent may or may not be allowed to override it). In some embodiments, the protection is used to prevent a user of a user group (e.g., a child) from accessing inappropriate content (e.g., adult or violent content) or to prevent the user from establishing connections (e.g., phone/video conversations, exchanging texts, social networking) with inappropriate individuals.

In some embodiments, at least one of the embodiments described above associated with a curfew may be applied to a protection. In some embodiments, at least one of the embodiments described above associated with curfew management may be applied to protection management. In some embodiments, at least one of the embodiments described above associated with applying/enforcing a curfew may be applied to applying/enforcing a protection.

FIG. 70 illustrates representative screen 9062, which illustrates exemplary information that may be presented on the master device, in accordance with some embodiments, when a subscriber attempts to manage a protection setting of one or more devices and one or more users. For example, the "Master Device Protection settings" may be managed from a master device. In some embodiments, a master user may arrive at the "Master Device Protection settings" from a device agent UI. In some embodiments, a master user may arrive at the "Master Device Protection settings" from the master device settings or an application on the master device. In some embodiments, the "Master Device Protection settings" may be a website, portal, etc. In some embodiments, the "Master Device Protection settings" settings may be presented to the master device from a network element. In the illustration of FIG. 70, the settings assists in managing three devices ("Child Device A," "Child Device B," and "Manager Device C") and two users ("Child A" and "Child B"). In the illustration of FIG. 70, each device (or each user) may be managed independently (e.g., by selecting a protection setting from a dropdown menu). In the illustration of FIG. 70, the manager may select one of the following options: "None" (which may be associated with no protection), "PG 7" (shown in bold to indicate being currently selected), or "PG 12." In the illustration of FIG. 70, the current selection for "Child Device A" is "PG 7," the current selection for "Child Device B" is "PG 12" (e.g., the child device B is associated with an older child than the child associated with child device A, or child device B is a shared device in a more prominent location for a parent to monitor—such as a large TV), the current selection for "Master Device C" is "None," the current selection for "Child A" is "PG 7," the current selection for "Child B" is "PG 12" (e.g., because Child B is older than Child A and is granted permission to engage in more activities). In some embodiments, it may be more convenient for the protection manager to select a common selection for all the devices by setting "Select All Devices" (or alternatively "Select all Users"—for example, if the whole family is having or about to have dinner, a manager may select "Dinner" in the "Select All Devices" drop down). In some embodiments, a master user selection may take place real-time (or alternatively in near-real-time or quasi real-time). In some embodiments, real-time includes the actions associated with the master user management taking effect within a few minutes of being set by the master user. In some embodiments, real-time includes the actions associated with the master user management taking effect in less than a minute after being set by the master user. In some embodiments, real-time includes the actions associated with the master user management taking effect in less than a few seconds after being set by the master user. In some embodiments, the master user selection takes place in real-time after the master user selects the "OK" button (e.g., through a touch screen, or a voice command). In some embodiments, alternatives to selecting the "OK" could include one or more of: "On," "Accept," "Yes," "Start," "Protect," "Protect Now," "Protect Start," "Monitor," "Control Now."

In some embodiments, the "Master Device Protection settings" menu (or alternatively presentation, display, screen, window, or portal, etc.) may be used by a master user to check the protection status of one or more devices or one or more users. In some embodiments, the "Master Device Protection settings" presentation (or alternatively display, screen, window, or portal, etc.) may be used by a master user to change a previously selected protection status of one or more devices (or one or more users). In some embodiments, the "Master Device Protection settings" presentation (or alternatively display, screen, window, or portal, etc.) may be used by a master user to end the protection status of one or more devices or one or more users (e.g., by changing "Child Device A" or "Child A" from "PG 7" to "PG 12" and selecting "OK").

Figures 71, 72:
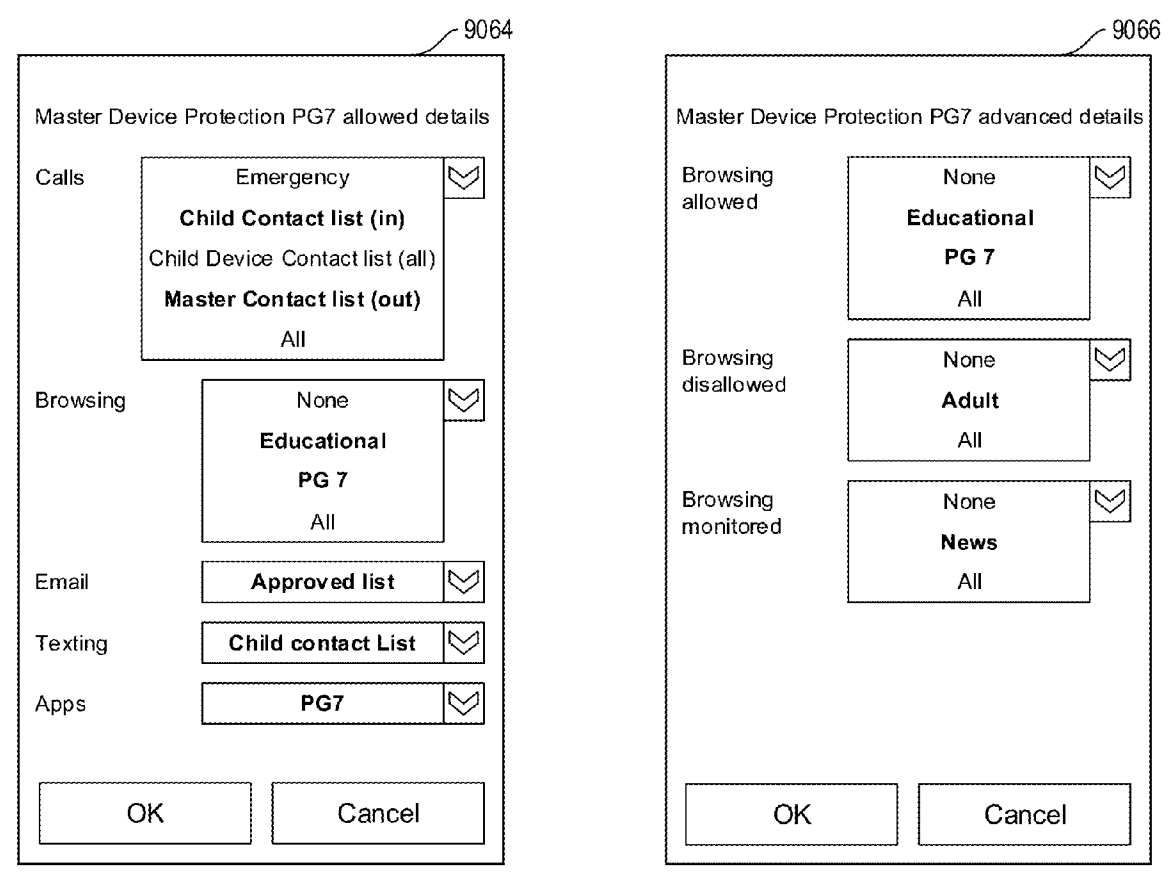

FIG. 71 illustrates representative screen 9064, which illustrates exemplary information that may be presented on the master device, in accordance with some embodiments, when a subscriber attempts to manage the protection "PG 7" selection. In some embodiments, the protection "PG 7" selection is pre-configured. In some embodiments, the protection "PG 7" selection is pre-configured by a device agent. In some embodiments, the protection "PG 7" selection is pre-configured by a network element. In some embodiments, the protection "PG 7" selection is pre-configured by a third-party provider of the protection service. In some embodiments, the protection "PG 7" selection may be modified or customized by a master user. In some embodiments, the protection "PG 7" selection may be modified or customized by a master user on a master device. In some embodiments, the protection "PG 7" selection may be modified or customized by a master user on a second device (e.g., a child device—for example, after presenting master credentials).

In the illustration of FIG. 71, the service activities restrictions associated with the protection "PG 7" selection allow the recipient to receive calls from numbers in the child contact list (e.g., the child's friends) and make calls based on the master contact list (e.g., to call the parents/family or the master user/device) as illustrated by "Calls" set to "Child Contact list (in)" and "Master Contact list (out)," activity "Browsing" of both "Educational" and/or "PG 7" is allowed (e.g., could be an "and" or an "or" of these two elements), activity "Email" is allowed for an "Approved list" (e.g., could be a list defined by the master user), the activity "Texting" is allowed for a "Child contact List" (e.g., the same list as the phone calls), and activity "Apps" is permitted for "PG 7" rated apps. In some embodiments, additional activities may be listed or some activities may not be listed for protection management. In some embodiments, the master user can modify or customize only a subset of the activities (e.g., a master user may not be allowed to prevent an emergency communication such as a 911 call) associated with a protection selection (e.g., a master user may not be allowed to set calls to "None"). In some embodiments, the pre-configured selections or master user modifications may be different for in-bound or out-bound communications (e.g., allow the device to send texts, but not to receive texts).

In some embodiments, the modifications to a preset protection take into effect after the "OK" input is selected. In some embodiments the modifications to a preset protection take into effect in real-time after the "OK" input is selected. In some embodiments, the "OK" selection could be alternatively or in addition represented by an equivalent term, such as one or more of: "Accept," "Yes," "Agreed," etc. In some embodiments, the preset modifications could remain unchanged by selecting the "Cancel" input (or some other equivalent message, such as "NO" or "Reject," "OFF." In some embodiments, the device can be modified back to it original settings with a "Reset" selection.

In some embodiments, a protection management (e.g., a state or mode) could be based on time events, such as a start time, end time, or duration (e.g., similar to FIG. 55 but applied to protection). In some embodiments, a protection management could control a subset of users or devices and apply a common state (e.g., similar to FIG. 56 or FIG. 58 but applied to protection). In some embodiments, a protection management could include management of ongoing activities assisted by a termination policy (e.g., similar to FIG. 63 but applied to protection). In some embodiments, a protection management comprises setting a custom protection setup (or alternatively called profiles) (e.g., similar to FIG. 64 but applied to protection). In some embodiments, the protection management comprises settings based on a location (e.g., home, work, school, park, road), a change of location (e.g., location trace or velocity/speed), a time (e.g., a time of day, day of week), a device state (e.g., in standby, active, phone/data use, hands free, modems in use, etc.), network state/type (home, roaming, cellular/Wi-Fi); for example similar to FIG. 65 but applied to protection. In some embodiments, the protection management comprises a notification (e.g., a notification generated by a master device or selected/defined/customized by a master user) by a master user and presented at a protected user device (e.g., at a child device being used by a child); for example similar to FIG. 66, FIG. 67 and FIG. 68 but applied to protection. In some embodiments, a user being protected may respond to a master user protection notification by one or more of accepting, rejecting, requesting an extension/delay, requesting an exception, etc.; for example, similar to FIG. 69 but applied to protection embodiments.

In some embodiments, a protection management comprises allowed (or alternatively or equivalently called whitelisted) activities and/or disallowed (or alternatively or equivalently called blacklisted or blocked) activities. In some embodiments, a protection management comprises monitored activities.

In some embodiments, a protection management comprises detecting an activity (e.g., a disallowed or monitored activity) and recording at least a portion of the activity. In some embodiments, information associated with the at least a portion of the activity is communicated with a master user (e.g., over a master device, website, portal, etc.). In some embodiments, at least a portion of a call, a text, a website, a streaming audio/video, social networking update is shared by a child device (e.g., a child based activity) to a master user (e.g., via a master device). In some embodiments, the master user may receive one or more of an email, a text, an audio/video stream, or a push notification containing information associated with the child device activity.

FIG. 72 illustrates representative screen 9066, which illustrates exemplary information that may be presented on the master device, in accordance with some embodiments, when a subscriber attempts to manage (e.g., advanced details or fine granularity management) the protection of a "Browsing" activity within the "PG 7" selection. In the illustration of FIG. 72, the "Browsing" activity comprises allowed, disallowed, and monitored activities. For example, "Browsing allowed" allows "Educational" and/or "PG 7" content, "Browsing disallowed" blocks "Adult" content, and "Browsing monitored" may monitor "News" websites. For example, a master user (e.g., on a master device) protection management may allow a child to access "News" websites on a child device, but would receive information associated with news websites being accessed (e.g., by receiving occasional, frequent, periodic, real-time, or event-trigger-based screen shots, or URL or domain names, etc.). In some embodiments, a call/text associated with a monitored cell/text list is stored (e.g., on the child device or a network element) and is shared with the master user (e.g., on master device, website, or portal). Similarly audio/video streaming, apps/games may store at least a portion of the activity and share the stored activity with the master user. In some embodiments, the at least a portion of the activity is shared with the master user over a secure channel (e.g., encrypted). In some embodiments, the at least a portion of the activity is compressed into local or network storage prior to sharing with the master user.

In some embodiments, the protection device group is based on a service account (e.g., a wireless access account, family share account, a shared usage allocation account, a SMB account, an enterprise account, etc.). In some embodiments, the protection device group is based on a service plan (e.g., a wireless operator, service provider, mobile wireless operator, MVNO, etc.). In some embodiments, the protection device group is based on an access network (e.g., the devices associated with a home WLAN). In some embodiments, a protection device group is based on two or more of: a service account, service plan, or access network. In some embodiments, a protection device group is based on a device agent on the device group. For example, the device agent could be an application installed on each device in the device group (e.g., with a special credential assigned to the device group) and optionally at least one of the devices has additional capabilities based on the app that allows it to be the protection manager. In some embodiments, a first device of the protection device group is part of a first service account (or a first service plan, or a first mobile operator, or a first service provider) and a second device of the protection device group is part of a second service account (or a second service plan, a second mobile operator, or a second service provider). In some embodiments, a first device of the protection device group is part of a first service account (or a first service plan, or a first mobile operator, or a first service provider) and a second device of the protection device group is part of a second service account (or a second service plan, a second mobile operator, or a second service provider) and device 100A and device 100B are associated with a device group based on a device agent (e.g., an app) or a website, portal, or a third-party device group provider (e.g., not associated with the mobile operator or wireless service provider).

In some embodiments, the protection user group is based on a service account (e.g., a wireless access account, family share account, a shared usage allocation account, a SMB account, an enterprise account, etc.). In some embodiments, the protection user group is based on a service plan (e.g., a wireless operator, service provider, mobile wireless operator, MVNO, etc.). In some embodiments, the protection user group is based on an access network (e.g., the users interacting with devices communicating with a home WLAN). In some embodiments, a protection user group is based on two or more of: a service account, service plan, or access network. In some embodiments, protection user group is based on a device agent on the device group. For example, the device agent could be an app installed on the device that is configured to obtain a user credential associated with the device group (e.g., with a special credential assigned to the user group) and optionally at least one of the users has additional capabilities based on the user credential that allows him/her to be the protection manager.

In some embodiments, a protection group comprises a combination of one or more devices and one or more users (e.g., a protection group may comprise a master device, two child devices, a master user, and a child user).

In some embodiments, protection management and/or enforcement (e.g., a protection control policy) is implemented (or is assisted by) at least in part by one or more network elements or a network system (e.g., a service controller or a DPI server inspecting data communications associated with a device under protection). In some embodiments, protection management (e.g., a protection control policy) is implemented (or is assisted by) at least in part by a device under protection (e.g., one or more device agents such as an OS function, service processor, or an app). In some embodiments, protection management (e.g., a protection control policy) is implemented (or is assisted by) at least in part by one or more network elements and at least in part by a device under protection.

In some embodiments, a master protection management communication (e.g., from a master device or based on information provided by a master user onto any device from the group) to a particular device or a device associated with a particular user (e.g., a child device or a device a child user is using) originates or terminates at a device agent (e.g., an app or OS function, service processor at the master device or child device). In some embodiments, a master protection management communication comprises at least control information, notification information, and acknowledgement information. In some embodiments, a master protection management assists in providing a device agent (e.g., an app) to a particular device (e.g., a child device). In some embodiments, a master protection management communication from a device to a particular device or a device associated with a particular user is communicated over a device-to-device link, such as a near field communication (NFC), ad hoc Wi-Fi, Bluetooth, Zigbee, etc. In some embodiments, a master protection management communication from a device to a particular device or a device associated with a particular user is communicated over a LAN, such as, WLAN, Wi-Fi, etc. In some embodiments, a master protection management communication from a device to a particular device or a device associated with a particular user is communicated over a WAN, such as, WWAN, cellular, etc. In some embodiments, a master protection management communication from a device to a particular device or a device associated with a particular user is communicated over a combination of access networks (e.g., a master device communicating over Wi-Fi to a intermediate networking device communicating over a cellular network to a child wireless device). In some embodiments, a master protection management communication from a device to a particular device or a device associated with a particular user is communicated over a limited access network (e.g., the protection control is only allowed in a home Wi-Fi network).

In some embodiments, the actions illustrated in one or more of FIGS. 54 through 72 are achieved through one or more user interfaces (e.g., voice commands or a combination of voice commands and text input, or a touch screen).

Device Group Management and Service Activity Control

In some embodiments, a device group manager (or alternatively, a "master" user, an administrator, a service account owner, a service account manager, a user/subscriber having administrative privileges, a user group manager, a "parent" for a "family" plan, a corporate IT manager for a corporate account, a service provider administrator) manages (defines, controls, administrates, etc.) a set of one or more service activity controls (e.g., restrictions, curfews) that apply to an individual device, a device group, a subset of a device group, a set of related devices, or a set of unrelated devices. In some embodiments, the service activity controls apply to any service activity, to a specific set of service activities, or to a single service activity for a device to which the service plan controls are administered. In some embodiments, service activity controls are referred to as service controls, device controls, service permissions, device permissions, curfews, service limits, service restrictions, or other equivalent terms. In some embodiments, permissions for a device or a user refers to properties for administrative control for which the device is configured or the user is assigned, and restrictions for a device or a user refer to specific service activity controls that restrict use or access of one or more service activities on the device or for the user when using a device. In some embodiments, the device group manager creates the set of one or more service activity controls to apply to any device within a device group (or other set of devices). In some embodiments, through a service design/management system, the device group manager configures properties of the service activity control. In some embodiments, the device group manager configures the service activity control through a user interface of a device belonging to the device group. In some embodiments, the device group manager configures the service activity control through an application on the device connected to an application server/portal located in a network system. In some embodiments, the device group manager configures the service activity control through a web-based interface to a web server communicatively coupled to (or part of) a network system. In some embodiments, the device group manager configures the service activity control using one or more operating system (OS) components resident on a device. In some embodiments, the device group manager configures service activity controls through a "master" device (or through any device while "logged in" as a "master" user to the device). In some embodiments, the device group manager configures service activity controls through a computing device separate from the device group, e.g., a personal computer, a tablet, a laptop, a terminal, etc.

In some embodiments, service activity control configurations are stored in a network-based service design/management system, in one or more devices of the device group, or in a combination of a network-based service design/management system and one or more devices of the device group. In some embodiments, service activity controls configured by the device group manager are stored in the network-based service design/management system and "pushed" or "pulled" to individual devices in the device group. In some embodiments, service activity controls configured by the device group manager are stored in the "master" device and "pushed" or "pulled" to other devices in the device group from the "master" device, either directly device-to-device, or indirectly through one or more network elements communicatively coupled between the "master" device and the "other" device. In some embodiments, service activity controls are configured by a first device group manager for a first device group and shared with a second device group manager for a second device group. In some embodiments, a service design/management system catalogs a set of pre-configured service activity controls. In some embodiments, the service design/management system adds "user configured" service activity controls to the catalog of service activity controls, e.g., with permission (or in some embodiments without permission) of the device group manager that configured the service activity control. In some embodiments, through one or more UI screens on a device, the device group manager selects, configures, customizes, and applies service activity controls to one or more devices. In some embodiments, the service design/management system provides all or part of information for the one or more UI screens. In some embodiments, the service design/management system provides information for UI screens that include a fully pre-configured service activity control, a partially pre-configured service activity control, or a "shell" for a fully customizable service activity control. In some embodiments, a set of pre-configured service activity controls are presented to the device group manager (e.g., through one or more UIs) organized according to properties of what is controlled, when the controls apply, alphabetically, according to a service type, or according to another "categorization" of service activity control. In some embodiments, the device group manager selects one or more "named" pre-configured service activity controls from a menu, list, drop down, array or other presentation of labels for the pre-configured service activity control catalog and applies the selected service activity controls to one or more devices.

In some embodiments, a device group manager, a network management system, and/or specific software/hardware elements on a device monitors and verifies integrity of software components (e.g., operating system elements, applications, etc.) for a device of a device group. In some embodiments, integrity of software and/or hardware settings for a device is checked, e.g., to determine whether one or more elements of the software and/or hardware settings have been tampered with (hacked into, corrupted, or otherwise altered outside of permissions allowed for the device). In some embodiments, a "time" setting for a device is verified against a reference time (e.g., a network-based time) to verify that time settings for the device are intact and correct. By verifying settings, the device group manager and/or service management system ensures (at least in part) that service activity controls that include time-based restrictions are properly applied for the device. In some embodiments, one or more device settings are overridden by the device group manager or the service management system to apply "correct" settings that correspond to service activity controls applied to the device. In some embodiments, service activity controls for applications are verified by the device group manager, the service management system, and/or by software/hardware elements on the device. In some embodiments, one or more application names and/or "security" certificates for applications are verified against a reference list, set, or file (on the device, in the network, or in a combination thereof). In some embodiments, applications stored on a device (or in network-based storage, e.g., an application store or a cloud server) to which service activity controls apply are periodically verified. In some embodiments, one or operating system components are checked to verify that the operating system components have not been tampered with. In some embodiments, a service processor on a device is checked to verify integrity of the service processor. In some embodiments, service policies (or portions thereof) stored on a device are verified. In some embodiments, the device group manager is provided access to device hardware/software integrity information. In some embodiments, the device group manager is alerted when integrity verification fails for one or more software and/or hardware elements of a device in the device group. In some embodiments, a network system administrator is notified when hardware and/or software integrity verification fails for a device. In some embodiments, one or more device agents in the device verifies integrity of one or more applications or operating system components, e.g., using credentials and/or security certificates. In some embodiments, tampering of an operating system component is detected, and an indication of tampering is provided to a device user, a device manager, a device administrator, a device group manager or other entity. In some embodiments, a device is disabled when tampering is detected. In some embodiments, a notification is provided to a device group manager indicating tampering of software/hardware of the device, and the device group manager selects actions to take. In some embodiments, the device group manager selects to restrict use of the device in response to the detection of tampering.

In some embodiments, a device group manager sets one or more notification alert limits for one or more devices in a device group. In some embodiments, the device group manager receives notification alerts according to limits set by the device group manager and/or limits automatically configured for a service activity, and/or limits set by a user of a device in the device group. In some embodiments, the device group manager sets limits for notifications that are presented to the device group manager and/or to a user of a device for a device in the device group. In some embodiments, a notification includes information about service usage for a particular service activity or set of service activities, e.g., for service usage of a particular service type according to a service plan. In some embodiments, service usage limits are based on specific service usage amounts or percentages used during a subscription time period, e.g., a recurring allocation for a service plan pre-paid or post-paid for a regular time period. In some embodiments, service usage limits are based on specific service usage amounts or percentages remaining for an allocation during a subscription time period. In some embodiments, the device group manager receives notifications according to service usage limits for an individual device, for a set of devices, and/or for all devices in a device group. In some embodiments, an individual service usage triggers a notification alert to a user of a device and/or to the device group manager. In some embodiments, an aggregated service usage (e.g., for one or more devices in a device group) triggers a notification alert to a user of a device, to a subset of devices in a device group, to all devices in a device group, and/or to the device group manager. In some embodiments, a notification alert provided to the device group manager includes an option to provide additional service usage allocation to a device, a set of devices, or the entire device group. In some embodiments, a notification alert provided to a user of a device includes an option to request additional service usage allocation for the device. In some embodiments, the request for additional service usage allocation from the user of the device is provided to the device group manager. In some embodiments, the device group manager approves or denies the request for additional service usage allocation to the requesting device/user. In some embodiments, the device group manager approves a different service usage amount from an amount requested by the requesting device/user.

In some embodiments, a device group manager sets a service activity control that restricts use of one or more particular applications or application types on a device. In some embodiments, an application is restricted by blocking communication of the application to and/or from a network, e.g., a browser application can be "not connected" to the network, even though a network can be available for communication to/from the device, e.g., for another "allowed" application. In some embodiments, a service activity control restricts an application by blocking use of the application on a device, e.g., an application can be restricted from launching and operating on the device. In some embodiments, a service activity control restricts download and/or upload of information for an application from a network. In some embodiments, a service activity control restricts download of one or more applications. In some embodiments, a restricted (limited) use of an application is allowed by a service activity control. In some embodiments, a service activity control restricts a service activity (e.g., use of an application) based on a particular time, e.g., always, during a specific time period (day, date, time of day, type of day, etc.) In some embodiments, a service activity control restricts use of, connections for, download of, or other uses of an application during a time period specified by a device group manager for a device, a group of devices, of an entire device group.

In some embodiments, a device group manager, e.g., through use of a "master" device in cooperation with a network-based server, determines one or more applications to which a service activity control applies. In some embodiments, the device group manager selects applications to which to apply service activity controls from a listing or by searching for one or more applications in an application store database, e.g., on a network-based server. In some embodiments, the device group manager identifies applications for service activity control by reviewing a "backup" copy of applications for one or more devices of a device group stored in a "cloud" based server. In some embodiments, the device group manager selects applications to which to apply service activity controls by obtaining a listing or search results for applications downloaded to and/or resident on a device of a device group. In some embodiments, the device group manager verifies credentials for applications of a device of a device group. In some embodiments, the device group manager verifies integrity of software/hardware elements of a device in a device group. In some embodiments, application restrictions are applied to "unverified" and/or "unverifiable" applications of a device in a device group. In some embodiments, only "verified" applications (or specified "verified" applications) are allowed and other applications for a device in a device group are blocked and/or otherwise restricted by one or more service activity controls defined by the device group manager. In some embodiments, a device group manager obtains information on verification of credentials for one or more devices in a device group. In some embodiments, when credentials for a device in a device group are not verified or verifiable, one or more service activity controls are applied to the device. In some embodiments, the device group manager obtains information on software/hardware integrity of software/hardware for one or more devices in a device group. In some embodiments, when the integrity of software/hardware of a device in device group indicates compromise, or otherwise when the device integrity is not confirmed, one or more service activity controls are applied to the device in the device group.

In some embodiments, the device group manager, through a master device, or logged as a "master" user to a device, or through an interface to a service management system (e.g., a website, application portal, or service management server), is presented information for applications available in an application store. In some embodiments, the device group manager selects a set of applications from the application store to which service activity controls for one or more devices in a device group are applied. In some embodiments, the device group manager accesses an application store, searches for one or more applications or sets of applications, and obtains a list of applications downloaded, accessed, or otherwise associated with one or more devices in a device group. In some embodiments, a set of applications are automatically populated in an interface screen presented to the device group manager, e.g., based on association with the device group or based on one or more search terms entered by the device group manager. In some embodiments, the device group manager accesses information for a set of applications downloaded to, resident on, or accessible from a device in the device group. In some embodiments, the device group manager obtains one or more security certificates (or other secure forms of verification) for the one or more applications of the device in the device group. In some embodiments, the device group manager obtains the security certificates for the applications from an application store (or other network-based server) and compares the network security certificates to security certificates for the applications resident on (and/or obtained from) the device in the device group. In some embodiments, the device group manager verifies an application's identity and failing verification applies service activity controls to the application. In some embodiments, the device group manager selects an application from a menu (e.g., based on information obtained from an application store), obtains an application security certificate from the application store, and sends the application security certificate to a device in the device group (directly from the application store, or indirectly from the application store to a device used by the device group manager and then to the device in the device group). In some embodiments, the device group manager obtains verification of the application from the device in the device group based on use of the obtained security certificate. In some embodiments, verification is performed by the device in the device group, by a device used by the device group manager, by a network-based verification system, or by a combination of these.

In some embodiments, the device group manager, through a master device, or logged as a "master" user to a device, or through an interface to a service management system (e.g., a website, application portal, or service management server), is presented information for applications of another device (e.g., a "secondary/child" device) in the device group. In some embodiments, the device group manager obtains information on certificates for applications from the secondary device, from a "primary" device of the device group, or from a network-based service management system (or other network-based server/database). In some embodiments, a set of applications for a secondary device is presented through a user interface to the device group manager, e.g., on a "primary" device or through another computing device connected to a device service management system. In some embodiments, the set of applications presented represent a set of available applications to download/install. In some embodiments, the set of applications presented represent a set of downloaded and/or installed applications for the secondary device. In some embodiments, the set of applications are presented with display options to enable or disable the applications for use on and/or download to and/or restrictions applied to the secondary device. In some embodiments, the device group manager applies service activity controls to one or more applications in the set of applications presented through a user interface of a master device (or device on which the device group manager is "logged in.") In some embodiments, a set of "pre-selections" for service activity control of the applications is presented to the device group manager. In some embodiments, the set of "pre-selections" include particular service activity control settings to apply to one or more applications of the secondary device. In some embodiments, the set of "pre-selections" include a subset of the applications of the secondary device to which to apply one or more service activity controls. In some embodiments, an allowed/enabled/white list of applications is presented to the device group manager. In some embodiments, the device group manager creates an allowed/enabled/white list of applications for the secondary device. In some embodiments, the device group manager from a device service management system obtains recommendations for service activity controls of applications. In some embodiments, the device group manager applies all or part of the obtained recommendations for service activity controls to one or more applications of the secondary device. In some embodiments, the device group manager maintains control of a master white list for all devices in a device group. In some embodiments, the device group manager maintains individual white lists for applications for each device in a device group. In some embodiments, the device group manager transfers a white list from one device in the device group to another device in the device group. In some embodiments, the device group manager obtains recommended white lists (e.g., based on age groups or other categorizations) for users of secondary devices in the device group. In some embodiments, the device group manager enforces service activity controls for applications on secondary devices by applying a white list (e.g., selected from the recommended white lists) to one or more secondary devices in the device group. In some embodiments, only applications on a white list are allowed/enabled on a secondary device and other applications are restricted/disabled on the secondary device. In some embodiments, applications on a white list are always allowed/enabled irrespective of service activity controls applied to applications or otherwise applied on the secondary device. In some embodiments, the device group manager obtains a list of applications resident on, downloaded to, accessible to, or otherwise operable on one or more devices in the device group, e.g., on the master device, on a secondary device, on any device other than the master device, on any device with service management responsibilities for the device group, on a set of secondary devices in a device group. In some embodiments, the device group manager obtains information for applications, service activity controls, and/or white lists for the set of devices in a device group. In some embodiments, the device group manager defines an application group (a set of applications selected from those available to, resident on or otherwise operable on one or more devices of a device group). In some embodiments, the device group manager defines a service activity control for the application group. In some embodiments, the service activity control for the application group applies to one or more specific applications in the application group. In some embodiments, the service activity control applies to one or more devices in the device group that can use or attempt to one or more of the applications in the application group. In some embodiments, the service activity control is automatically applied to an application of an application group for any device (or for a specified set of devices) of a device group. In some embodiments, the device group manager defines an application group and a service activity control for applications of the application group. In some embodiments, the device group manager applies the service activity control to devices in the device group, and applications of the application group resident on the devices automatically are associated with the service activity control. In some embodiments, an application of the application group has a service activity control automatically applied when downloaded to a device in the device group. In some embodiments, one or more aspects of a service activity control apply to all applications in an application group and one or more additional aspects of the service activity control apply individually to different applications in an application group. In some embodiments, one or more aspects of a service activity control apply to all devices in a device group and one or more additional aspects of the service activity control apply individually to different devices in the device group.

In some embodiments, the device group manager applies a service activity control to disallow downloading of an application (or application group) from an application store for a device, a set of devices or an entire device group. In some embodiments, the device group manager applies a service activity control to restrict permissions to download one or more applications from an application store to one or more devices of a device group. In some embodiments, the application store maintains information about devices in a device group and permissions to download or otherwise access applications of the application store. In some embodiments, only a subset of applications available in an application store are presented to a secondary device in a device group, the subset of applications presented determined at least in part by a service activity control and/or by an application group defined by a device group manager. In some embodiments, the application store determines permission to display, download, and/or access an application to a secondary device based on information supplied from a device group manager. In some embodiments, the application store determines permission to display, download, and/or access one or more applications to a secondary device based on one or more policies, security certificates, credentials, security keys, or other secure information provided by the secondary device to the application store. In some embodiments, the application store requires presentation of a security certificate and/or a secure "log in" identity (or other permission information) from a user of a secondary device in order to display, download or access one or more applications of the application store. In some embodiments, a service activity control on the secondary device restricts the secondary device from downloading one or more applications. In some embodiments, the secondary device is restricted to downloading, launching, use of applications to a specific white list of applications provided by the device group manager. In some embodiments, the secondary device is restricted based on a service activity control that allows or disallows installing, launching and/or particular use of one or more applications based on particular restrictions defined by the device group manager for a device group to which the secondary device belongs. In some embodiments, software/hardware on the secondary device disallows or allows downloading, installation, launching and/or execution of applications based on one or more security certificates, security keys, application lists, a secure code, a hash signature, or other secure means. In some embodiments, a service activity control and/or integrity verification software/hardware on a device restricts execution of an application for a specific time period, for a recurring time period, for an indefinite time period (approximately now until otherwise changed), for a future time period, for specific days of the week, for specific types of days, for specific dates, or for combinations of these. In some embodiments, a service activity control restricts a network connection for one or more applications of a device. In some embodiments, network connection restrictions are implemented on the device. In some embodiments, network connection restrictions are implemented in one or more network elements. In some embodiments, network connection restrictions are implemented in a combination of software/hardware elements on the device and in one or more network elements. In some embodiments, a service activity control allows or disallows use of a device in its entirety. In some embodiments, a service activity control allows or disallows a subset of capabilities of a device. In some embodiments, time-based restrictions are combined with application-based restrictions on a device of a device group. In some embodiments, the device group manager defines one or more service activity controls as a combination of time-based restrictions and/or application-based restrictions directly through a user interface of a "master" device and/or through an interface to a network-based service management system.

In some embodiments, a device group manager defines and/or obtains one or more service activity controls, e.g., through an interface of a device and/or through an interface to a service management system, for a device group. In some embodiments, the device group manager defines or modifies properties of the one or more service activity controls, e.g., to what activity the service activity control applies, when the service activity control applies, to what extent the service activity control applies, etc. In some embodiments, the device group manager selects from a set of service activity controls and a set of devices in a device group to determine which service activity controls apply to which devices in the device group. In some embodiments, the device group manager associates one or more devices of the device group with one or more specific service activity controls. In some embodiments, through a user interface, the device group manager selects from a display of devices and service activity controls and associates specific service activity controls with specific devices of the device group. In some embodiments, the device group manager selects a specific device, a subset of devices, or all devices of a device group to which one or more service activity controls apply. In some embodiments, the device group manager defines a new device group (or a subset thereof) to which to apply service activity controls. In some embodiments, the device group manager applies service activity controls to an already defined device group (or to a subset thereof). In some embodiments, through the user interface, the device group manager obtains a display of devices of a device group, a set of service activity controls, and/or a set of service plans applicable for the devices of the device group. In some embodiments, the device group manager is presented selection buttons to apply a specific service activity control to a device group, a device, or a subset of devices of a device group. In some embodiments, the device group manager is presented selected buttons to apply a set of specific service activity controls to the device group, the device, or to the subset of devices of the device group. In some embodiments, the devices of a device group and a set of service activity controls are presented in a matrix, a table, a set of drop down menus, a spreadsheet, a listing, or an otherwise navigable grouping. In some embodiments, the device group manager is presented a set of devices, e.g., listed in a heading column or row and a set of service activity controls, e.g., listed in a corresponding heading row or column for a matrix/table. In some embodiments, the device group manager selects to enable or disable application of a particular service activity control to a particular device by selecting a button in a matrix/table element that represents the intersection of the particular service activity control with the particular device. In some embodiments, a set of devices for a device group and a set of service plans applicable to the devices in the device group are presented in a table/matrix format, and the device group manager selects whether to apply one or more service activity controls to particular combinations of service plans and devices in the device group. In some embodiments, the device group manager applies service activity controls to a particular service plan, a set of service plans, or to all service plans for a particular device. In some embodiments, the device group manager applies a particular service activity control to a particular device, a set of devices, or to all devices in a device group (the particular service activity control includes, in some embodiments, to which service plans the particular service activity control applies). In some embodiments, the device group manager is presented a set of service activity controls and a set of service plans for a particular device in the device group. In some embodiments, the device group manager associates particular service activity controls with particular service plans by selecting buttons (or other equivalent user interface constructs) for the particular device. In some embodiments, the device group manager obtains information for a set of service plans operable on (and/or available to operate on) a particular device. In some embodiments, the device group manager applies service activity controls to service plans for particular devices after the service plan is associated with the particular device. (In some embodiments, the service plan is a shared service plan associated with multiple devices in a device group.) In some embodiments, the device group manager applies service activity controls to service plans before the service plan is associated with the particular device, e.g., through a service management system, and/or for a set of service plans associated with at least one device in the device group, and/or for a set of service plans associated with a "master" device (and/or "master" user) of the device group. In some embodiments, the device group manager assigns service plan controls for different types of devices in a device group (e.g., service plan controls vary for different devices depending on where a device sits in a hierarchy of service control for a device group.) In some embodiments, a parent/master/primary device/user (or a set of parent/master/primary devices/users) for a device group is associated with a first set of service activity controls, and a child/slave/secondary device/user (or set of child/slave/secondary devices/users) is associated with a second set of service activity controls. In some embodiments, a "new" or "added" primary device/user inherits the first set of service activity controls, while a "new" or "added" secondary device/user inherits the second set of service activity controls automatically when added to the device group.

In some embodiments, a catalog or library of service activity controls is maintained by and/or accessible to a device group manager in the master device, in local storage associated with the master device, in network storage, or in a service management system. In some embodiments, a device group manager defines a second service activity control by selecting a first service activity control from the catalog of service activity controls, modifying one or more properties of the first service activity control, naming the modified first service activity control as the second service activity control, and saving the second service activity control to the catalog/library of service activity controls. In some embodiments, a service activity control is a "named" object resident on a device in a device group. In some embodiments, the service activity control is enabled or disabled for a particular device in the device group. In some embodiments, the service activity control is associated with a user of a user group and transfers to a device in use by the user. In some embodiments, one or more service activity controls defined for a device or set of devices in a device group is applied to another device or set of devices in the device group. In some embodiments, a network-based service management system or device-based service management application provides one or more templates for service activity control definition and management. In some embodiments, service activity control templates are provided to the device group manager, e.g., for particular time periods with pre-defined properties. In some embodiments, the device group manager subsequently modifies/adjusts properties of the service activity control template to create a new service activity control for the device group.

In some embodiments, the device group manager is presented a set of devices, e.g., in a list, drop down menu, array, matrix, table, or other navigable set, with which to associate one or more service activity controls. In some embodiments, the device group manager selects a device to which to apply, define, or associate one or more service activity controls. In some embodiments, the device is represented through a user interface as a selectable object (e.g., a button) and by selecting the device, the device group manager is presented a list of service activity controls to apply, define, or associate with the device. In some embodiments, the device group is presented a set of service activity controls, e.g., in a list, drop down menu, array, matrix, table, or other navigable set, with which to associate one or more devices in a device group. In some embodiments, the device group manager selects a service activity control to which to apply, define, or associate with a device in a device group. In some embodiments, the service activity control is represented through a user interface as a selectable object (e.g., a button) and by selecting the service activity control, the device group manager is presented a list of devices in the device group with which to apply, define, or associate the service activity control. In some embodiments, a set of devices of a device group and a set of service activity controls are presented in a table with selectable objects to associate one or more particular service activity controls with one or more devices of the device group.

In some embodiments, the device group manager obtains a set of pre-defined service activity controls with properties for when the service activity control applies (time period based) and what the service activity controls (application, service activity, service type based). In some embodiments, a service activity control includes restrictions/limits on when the service activity is allowed/blocked, what service activities are allowed/blocked, an amount of allowed service usage associated with particular service activities, or a combination of these properties. In some embodiments, the device group manager associates service activity controls listed through a user interface to various devices in a device group, e.g., by selecting/checking devices of the device group to which each/one/several/all of the service activity controls applies. In some embodiments, a list of devices is presented through a user interface to the device group manager in combination with a list of service activity controls and a set of "checked" boxes/buttons that indicate which service activity controls apply to which devices of a device group. In some embodiments, the device group manager selects a box/button to enable/disable to particular service activity control association with a particular device of a device group. In some embodiments, the device group manager selects a particular service activity control, which highlights or otherwise indicates a list of devices of a device group to which the service activity control applies or may be applied. In some embodiments, all devices, or a pre-defined subset of devices of a device group, are associated with a service activity control based on a single button/box selection (one-click association). In some embodiments, the device group manager selects a service activity control and then selects each device to which to apply the service activity control. In some embodiments, the device group manager selects a device and then selects one or more service activity controls to associate with the device.

In some embodiments, user interface constructs, as described herein and in other applications incorporated by reference herein, for associating service activity controls with devices of a device group also apply to associating service plans with devices of a device group, e.g., assigning and or sharing service plans between one or more devices in a device group. In some embodiments, the device group manager selects an association of a device in a device group with a service plan in order to share/assign the service plan with the device. In some embodiments, a set of devices in the device group and a set of service plans are presented through a user interface (on a device or through a separate computing device/terminal) to the device group manager. In some embodiments, the device group manager selects a particular service plan and then selects a set of devices of a device group with which to share/assign the particular service plan. In some embodiments, relationships of devices in a device group and service plans for a device group are represented by a matrix, table, or other navigable array through a user interface to the device group manager. In some embodiments, information on service activity controls for service plans are also represented on the same display. In some embodiments, service usage allocations for a service plan are represented on the display. In some embodiments, service usage allocation sharing/assignments to different devices of a device group (e.g., for a "shared" service plan having an aggregate total allocation of service usage for the device group) for a particular service plan is displayed. In some embodiments, the device group manager re-allocates service usage allocations for one or more service plans through a user interface.

In some embodiments, a secondary device in a device group requests an allocation (or generically to "share") a particular service plan. In some embodiments, the device group manager receives a notification of the request from the secondary device (directly device-to-device or indirectly device-to-network element-to device). In some embodiments, the device group manager approves a request for sharing a service plan with the secondary device. In some embodiments, the device group manager approves service plan sharing through a master device, while logged in as a master user on a device, or through a service management system. In some embodiments, the device group manager receives or otherwise obtains a notification that indicates a request from the secondary device to share the particular service plan. In some embodiments, the notification includes an option to approve and/or an option to disapprove sharing the service plan with the secondary device. In some embodiments, the notification includes an option to modify the request to share the service plan with the secondary device. In some embodiments, the notification includes an option to approve select aspects of the request to share a service plan with the secondary device. In some embodiments, the secondary device requests a first allocation for sharing of a service plan, and the device group manager approves a second allocation for sharing of the service plan, e.g., (an amount approved differs from an amount requested.)

In some embodiments, a device that is not associated with a device group sends a request to "join" a device group. In some embodiments, a device group manager approves requests of a device to "join" a device group. In some embodiments, the device group manager applies a set of service activity controls and/or a set of service plans to the new device that joins the device group. In some embodiments, a device group manager sends in "invite" to another device to join the device to a device group. In some embodiments, the new device approves joining the device group, e.g., through a user interface on the secondary "new" device invited to join the device group. In some embodiments, a device group manager invites a device to "share" an allocation of a service plan (or be associated with a service plan). In some embodiments, a user of the secondary device to which the invitation to share the allocation is sent approves sharing the service plan. In some embodiments, a secondary device is associated with a first service plan, and subsequent to sharing a second service plan, e.g., in response to an invitation to share the second service plan, the secondary device is associated with both the first service plan and the second service plan. In some embodiments, the secondary device is associated with a first service plan, and subsequent to sharing a second service plan, the secondary device is associated with the second service plan and disassociated from the first service plan.

In some embodiments, a device group manager assigns and/or shares a service plan with one or more other devices in a device group. In some embodiments, the device group manager is presented a set of service plans and a set of devices of a device group through a user interface and selects to which devices in the device group to share one or more of the service plans. In some embodiments, the device group manager shares and/or assigns a service usage amount of a service plan to one or more devices of a device group. In some embodiments, the service usage amount refers to a quantifiable amount of service usage associated with an aspect of the service plan. In some embodiments, the service usage amount represents a time amount (e.g., minutes of voice service), a data amount (e.g., megabytes of data usage), or a usage count (e.g., number of messages in/out). In some embodiments, the device group manager assigns and/or shares a service usage "currency" with one or more devices of a device group. In some embodiments, service usage "currency" refers to actual currency units (e.g., dollars) and/or virtual currency units (e.g., service credits). In some embodiments, service usage "currency" applies to particular service plans, particular applications, or particular service activities for the device in the device group. In some embodiments, the device group manager assigns/shares a portion of a service plan with another device in the device group. In some embodiments, a service plan includes a plurality of service activities, and the device group manager shares/assigns a subset of service activities of the service plan with one or more devices of the device group. In some embodiments, a service plan includes a plurality of service usage amounts for different service activities, and the device group manager shares/assigns a subset of the service usage amounts for one or more of the different service activities of the service plan with one or more devices in the device group. In some embodiments, the device group manager shares a combination of service plan service activities, service plan service usage amounts, and service usage "currency" with one or more devices of a device group. In some embodiments, the device group manager shares/assigns a service usage amount for a particular time period to a device in the device group. In some embodiments, the device group manager shares/assigns a service plan, a service usage amount, a service usage "currency," or a combination of these to a device outside of a device group. In some embodiments, the device group manager shares/assigns a portion of a "shared" service plan to a device that is not associated with the "shared" service plan. In some embodiments, the device group manager allows use of a portion of a "shared" service plan with a device that is not associated with the "shared" service plan or outside a device group managed by the device group manager for a specific purpose and/or a specific time period. In some embodiments, the device group manager shares a portion of a service plan, a service usage amount, a service usage "currency," or a combination of these with a user of a device in the device group that can then use the "shared" service plan on a device that is not associated with the device group.

In some embodiments, a device group manager of a device group defines an allowed/enabled/white list for a device in a device group, a subset of devices in the device group, or the entire device group. In some embodiments, the device group manager obtains a representative allowed/enabled/white list from a service management system. In some embodiments, the device group manager obtains a particular allowed/enabled/white list from another device, e.g., in the device group or from another device group. In some embodiments, the device group manager modifies an obtained allowed/enabled/white list. In some embodiments, the allowed/enabled/white list applies to a set of contacts to and/or from which a device can communicate, e.g., using an application or other service capability of the device. In some embodiments, contacts include individuals, users, devices, user groups, device groups, or other sets of devices/users. In some embodiments, a device number, a telephone number, an email address, a messaging identifier, or other unique identifier by which the device can communicate using a voice, messaging, or data application specifies a contact. In some embodiments, the device group manager defines an allowed/enabled/white list of contacts for a device in a device group by selecting a particular set of contacts from a list of contacts available in the device, in a service management system, in a master device, associated with the user of the device, or associated with a master user. In some embodiments, the device group manager selects one or more contacts for an allowed/enabled/white list by entering information in a search field through a user interface, e.g., on the device or through a separate computing device. In some embodiments, a set of one or more candidate contacts for the allowed/enabled/white list is presented through the user interface dynamically as the device group manager enters information in the search field (e.g., automatically populate based on a portion of a search string entered). In some embodiments, the device group manager selects one or more of the presented contacts to add to the allowed/enabled/white list of contacts. In some embodiments, the device group manager defines the allowed/enabled/white list of contacts based on a set of contacts in the device, e.g., all contacts in the device and/or a specific subset of contacts in the device. In some embodiments, the device group manager defines the allowed/enabled/white list of contacts based on a set of contacts in the master device, e.g., all contacts in the master device or a set of contacts in the master device. In some embodiments, the device group manager defines an allowed/enabled/white list of contacts by collecting a set of contacts from one or more devices in the device group. In some embodiments, the device group manager defines an allowed/enabled/white list of contacts by editing a collated set of contacts obtained from one or more devices in the device group. In some embodiments, the device group manager enters one or more contacts directly to define the allowed/enabled/white list of contacts. In some embodiments, the device group manager retrieves one or more contacts for the allowed/enabled/white list from a network based system, e.g., from a "cloud-based" server. In some embodiments, a network-based service (cloud service) provides a set of contacts for an allowed/enabled/white list to the device group manager. In some embodiments, the device group manager edits the set of contacts obtained from the network-based service to define an allowed/enabled/white list for the device in the device group. In some embodiments, a set of emergency services contacts are automatically loaded to an allowed/enabled/white list for a device in the device group. In some embodiments, a set of contacts for the device group (e.g., a family group, corporate group, user group) is automatically loaded to the allowed/enabled/white list for a device in the device group. In some embodiments, a set of contacts included in an allowed/enabled/white list is automatically determined based on a geographic location and/or a network type and/or a specific network and/or a set of network types/networks available for use by the device. In some embodiments, a set of contacts included in an allowed/enabled/white list is downloaded from a service management system. In some embodiments, the device group manager specifies a geographic location or specific network for the device (e.g., for future travel) and obtains a set of contacts for the specified geographic location or specific network for the device. In some embodiments, contacts on an allowed/enabled/white list can be communicated with irrespective of service activity controls applied to one or more service plans of a device in the device group. In some embodiments, a subset of service activities available to a device in the device group is available for communication with contacts on an allowed/enabled/white list, e.g., voice communication only, messaging only, email only, etc. In some embodiments, a service plan control blocks a specific set of service activities but allows other service activities for contacts on an allowed/enabled/white list. In some embodiments, outgoing calls, messages, and/or emails are blocked for a device including members of an allowed/enabled/white list, while incoming calls, message, and/or emails are allowed for the device. In some embodiments, incoming calls, messages, and/or emails are blocked for a device including members of an allowed/enabled/white list, while outgoing calls, message, and/or emails are allowed for the device. In some embodiments, the device group manager defines a disallowed/disabled/black list of contacts with which the device is not able to communicate by voice, message, and/or email. In some embodiments, the device group manager is notified when a device in the device group communicates with a contact that is not on an allowed/enabled/white list of contacts. In some embodiments, notifications are provided for voice, messaging, and/or email received by or transmitted from a device in the device group to a contact that is not in the allowed/enabled/white list of contacts. In some embodiments, the device group manager obtains both a notification and at least a portion of a voice, message, or email communication received from or transmitted to a contact that is not in the allowed/enabled/white list of contacts. In some embodiments, the device group manager obtains a notification of an attempted communication between a device in the device group and a contact that is not on an allowed/enabled/white list of contacts. In some embodiments, the device group manager controls one or more subsequent actions possible from the device in response to the notification. In some embodiments, the notification includes a request for approval from the device group manager for communication to the contact that is not on the approved/enabled/white list. In some embodiments, the device group manager approves the communication in response to the notification, and the device subsequently is allowed/enabled to communicate with the contact that is not on the approved/enabled/white list. In some embodiments, the device group manager restricts the available communication methods and/or times for communication with contacts that are not on the approved/enabled/white list. In some embodiments, the device group manager receives a portion of voice content for incoming or outgoing voice connections by a device in the device group with a contact that is not on the approved/enabled/white list. In some embodiments, the device group manager receives a portion of message content for incoming or outgoing message connections by a device in the device group with a contact that is not on the approved/enabled/white list. In some embodiments, the device group manager receives a portion of email content for incoming or outgoing communication by a device in the device group with a contact that is not on the approved/enabled/white list.

In some embodiments, the device group manager applies service activity controls on a device through communication between an application on a primary/master device and a device agent on a secondary/child device. In some embodiments, the device group manager applies service activity controls on a device through communication between the application on the primary/master device to a network element (e.g., a server) and then to a device agent on the secondary/child device. In some embodiments, the network element is a service controller. In some embodiments, the device group manager applies service activity controls on a device through communication from an application on the primary/master device to a network-based server that controls service activities of the secondary/child device using network resource management. In some embodiments, service activity controls are managed by a combination of device-based controls and network-based controls. In some embodiments, the device group manager accesses in real time or near real time a state of service activity control for one or more devices in a device group. In some embodiments, the device group manager obtains information about service activity control settings using an application on the primary/master device. In some embodiments, the device group manager obtains the information about service activity control settings from a network-based server.

In some embodiments, a device group manager (e.g., a user with device administrative privileges) transfers a device from a first service account to a second service account through a user interface, e.g., on a master device, logged in as a master user on a device, or through an interface to a service management system. In some embodiments, the device group manager manages a device group that includes only one device (e.g., as an administrative user of a particular device.) In some embodiments, the device group manager transfers the device in a device group to another device group. In some embodiments, the device group manager transfers the device an initial, temporary, or ambient services account to a subsequent, permanent, or particular services account. In some embodiments, the device group manager transfers the device from a pre-activation service account to a post-activation service account, e.g., as part of an activation process for the device. In some embodiments, a user of a device transfers a device from one service account to another service account. In some embodiments, through a user interface of a device, the device is transferred from one service account to another service account. In some embodiments, during an activation process, the device is transferred from a temporary activation account to a permanent service account. In some embodiments, the device is transferred from an individual service account to a shared service account (e.g., a service account associated with a device group). In some embodiments, the device is transferred from an individual service account to a family service account. In some embodiments, the device is transferred from a family service account to an individual service account. In some embodiments, the device is transferred from an individual service account to a corporate service account. In some embodiments, the device is transferred from a corporate service account to an individual service account. In some embodiments, the device is transferred from a first service account to a second service account created directly from the device. In some embodiments, through a user interface of the device, the device is transferred from one account to another account. In some embodiments, a new or different service account is created "on the fly" from the device, and the device is subsequently transferred from a temporary account (or from "no account") to the created service account. In some embodiments, a device group manager creates a service account through a master device, or logged in as a master user or through a service management system in preparation for transfer of one or more devices to the created service account. In some embodiments, the device group manager subsequently associates one or more devices with the service account, e.g., directly through the interface of the devices being associated with the service account. In some embodiments, a service account is associated with one or more service plans. In some embodiments, through a user interface of a device (e.g., a master device or through a child device), a device group manager (or a device user) transfers a device from one service plan to another service plan in a service account with which the device is associated. In some embodiments, a device group manager (or a device user) transfers service plans between service accounts. In some embodiments, devices associated with service plans automatically transfer from one service account to another service account accompanying the transfer of service plans between service accounts. In some embodiments, when a device transfers from one service account to another service account, service plans associated with the device also transfer from the one service account to another service account.

In some embodiments, a device group manager defines a service activity control for an application through a user interface of a first device, e.g., a first device of a device group. In some embodiments, a user interface screen is displayed to the device group manager on device 100A. In some embodiments, the user interface screen includes a field in which the device group manager enters (or searches for) an application identifier. In some embodiments, the user interface screen includes options for a user preference associated with the service activity control for the application. In some embodiments, an application credential associated with the application identifier is determined, e.g., by device 100A, by a network system, or by a combination of device 100A and a network system. In some embodiments, one or more service activity control policy instructions for the application are determined based on the user preference. In some embodiments, the one or more service activity control policy instructions for the application are determined by device 100A, by a network system, or by a combination of device 100A and a network system. In some embodiments, the application credential and the one or more service activity control policy instructions for the application are provided to a second device (e.g., device 100B). In some embodiments, the application credential and the one or more service activity control policy instructions for the application are provided directly from device 100A to device 100B. In some embodiments, a secure communication link is established between device 100A and device 100B through which the application credential and the one or more service activity control policy instructions are communicated between device 100A and device 100B. In some embodiments, the application credential and the one or more service activity control policy instructions are communicated from device 100A to device 100B through a network system. In some embodiments, device 100A communicates with the network system over a secure communication link. In some embodiments, device 100B communicates with the network system over a secure communication link. In some embodiments, the network system authenticates device 100A and/or device 100B before, after, or in conjunction with establishing secure communication links to device 100A and/or device 100B. In some embodiments, device 100B uses the application credential and the one or more service activity control policy instructions to apply the defined service activity control to the application on device 100B. In some embodiments, device 100B determines an attempt to download the application to device 100B. In some embodiments, device 100B determines the application is resident on device 100B. In some embodiments, device 100B determines the application (or a portion thereof) is installed on device 100B. In some embodiments, device 100B applies the service activity control for the application by enforcing at least a portion of the one or more service activity control policy instructions. In some embodiments, device 100B blocks the application from downloading to device 100B. In some embodiments, device 100B provides an indication to assist in presenting a notification to the device group manager (e.g., on device 100A). In some embodiments, device 100B blocks the application from starting on device 100B. In some embodiments, device 100B blocks the application from starting on device 100B during a particular time period. In some embodiments, device 100B blocks the application from communicating outside of (and/or within) device 100B. In some embodiments, time-based blocking is applied using the at least a portion of the one or more service activity control policy instructions. In some embodiments, indications to one or more other devices, users, device group managers are generated in response to determining an attempt to download, launch, use, or communicate with the application on device 100B.

In some embodiments, one or more service usage limits for a service activity are defined by a user of a device, a device group manager for a device, or by a system administrator. In some embodiments, a service usage limit defines a specific service usage amount for a particular user and/or device. In some embodiments, a service usage limit defines a specific service usage amount from a service usage allocation for the device, for a set of devices, for a device group, for a service plan, or for a set of service plans. In some embodiments, a service usage limit defines a percentage of an allocation of a service usage amount for a device or set of devices. In some embodiments, a service usage limit applies to a particular device in a device group. In some embodiments, a service usage limit applies to a set of devices in a device group. In some embodiments, a service usage limit applies to any device in a device group. In some embodiments, a service usage limit applies to a particular time period (e.g., a billing cycle) for a service plan, a part of a service plan, or a set of service plans. In some embodiments, a service usage limit determines a trigger for providing a notification to a user of a device (or to another device or user, e.g., to a device group manager). In some embodiments, a service controller, network system, service management system, service design center, or other collection of network elements defines one or more service usage limits. In some embodiments, notifications are provided to a user and/or a device through voice, text, messaging, email, or a combination of these. In some embodiments, a voice message is generated that provides an indication of a service usage (e.g., an absolute amount, relative amount, percentage used, percentage remaining) In some embodiments, the voice message is provided to a user of a device and/or to other devices in a device group and/or to a device group manager. In some embodiments, the voice message is automatically presented (e.g., audibly presented through a speaker of a device to a user of the device). In some embodiments, the voice message provides an audible indication of an amount of service usage consumed or an amount of service usage allocation remaining for a service plan or service allocation to a user or device.

In some embodiments, a device is configured to present a notification, alert, or other indication to a user of the device when an incoming communication is attempted, e.g., based on information supplied from a network system. In some embodiments, incoming communication includes voice calls, text messages, chat sessions, video services, email messages, or other forms of voice, text, video, and/or data communications. In some embodiments, the device provides the notification, alert, or other indication to inform the user of the device when an incoming communication is pending. In some embodiments, the device provides a notification message that requires a response from the user of the device before the incoming communication is received, completed, and/or connected. In some embodiments, the device provides a notification with options to allow the user to accept the incoming communication. In some embodiments, one or more notifications are provided to the user in real time (or near real time). In some embodiments, a connection is established for the incoming communication to the user of the device in response to an acceptance input received from the user of the device (e.g., through a user interface of the device.) In some embodiments, all or a portion of the incoming communication is stored for the user in advance of the acceptance of the incoming communication by the user of the device. In some embodiments, information is provided to the user to accept service terms and conditions before the incoming communication is received and/or a communication session is initiated. In some embodiments, the device and/or a network system stores all or part of a voice, text, video, data, email or other form of communication for the incoming communication to deliver to the user of the device in response to an acceptance from the user of the device. In some embodiments, the device and/or a network system automatically provides at least a portion of the incoming communication to the user to provide additional information to determine whether to accept the incoming communication. In some embodiments, the device and/ or a network system provides at least a portion of the incoming communication to the user after acceptance by the user. In some embodiments, the device and/or a network system initiates a communication to a sender of the incoming communication (e.g., calls back when a user accepts). In some embodiments, the device and/or a network system provides for storage and playback in real time, near real time, and/or "accelerated" time (i.e., "fast" playback) of at least a portion of the incoming communication.

In some embodiments, a user of a device and/or a device group manager manages one or more aspects of service plans through a user interface of the device. In some embodiments, service usage amounts for service plans associated with a device and/or a device group are displayed on a user interface. In some embodiments, service usage amounts displayed are refreshed at regular (or irregular) intervals. In some embodiments, service usage amounts displayed on a user interface are updated based on service usage monitoring in the device, by a network system, or by a combination of the device and a network system. In some embodiments, a service usage displayed on the user interface of the device is updated in response to a user input. In some embodiments, service usage information is determined on the device and/or in a network and service usage updates are provided from the device to the network and/or from the network to the device to refresh display of service usage information for the device. In some embodiments, service plan status information and/or service plan options are updated for the device. In some embodiments, the device obtains service plan status updates and/or service plan option updates from the network, e.g., in real time, in response to a user input, or through a background process. In some embodiments, service plan information for the device is updated when a user selects one or more buttons/icons on the user interface of the device. In some embodiments, updates for service usage and/or service plans are provided in the background so that service usage information and/or service plan status and/or service plan options are up to date when a user selects to display information about a service plan. In some embodiments, service plan options (e.g., for alternative service plans or for service plans already subscribed to by the user) are updated in real time, in near real time, and/or in the background so that a user can be informed of service plan availability when a user selects one or more buttons and/or icons on the user interface of the device. In some embodiments, service usage and/or service plan information is obtained from a network and/or updated in response to a user input for any icon or button on a user interface of the device and before the user requests information for service usage and/or service plans. In some embodiments, an indication is provided on the user interface when new information is available and/or has been obtained for one or more service plans of the device. In some embodiments, in response to a user input, a superset of information that may be of interest to the user of the device is updated. In some embodiments, a synchronization and/or update indication is provided by a network element to the device, and the device determines whether to obtain new service usage and/or service plan information based at least in part on the synchronization and/or update indication provided. In some embodiments, service usage updates and/or service plan updates are obtained, pulled, pushed, or otherwise provided to the device as available. In some embodiments, service usage updates and/or service plan updates are provided after a pre-determined accumulation of updates. In some embodiments, service usage updates and/or service plan updates are provided based on a pre-determined time interval. In some embodiments, a user of the device provides a user preference for service usage and/or service plan update frequency and/or content. In some embodiments, a device maintains a service selection status version and synchronizes the service selection status version with information from a network element to determine what information for service usage and/or service plans requires updates and only update incrementally what is required. In some embodiments, the device obtains service selection status version information from a network element. In some embodiments, the device provides service selection status version information to a network element. In some embodiments, the device determines when service usage updates and/or service plan information requires updates. In some embodiments, a network element determines when service usage updates and/or service information requires updates. In some embodiments, the device maintains a catalog of a subset of status possibilities for service usage and/or service plan information and only updates the catalog. In some embodiments, a service plan lease is provided when a user selects a service plan, e.g., through a user interface of a device, and before a network system has confirmed the service plan for the device (or for the user of the device). In some embodiments, a service plan lease provides for a temporary or limited service usage in advance of a selected service plan. In some embodiments, a user of a device is pre-approved for service authorization and/or credit standing before, upon, or after selection of a service plan. In some embodiments, a user service plan lease is revoked when credit standing for the user is not approved, or when configuration of a service plan for the device and/or for the user of the device cannot be completed.

In some embodiments, a network system analyzes service usage and/or service plan records for a device, a user, a device group, or a user group and determines service plan recommendations. In some embodiments, the network system determines service plans that match a user/device/group's service usage history. In some embodiments, the network system recommends one or more service plans to a user/device/group based on one or more service plan characteristics (e.g., features, performance, cost). In some embodiments, the network system determines service plans based on cost to the user, for a device, and/or for a device group. In some embodiments, the network system determines service plans based on wholesale cost to provide the service to the user, to the device, and/or to the device group. In some embodiments, the network system provides service plan recommendations for current and/or future use by a user, device, and/or device group. In some embodiments, the network system provides recommended service plans to the user, device, and/or device group, e.g., through a notification, alert, marketing interceptor, upsell, advertisement, or other means of presenting the service plan recommendations to the user/device/group.

Device Group Management and Service Activity Control User Interface

Figure 156:
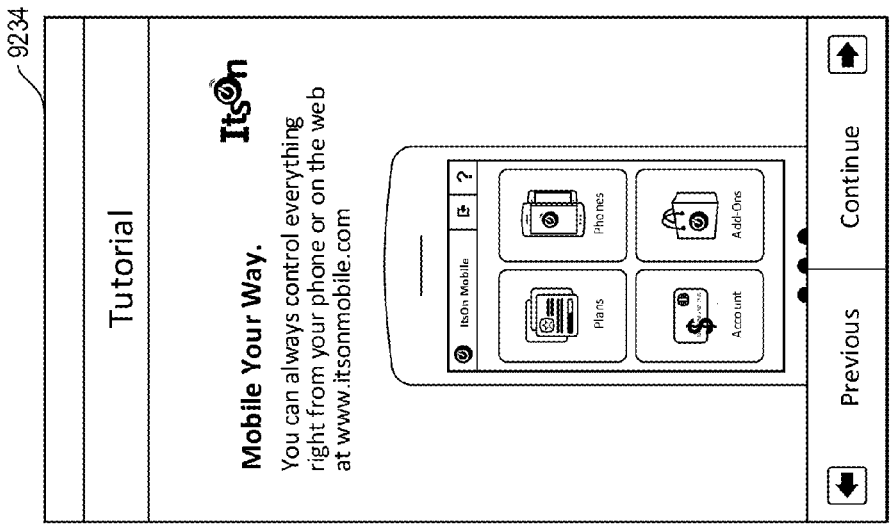
Figure 155:
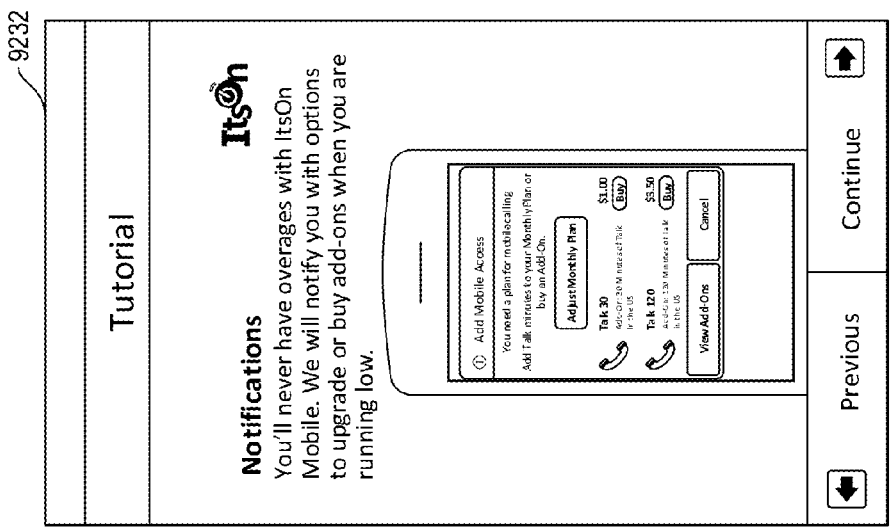

FIGS. 73 through 156 illustrate representative screen captures from a device that implements at least some of the disclosures described herein. In view of the disclosures herein and the material disclosed in the applications incorporated by reference, a person having ordinary skill in the art will appreciate that FIGS. 73 through 156 are largely self-explanatory illustrations of many of the disclosures herein. It is to be appreciated that FIGS. 73 through 156 are from an exemplary implementation. FIGS. 73 through 156 and are not intended to be limiting.

FIG. 73 illustrates representative screen 9068, which illustrates an exemplary initial opening "start up" screen that provides for associating device 100 with a service account. In some embodiments, one or more options for a service account for device 100 are presented through a display of device 100 to a user of device 100. In some embodiments, a displayed option includes establishing a new service account for device 100. In some embodiments, the user of device 100 creates a new service account for device 100, e.g., as a service account owner, directly by interfacing with device 100 through its display and entering information required to establish the new service account. In some embodiments, at least a portion of the information used to establish the service account is obtained by a network management system from device 100. In some embodiments, at least a portion of the information used to establish the service account is obtained by the network management system from one or more storage elements (e.g., databases, servers) located in a wireless access network, core wireless network, or communicatively coupled to the wireless network. In some embodiments, the user of the mobile wireless device enters at least a portion of the information through a separate interface to a service management system, e.g., through a web-based interface to the service management system. In some embodiments, the user of the mobile wireless device enters information using an application resident on device 100 or using one or more operating system components executing on device 100. In some embodiments, the user of device 100 is required to enter one or more credentials to identify the user and/or indicate authorization of the user to create the new service account. In some embodiments, a displayed option of device 100 to the user of device 100 includes joining device 100 to an existing service account. In some embodiments, the existing service account is an established service account associated with one or more additional devices. In some embodiments, the existing service account is a service account associated with a device group or user group. In some embodiments, the existing service account is associated with one or more service plans, e.g., a "shared" family/corporate service plan. In some embodiments, a new service account and/or an existing service account are required to be associated with at least one recurring service plan. In some embodiments, the new service account and/or the existing service account are not required to be associated with any recurring service plans, e.g., using one-time, limited time, pre-paid, or other non-recurring service plans. In some embodiments, the existing service account is established at least in part by a user, a sales associate, an account administrator, an original equipment manufacturer, or a device distributor. In some embodiments, the user of device 100 provides additional information to complete establishment of a partially entered existing service account.

FIGS. 74 and 75 illustrate representative screen from a device 100 user interface. Screen 9070 does not include any user-entered information, whereas screen 9072 includes user-entered information. Screen 9070 allows a user to enter information for an email account and an account password, as shown in screen 9072. In some embodiments, the email account address and/or the account password are used for authentication of a user of device 100 and/or a service account owner. In some embodiments, the email address and password are used to authenticate the user as authorized to add, change, delete or otherwise manage service plans associated with the service account (and/or other properties of software/hardware on the device for service management). In some embodiments, at least a portion of the information entered in these screens is used in combination with one or more additional credentials to verify a user's authorization to use a device and/or manage service plans for the device.

FIG. 76 illustrates representative screen 9074, which allows a user of device 100 to enter information to establish a new service account. In some embodiments, the user provides a service account owner and/or user information. In some embodiments, a portion of the service account information entered is used for credit verification of the service account owner and/or the user of device 100. In some embodiments, contact information is provided by the user of device 100, e.g., including telephone numbers, names, email addresses, street addresses, messaging identifiers, or other forms of identification of the user and/or a service account owner.

Figures 77, 78:
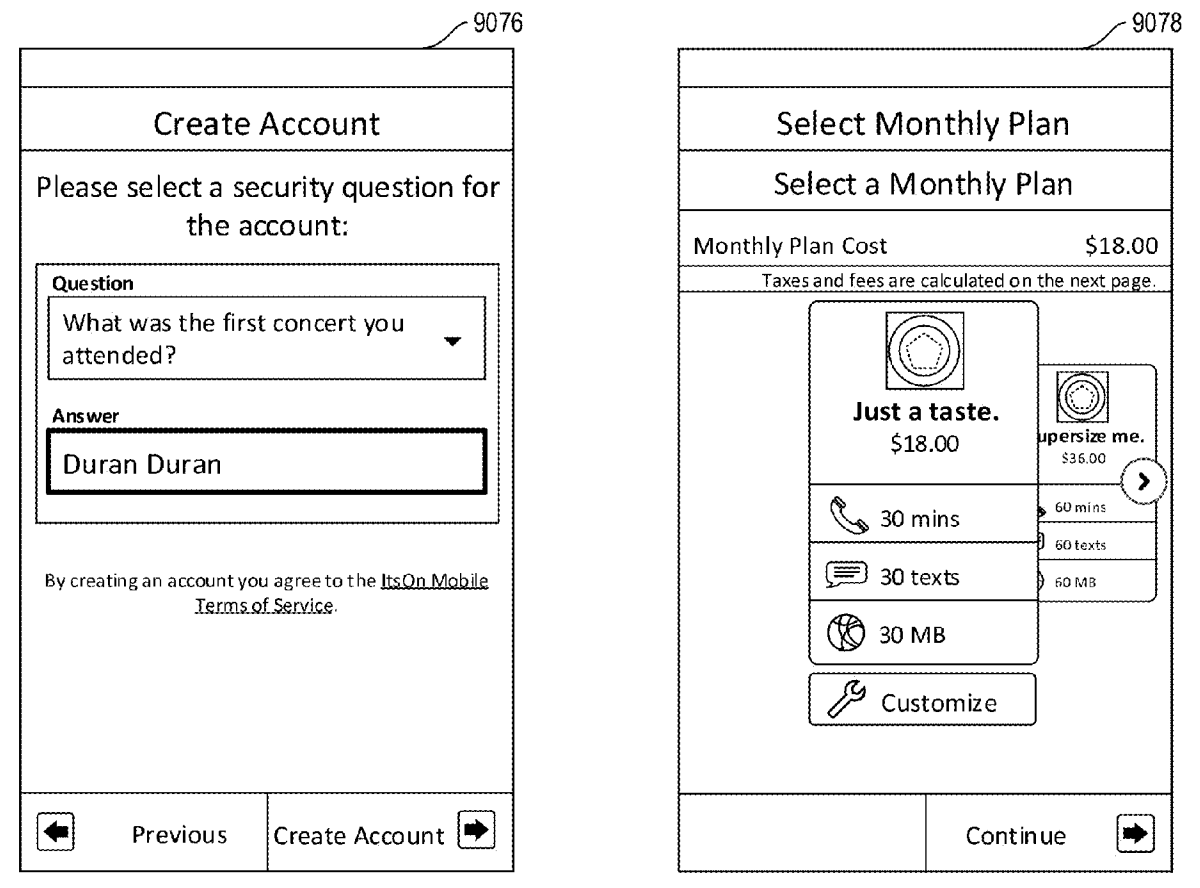

FIG. 77 illustrates representative screen 9076, which allows a user to enter information for one or more security questions associated with the service account, the user of device 100, and/or the service account owner. In some embodiments, the user selects from a list, drop down menu, array, or other display of representative security questions and provides answers to the security questions through the user interface of device 100. In some embodiments, one or more of the security questions and answers are used in a challenge/query/response exchange to verify and/or identify the user of the device. In some embodiments, the security questions are used to access select levels of information and/or control of service management for device 100.

FIG. 78 illustrates representative screen 9078, which allows a user of device 100 to select a recurring service plan for device 100. In some embodiments, the user and/or service account owner selects a recurring service plan for device 100 directly through the user interface of device 100. In some embodiments, the recurring service plan includes multiple service plan elements that provide different service types. In some embodiments, the user of device 200 selects from a plurality of recurring service plans, each recurring service plan having a different combination of service plan elements and/or different service usage amounts for different service plan elements. In some embodiments, the user of device 100 customizes a recurring service plan, e.g., by selecting the "customize" button/icon through the user interface and then selecting additional information that customizes the recurring service plan to include features required and/or requested by the user of device 100. In some embodiments, the recurring service plans are presented and/or perused by the user through an easily navigable user interface, e.g., by swiping a display or selecting one or more icons to traverse through an array of available recurring service plans.

Figure 79:
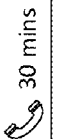
FIG. 79 illustrates a representative screen to review a recurring service plan selection of the user of the device, the recurring service plan selected from the array of service plans presented to the user of the device in accordance with some embodiments.

FIG. 79 illustrates representative screen 9080, which allows a user to review a recurring service plan selection of the user of device 100, the recurring service plan selected from the array of service plans presented to the user of device 100. In some embodiments, the selected recurring service plan is a "customized" service plan. In some embodiments, estimated cost information for the selected service plan is presented to the user of device 100. In some embodiments, cost information includes recurring costs, one-time costs, supplemental costs/fees, or a combination of these. In some embodiments, the user of device 100 can return to previous screens to select another service plan and/or modify a service plan selection. In some embodiments, the user of device 100 can proceed to "checkout" using the reviewed selected recurring service plan.

Figure 80:
FIG. 80 illustrates a representative screen to enter payment information associated with a user, a service account, a service account owner, a device, a device group, or a user group in accordance with some embodiments.

FIG. 80 illustrates representative screen 9082, which allows a user of device 100 to enter payment information associated with the user, a service account, a service account owner, a device, a device group, or a user group. In some embodiments, payment information is entered one time. In some embodiments, payment information (or a portion thereof) is stored for future reference and/or purchases of service plans and/or other services through device 100. In some embodiments, payment information is securely stored in device 100 and/or in one or more network elements of a network system and/or in one or more associated secure databases for "credit." In some embodiments, credit verification of a user of device 100 or a service account owner uses at least a portion of the payment information provided.

Figure 81:
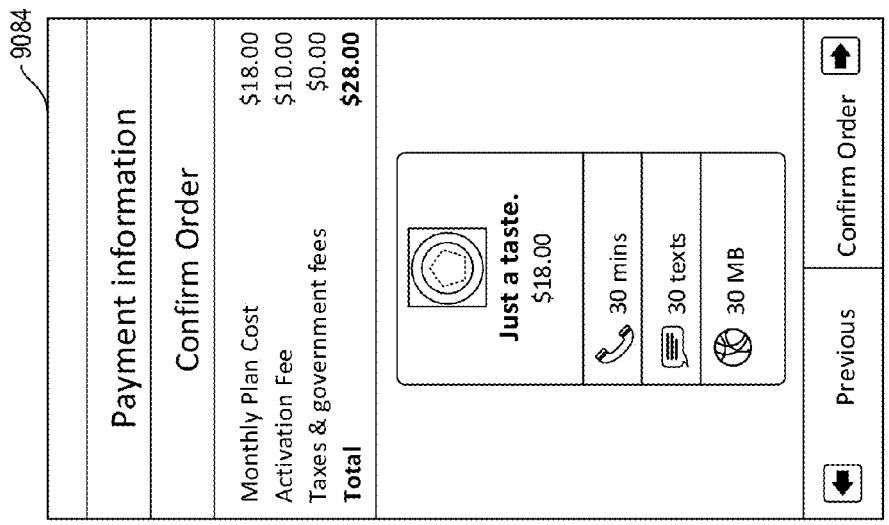
FIG. 81 illustrates a representative screen that confirms a service plan selection (and/or customization) and a payment selection for a service plan in accordance with some embodiments.

FIG. 81 illustrates representative screen 9084, which confirms a service plan selection (and/or customization) and a payment selection for a service plan. In some embodiments, a service plan is not applied to a service account until a user or service account owner selects confirmation through the user interface of device 100.

Figure 82:
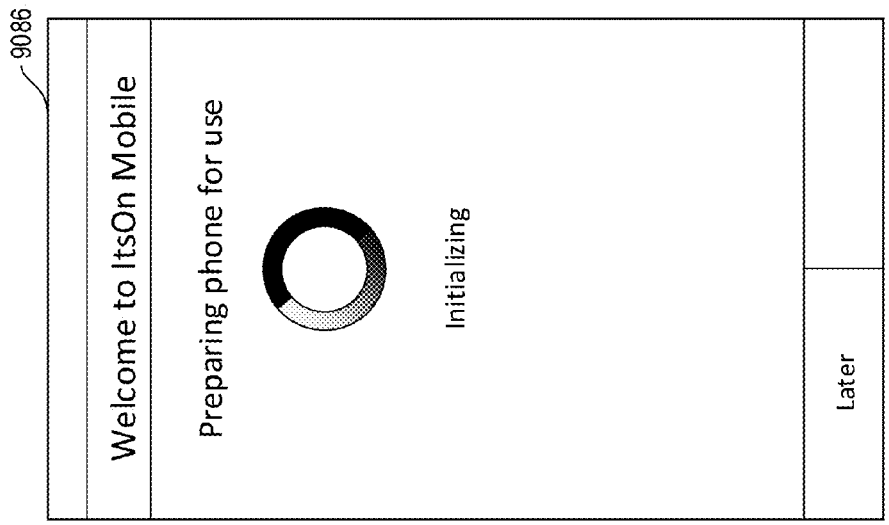
FIG. 82 illustrates a representative screen that informs the user of the device when at least a portion of an initialization process for the device is in progress in accordance with some embodiments.

FIG. 82 illustrates representative screen 9086, which informs the user of device 100 when at least a portion of an initialization process for device 100 is in progress. In some embodiments, a display of progress of the process is provided (e.g., a bar or other real time or near-real-time indication).

Figure 83:
FIG. 83 illustrates a representative screen through which a user of a device specifies a reference identifier (nickname) for the device in accordance with some embodiments.

FIG. 83 illustrates representative screen 9088, through which a user of device 100 can specify a reference identifier (nickname) for device 100. In some embodiments, the user of device 100 also selects a "role" for device 100 (and/or a user of device 100). In some embodiments, an "administrator" role provides full device and service plan management capabilities. In some embodiments, a "user" role provides for limited device and service plan management capabilities. In some embodiments, roles are associated with individual devices. In some embodiments, roles are associated with individual users of devices. In some embodiments, roles are associated with groups of users.

Figure 84:
FIG. 84 illustrates a representative screen to select a device phone number for a device in accordance with some embodiments.

FIG. 84 illustrates representative screen 9090, which allows a user to select a phone number for device 100. In some embodiments, a "current" phone number is provided to the user (administrator) of device 100. In some embodiments, the user (administrator) of device 100 selects from multiple options for the phone number. In some embodiments, device 100 keeps a current phone number, transfers a number from a different device, or requests a new number for device 100. In some embodiments, a new number is at least partially based on information associated with device 100 and/or with a service account and/or with user/administrator information provided. In some embodiments, a user/administrator selects a preferred area code for a new device number. In some embodiments, a user/administrator is provided a selection of recommended area codes based at least in part on address information provided (e.g., for the service account associated with device 100). In some embodiments, an area code is automatically selected (and/or recommended) based on a geographic location of device 100. In some embodiments, an area code is automatically selected (and/or recommended) based on one or more available wireless networks.

Figures 85, 86:
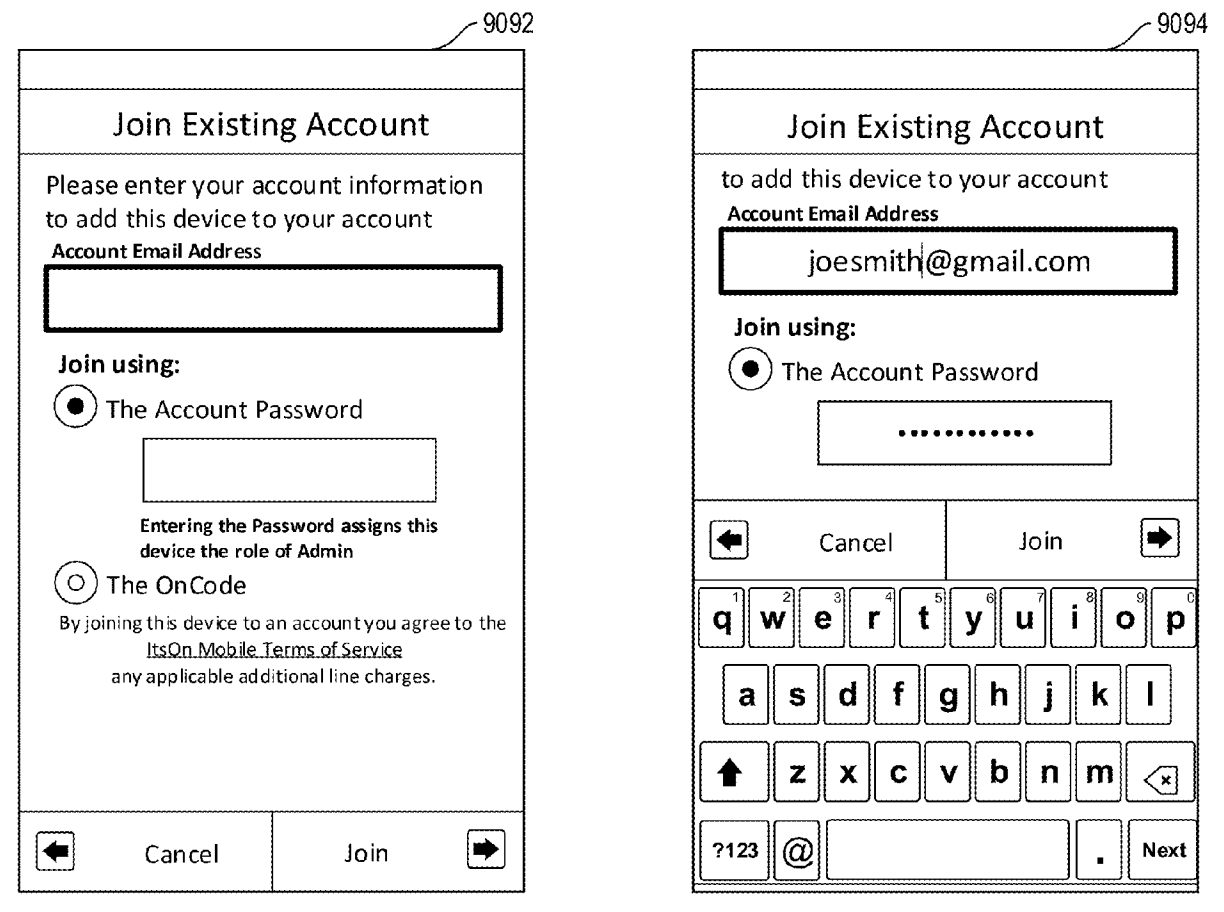

FIG. 85 illustrates representative screen 9092, which allows a user to enter information to join device 100 to an existing service account. In some embodiments, at least a portion of the information entered is used to identify the existing service account. In some embodiments, at least a portion of the information entered is used to verify a user of device 100, an administrator for device 100, or a service account owner. In some embodiments, at least a portion of the information is used by a network system to determine one or more service accounts to which device 100 may be associated. In some embodiments, a user of device 100 obtains and enters supplemental security information, e.g., retrieved from a network system through a separate and possibly secure connection.

FIG. 86 illustrates representative screen 9094, which allows the user to enter information to join device 100 to an existing service account. Screen 9094 includes an overlay keyboard through which to enter the requested information.

Figure 88:
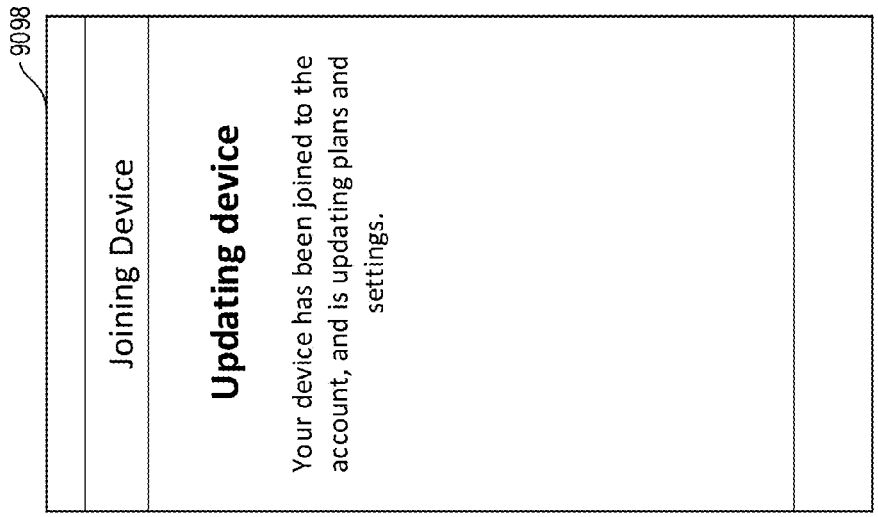
FIGS. 87 and 88 illustrate representative screens to indicate progress of a process to join a device to an existing service account in accordance with some embodiments.
Figure 87:
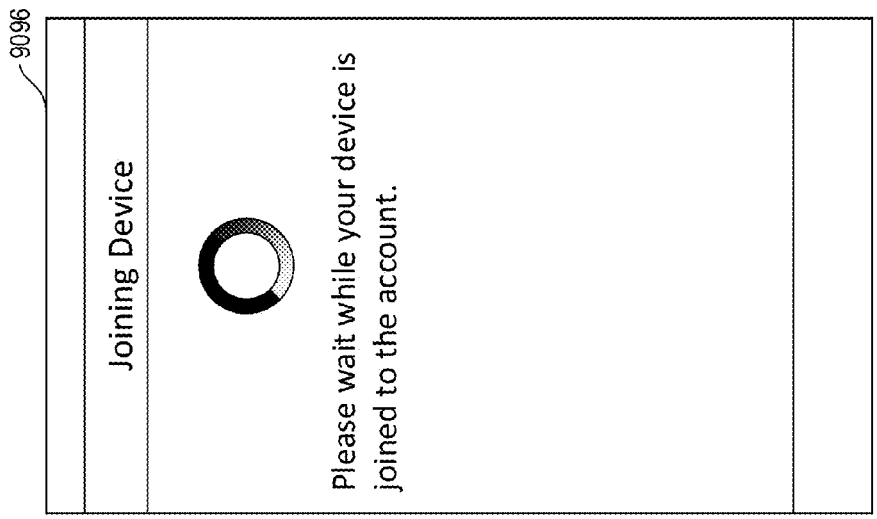
Figure 92:
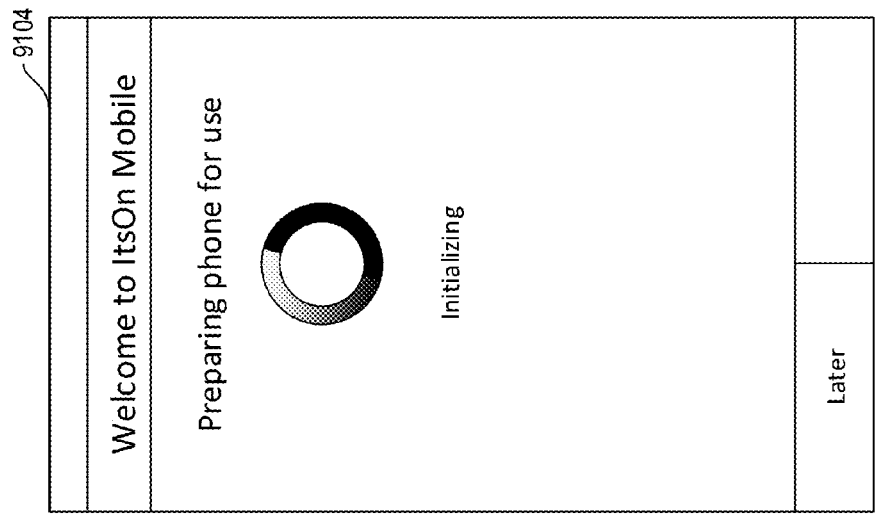
Figure 91:
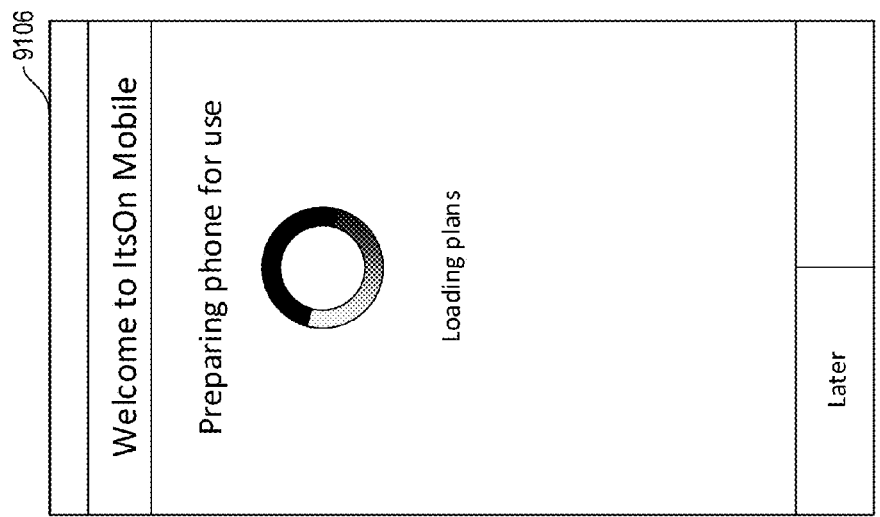

FIGS. 87 and 88 illustrate representative screens 9096 and 9098, which provide a user interface that presents multiple screens to indicate progress of a process to join device 100 to an existing service account. In some embodiments, service plans and/or service plan configurations and/or device settings are updated as part of joining device 100 to a service account. In some embodiments, service account settings are provided to device 100. In some embodiments, at least a portion of service plans, service policies, service rules, and/or service policy instructions are provided to device 100.

FIGS. 89 through 93 illustrate representative screens 9100, 9102, 9104, 9106, and 9108, which indicate progress of a process to prepare device 100 for use with a wireless network. In some embodiments, the process includes joining device 100 to a service account, establishing a new service account, updating service plans, updating service settings, updating device settings, loading service policies, loading service plans, establishing network connections, or a combination of these.

Figure 94:
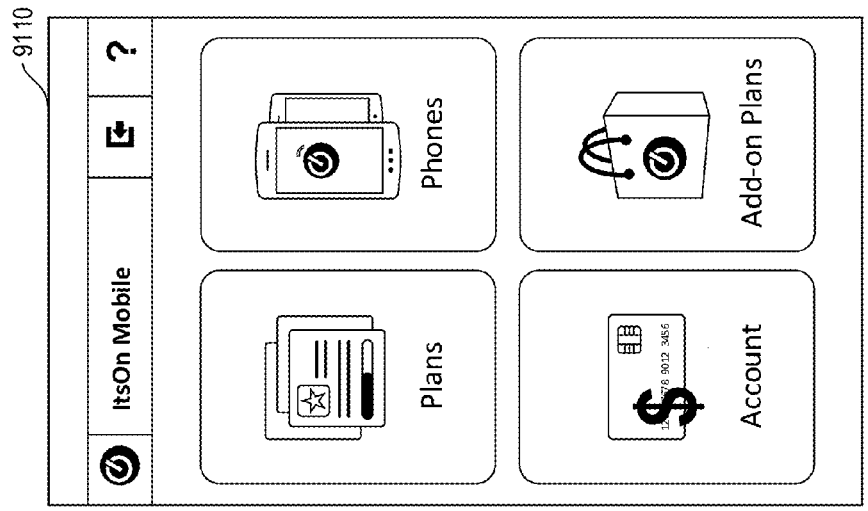
FIG. 94 illustrates a representative "home" screen for a device in accordance with some embodiments.
Figure 93:
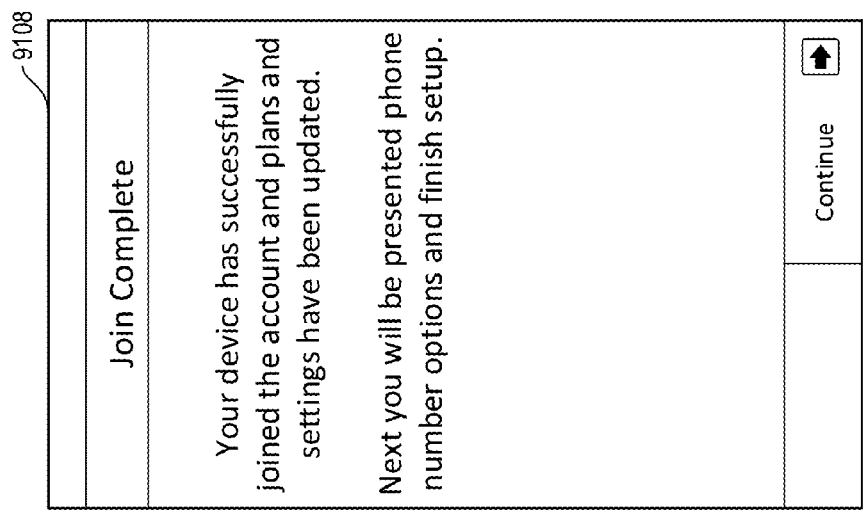

FIG. 94 illustrates representative screen 9110, illustrating a device 100 user interface that illustrates a "home" screen for device 100 when device 100 is authorized to operate over a wireless network. In some embodiments, the "home" screen includes multiple selectable buttons/icons/partitions. In some embodiments, a user/administrator of device 100 selects a button/icon/partition to access information, manage services, manage devices, purchase services, review account information, or perform other service plan and device management functions.

Figures 95, 96:
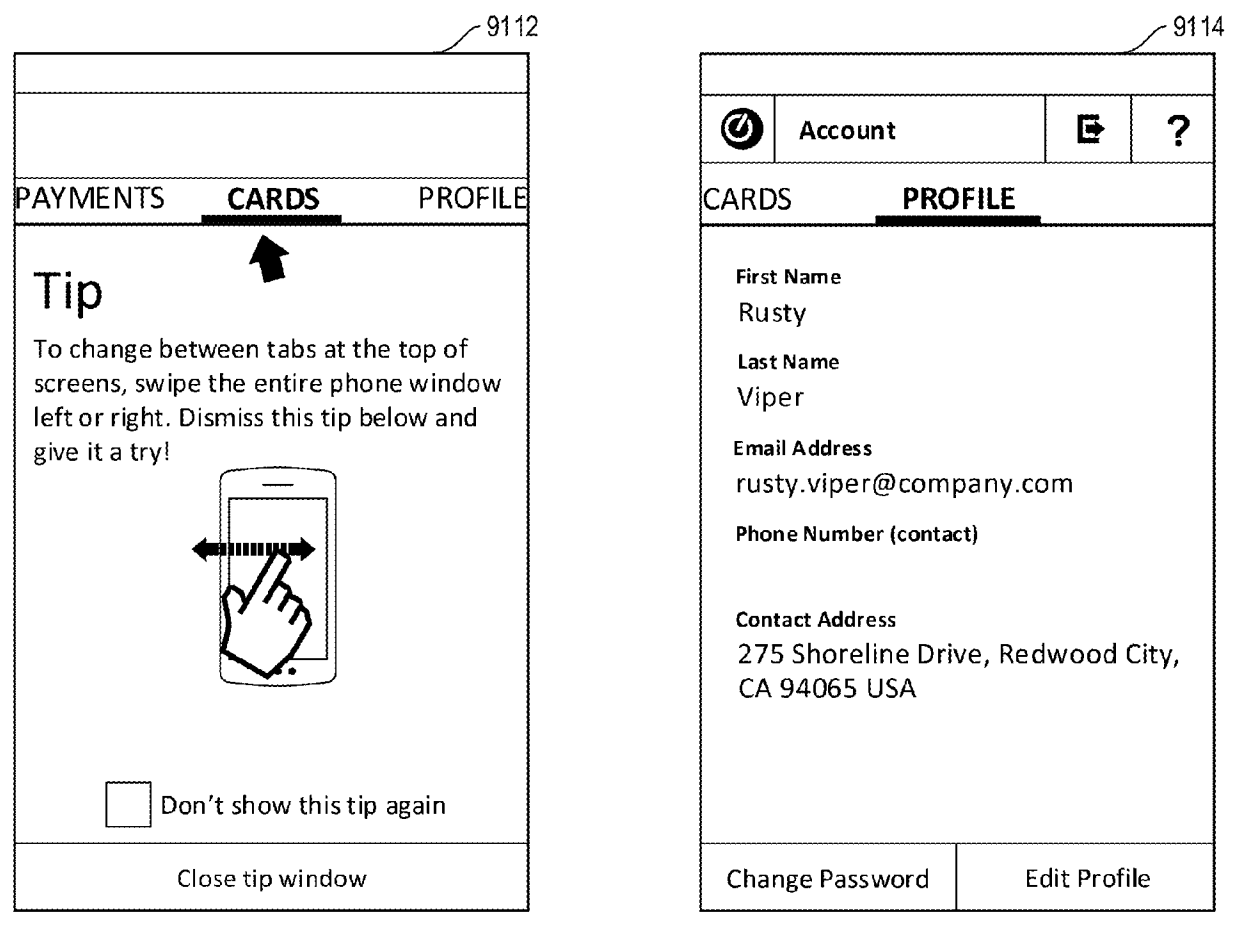

FIG. 95 illustrates representative screen 9112, which provides information to the user of device 100 to assist in learning how to use the device 100 user interface. In some embodiments, the "tip" information is provided based on a request from the user. In some embodiments, the "tip" information is provided based on a recent history of user interaction through the user interface. In some embodiments, the "tip" information is provided based on a previously viewed screen (or set of screens).

FIG. 96 illustrates representative screen 9114, through which a user of device 100 reviews profile information for a user (and/or an administrator) of device 100. In some embodiments, profile information and/or password information and/or other service account information, user information, or device information are modified through one or more user interface screens.

Figure 97:
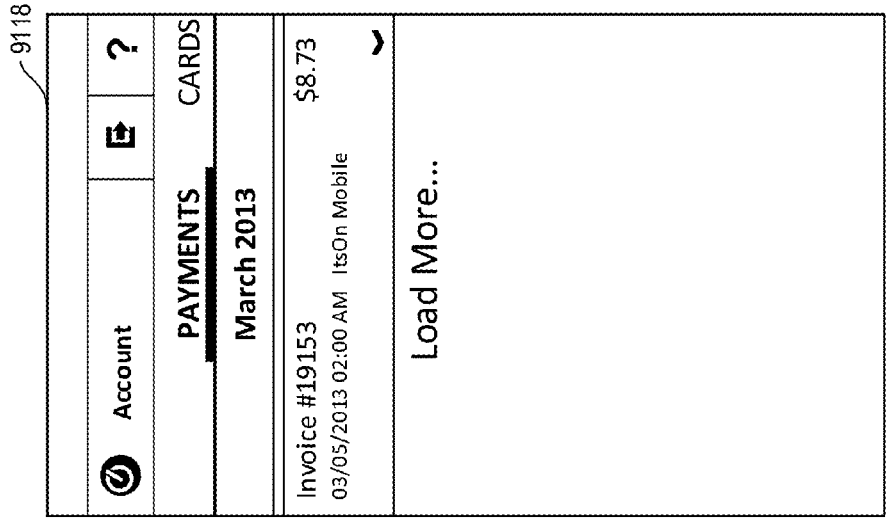
FIG. 97 illustrates a representative screen to provide a listing of payment forms associated with a device, user, and/or service account in accordance with some embodiments.

FIG. 97 illustrates representative screen 9116, which provides a listing of payment forms (e.g., credit cards) associated with a device, user, and/or service account. In some embodiments, additional payment forms are entered through one or more user interface screens. In some embodiments, stored payment information is updated and/or modified through one or more user interface screens.

Figure 98:
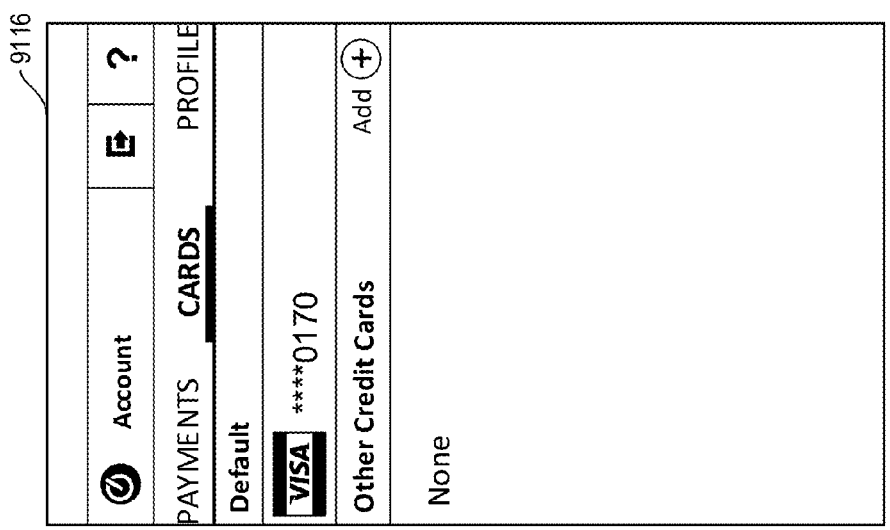
FIG. 98 illustrates a representative screen to summarize invoices provided for a device, user, and/or service account in accordance with some embodiments.

FIG. 98 illustrates representative screen 9118, which summarizes invoices provided for a device, user, and/or service account. In some embodiments, summary information is provided for a set of invoices. In some embodiments, additional detailed information is provided for one or more invoices in the set of invoices.

Figures 99, 100:
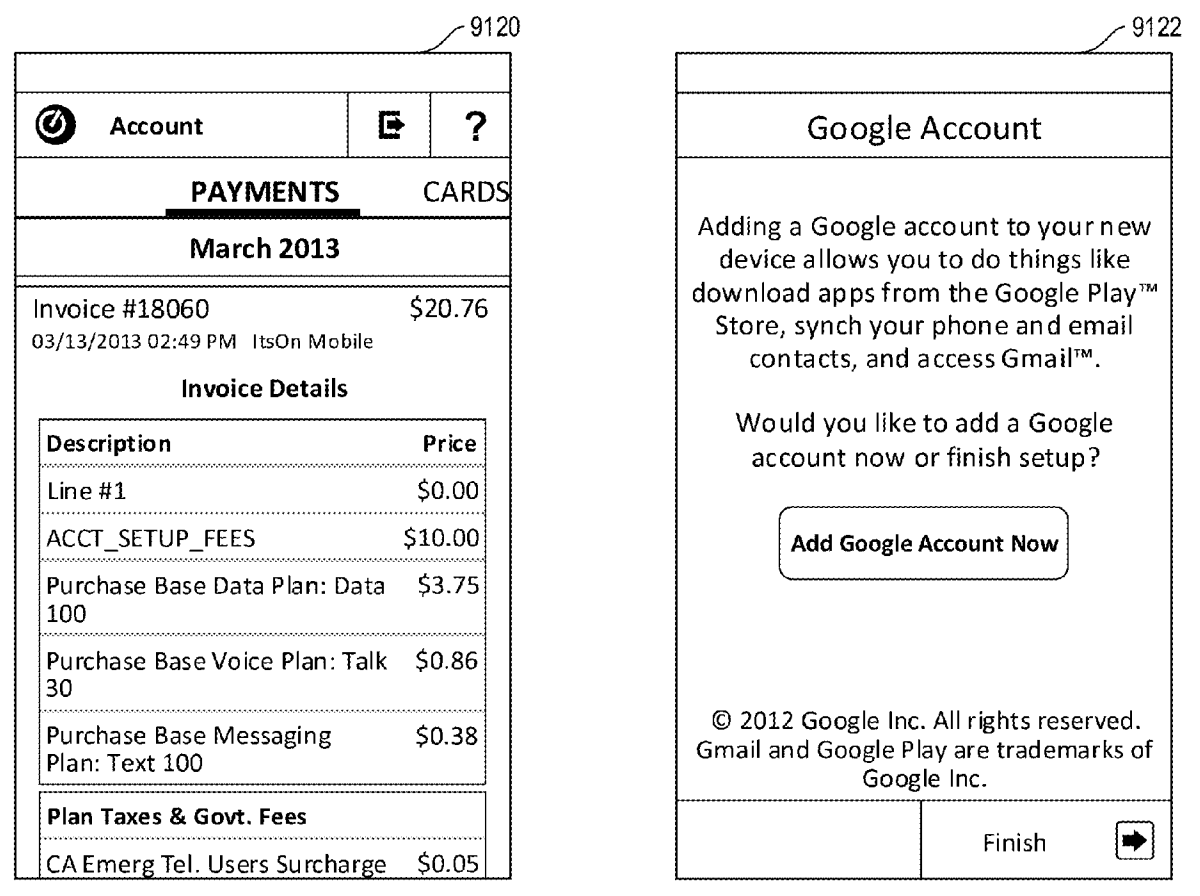

FIG. 99 illustrates representative screen 9120, which includes detailed information for a selected invoice.

FIG. 100 illustrates representative screen 9122, which assists a user of device 100 to add an account associated with an "outside" vendor, e.g., for a "third-party" service provider/partner, to device 100. In some embodiments, device 100, the user, an administrator, and/or the service account is associated with an additional "outside" account by entering information through one or more user interface screens.

Figures 101, 102:
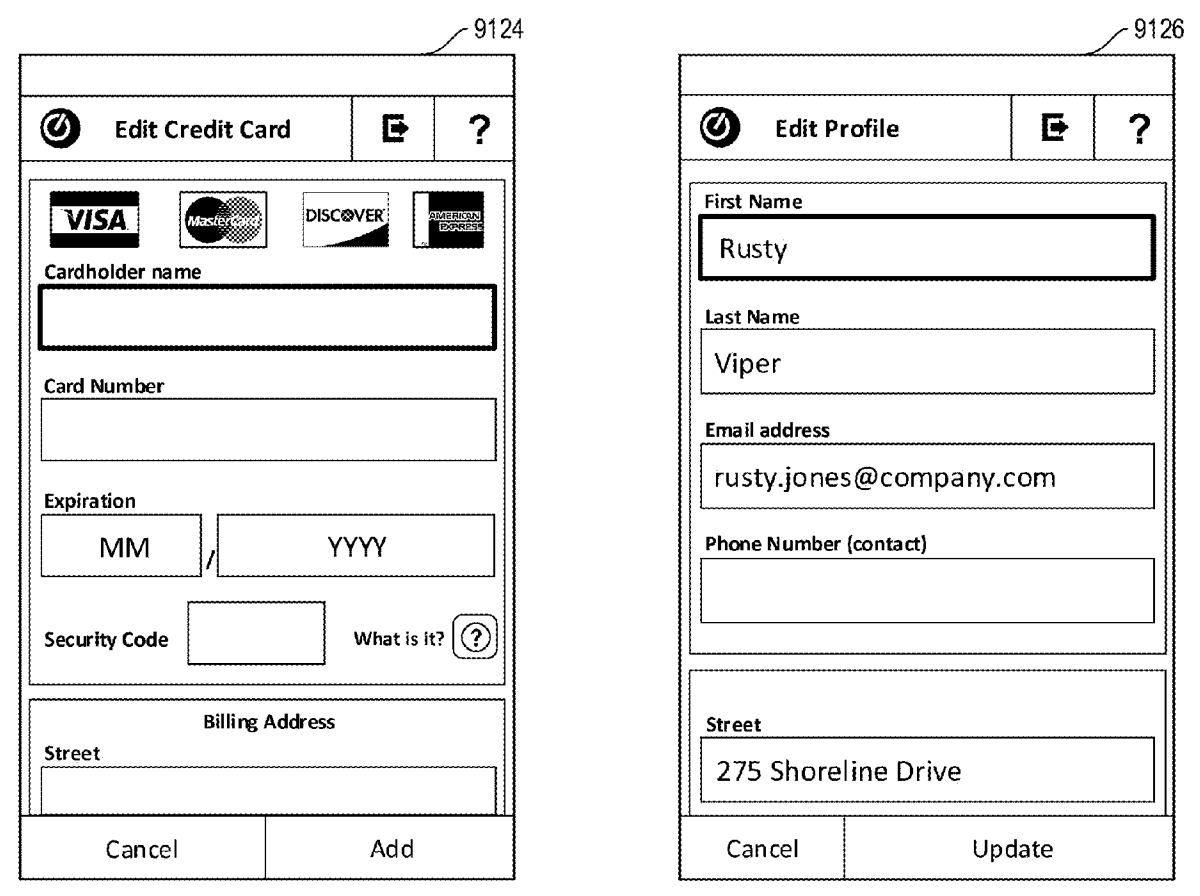

FIGS. 101 and 102 illustrate representative screens 9124 and 9126, which allow a user to update and/or modify information for payment forms associated with a service account, and service account profile information.

Figure 103:
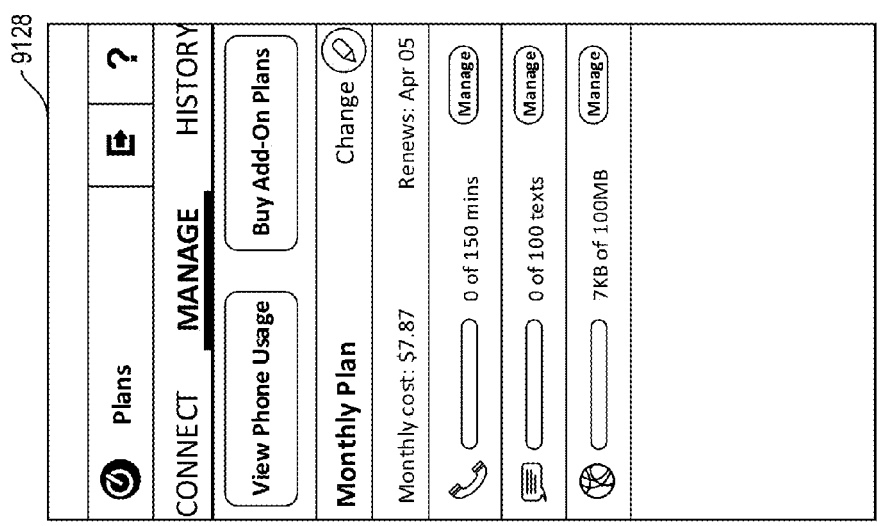
FIG. 103 illustrates a representative screen to review and manage service plans associated with the device in accordance with some embodiments.

FIG. 103 illustrates representative screen 9128, which allows a user to review and manage service plans associated with device 100. In some embodiments, a summary of service plans is provided. In some embodiments, summary information for a recurring service plan is provided. In some embodiments, service usage amounts for service plan elements of a service plan are provided. In some embodiments, the user of device 100 selects to view additional service usage amount details. In some embodiments, the user of device 100 selects to manage service plans and/or service plan elements. In some embodiments, the user of device 100 selects to purchase additional service plans and/or service plan elements. In some embodiments, the user selects to change, substitute, modify, and/or customize a service plan or elements of a service plan.

Figure 104:
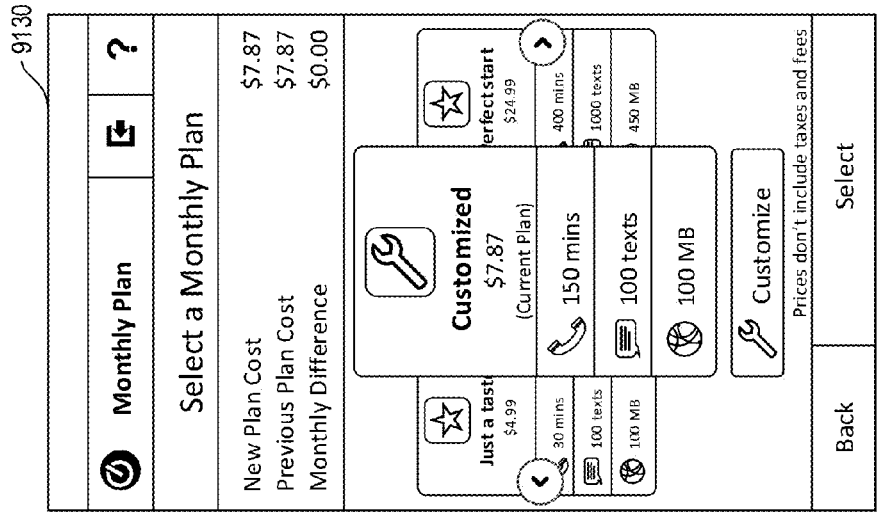
FIG. 104 illustrates a representative screen to select a recurring service plan from an array of service plans in accordance with some embodiments.

FIG. 104 illustrates representative screen 9130, which allows a user to select a recurring service plan from an array of service plans. In some embodiments, the user of device 100 customizes the service plan. In some embodiments, a currently subscribed service plan is customized as indicated on screen 9130. In some embodiments, an option to customize a current service plan is provided through the user interface.

FIG. 105 illustrates representative screen 9132, through which a user of device 100 can customize a service plan. In some embodiments, each service plan element of the service plan is customized, e.g., by selecting from multiple possible configurations through a displayed set of information. In some embodiments, a user selects to customize one or more service plan elements of a "customized" service plan, e.g., by selecting service usage amounts for individual service plan elements. In some embodiments, a user selects service usage amounts for voice, messaging, and data individually. In some embodiments, user interface components provide for an easily navigable selection of service plan elements from an array of possible service usage amounts/values/costs for each service plan element of a customized service plan.

FIG. 106 illustrates representative screen 9134, which allows a user to confirm changes made to a customized service plan. As illustrated in FIG. 106, no particular changes have been selected by the user of the device. In some embodiments, changes to each service plan element are provided. In some embodiments, individual service plan element service usage amounts and/or costs are provided.

Figures 107, 108:
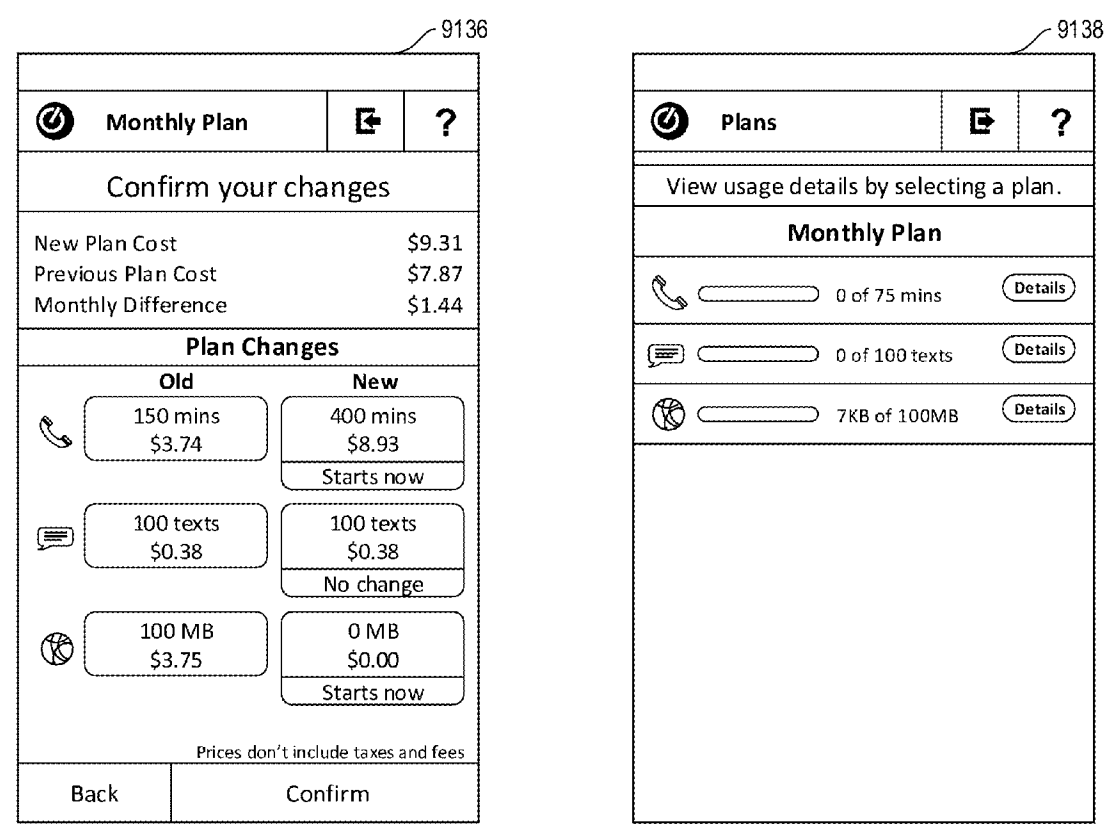

FIG. 107 illustrates representative screen 9136, which allows a user of device 100 to confirm changes to a customized service plan. As illustrated in FIG. 107, changes to customize a service plan for each service plan element are provided. In some embodiments, service plan customization takes place "immediately" upon confirmation by the user of device 100. In some embodiments, differences in service usage amounts and/or service plan element costs are provided.

FIG. 108 illustrates representative screen 9138, which summarizes information for a service plan, including a summary of "consumption" of individual service usage amounts for each service plan element of the service plan. In some embodiments, the user of device 100 selects a button/icon to obtain additional detailed information for each service plan element, service usage amount, service usage history, etc.

Figures 109, 110:
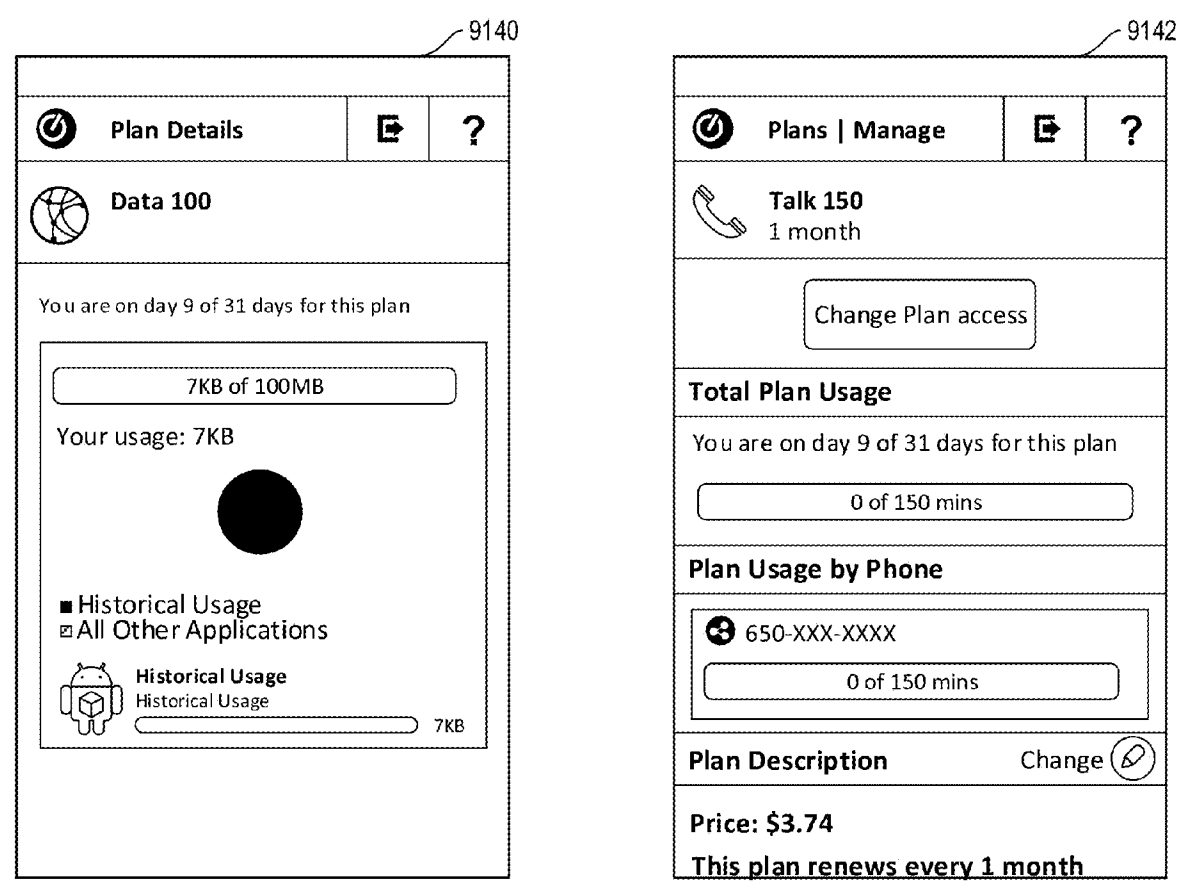

FIG. 109 illustrates representative screen 9140, which provides additional detailed information for a service plan element of a service plan. In some embodiments, detailed information provided includes a service plan recurring time period, an indication of a current time within the recurring time period, a service usage amount, an amount of service usage consumed during the current time period, an amount of service usage remaining for consumption during the current time period, an indication of historical service usage for previous time periods, or a combination of these. In some embodiments, service usage consumption is detailed according to service activities. In some embodiments, service usage consumption is detailed according to service activity classifications and/or service types. In some embodiments, service usage trends or service usage consumption rates are provided.

Figure 111:
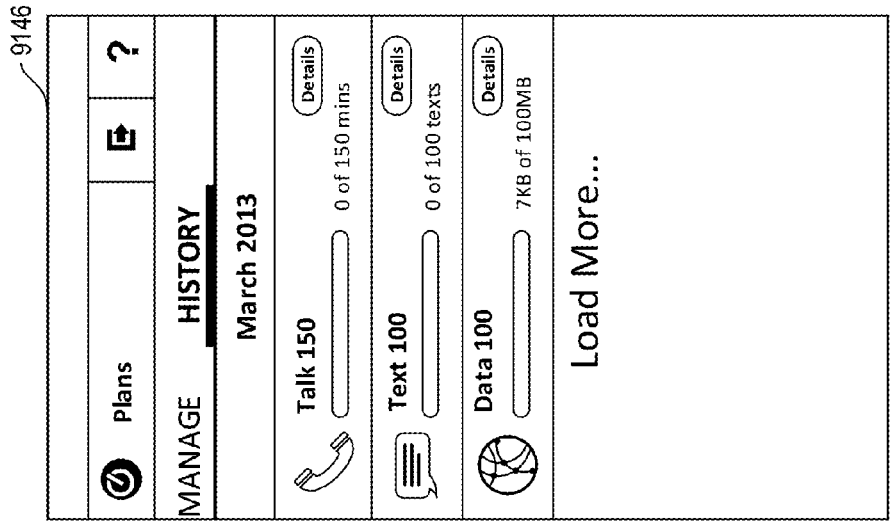

FIGS. 110 and 111 illustrate representative screens 9142 and 9144, which provide summarized information for a service plan and/or element of a service plan. In some embodiments, the user accesses information for the service plan and/or changes service plan elements. In some embodiments, summary information provided for the service plan includes a recurring time period, a position within the recurring time period, a service usage amount, an amount of service usage consumed, a breakdown of service usage per device, a breakdown of service usage per service activity, a breakdown of service usage per service type, a breakdown of service usage per service activity classification. In some embodiments, a user modifies a service plan by selecting a "change" button/icon and selecting changes to a service plan or service plan element.

Figure 112:
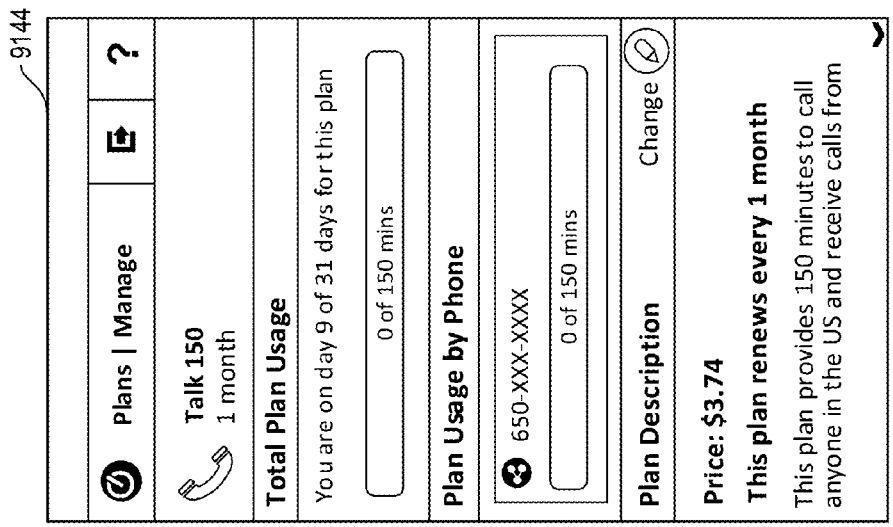
FIG. 112 illustrates a representative screen that provides summarized service usage for a service plan for a particular time period in accordance with some embodiments.

FIG. 112 illustrates representative screen 9146, which provides summarized service usage for a service plan for a particular time period. In some embodiments, service usage information displayed is organized according to service plan element, service plan type, service plan elements, or service usage classification. In some embodiments, detailed information for individual service plan elements is accessed by selecting a "details" button/icon through the user interface of device 100. In some embodiments, service usage amounts for each service element of a service plan are provided. In some embodiments, service usage consumption for each service element of a service plan are provided. In some embodiments, graphical displays of service usage consumption and/or service usage amounts remaining are provided for a service plan and/or for individual service plan elements of a service plan.

Figures 113, 114:
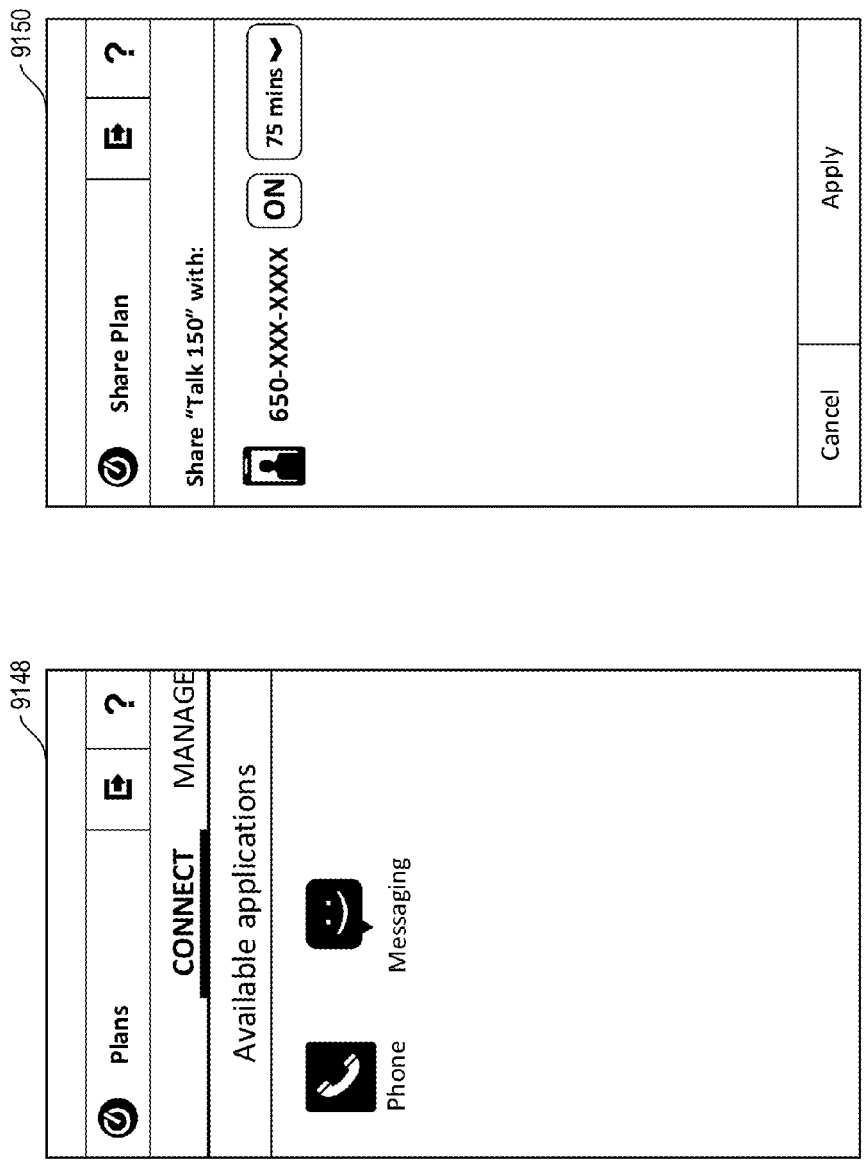
FIG. 113 illustrates a representative screen summarizing a set of applications available for use on the device in accordance with some embodiments.
FIG. 114 illustrates a representative screen for which a service plan of a service account is shared by a device in accordance with some embodiments.

FIG. 113 illustrates representative screen 9148, which summarizes a set of applications available for use on device 100. In some embodiments, the available applications are summarized according to a service type. In some embodiments, the available applications are summarized in a list, array, matrix or other display. In some embodiments, the device includes multiple applications. In some embodiments, device 100 includes multiple applications for a service type. In some embodiments, an application launches upon selection by the user of device 100 through the user interface of device 100.

FIG. 114 illustrates representative screen 9150, which enables a service plan of a service account to be shared with another device 100, e.g., a device within a device group. In some embodiments, a device group manager or administrator of a service account controls sharing of service plans among devices 100 in a device group. In some embodiments, an identifier for a device and/or user is provided to indicate with which user/device the service plan (or service plan element) is shared. In some embodiments, the device group manager (and/or administrator) enables or disables sharing of a service plan or service plan element with another device/user by selecting a button/icon on the user interface of a device. As illustrated in FIG. 114, a voice service plan (or service plan element) is shared with another device (as indicated by the "ON" button/icon). In some embodiments, an amount of service usage of the service plan and/or service plan element shared is displayed. In some embodiments, the device group manager (or administrator) selects an amount of service usage to share with the device. In some embodiments, a drop down menu is provided with recommended service usage amounts to share. In some embodiments, a shared usage amount is an "absolute" amount of service usage. In some embodiments, a shared usage amount is a "percentage" amount of a service usage allocation for a service plan or service plan element. As illustrated in FIG. 114, 75 minutes of a 150 minute service usage allocation is shared with the device indicated. In some embodiments, the device group manager (and/or administrator) modifies shared plan service usage through the user interface and confirms changes to shared plans by selecting the "Apply" button/icon.

Figures 115, 116:
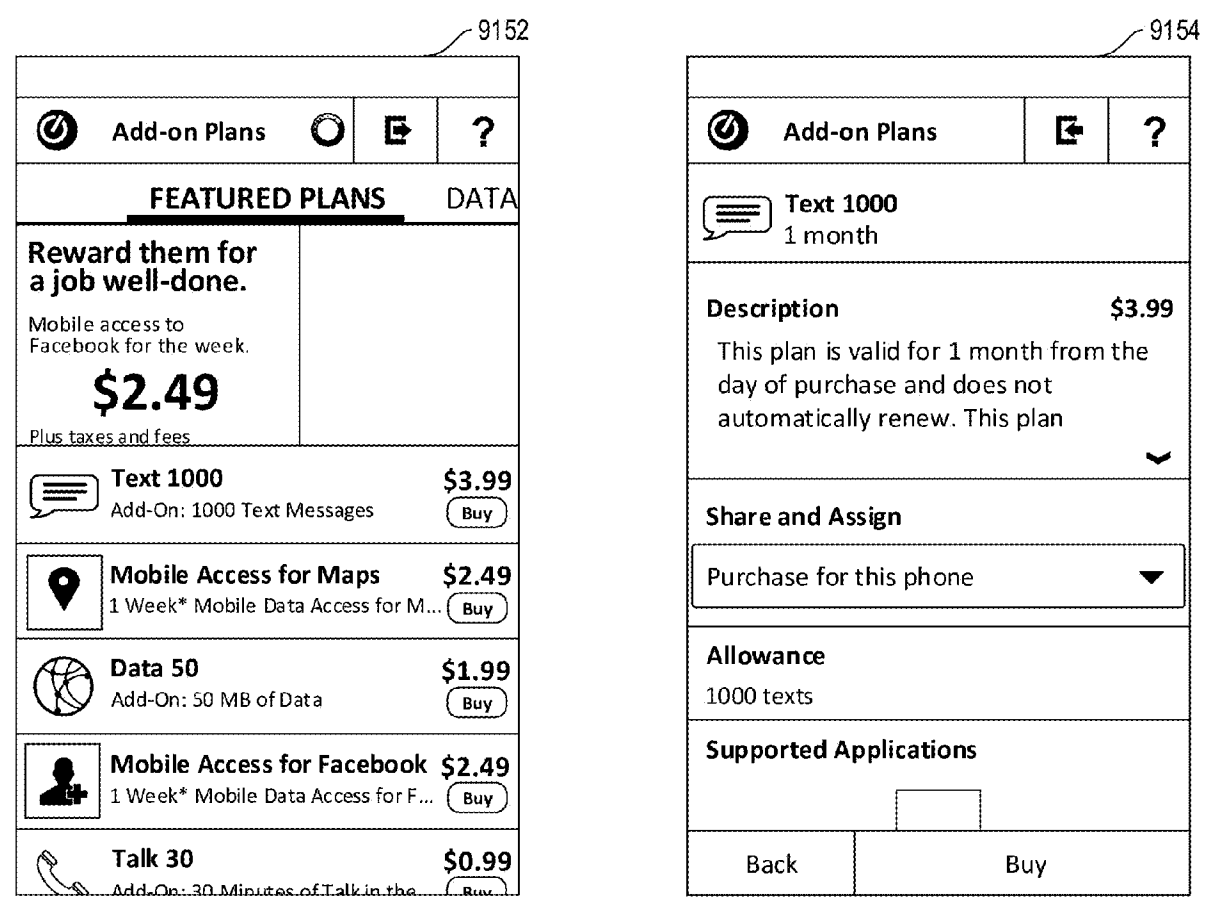

FIG. 115 illustrates representative screen 9152, which presents a set of "featured" service plans for review, selection, and/or purchase by a user of device 100.

FIG. 116 illustrates representative screen 9154, which presents summary information for a particular service plan selected from the set of featured service plans. In some embodiments, the service plan selected is a recurring service plan. In some embodiments, the service plan selected is a time-limited service plan. In some embodiments, the service plan selected is a supplemental (add-on) service plan, e.g., to modify an existing service plan. In some embodiments, a summary of the service plan, the cost for the service plan, a service usage amount for the service plan, a list of applications supported by the service plan, an option to purchase the service plan, or a combination of these are presented through the user interface to the user of device 100. In some embodiments, a drop down menu is provided to select among several options for the service plan. In some embodiments, the user confirms purchase of the service plan by selecting a "Buy" button/icon through the user interface of device 100.

Figure 117:
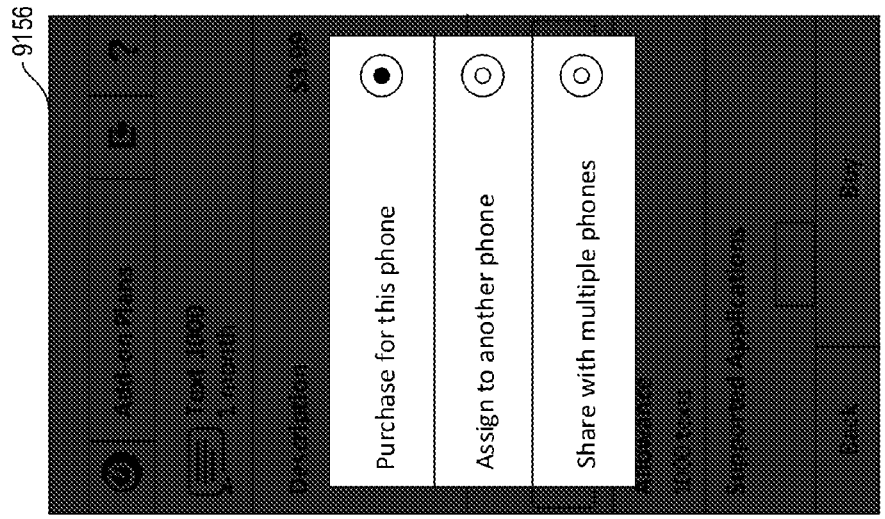
FIG. 117 illustrates a representative overlay screen that presents several options for a service plan in accordance with some embodiments.

FIG. 117 illustrates representative screen 9156, which has an overlay that presents several options for a service plan. In some embodiments, the user of device 100 purchases the service plan for a particular device. In some embodiments, the user of device 100 assigns the service plan (in part or in its entirety) to another device, e.g., to a different device within a device group. In some embodiments, the user of device 100 shares the service plan with one or more other devices. In some embodiments, sharing of the service plan includes sharing a service usage amount or percentage of service usage allocation with other devices, e.g., devices 100 of a device group. In some embodiments, a user with administrative privileges has authorization to purchase, assign, and/or share service plans, service plan elements, or portions thereof. In some embodiments, a user without administrative privileges requests approval from a device group manager (or other user with administrative privileges) to purchase, assign, and/or share a service plan or service plan element.

Figure 118:
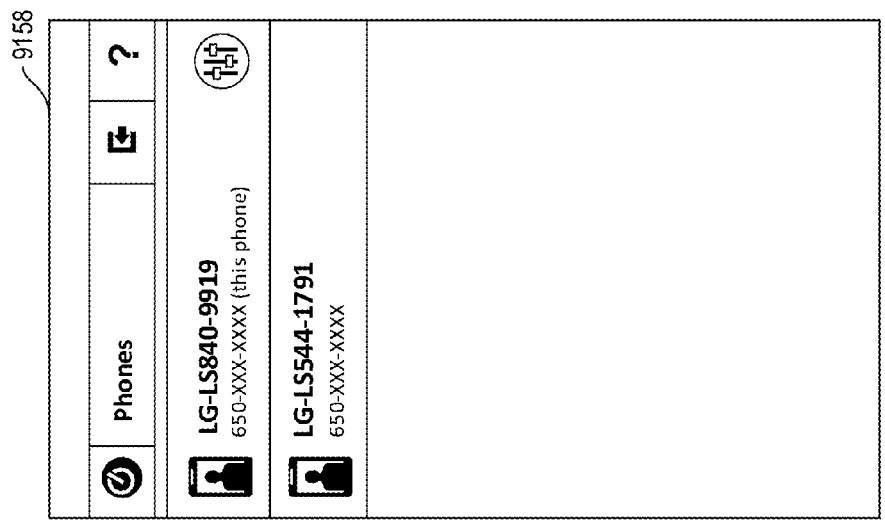
FIG. 118 illustrates a representative screen that summarizes a set of devices in a device group in accordance with some embodiments.

FIG. 118 illustrates representative screen 9158, which summarizes a set of devices 100 in a device group. In some embodiments, a listing of devices 100 in a device group includes a primary/master/parent device (e.g., Master Device 100A). In some embodiments, a listing of devices 100 in a device group includes one or more secondary/slave/child devices (e.g., Secondary Device 100B). In some embodiments, an indication of a device's status within a hierarchy of devices 100 of a device group is provided. In some embodiments, privileges to manage service plans and/or devices of a device group are indicated. In some embodiments, identifiers for devices 100 (and/or for users of devices 100) are provided. In some embodiments, a user of device 100 selects a particular device within a listing to access additional information for the particular device.

Figure 119:
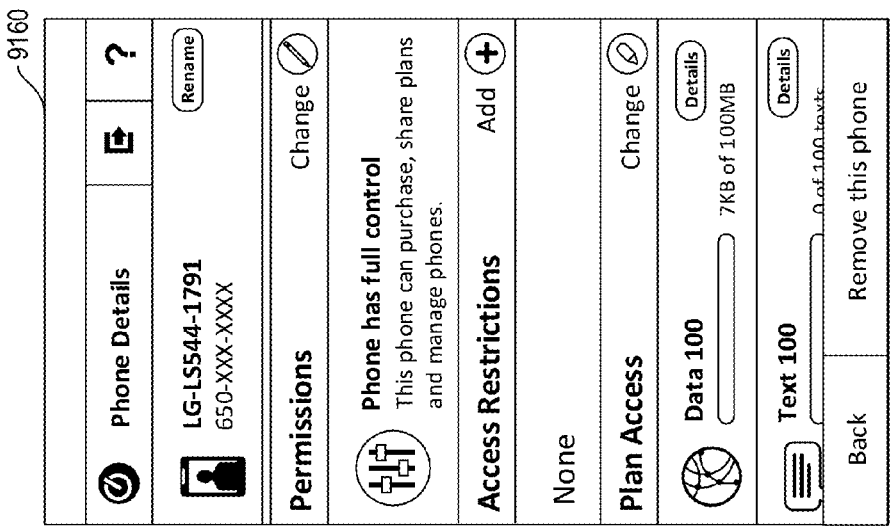
FIG. 119 illustrates a representative screen that provides detailed information for a particular device in accordance with some embodiments.

FIG. 119 illustrates representative screen 9160, which provides detailed information for a particular device. In some embodiments, a user modifies the detailed information by selecting from one or more buttons/icons through the user interface. In some embodiments, the detailed information provides identifiers for the particular device. In some embodiments, identifiers for the particular device may be changed by the user. In some embodiments, a level of permissions (administrative privileges or other characteristics of service plan and/or device and/or device group management) is indicated. In some embodiments, a user of device 100 selects to change a permissions level for the particular device. In some embodiments, one or more service activity controls (e.g., access restrictions) are indicated for the particular device. In some embodiments, service plan information is provided for the particular device. In some embodiments, service activity controls are added by selecting a button/icon through the interface. In some embodiments, service plan elements are changed by selecting a button/icon through the interface.

Figure 120:
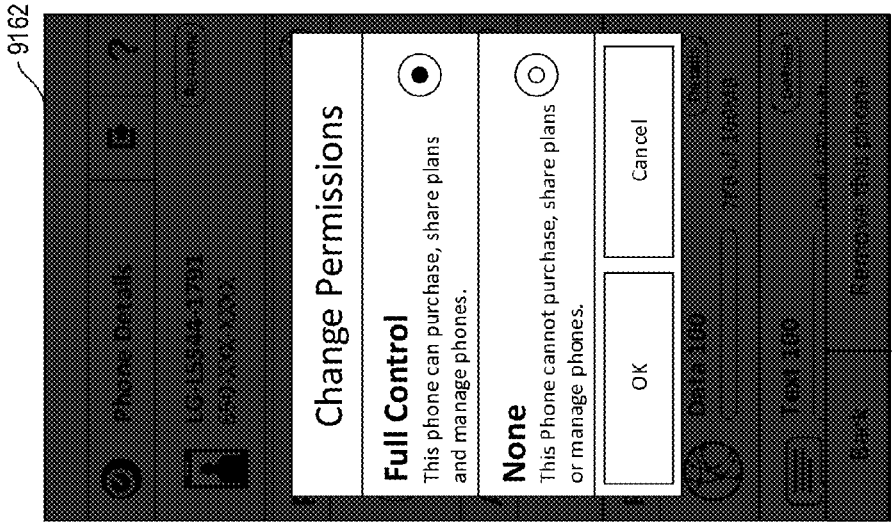
FIG. 120 illustrates a representative screen that indicates permission levels for a particular device in accordance with some embodiments.

FIG. 120 illustrates representative screen 9162, which has an overlay that indicates permissions levels for the particular device. In some embodiments, permission levels include full control of a device and/or a device group and/or a service plan for a device. In some embodiments, full control permissions level includes managing service plans for a device. In some embodiments, full control permissions level includes purchasing service plans for a device. In some embodiments, full control permissions level includes manage devices 100 of a device group. In some embodiments, permission levels include a limited capability to purchase service plans, share service plans, assign service plans, mange service plans, modify service plans, or manage devices 100 of a device group. In some embodiments, additional permission levels between "full control" and "no control" are provided (not illustrated). In some embodiments devices are assigned permissions control within a hierarchy of devices for a device group. In some embodiments, the user/administrator/device group manager selects a permission level for a device 100 of a device group.

Figure 122:
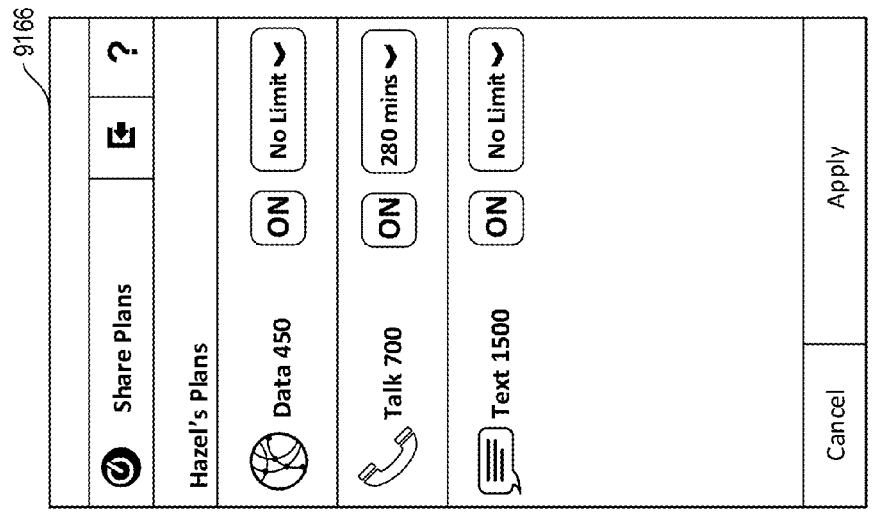
FIGS. 121 and 122 illustrate representative screens that summarize information for sharing service plans for a particular device in accordance with some embodiments.
Figure 121:

FIGS. 121 and 122 illustrate representative screens 9164 and 9166, which summarize information for sharing service plans with a particular device. In some embodiments, as illustrated in FIG. 122, a user with administrative privileges to share a service plan or service plan element selects one or more service plans or service plan elements. In some embodiments, each service plan element or service plan is summarized on a display through the user interface of device 100. In some embodiments, the user selects to enable or disable sharing or a service plan or service plan element by selecting a button/icon (e.g., the "ON" button/icon). In some embodiments, the user selects an amount of service usage to share with the particular device. In some embodiments, the amount of service usage is provided in a drop down menu. In some embodiments, a service usage amount of a service plan to share is an absolute service usage amount or quantity (e.g., number of minutes of voice, number of messages, amount of data in KB/MB/GB). In some embodiments, a service usage amount of a service plan to share is a percentage amount of a service usage allocation for the service plan. FIG. 121 illustrates an overlay screen with different service usage percentages (and corresponding service usage amounts for the percentages) from which the user can select to share the service plan. In some embodiments, the user configures service plan sharing for individual service plans and service plan elements through the user interface and confirms the sharing selection by selecting the "Apply" button/icon.

Figures 123, 124:
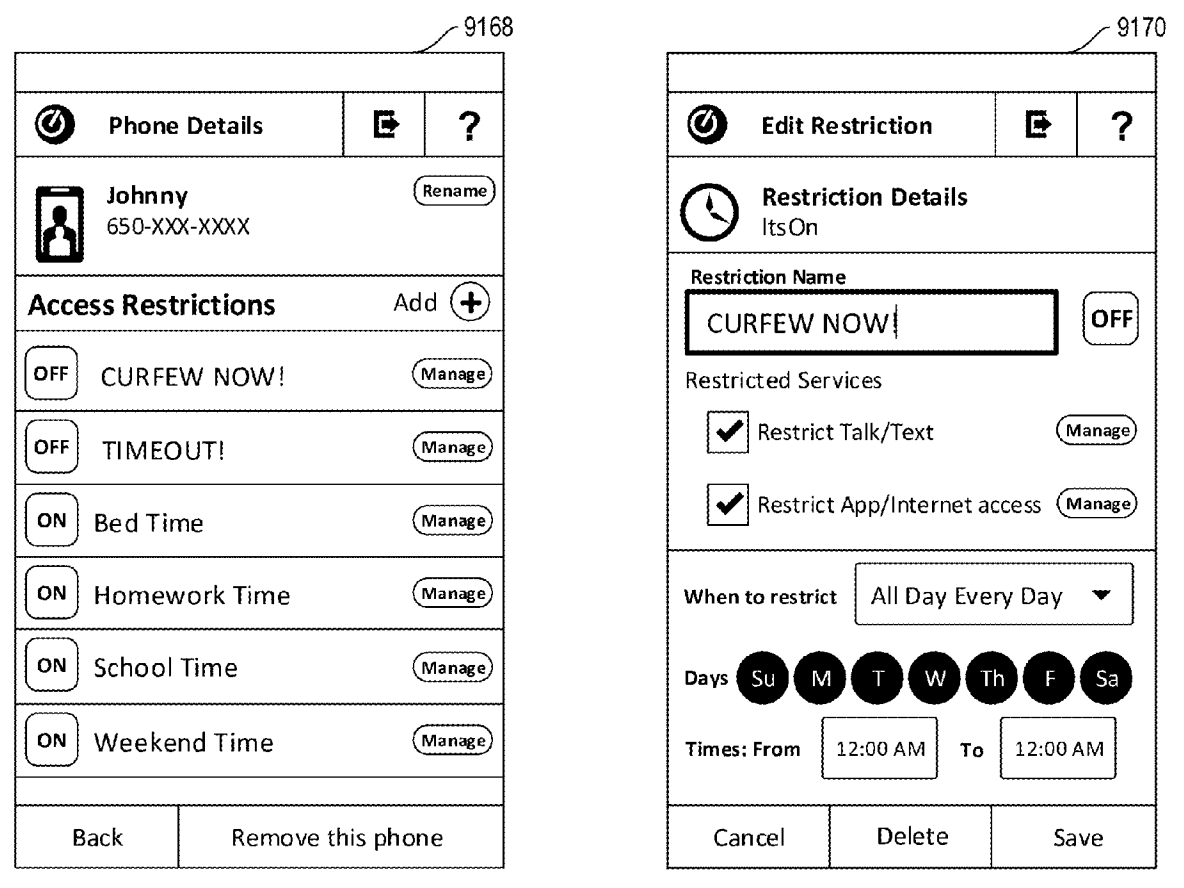

FIG. 123 illustrates representative screen 9168, which provides information on service activity controls (e.g., access restrictions) for a selected device ("Johnny"). In some embodiments, one or more service activity controls are applied to a selected device. In some embodiments, individual service activity controls are managed by selecting a button/icon through the user interface of device 100. In some embodiments, the selected device is a device in a device group managed by a user with administrative privileges for the device group. In some embodiments, the selected device is the user's device (i.e., device 100). In some embodiments, the selected device is a device other than the user's device. In some embodiments, the service activity controls apply to one or more devices 100 in a device group. In some embodiments, the device group manager (or administrator) manages service activity controls for multiple devices 100 simultaneously. In some embodiments, a set of service activity controls apply to multiple devices 100, with configurations for the individual service activity controls customized to each device. In some embodiments, a service activity control is defined for a device, a set of devices, a device group, a set of device types, a set of devices having a permission level, a set of devices grouped together in a hierarchy of devices, or other device collection. In some embodiments, each service activity control can be enabled or disabled for each device (or for a set of devices). In some embodiments, each service activity control can be modified for each device (or for a set of devices). As illustrated in FIG. 123, a number of service activity controls apply to a device, with some service activity controls enabled ("ON") and some service activity controls disabled ("OFF").

FIG. 124 illustrates representative screen 9170, which enables a user to modify a particular service activity control (access restriction) for a selected device (or a selected set of devices). In some embodiments, a user with administrative privileges (device group manager, administrator) renames the service activity control. In some embodiments, the administrator selects through the user interface of device 100 properties of the service activity control. In some embodiments, the administrator selects "what" the service activity control restricts. In some embodiments, the service activity control applies to particular service plans. In some embodiments, the service activity control applies to service types. In some embodiments, the service activity control applies to particular applications (or sets of applications). In some embodiments, the service activity control applies to network access (internet access). In some embodiments, the administrator selects to restrict incoming and/or outgoing communication (talk, text, messaging, video, chat, email, etc.) for the selected device (or selected set of devices) using the service activity control. In some embodiments, the administrator selects to restriction application usage and/or Internet access for the selected device (or selected set of devices). In some embodiments, the administrator selects "when" the service activity control applies. In some embodiments, a drop down menu (or other user interface construct) is presented for different time periods. In some embodiments, the administrator selects a customized time period for when the service activity control applies. In some embodiments, the administrator selects days of the week and time periods within days of the week to which the service activity control applies. In some embodiments, the administrator selects days of the week, and time periods that overlap different days of the week to which the service activity control applies. FIG. 124 illustrates a service activity control entitled "Curfew Now!" that applies for all days and all times. In some embodiments, when the "Curfew Now!" service activity control is applied for a device, restrictions imposed by the service activity control apply continuously once enabled until the service activity control is disabled.

Figures 125, 126:
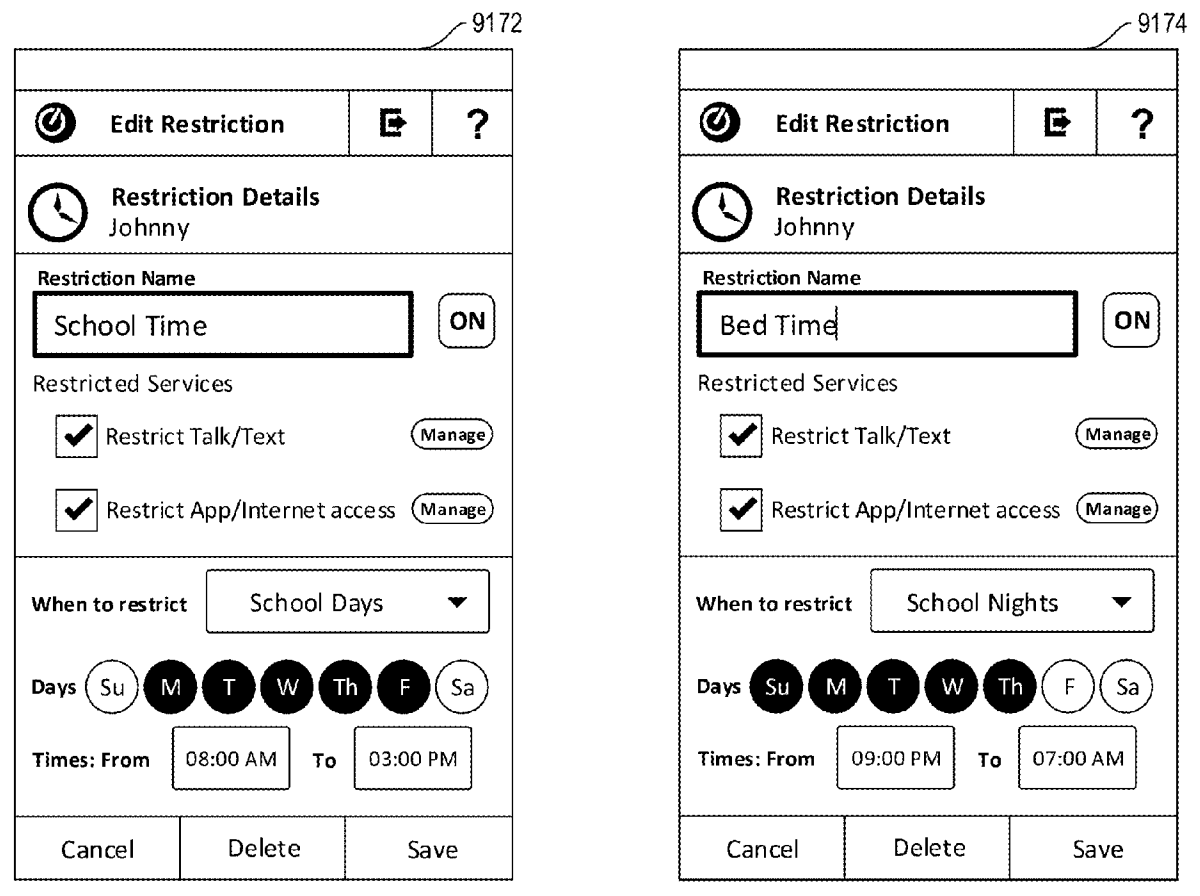

FIG. 125 illustrates representative screen 9170, which allows a user to modify a service activity control (access restriction) for a selected device (or a selected set of devices). In some embodiments, an administrator defines a "School Time" service activity control to apply for weekdays (Monday to Friday) during school hours (e.g., 8:00 AM to 3:00 PM). In some embodiments, the "School Time" service activity control restricts use of the selected device (or selected set of devices) for one or more services. In some embodiments, communication to/from the selected device (or selected set of devices) is limited by the service activity control during the specified time periods. In some embodiments access to applications and/or networks is limited during the specified time periods. In some embodiments, a drop down menu provides a predefined time period for the service activity control (e.g., "School Days"). In some embodiments, the predefined time period automatically populates the time controls with a particular setting. In some embodiments, the administrator overrides the default time control settings to "customize" the settings for "School Days".

FIG. 126 illustrates representative screen 9174, which allows a user to modify a service activity control (access restriction) for a selected device (or a selected set of devices). In some embodiments, an administrator defines a "Bed Time" service activity control to apply for nights that precede weekdays. In some embodiments, the "Bed Time" service activity control restricts use of the selected device (or selected set of devices) for one or more services. In some embodiments, communication to/from the selected device (or selected set of devices) is limited by the service activity control during the specified time periods. In some embodiments access to applications and/or networks is limited during the specified time periods. In some embodiments, a drop down menu provides a predefined time period for the service activity control (e.g., "School Nights"). In some embodiments, the predefined time period automatically populates the time controls with a particular setting. In some embodiments, the administrator overrides the default time control settings to "customize" the settings for "School Nights." As illustrated in FIG. 126, in some embodiments, time periods begin on one day and end on another day.

FIG. 127 illustrates representative screen 9176, which allows a user to define a service activity control (access restriction) for a selected device (or a selected set of devices). In some embodiments, an administrator defines a "My Restriction" service activity control to apply for a specified time period and to a set of particular services. In some embodiments, communication services are restricted. In some embodiments, application use on the selected device (or selected set of devices) is restricted. In some embodiments, network access by the selected device (or selected set of devices) is restricted. In some embodiments, customized service activity controls are saved on the selected device (or selected set of devices), on another device in a device group, in a network element, or a combination of these. In some embodiments, the administrator loads one or more customized service activity controls to one or more devices 100 in a device group.

FIG. 128 illustrates representative screen 9178, which allows a user to define exceptions that override a service activity control (or a set of service activity controls). In some embodiments, the exception provides for communication by the selected device (or selected set of devices) to and/or from other devices, users, individuals, groups, etc. In some embodiments, a default exception is "no exception." In some embodiments, the administrator selects a set of users (people) with which the selected device (or selected set of devices) can communicate to override a service activity control. In some embodiments, the administrator selects a set of people in a contact list (on the selected device (or selected set of devices), on another device, for a device group, or obtained from a network element.) In some embodiments, the administrator defines a specific set of people to which the selected device (or selected set of devices) can communicate to override the service activity control.

Figures 129, 130:
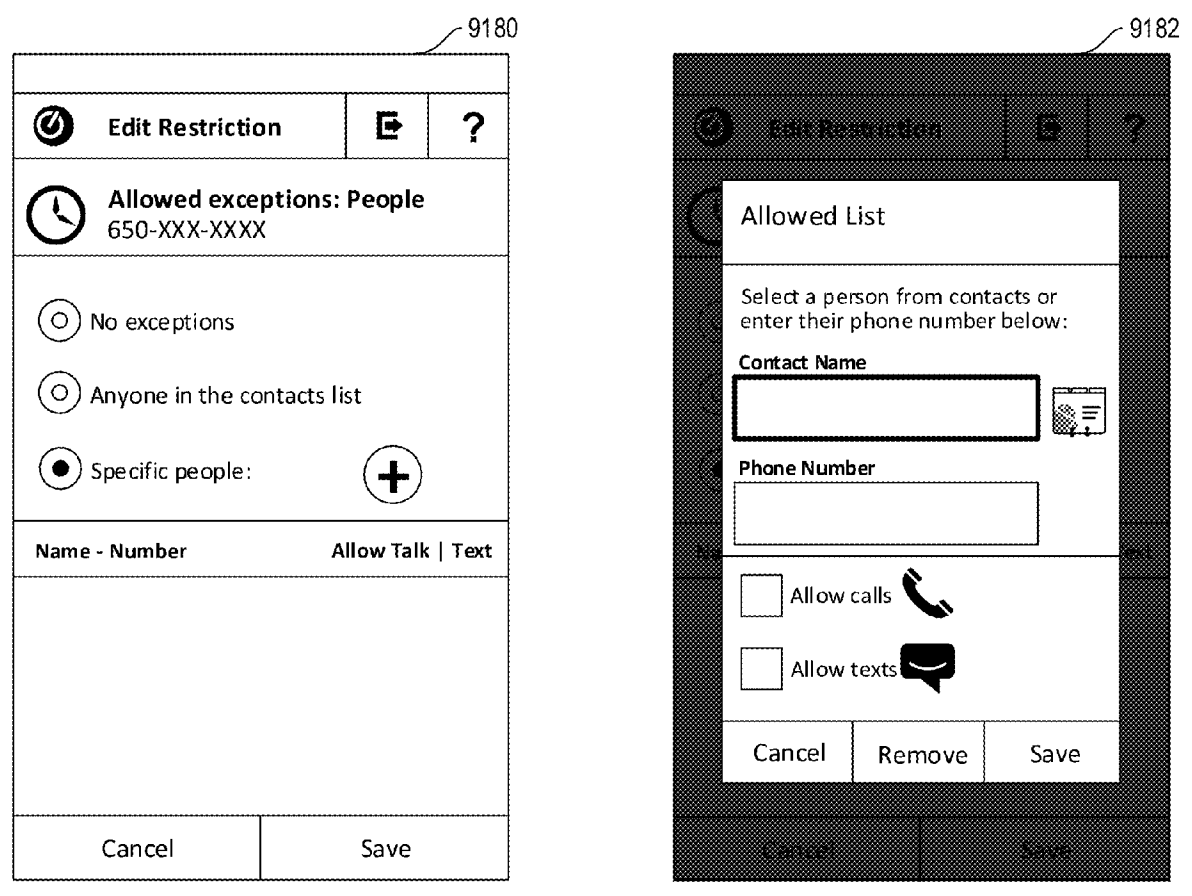

FIG. 129 illustrates representative screen 9180, which allows a user to define a set of specific people to allow as an exception for communication that overrides one or more service activity controls. In some embodiments, the administrator selects specific people by selecting a button/icon through the user interface. In some embodiments, the administrator selects a pre-defined (or previously defined) list of specific people to populate the restriction exception. In some embodiments, the administrator access a contact list of the selected device (or selected set of devices), a contact list of another device in a device group, a contact list for a device group, or a network-based contact list to select individuals to include in the exception list.

FIG. 130 illustrates representative screen 9182, which allows a user to select an individual from a contact list to include in a restriction exception list that overrides a service activity control. In some embodiments, the administrator searches for contacts within a contact list by entering information in a search field of the user interface. In some embodiments, the administrator searches by contact name and/or by contact identifier and/or by contact number. In some embodiments, the administrator selects one or more communication service types permitted for the individual, e.g., "allow" incoming and/or outgoing voice connections, "allow" incoming and/or outgoing messaging connections, or "allow" incoming and/or outgoing emails.

Figures 131, 132:
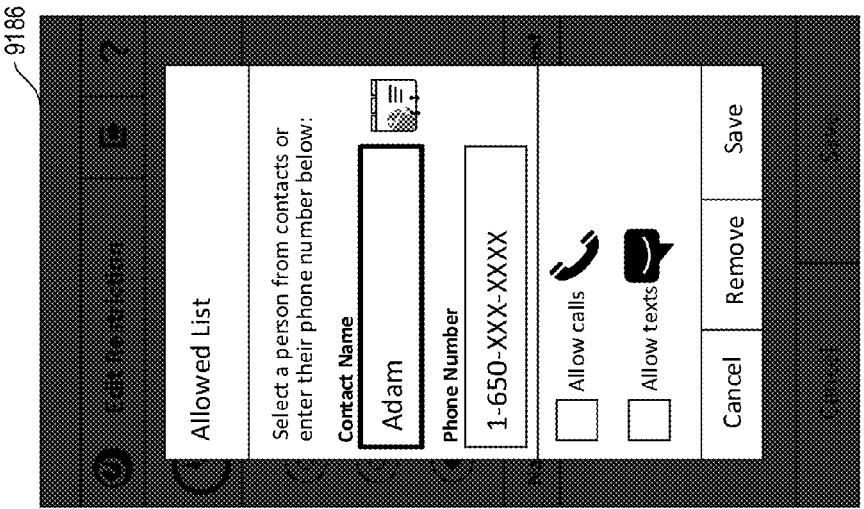
FIG. 131 illustrates a representative screen for searching for contacts within a contact list to define or modify a restriction exception list in accordance with some embodiments.
FIG. 132 illustrates a representative screen in which a particular contact is selected from the contact list and populated within the allowed list for restriction exceptions in accordance with some embodiments.

FIG. 131 illustrates representative screen 9184, which allows a user to search for contacts within a contact list to define or modify a restriction exception list.

FIG. 132 illustrates representative screen 9186, in which a particular contact ("Adam") is selected from the contact list and populated within the allowed list for restriction exceptions. In some embodiments, by default an added contact is provided full communication access. In some embodiments, by default an added contact is provided no communication access, and the administrator selects to "allow" particular communications with the added contact.

Figures 133, 134:
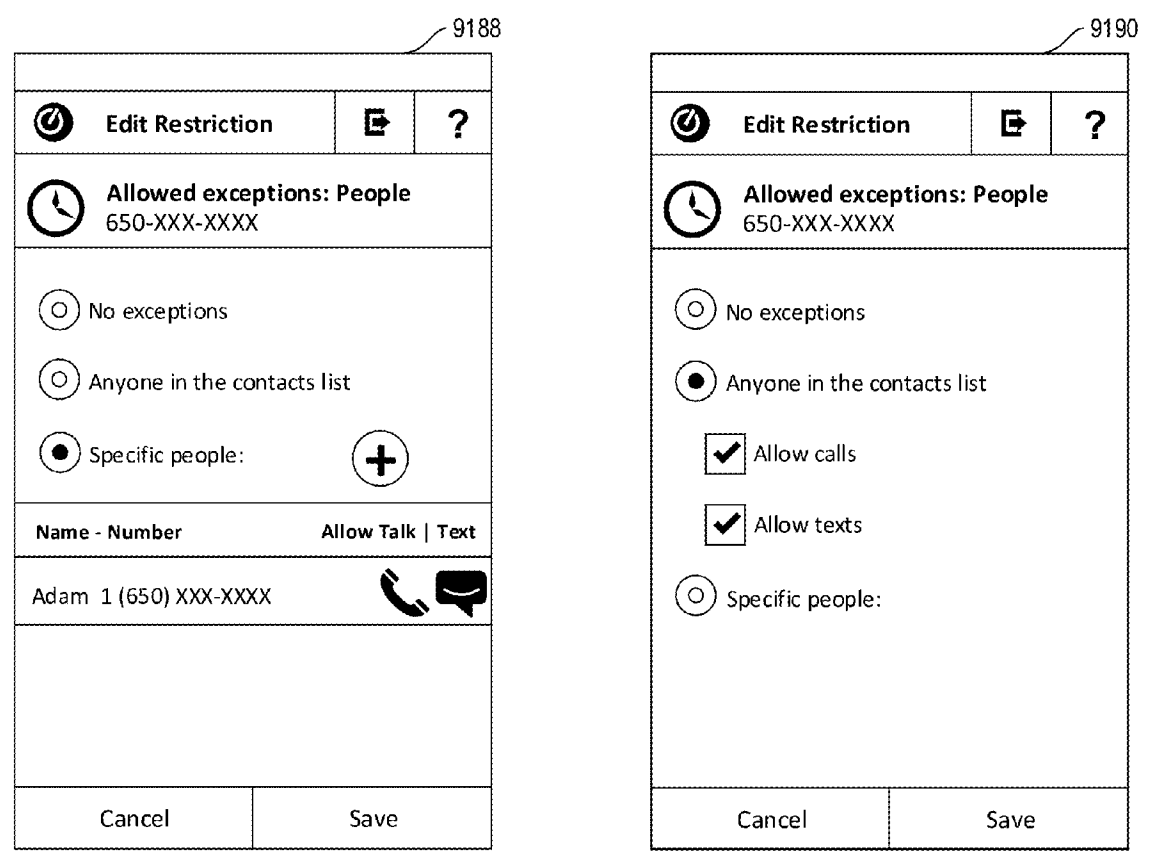

FIG. 133 illustrates representative screen 9188, which allows a user to define allowed exceptions that include specific individuals. In some embodiments, a listing of specific people with which the allowed exception to the service activity control applies is displayed. In some embodiments, an indication of types of communication permitted with the allowed exception individual is displayed (e.g., phone, text messaging). In some embodiments, individuals in the exception list are selected by the administrator and properties of the "allowed exceptions" for the selected individual are modified by the administrator (e.g., using the user interface (or similar user interface) as illustrated in FIG. 132).

FIG. 134 illustrates representative screen 9190, which allows a user to define an "allowed exception" list for a service activity control (access restriction). In some embodiments, the administrator selects to allow all individuals of a contact list. In some embodiments, the administrator selects a subset of individuals on a contact list (not shown). In some embodiments, the administrator selects types of communication allowed as an exception to the service activity control to/from individuals in the contact list. In some embodiments, all (or some) of the contacts in the contact list are allowed to contact the device/user to which the service activity control exception applies. In some embodiments, anyone in the contact list is allowed to call the device/user. In some embodiments, anyone in the contact list is allowed to send text messages to the device/user. In some embodiments, the user/device is allowed to call anyone in the contact list. In some embodiments, the user/device is allowed to text message anyone in the contact list.

Figure 135:
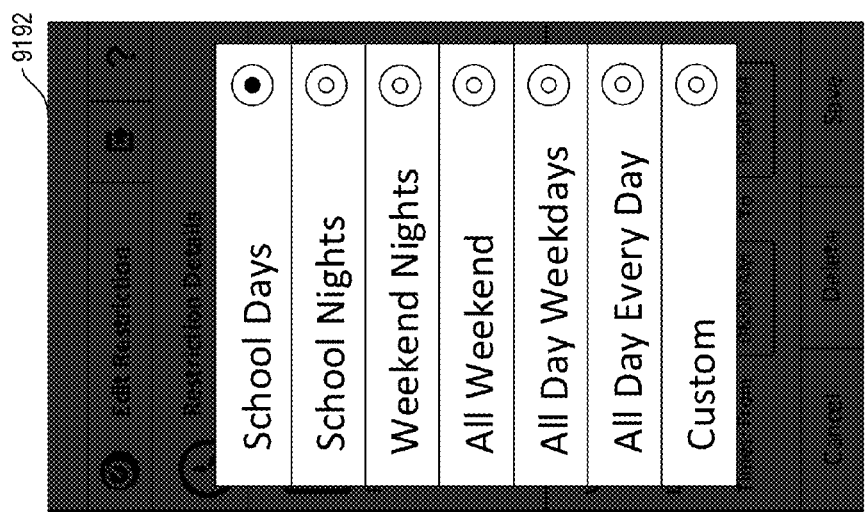

FIG. 135 illustrates representative screen 9192, which allows a user to select a pre-defined time period for a service activity control. In some embodiments, the administrator selects from the list of pre-defined time periods to apply to a service activity control for a selected device. In some embodiments, the administrator customizes time periods to apply to a service activity control. In some embodiments, the definitions of the pre-defined time periods are modifiable by the administrator through the user interface of device 100.

Figure 136:
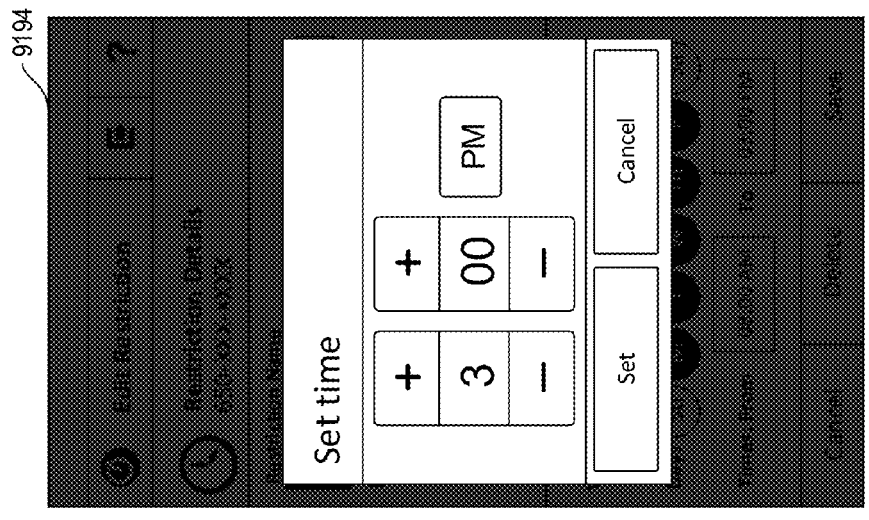

FIG. 136 illustrates representative screen 9194, which allows a user to select an initial time period value or an ending time period value for a service activity control. In some embodiments, the administrator selects one or more time periods for a particular day, set of days, overlapping days, non-overlapping days, or all days of a week (or other grouping of days). In some embodiments, multiple time periods of a day are defined for a service activity control (e.g., early morning and late evening).

Figures 137, 138:
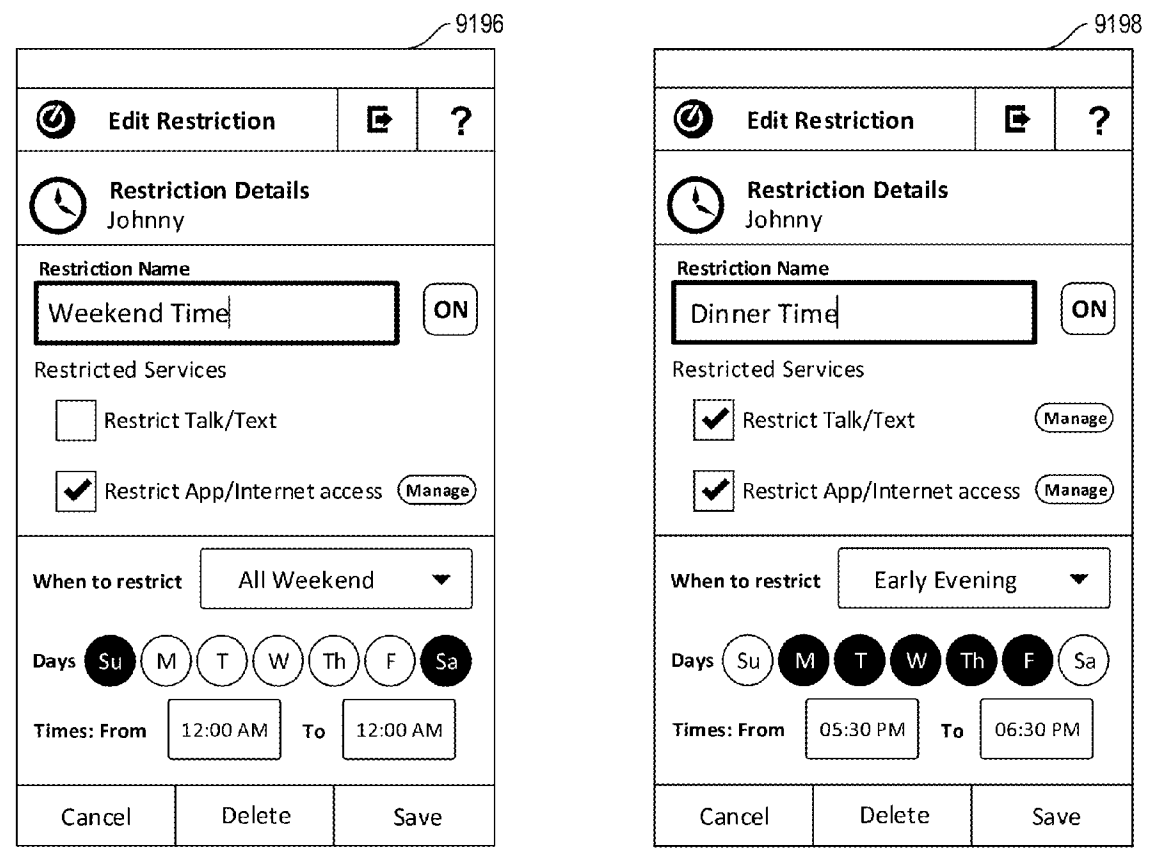

FIG. 137 illustrates representative screen 9196, which allows a user to modify a service activity control (access restriction) for a selected device (or a selected set of devices). In some embodiments, an administrator defines a "Weekend Time" service activity control to apply for weekend days (Saturday and Sunday) during all hours (e.g., 12:00 AM to 12:00 AM). In some embodiments, the "Weekend Time" service activity control restricts use of the selected device (or selected set of devices) for one or more services. In some embodiments, communication to/from the selected device (or selected set of devices) is limited by the service activity control during the specified time periods. In some embodiments access to applications and/or networks is limited during the specified time periods. In some embodiments, a drop down menu provides a predefined time period for the service activity control (e.g., "All Weekend"). In some embodiments, the predefined time period automatically populates the time controls with a particular setting. In some embodiments, the administrator overrides the default time control settings to "customize" the settings for "All Weekend".

FIG. 138 illustrates representative screen 9198, which allows a user to modify a service activity control (access restriction) for a selected device (or a selected set of devices). In some embodiments, an administrator defines a "Dinner Time" service activity control to apply for weekdays (Monday through Friday) during particular defined hours (e.g., 5:30 PM to 6:30 PM). In some embodiments, the "Dinner Time" service activity control restricts use of the selected device (or selected set of devices) for one or more services. In some embodiments, communication to/from the selected device (or selected set of devices) is limited by the service activity control during the specified time periods. In some embodiments access to applications and/or networks is limited during the specified time periods. In some embodiments, a drop down menu provides a predefined time period for the service activity control (e.g., "Early Evening"). In some embodiments, the predefined time period automatically populates the time controls with a particular setting. In some embodiments, the administrator overrides the default time control settings to "customize" the settings for "Early Evening". In some embodiments, the administrator defines a "custom" time period by selecting a "custom" drop down option for the "When to restrict" setting (not shown). In some embodiments, the administrator defines a "custom" time period using a set of selectable sliders (e.g., a bar display of time with arrow indicators for start and stop times).

Figure 139:
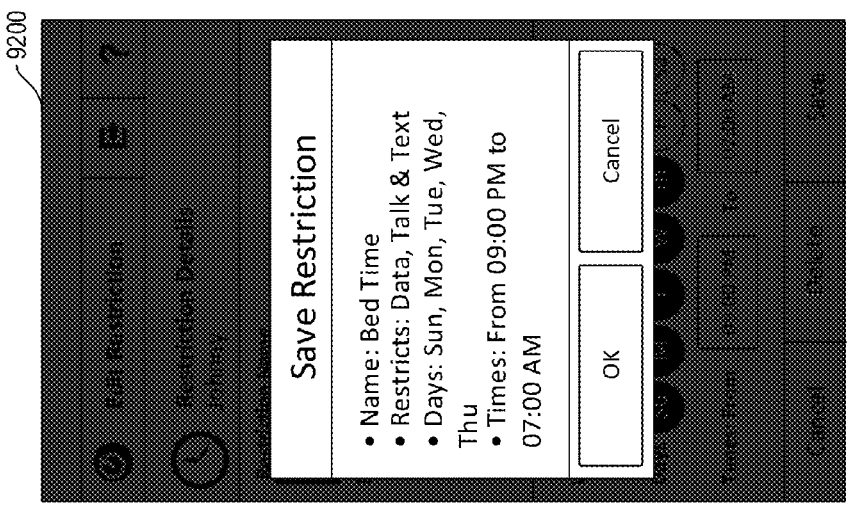
Figure 146:
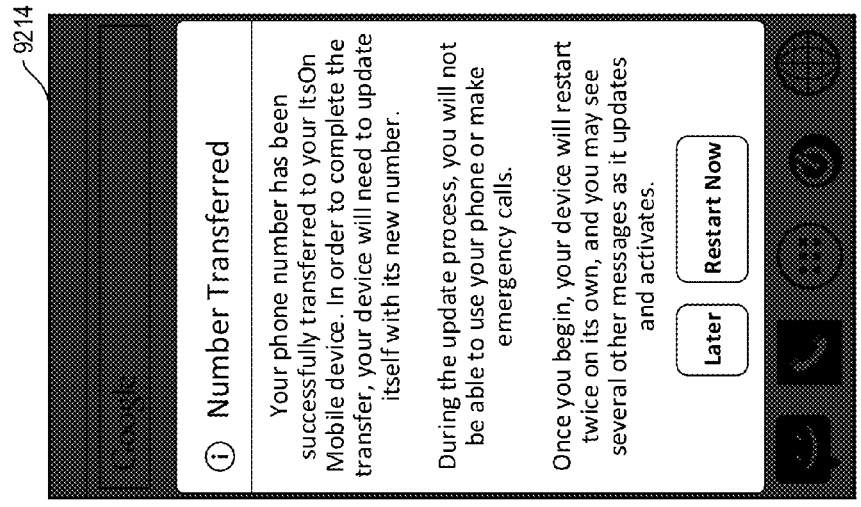
Figure 145:
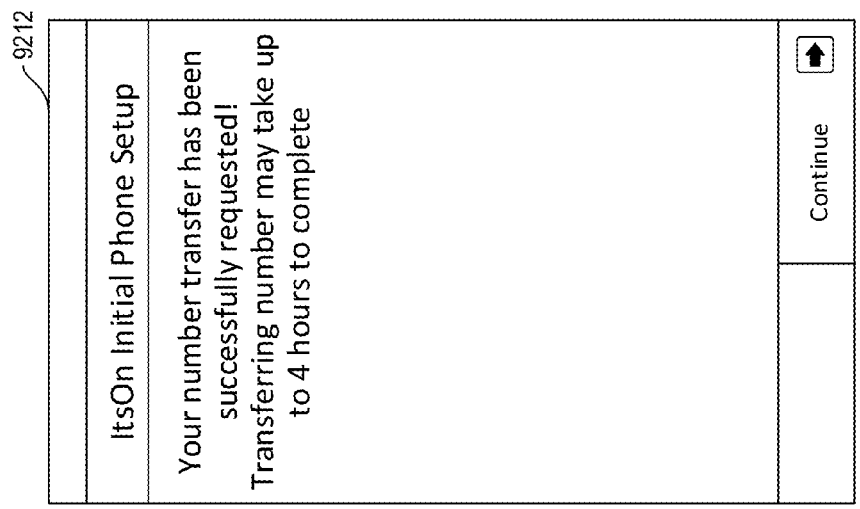
Figure 148:
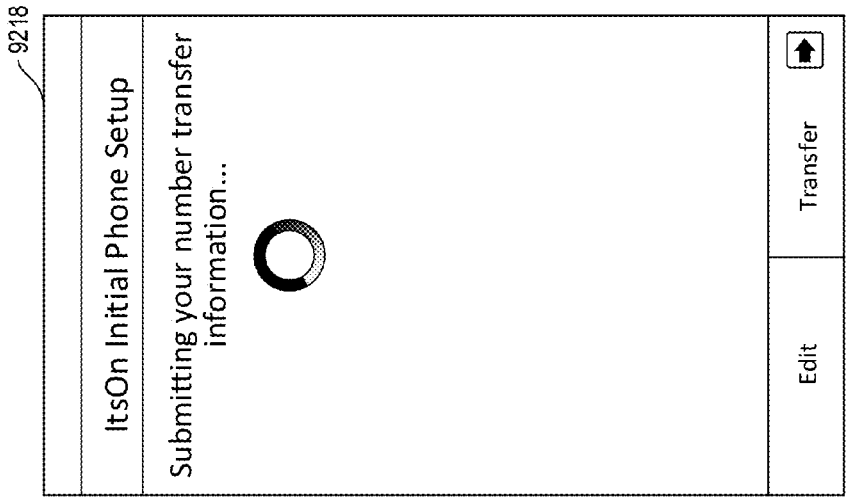
Figure 147:
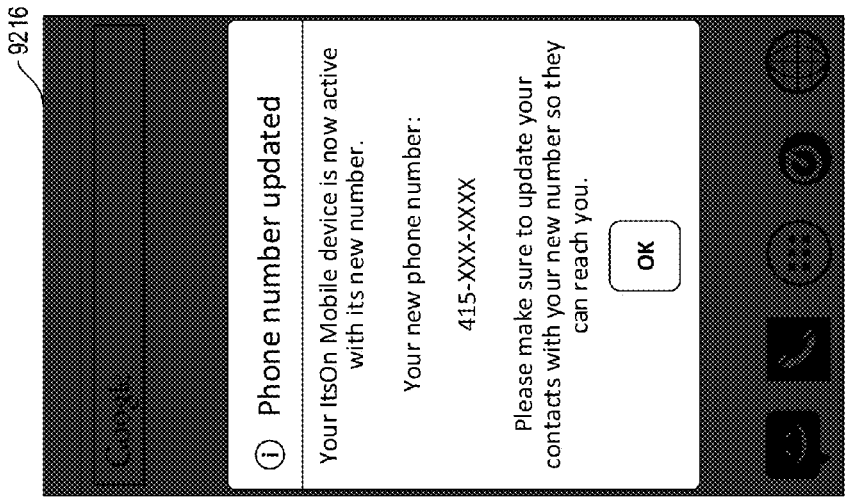
Figure 150:
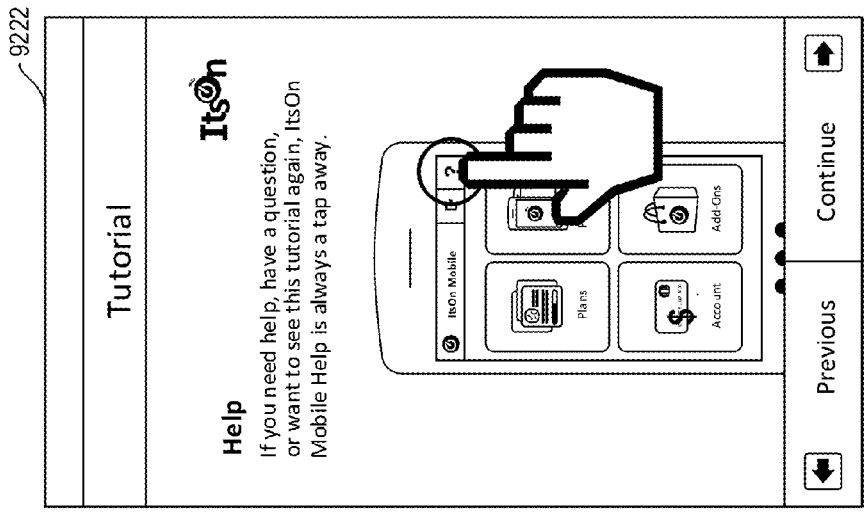
Figure 149:
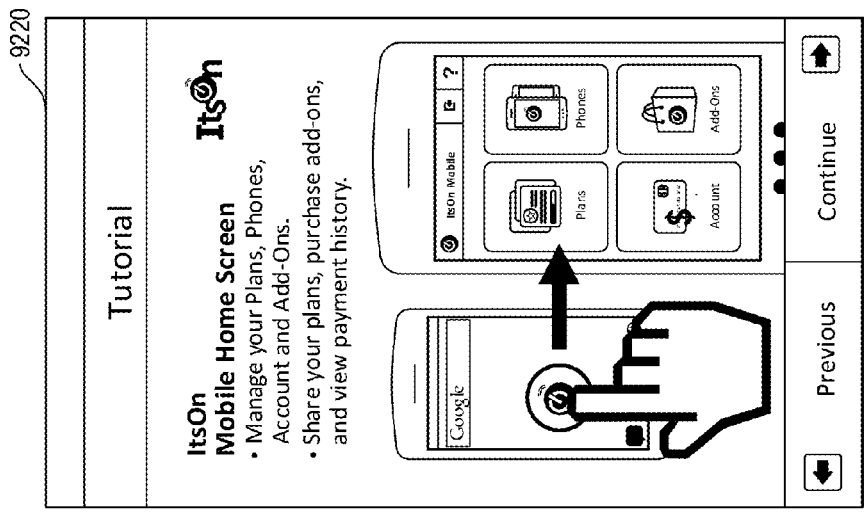
Figure 151:
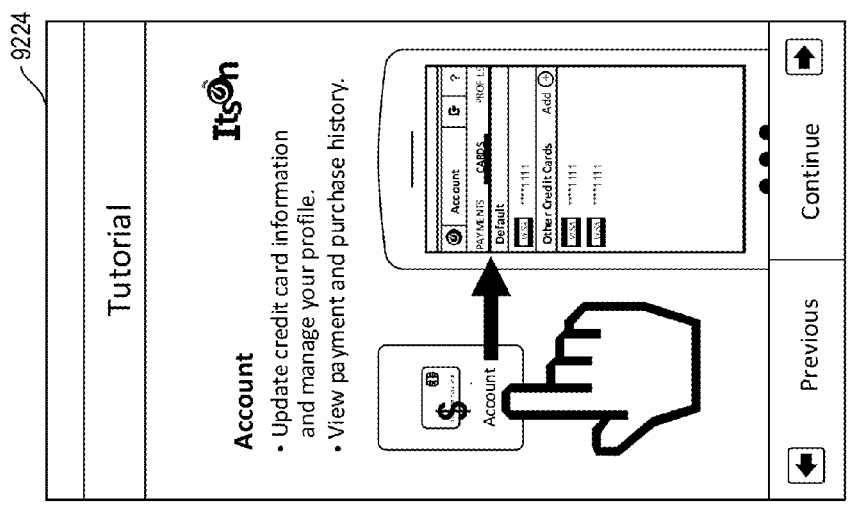
Figure 152:
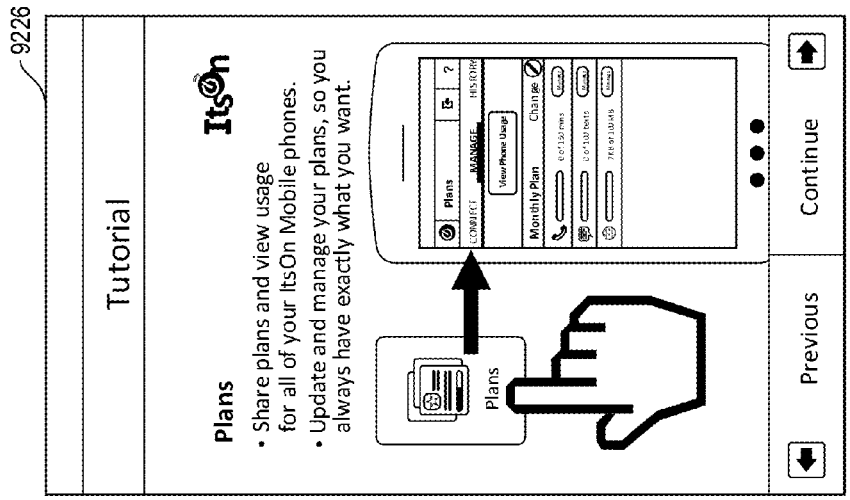
Figure 154:
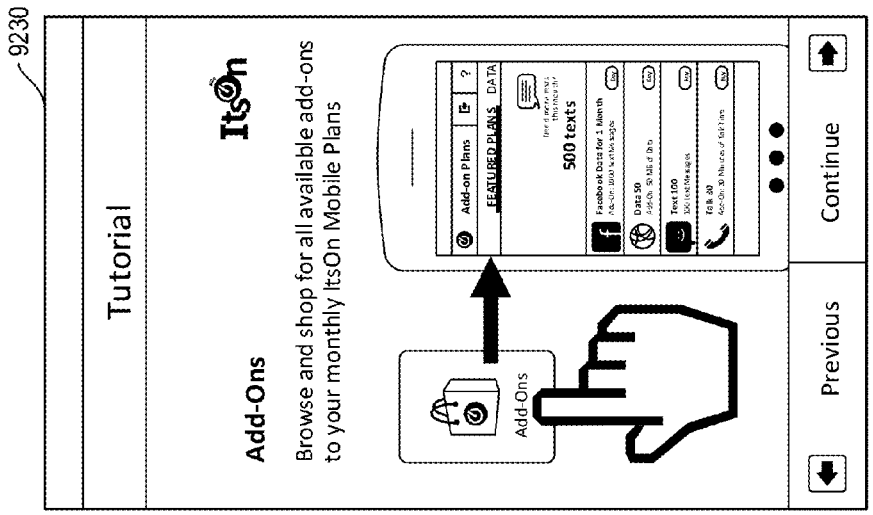
Figure 153:
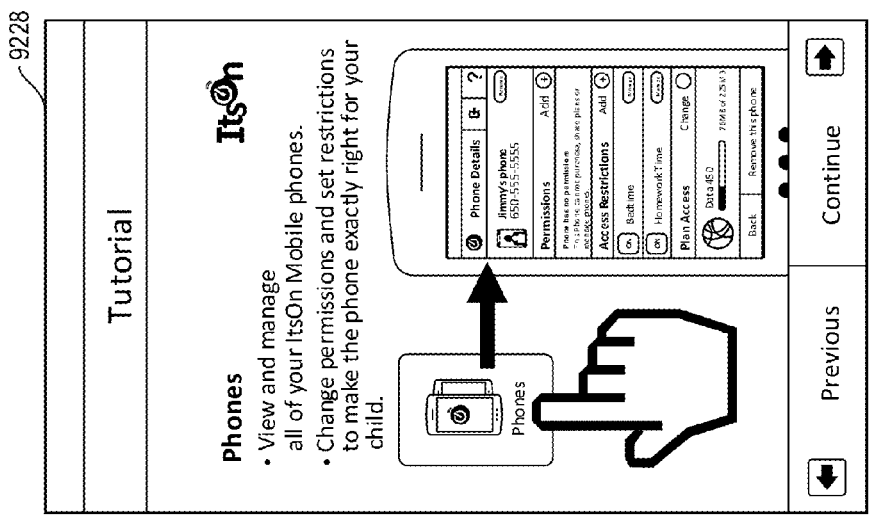

FIG. 139 illustrates representative screen 9200, which includes an overlay that summarizes a service activity control (access restriction) defined by the administrator. In some embodiments, one or properties of the service activity control are summarized in the overlay screen. In some embodiments, the administrator approves the definition of the service activity control by selecting a button/icon. In some embodiments, the administrator does not approve the definition of the service activity control by selecting a different button/icon. In some embodiments, the administrator returns to editing the service activity control and subsequently approves the edited service activity control.

Figure 140:
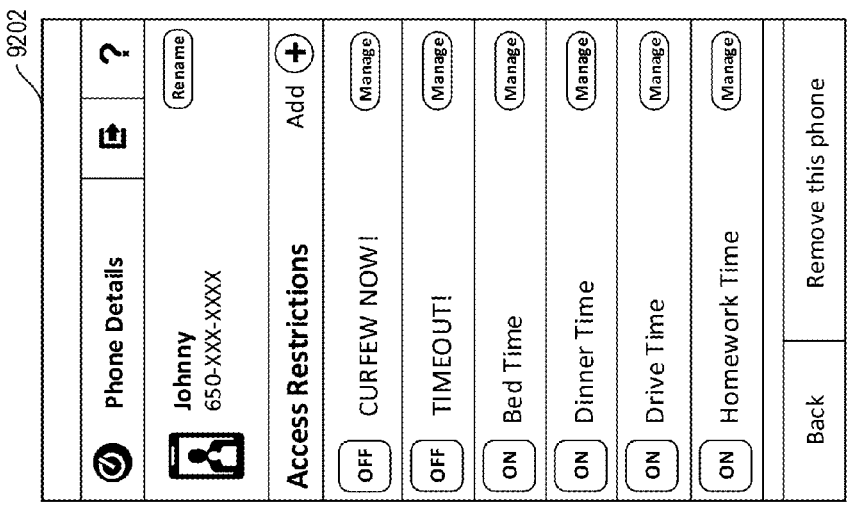

FIG. 140 illustrates representative screen 9202, which provides a list of service activity controls (access restrictions) for a selected device, including newly defined service activity controls included in the list of service activity controls.

FIG. 141 illustrates representative screen 9204, which allows a user to define an exception to a service activity control, the exception applying to one or more particular applications available on a device and/or to one or more networks (or network types) available for the selected device (or selected set of devices) to communicate over. In some embodiments, the "allowed exception" applies to a particular service activity control, to a set of service activity controls or to all service activity controls for the selected device (or selected set of devices). In some embodiments, the "allowed exception" applies to a particular device, to a set of devices, or to all devices of a device group. In some embodiments, the "allowed exception" permits the selected device (or selected set of devices) to communicate on a particular type of network (e.g., a home mobile network, a Wi-Fi network, a "femtocell" network, a 3G/4G network, a roaming mobile network). In some embodiments, the "allowed exception" permits the selected device (or selected set of devices) to communicate on mobile wireless networks. In some embodiments, the "allowed exception" permits the selected device (or selected set of devices) to communicate on Wi-Fi networks. In some embodiments, the administrator selects from a set of specific wireless networks over which the selected device (or selected set of devices) communicates. In some embodiments, the administrator selects a specific set of service provides over which selected device (or selected set of devices) is permitted to communicate. In some embodiments, the "allowed exception" defines one or more specific applications (or application types) that are permitted by the allowed exception to the service activity control (or set of service activity controls). In some embodiments, a list of applications available on the selected device (or selected set of devices) is provided to the administrator. In some embodiments, a superset list of applications for the selected device (or selected set of devices) is provided (e.g., including both applications installed on the selected device(s) and a set of applications that may be installed on the selected device(s)). In some embodiments, the administrator selects to allow particular applications from the displayed list. In some embodiments, software/hardware on the selected device (or selected set of devices), in the network, or a combination thereof, verifies one or more applications, e.g., using secure credentials or certificates. In some embodiments, only verified applications can be "allowed." In some embodiments, unverified applications are tagged and/or indicated to the administrator.

In some embodiments, service activity controls (access restrictions) apply to particular network types (e.g., disallow communication for particular times on particular networks). In some embodiments, service activity controls restrict access to mobile wireless networks. In some embodiments, service activity controls restrict access to Wi-Fi wireless networks. In some embodiments, service activity controls restrict based on a combination of wireless network type, specific wireless networks, specific communication types, applications, application types, time-based restriction, etc.

FIGS. 142 through 148 illustrate representative screens 9206, 9208, 9210, 9212, 9214, 9216, and 9218 for transferring a device number from another device to the particular device, e.g., as selected by an administrator.

FIGS. 149 through 156 illustrate representative screens 9220, 9222, 9224, 9226, 9228, 9230, 9232, and 9234, which present tutorial information to a user of device 100.

In some embodiments, a user interface presents one or more screens through which an administrator can select service plans (or elements thereof) with one or more devices 100. In some embodiments, the administrator selects a particular device from a listing of devices (e.g., of a device group) and then selects service plans to share with the particular device. In some embodiments, the administrator selects a particular service plan from a listing of service plans (e.g., for a particular device) and then selects a particular device (or devices) with which to share the particular service plan. In some embodiments, a user interface presents a table or matrix of information that illustrates sharing of service plans among a set of devices. In some embodiments, a user interface presents one or more screens through which an administrator can select service activity controls (restrictions) to apply to one or more devices 100.

In some embodiments, the administrator selects a particular device from a listing of devices (e.g., of a device group) and then selects a service activity control (restriction) to apply to the particular device. In some embodiments, the administrator selects a service activity control (restriction) from a listing of service activity controls (restrictions) (e.g., defined for a device group) and then selects a device (or devices) to which to apply the service activity control (restriction). In some embodiments, a user interface presents a table or matrix of information that illustrates applications of service activity controls (restrictions) among a set of devices 100.

In some embodiments, application programming interfaces (APIs) are provided through which devices 100 and/or network elements communicate information, e.g., within device 100, between device 100 and a network elements, or between network elements of a network system. In some embodiments APIs are defined for providing service plan and device management. In some embodiments, APIs are defined to provide for obtaining, exchanging, modifying, and/or transferring credentials to/from device 100. In some embodiments, APIs are defined to provide for exchanging credentials between device 100 and a website. In some embodiments, APIs are defined to provide for transferring credentials between device 100 and one or more activation servers. In some embodiments, APIs are defined to provide for transferring credentials between activation servers. In some embodiments, APIs are defined to allow for activating multiple devices 100. In some embodiments, APIs are defined to allow for managing multiple devices 100, device groups, or other collections of devices 100. In some embodiments, APIs are defined for managing quality of service features. In some embodiments, APIs are defined for managing service plan offers. In some embodiments, APIs are defined for managing sponsored service plans.

What is claimed is:

1. A method of operating a master wireless device service processor to manage service plan sharing, comprising:
    obtaining, from a master user, a device usage allocation applicable to two or more wireless devices, the two or more wireless devices associated respectively with respective ones of at least two different users associated with a service plan to which the master user subscribes;
    obtaining aggregate measures of device usage associated respectively with the at least two different users;
    performing a comparison of one or more of the aggregate measures of device usage with a usage metric; and
    based on the comparison, adjusting the device usage allocation.

2. The method of claim 1, further comprising authenticating the master wireless device based on a credential that identifies at least one of the master wireless device or the master user.

3. The method of claim 1, further comprising modifying the device usage allocation based on an input from the master user.

4. The method of claim 3, further comprising authenticating the master user based on a credential that identifies the master user.

5. The method of claim 1, further comprising:
    obtaining a modification request from at least one device of the two or more wireless devices; and
    modifying the device usage allocation based on the modification request.

6. The method of claim 5, further comprising:
    before modifying the device usage allocation based on the modification request, obtaining, from the master user, permission to modify the device usage allocation based on the modification request.

7. The method of claim 1, wherein the device usage allocation identifies an amount of time, an amount of data, a number of text messages, a number of voice minutes, an application on at least one of the two or more devices, or a combination of these.

8. The method of claim 1, wherein the comparison compares at least one of the aggregate measures of device usage to a particular percentage or fraction of the device usage allocation.

9. The method of claim 1, further comprising obtaining, from the master user, one or more parameters to assist in adjusting the device usage allocation.

10. The method of claim 1, further comprising sending a notification regarding the adjustment to at least one of the two or more devices, the notification for presentation through a user interface of the at least one of the two or more devices.

11. The method of claim 1, wherein the master wireless device is not one of the two or more wireless devices.

12. The method of claim 1, wherein one of the different users is a first user, and wherein a particular device of the two or more wireless devices is also associated with a second user in addition to being associated with the first user, and wherein the device usage allocation does not apply to the second user.

13. The method of claim 1, wherein a first device of the two or more devices is communicatively coupled to a first network, and wherein a second device of the two or more devices is communicatively coupled to a second network.

14. The method of claim 13, wherein the first network comprises a cellular network, and the second network comprises a Wi-Fi network.

15. The method of claim 13, wherein the first network comprises a cellular network, and the second network comprises a local area network.

16. The method of claim 1, wherein a first device of the two or more devices is associated with a respective one of the different users based at least in part on a credential obtained from that user.

17. The method of claim 1, wherein a first device of the two or more devices is associated with a respective one of the different users based on a selection by the master user.

18. The method of claim 1, wherein a first device of the two or more devices is associated with a respective one of the different users based at least in part on a sensor signal that identifies the another user.

19. The method of claim 1, wherein the device usage allocation indicates an amount of device usage time.

20. The method of claim 19, wherein the comparison comprises determining whether at least one of the aggregate measures of device usage is greater than or equal to a particular percentage or fraction of the amount of device usage time.

21. The method of claim 19, wherein the comparison comprises determining whether at least one of the aggregate measures of device usage is greater than or equal to the amount of device usage time.

22. The method of claim 1, wherein the device usage allocation indicates an amount of wireless data allotted to be transmitted or received by the two or more wireless devices.

23. The method of claim 22, wherein the comparison comprises determining whether at least one of the aggregate measures of device usage is greater than or equal to a particular percentage or fraction of the amount of data allotted to be transmitted or received by the two or more devices.

24. The method of claim 22, wherein the comparison comprises determining whether at least one of the aggregate measures of device usage is greater than or equal to the amount of data allotted to be transmitted or received by the two or more devices.

25. The method of claim 1, wherein adjusting the device usage allocation comprises revoking an unused allocation for at least one of the at least two different users.

* * * * *

UNITED STATES PATENT AND TRADEMARK OFFICE
CERTIFICATE OF CORRECTION

PATENT NO. : 9,571,559 B2
APPLICATION NO. : 14/181910
DATED : February 14, 2017
INVENTOR(S) : Raleigh et al.

It is certified that error appears in the above-identified patent and that said Letters Patent is hereby corrected as shown below:

On the Title Page

The following should be added to the end of the Related U.S. Application Data item (60), page 3, Column 1:
-- provisional application No. 61/264,120, filed on Nov. 24, 2009, provisional application No. 61/264,126, filed on Nov. 24, 2009 --

The following should be added to the end of the Related U.S. Application Data item (63), page 2, Column 2:
-- said application No. 12/695,019 is a continuation-in-part of application No. 12/380,778, filed on Mar. 2, 2009, and a continuation-in-part of application No. 12/380,771, filed on Mar. 2, 2009, said application No. 12/695,020 is a continuation-in-part of application No. 12/380,780, filed on Mar. 2, 2009, said application No. 12/694,445 is a continuation-in-part of application No. 12/380,780, filed on Mar. 2, 2009, said application No. 12/694,451 is a continuation-in-part of application No. 12/380,780, filed on Mar. 2, 2009, said application No. 12/694,455 is a continuation-in-part of application No. 12/380,780, filed on Mar. 2, 2009, said application No. 12/695,021 is a continuation-in-part of application No. 12/380,780, filed on Mar. 2, 2009, said application No. 12/695,980 is a continuation-in-part of application No. 12/380,780, filed on Mar. 2, 2009, and a continuation-in-part of application No. 2/695,019, filed on Jan. 27, 2010, and a continuation-in-part of application No. 12/695,021, filed on Jan. 27, 2010, said application No. 13/134,005, filed on May 25, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Signed and Sealed this
Sixteenth Day of April, 2019

Andrei Iancu
*Director of the United States Patent and Trademark Office*

Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,771 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, said application No. 13/134,028, filed on May 25, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,771 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, said application No. 13/229,580, filed on Sep. 9, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on

CERTIFICATE OF CORRECTION (continued)
U.S. Pat. No. 9,571,559 B2

Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,771 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, said application No. 13/237,827, filed on Sep. 20, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, said application No. 13/239,321, filed on Sep. 21, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, said application No. 13/248,028, filed on Sep. 28, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/247,998, filed on Sep. 28, 2011, and a continuation-in-part of application No. 13/248,025, filed on Sep. 28, 2011, said application No. 13/247,998, filed on Sep. 28, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/248,025, filed on Sep. 28, 2011, said application No. 13/248,025, filed on Sep. 28, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No.

13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, said application No. 13/253,013, filed on Oct. 4, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, and a continuation-in-part of application No. 13/248,025, filed on Sep. 28, 2011, said application No. 13/309,556, filed on Oct. 4, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No.

12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, and a continuation-in-part of application No. 13/248,025, filed on Sep. 28, 2011, and a continuation-in-part of application No. 13/253,013, filed on Oct. 4, 2011, and a continuation-in-part of application No. 13/309,463, filed on Dec. 1, 2011, said application No. 13/309,463, filed on Oct. 4, 2011, is a continuation-in-part of application No. 12/380,759, filed on Mar. 2, 2009, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, and a continuation-in-part of application No. 13/248,025, filed on Sep. 28, 2011, and a continuation-in-part of application No. 13/253,013, filed on Oct. 4, 2011, and a continuation-in-part of application No. 13/309,556, filed on Dec. 1, 2011, said application No. 13/374,959, filed on Jan. 24, 2012, is a continuation-in-part of application No. 12/380,759, filed on Mar. 2, 2009, and a continuation-in-part of application No.

CERTIFICATE OF CORRECTION (continued)
U.S. Pat. No. 9,571,559 B2

12/380,779, filed on Mar. 2, 2009, and a continuation-in-part of application No. 12/380,758, filed on Mar. 2, 2009, and a continuation-in-part of application No. 12/380,778, filed on Mar. 2, 2009, and a continuation-in-part of application No. 12/380,768, filed on Mar. 2, 2009, and a continuation-in-part of application No. 12/380,767, filed on Mar. 2, 2009, and a continuation-in-part of application No. 12/380,780 filed on Mar. 2, 2009, and a continuation-in-part of application No. 12/380,755 filed on Mar. 2, 2009, and a continuation-in-part of application No. 12/380,756 filed on Mar. 2, 2009, and a continuation-in-part of application No. 12/380,770 filed on Mar. 2, 2009, and a continuation-in-part of application No. 12/380,772 filed on Mar. 2, 2009, and a continuation-in-part of application No. 12/380,782 filed on Mar. 2, 2009, and a continuation-in-part of application No. 12/380,783 filed on Mar. 2, 2009, and a continuation-in-part of application No. 12/380,757 filed on Mar. 2, 2009, and a continuation-in-part of application No. 12/380,781 filed on Mar. 2, 2009 and a continuation-in-part of application No. 12/380,774 filed on Mar. 2, 2009, and a continuation-in-part of application No. 12/380,773 filed on Mar. 2, 2009, and a continuation-in-part of application No. 12/380,769 filed on Mar. 2, 2009, and a continuation-in-part of application No. 12/380,777 filed on Mar. 2, 2009, and a continuation-in-part of application No. 12/695,019, filed on Jan. 27, 2010, and a continuation-in-part of application No. 12/695,020, filed on Jan. 27, 2010, and a continuation-in-part of application No. 12/694,445, filed on Jan. 27, 2010, and a continuation-in-part of application No. 12/694,451, filed on Jan. 27, 2010, and a continuation-in-part of application No. 12/694,455, filed on Jan. 27, 2010, and a continuation-in-part of application No. 12/695,021, filed on Jan. 27, 2010, and a continuation-in-part of application No. 12/695,980, filed on Jan. 28, 2010, and a continuation-in-part of application No. 13/134,005, filed on May 25, 2011, and a continuation-in-part of application No. 13/134,028, filed on May 25, 2011, and a continuation-in-part of application No. 13/229,580, filed on Sep. 9, 2011, and a continuation-in-part of application No. 13/237,827, filed on Sep. 20, 2011, and a continuation-in-part of application No. 13/239,321, filed on Sep. 21, 2011, and a continuation-in-part of application No. 13/248,028, filed on Sep. 28, 2011, and a continuation-in-part of application No. 13/247,998, filed on Sep. 28, 2011, and a continuation-in-part of application No. 13/248,025, filed on Sep. 28, 2011, and a continuation-in-part of application No. 13/253,013, filed on Oct. 4, 2011, and a continuation-in-part of application No. 13/309,556, filed on Dec. 1, 2011, and a continuation-in-part of application No. 13/309,463, filed on Oct. 4, 2011. --